United States Patent [19]

Branigin

[11] Patent Number: 5,655,096
[45] Date of Patent: Aug. 5, 1997

[54] METHOD AND APPARATUS FOR DYNAMIC SCHEDULING OF INSTRUCTIONS TO ENSURE SEQUENTIALLY COHERENT DATA IN A PROCESSOR EMPLOYING OUT-OF-ORDER EXECUTION

[76] Inventor: Michael H. Branigin, 151 Ivy Hills Rd., Southbury, Conn. 06488

[21] Appl. No.: 112,212

[22] Filed: Aug. 25, 1993

Related U.S. Application Data

[63] Continuation of Ser. No. 597,580, Oct. 12, 1990, abandoned

[51] Int. Cl.⁶ .................................................. G06F 9/38
[52] U.S. Cl. .................................................. 395/376
[58] Field of Search .................................. 395/375, 800

[56] References Cited

U.S. PATENT DOCUMENTS

| | | | |
|---|---|---|---|
| 3,346,851 | 10/1967 | Thornton et al. | |
| 3,462,744 | 8/1969 | Tomosulo et al. | |
| 4,399,507 | 8/1983 | Cosgrove et al. | 395/375 |
| 4,468,736 | 8/1984 | DeSantis et al. | 395/650 |
| 4,498,136 | 2/1985 | Sproul, III | 395/725 |
| 4,553,203 | 11/1985 | Rau et al. | |
| 4,594,660 | 6/1986 | Guenther et al. | |
| 4,773,041 | 9/1988 | Hassler et al. | 395/400 |
| 4,847,755 | 7/1989 | Morrison et al. | 395/800 |
| 4,858,105 | 8/1989 | Kuriyama et al. | 395/375 |
| 4,891,753 | 1/1990 | Badde et al. | 395/375 |
| 4,903,196 | 2/1990 | Pomerene et al. | 395/375 |
| 5,050,008 | 9/1991 | Dollas et al. | 395/375 |
| 5,063,497 | 11/1991 | Cutler et al. | 395/800 |

OTHER PUBLICATIONS

Specification of U.S. application No. 07/448,720, filed Dec. 11, 1989.

Anderson, D. et al, "The System/360 Model 91: Floating-Point Execution Unit", *IBM Journal*, Jan., 1967, pp. 34–53.

Guilder, George.. Microcosm: The Revolution in Economics and Technology, "Excerpts from", *Electronic Business*, Sep. 4, 1989, pp. 44–48.

Hsu, W.. Patt, Y., "Checkpoint Repair for Out-Of-Order Execution Machines", Proceedings of the 14th Annual International Conference on Computer Architecture, Jun., 1987, pp. 18–26.

Pleszkun, A..Sohi, G., "The Performance Potential of Multiple Functional Unit Processors", Proceedings of the 15th Annual International Symposium on Computer Architecture, May, 1988, pp. 37–44.

Smith, J.E., "Dynamic Instruction Scheduling and Astronautics ZS–1", Computer, Jul. 1989, pp. 21–35.

(List continued on next page.)

*Primary Examiner*—Richard L. Ellis

[57] ABSTRACT

A computer processor employing parallelism through pipelining and/or multiple functional units improved by Sequential Coherency Instruction Scheduling and/or Sequential Coherency Exception Handling. *Sequential Coherency Instruction Scheduling* establishes dependencies based on the sequential order of instructions, to execute those instructions in an order that may differ from that sequential order. Instructions are permitted to execute when all needed source operands will be available by the time required by the instruction and when all logically previous reads and writes of the destination will be accomplished before the time that the instruction will overwrite the destination. *Sequential Coherency Exception Handling* does not use checkpointing or in-order commit. Instead it permits out-of-order execution to actually update the permanent state of the machine out-of-order. It maintains and saves, when an exception is recognized, sequential flow information and completion information about the program execution. To resume the exception causing program after the exception is handled, the saved state is used to re-establish the program flow that was determined prior to the exception and to re-establish which instructions in that flow should not be executed, because they were completed before the exception occurred.

2 Claims, 52 Drawing Sheets

OTHER PUBLICATIONS

Smith, J.E...Pleszkun, A.R., "Implementation of Precise Interrupts in Pipelined Processors", The 12th International Symposium on Computer Architecture Conference Proceedings, Jun., 985, pp. 36–44.

Sohi, G., Valjapeyam, A.R., "Instruction Issue Logic for High Performance Interruptable Pipelined Processors", Proceedings of the 14th International Conference on Computer Architecture, Jun., 1987, pp. 27–37.

Uht, A.. Wedig, R., "Hardware Extraction of Lower–Level Concurrency From Serial Instruction Streams", Proceedings of the 1986 Conference on Parallel Processing, Aug. 1986, pp. 729–736.

Performance Capacity, The Goal

Basic Multi-Functional Unit Processor

FIGURE 3A. IN-ORDER OVERLAPPED EXECUTION

CYCLE 1111111111222222222233333333334444444444555555555566666666667777777777888888888 8
      1234567890123456789012345678901234567890123456789012345678901234567890123456789012345 67890

A  ISUB/S COUNT-1->COUNT, SET CC
B  MOVE/D R11->R10
C  LOAD/D ZX->R11, INCR ADRS
D  FMUL/D R*R10->RP1
E  FMUL/D T*R11->RP2
F  FADD/D RP1+RP2->RS1
G  LOAD/D Y(k)->RYK, INCR ADRS
H  FMUL/D RYK*RS1->RP3
I  GOTO A IF CC.LE.
J  FADD/D Q+RP3->RS2
K  STOR/D RS2->X(k), INCR ADRS

22 Cycles

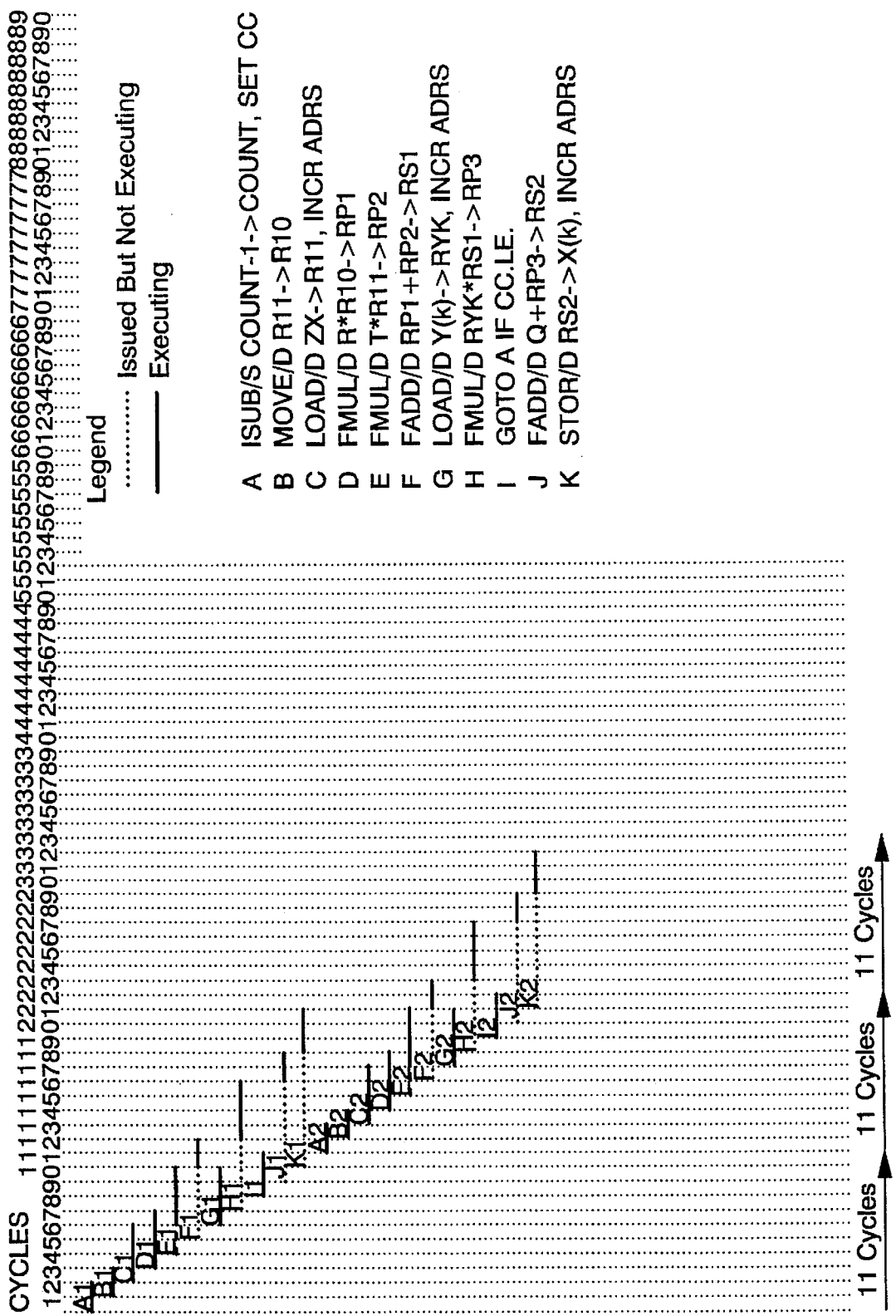

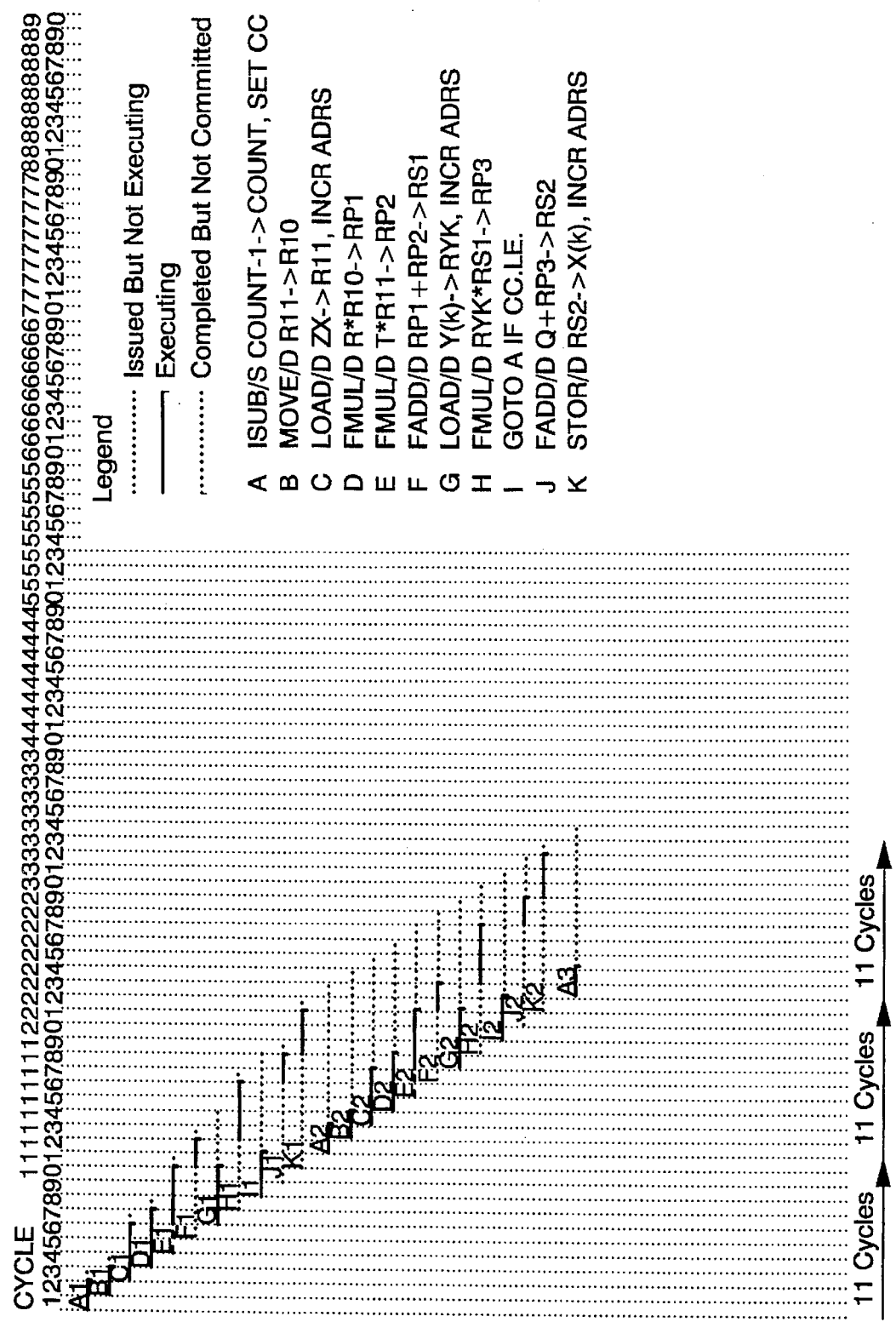

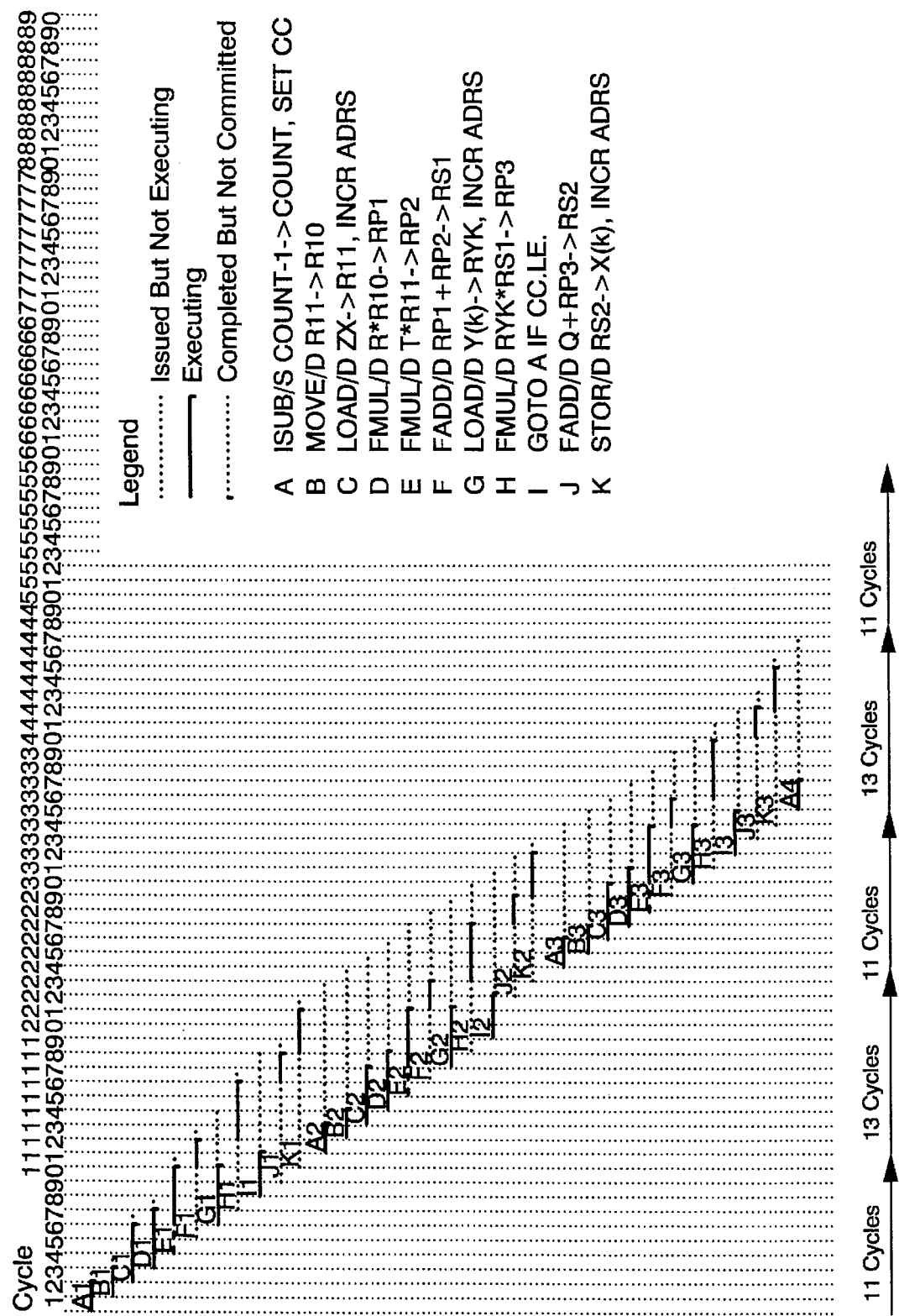

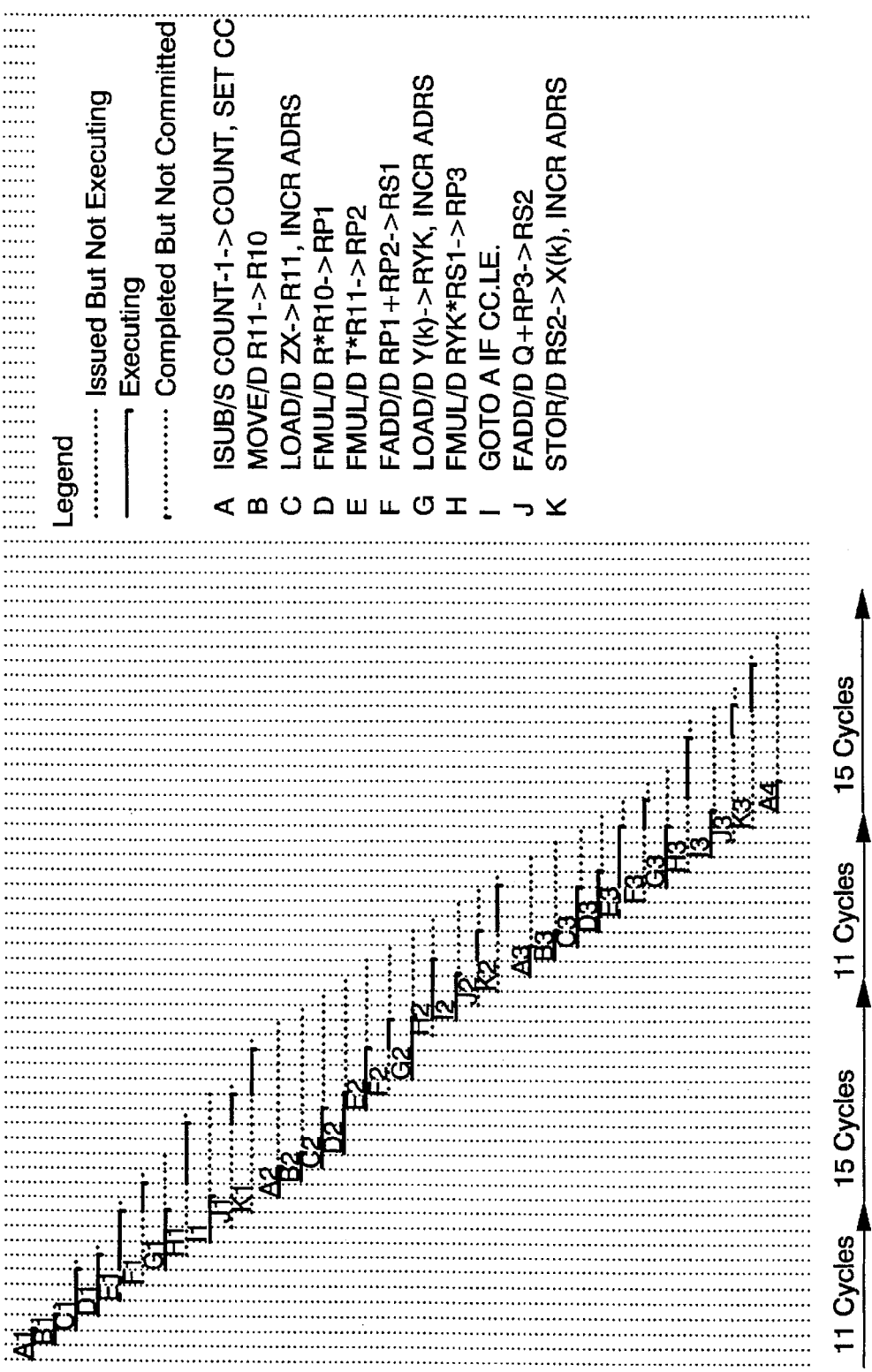

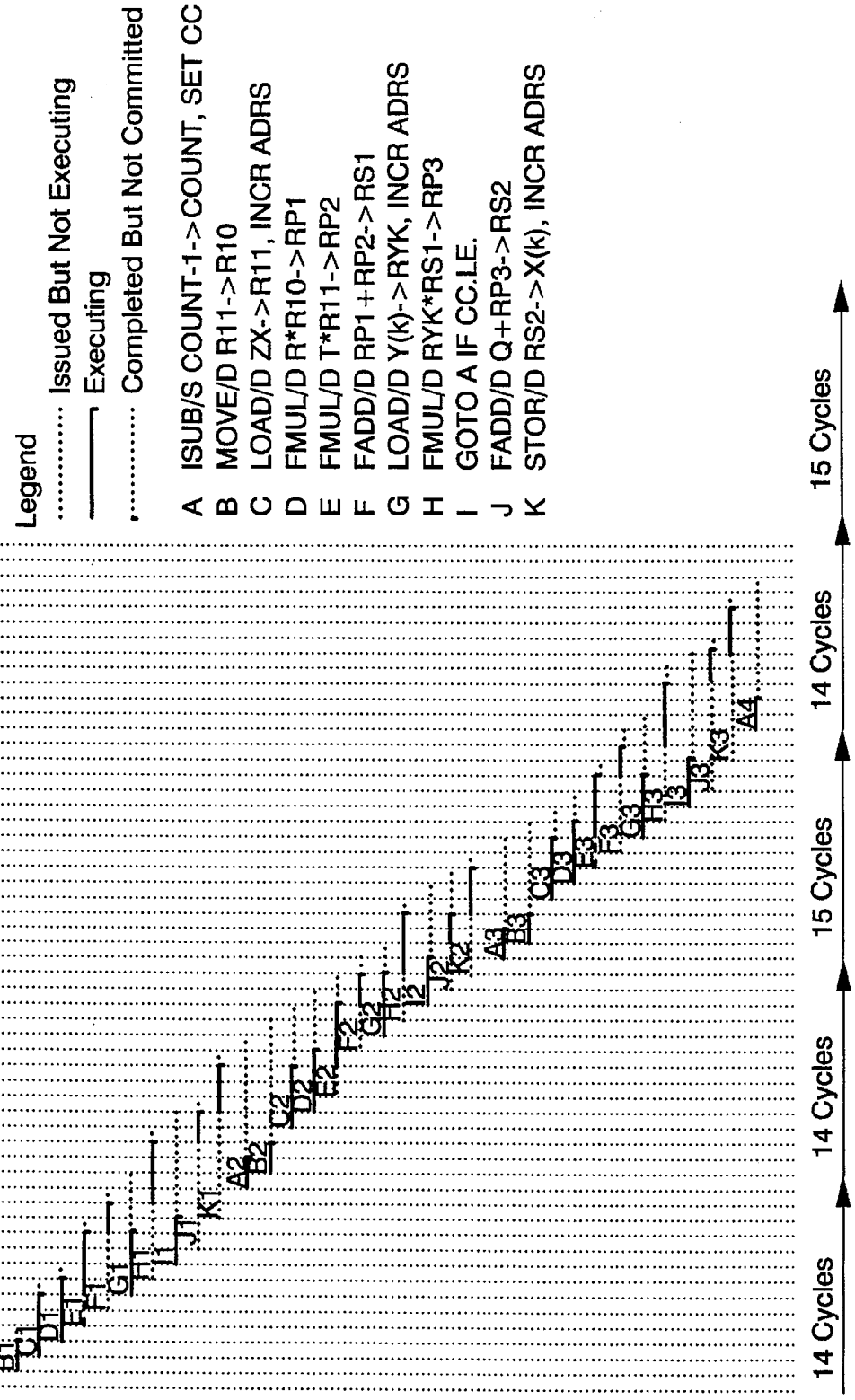

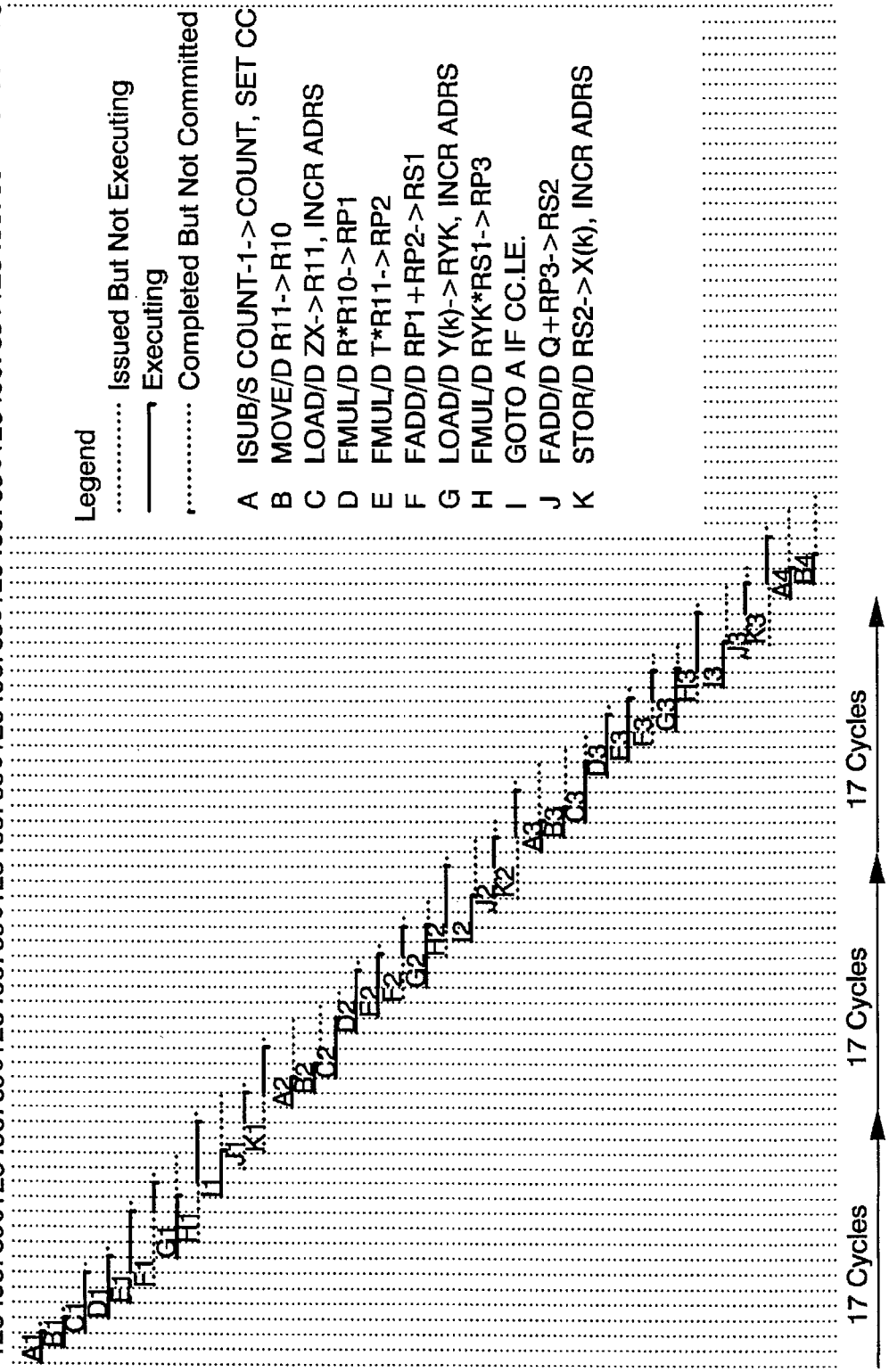

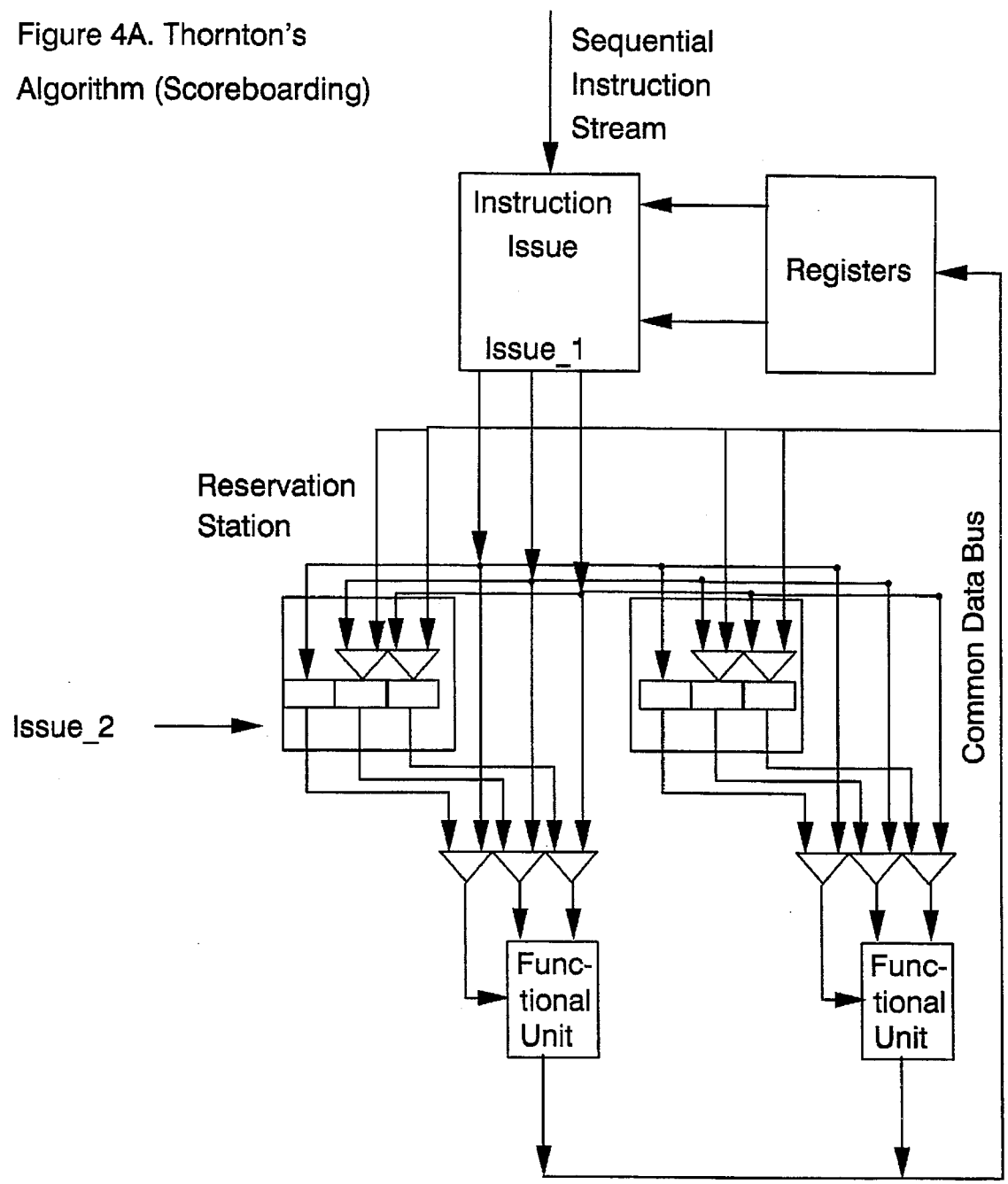
Figure 4A. Thornton's Algorithm (Scoreboarding)

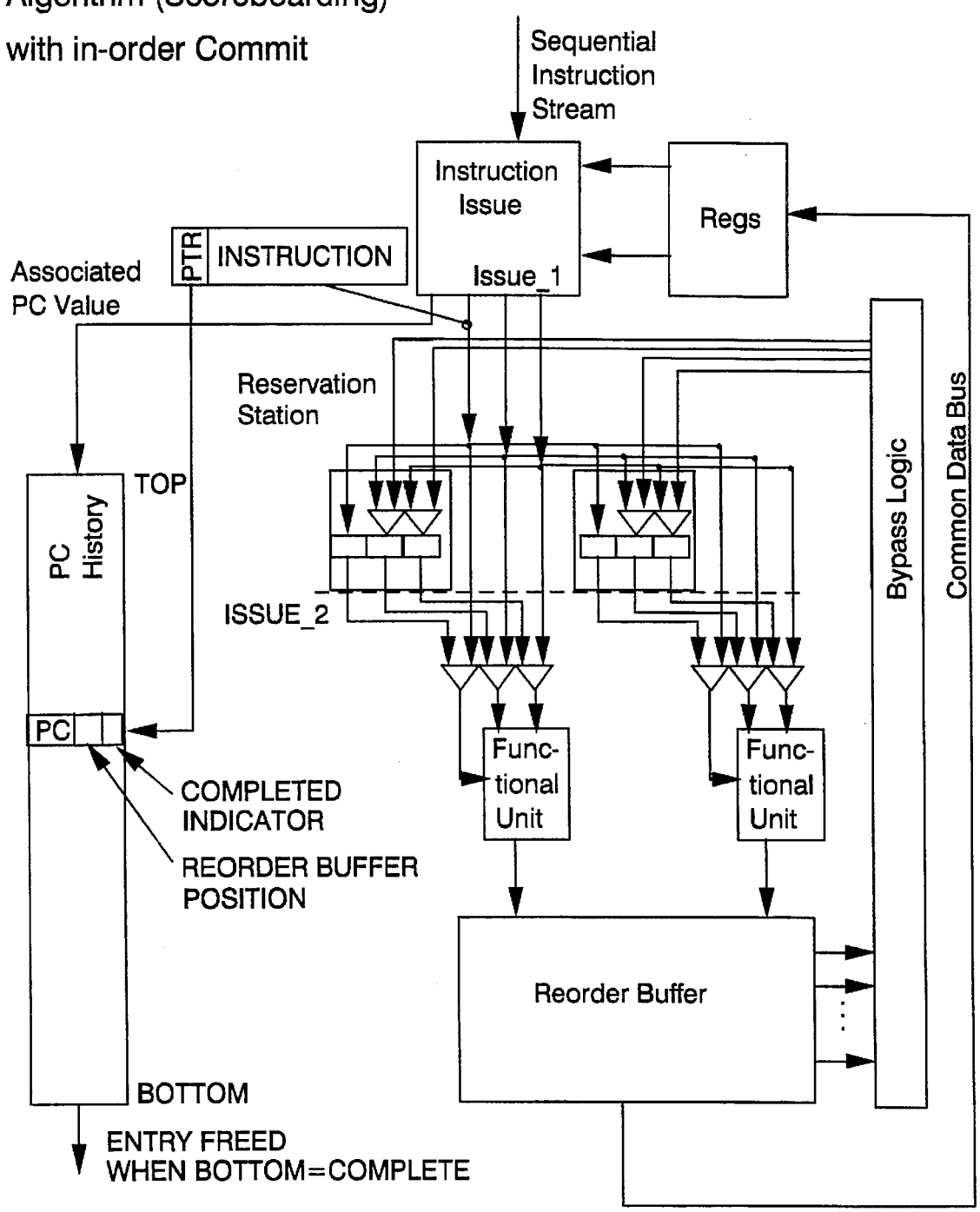
Figure 4B. Thornton's Algorithm (Scoreboarding) with in-order Commit

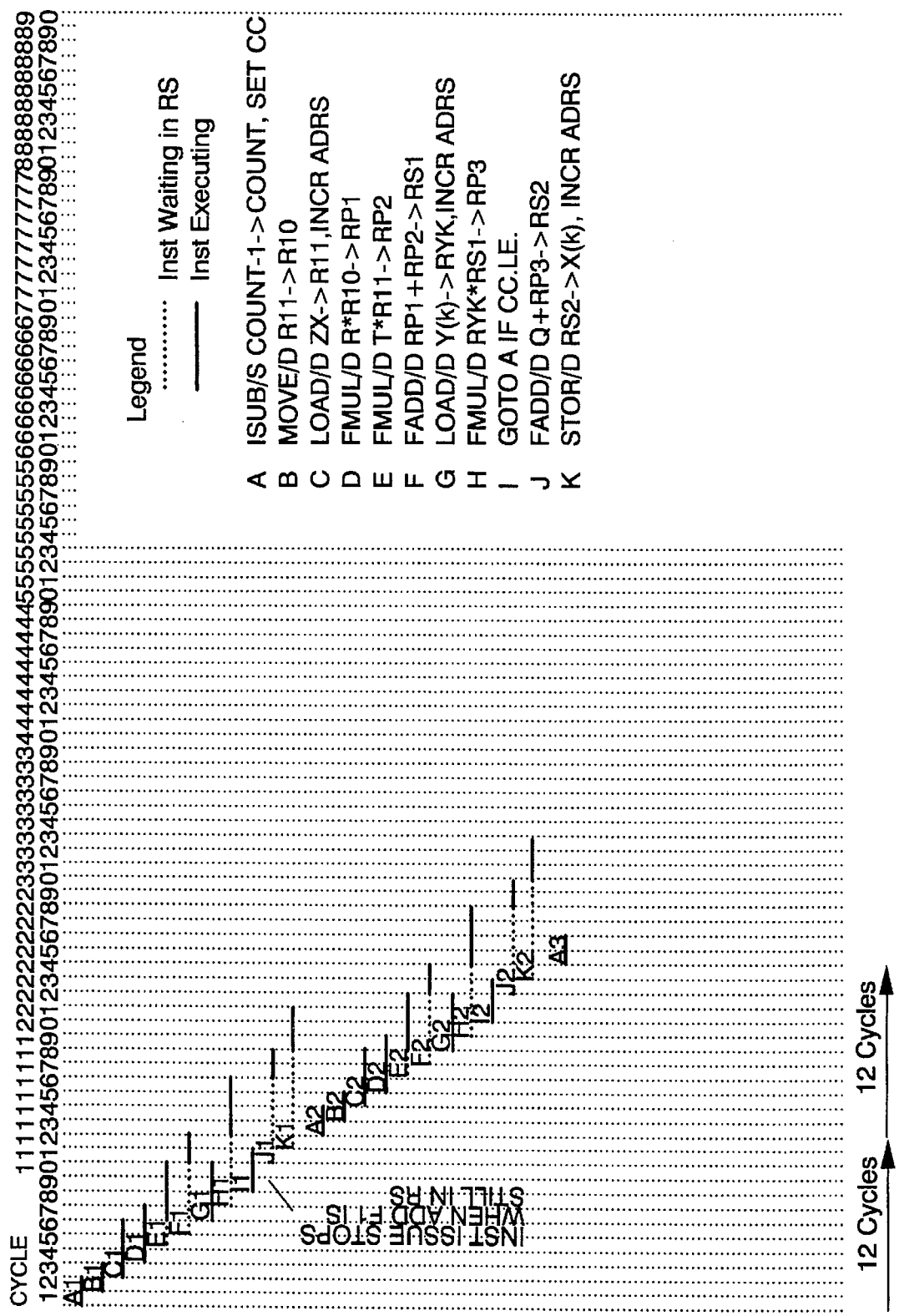

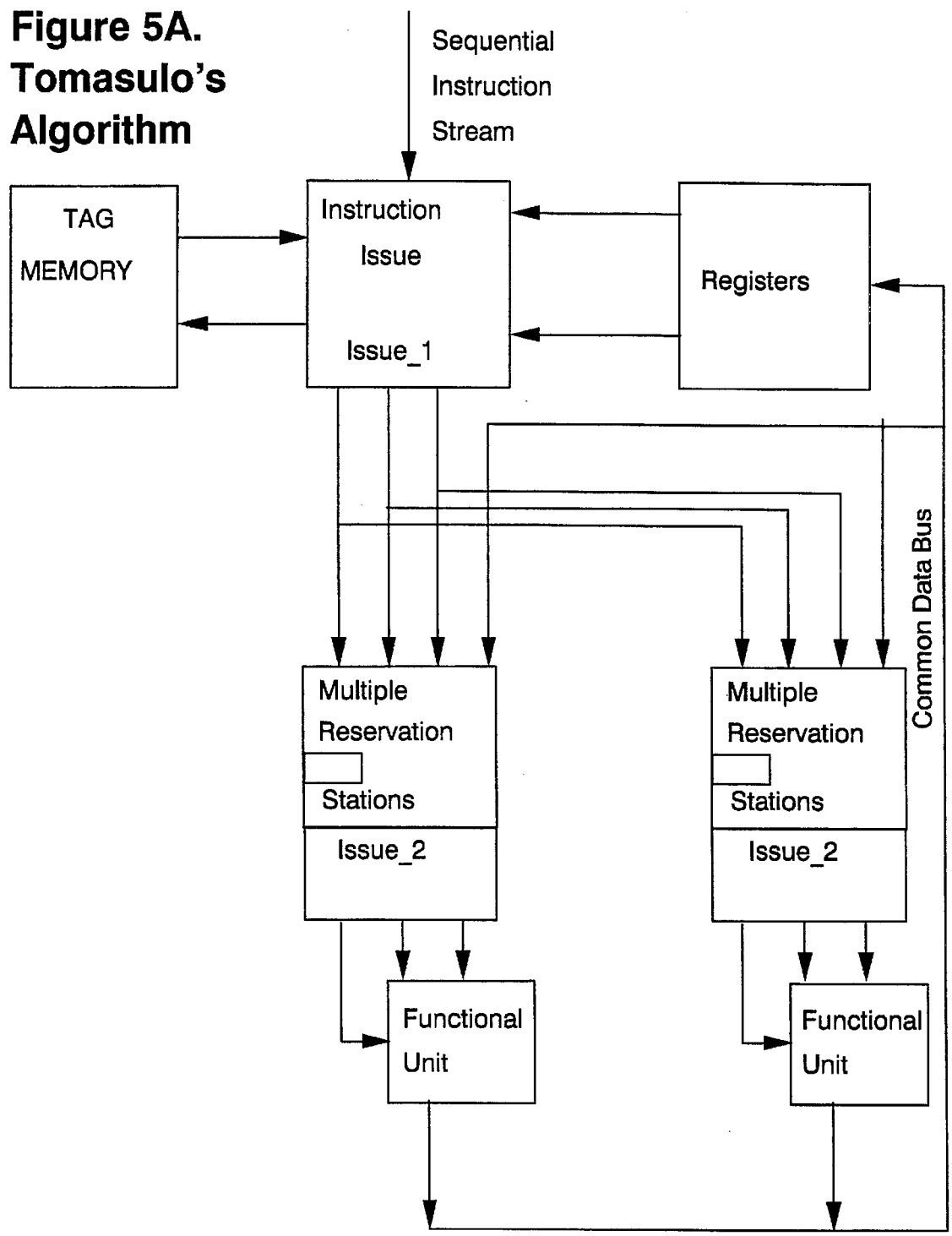

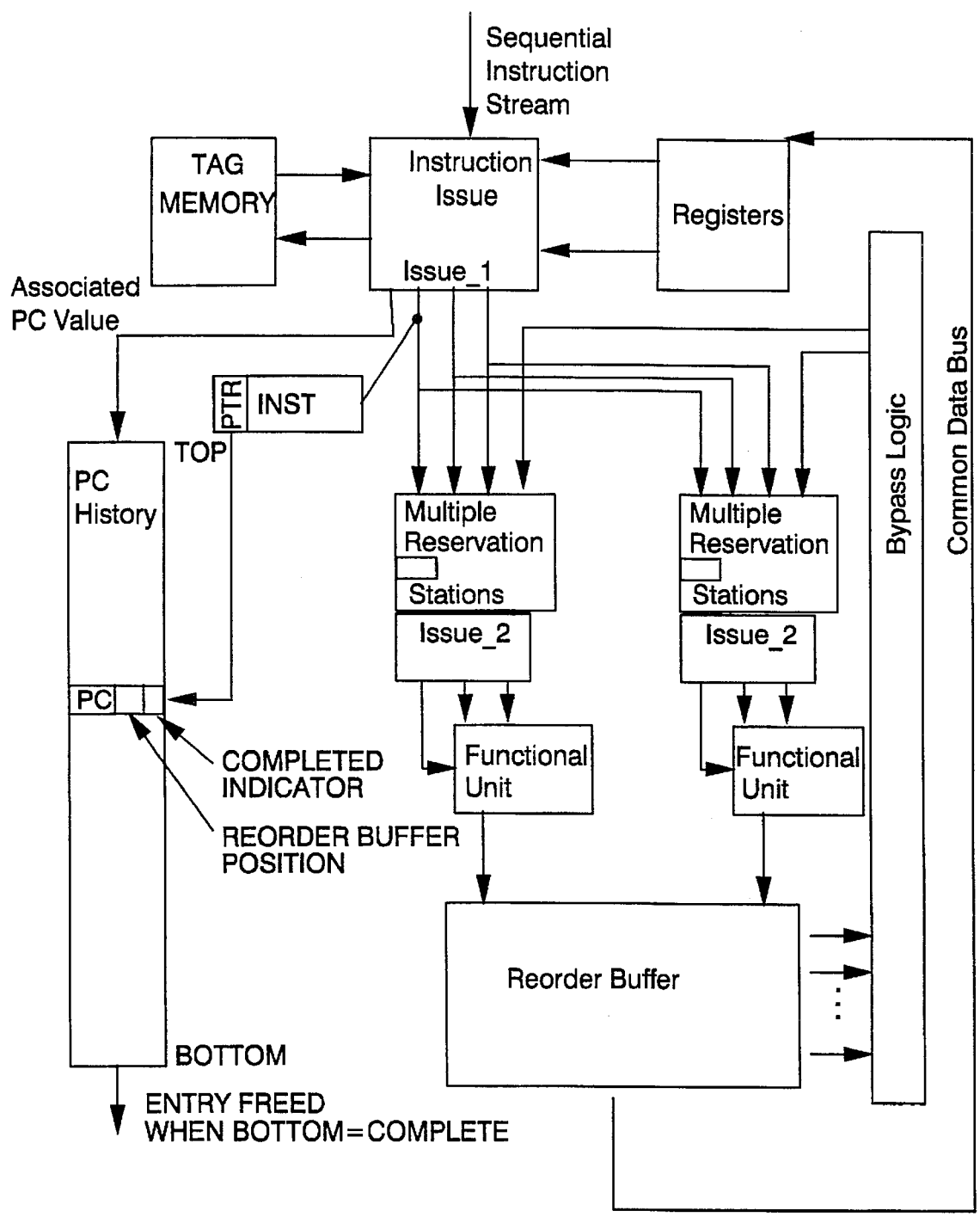

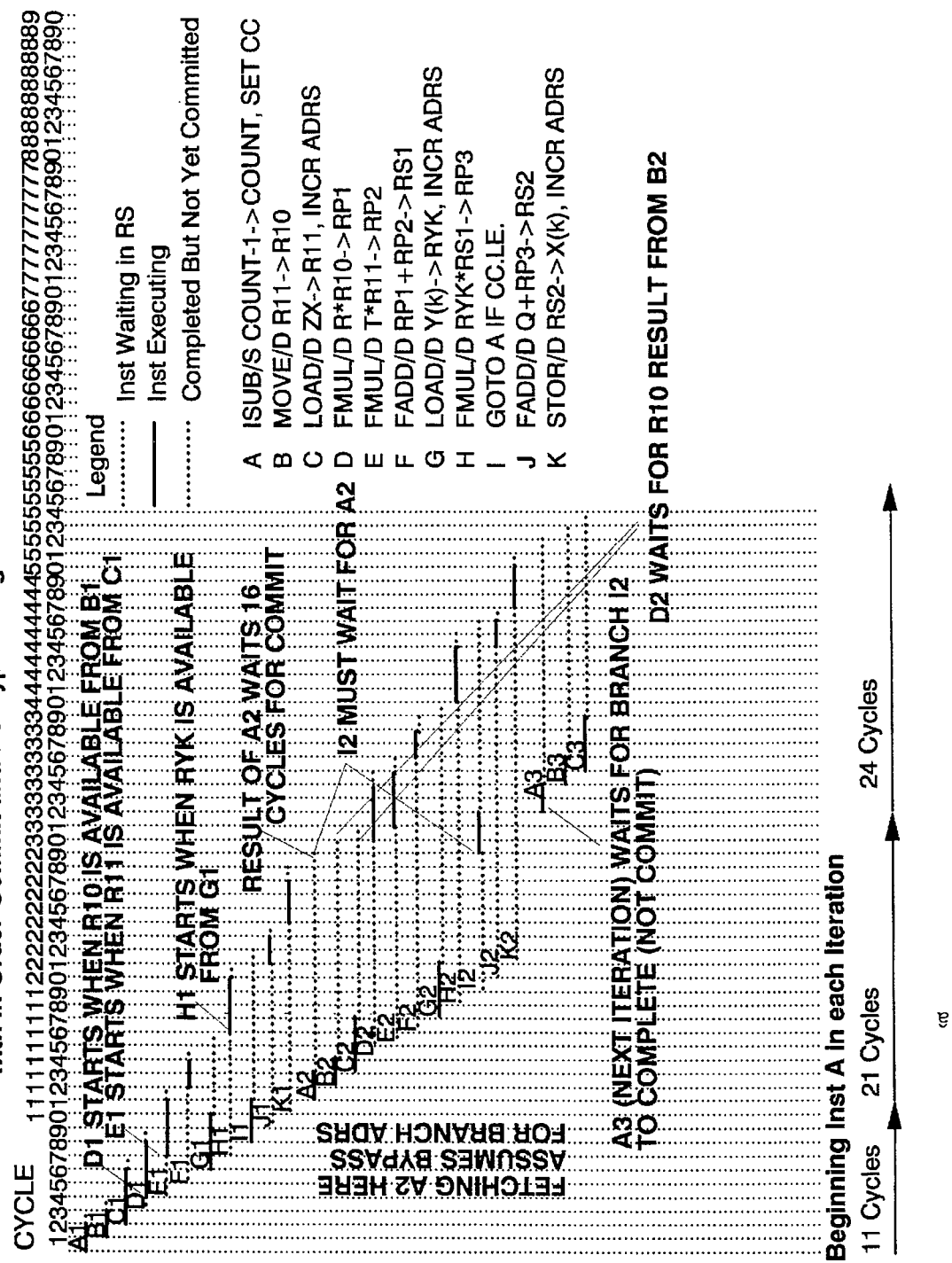

Figure 6.

Register Update Unit

Sequential Coherency Instruction Scheduling Computer Block Diagram

Sequential Coherency Instruction Scheduling
Pipeline Computer Block Diagram

Sequential Coherency Instruction Scheduling
RESOURCE INDEXED ACTIVITY ACCOUNTING

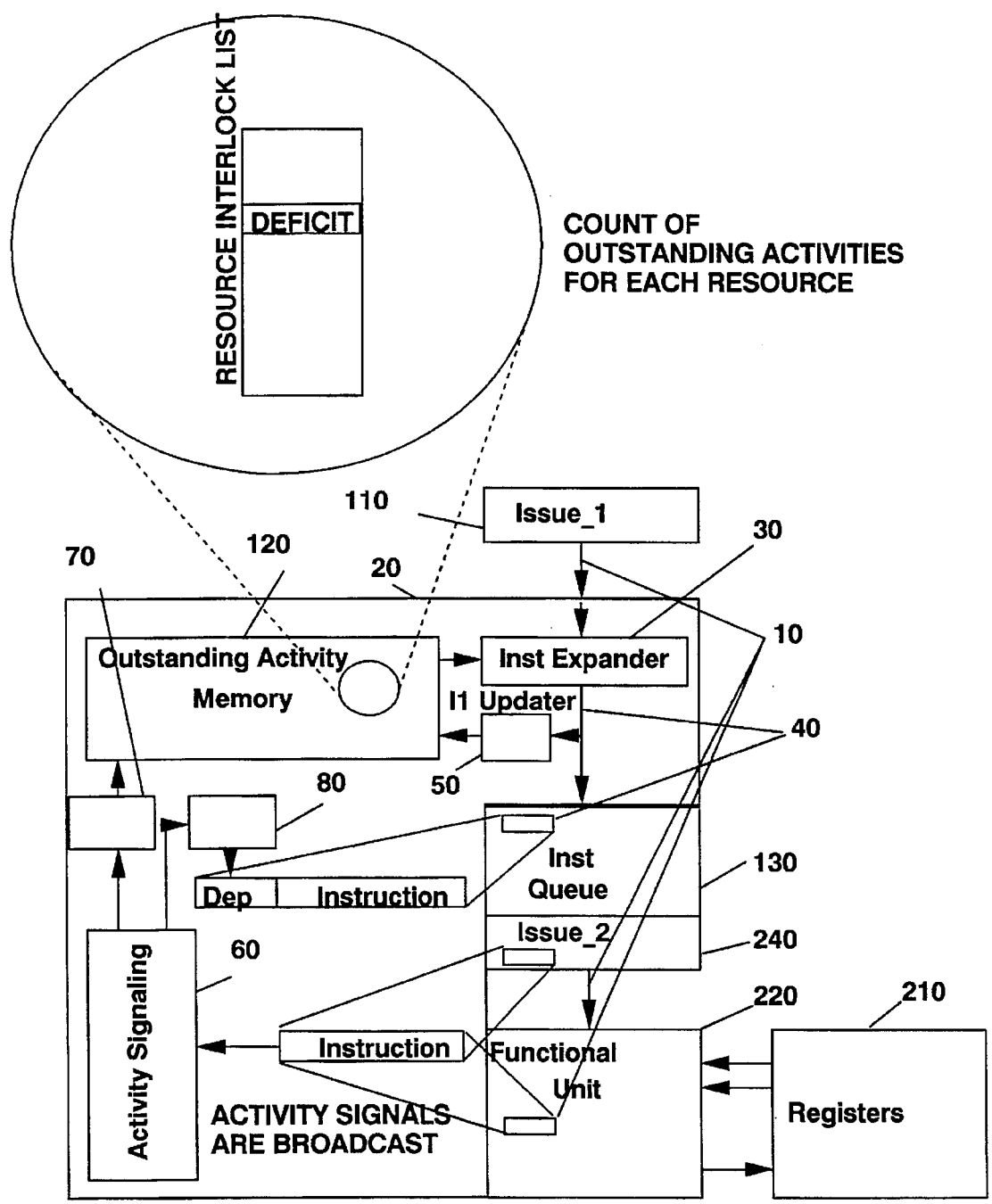

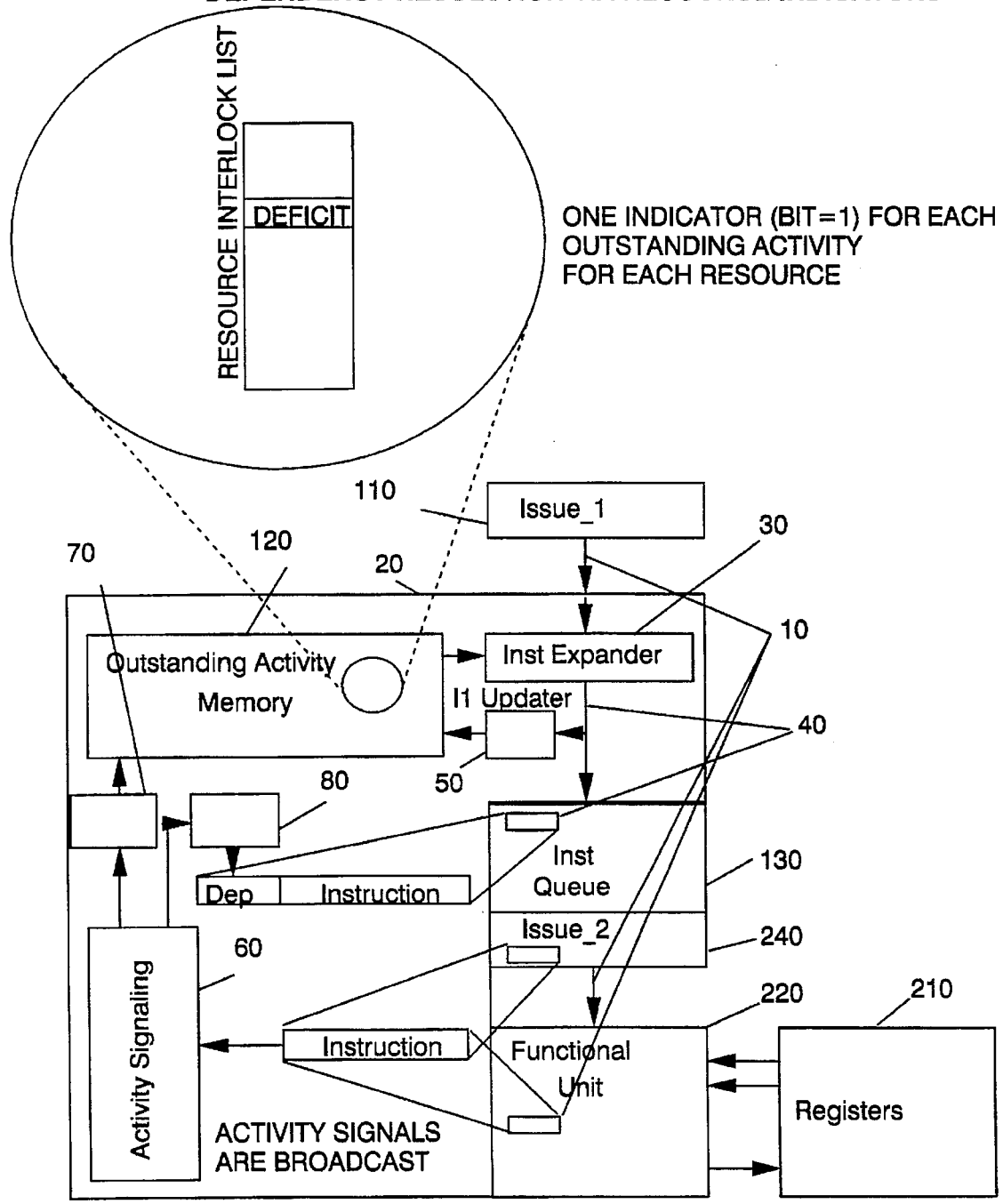

Sequential Coherency Instruction Scheduling
DEPENDENCY RESOLUTION VIA RESOURCE LINKED LISTS Sequential Coherency Instruction Scheduling
INSTRUCTION AND RESOURCE INDEXED ACTIVITY ACCOUNTING INSTRUCTION AND RESOURCE INDEXED ACTIVITY ACCOUNTING FIFO ORDERED INSTRUCTION QUEUE INSTRUCTION AND RESOURCE INDEXED ACTIVITY ACCOUNTING
LINKED LIST OF OUTSTANDING INSTRUCTIONS INSTRUCTION AND RESOURCE INDEXED ACTIVITY ACCOUNTING DEPENDENCY RESOLUTION VIA A MATRIX Sequential Coherency Instruction Scheduling
Instruction Indexed Activity Accounting

DEPENDENCY RESOLUTION VIA RESOURCE DEFICITS
MORE AGGRESSIVE SCHEDULING

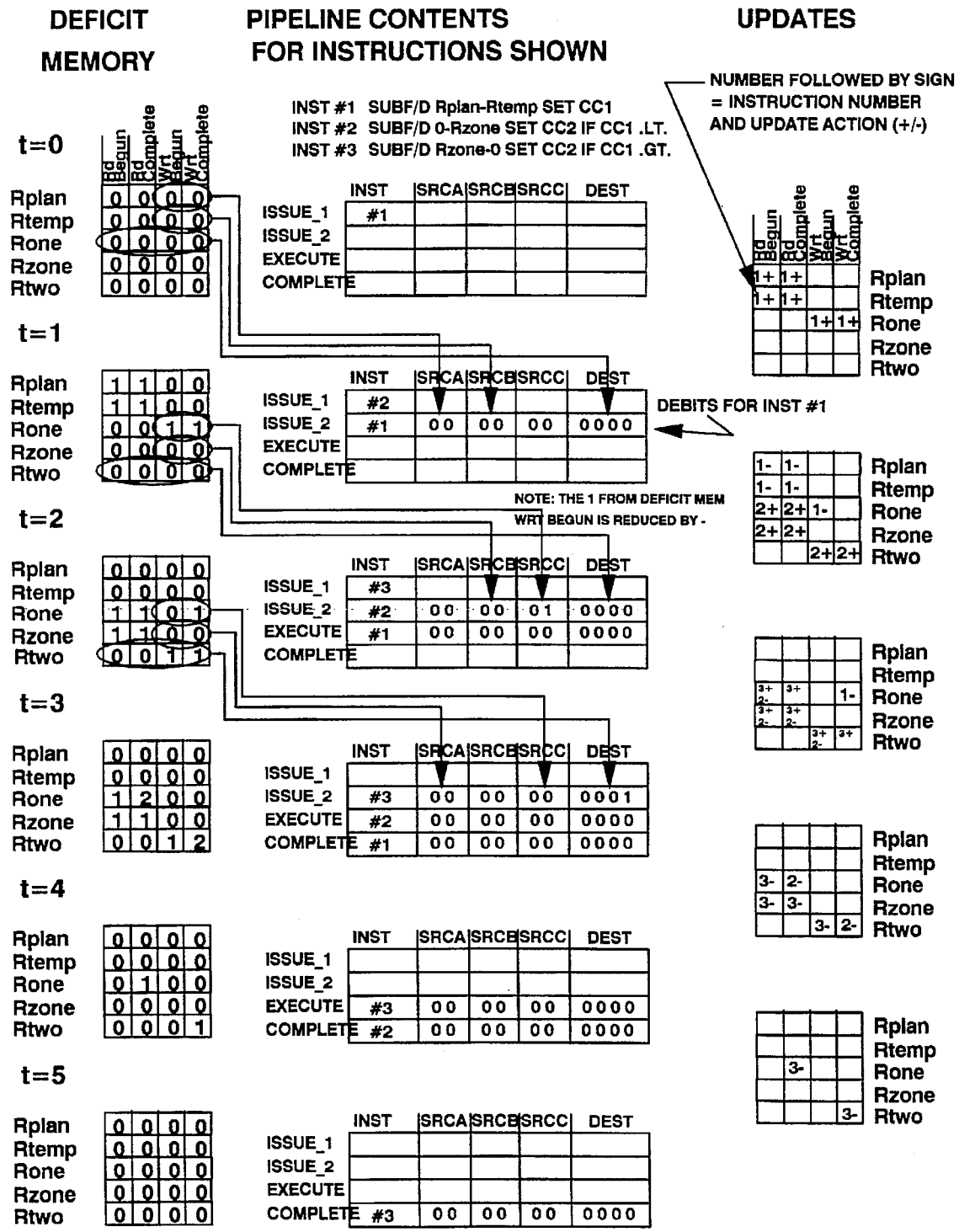
Figure 11B. Aggressive Sequential Coherency Scheduling Example

Sequential Coherency Instruction Scheduling.
IMPLICIT ACTIVITY SIGNALING

Sequential Coherency Instruction Scheduling
A BASIC EMBODIMENT WITH IMPLICIT ACTIVITY SIGNALING Sequential Coherency Instruction Scheduling
Aggressive Scheduling with Implicit Activity Signaling Figure 12D. Aggressive Scheduling with Implicit Signaling Example

| OUTSTANDING ACTIVITY MEMORY | | | ISSUE_1 PLACEMENT | ISSUE_1 UPDATE |
|---|---|---|---|---|

CYCLE=0

| | TIME READ | TIME WRITE |
|---|---|---|
| Rplan | Null | Null |
| Rtemp | Null | Null |
| Rone | Null | Null |
| Rzone | Null | Null |
| Rtwo | Null | Null |

INST#1 = SUBF/D Rplan-Rtemp SET CCone

POSITION $_{SRCA}$ = Null
POSITION $_{SRCB}$ = Null
POSITION $_{SRCCw}$ = Null       PLACED = 1
POSITION $_{DESTw}$ = Null
POSITION $_{DESTr}$ = Null
POSITION $_{DEFAULT}$ = 0 + 1

DELAY$_W$ = 1

TIME $_{RPLAN,read}$ = 1
TIME $_{RTEMP,read}$ = 1
TIME $_{RONE,write}$ = 2

CYCLE=1

| | TIME READ | TIME WRITE |
|---|---|---|
| Rplan | 1 | Null |
| Rtemp | 1 | Null |
| Rone | Null | 2 |
| Rzone | Null | Null |
| Rtwo | Null | Null |

INST#2 = SUBF/D 0-Rzone SET CCtwo IF CCone .LT.

POSITION $_{SRCA}$ = Null
POSITION $_{SRCB}$ = Null
POSITION $_{SRCC}$ = 2-1+1       PLACED = 2
POSITION $_{DESTw}$ = Null
POSITION $_{DESTr}$ = Null
POSITION $_{DEFAULT}$ = 1 + 1

DELAY$_W$ = 1
DELAY$_C$ = 1

TIME $_{SRCA,read}$ = 2
TIME $_{RZONE,read}$ = 2
TIME $_{RONE,read}$ = 3
TIME $_{RTWO,write}$ = 3

CYCLE=2

| | TIME READ | TIME WRITE |
|---|---|---|
| Rplan | Null | Null |
| Rtemp | Null | Null |
| Rone | 3 | 2 |
| Rzone | 2 | Null |
| Rtwo | Null | 3 |

INST#3 = SUBF/D Rzone-0 SET CCtwo IF CCone .LT.

POSITION $_{SRCA}$ = Null
POSITION $_{SRCB}$ = Null
POSITION $_{SRCC}$ = 2-1+1       PLACED = 3
POSITION $_{DESTw}$ = Null
POSITION $_{DESTr}$ = 3-1+1
POSITION $_{DEFAULT}$ = 2 + 1

DELAY$_W$ = 1
DELAY$_C$ = 1

TIME $_{RZONE,read}$ = 3
TIME $_{SRCB,read}$ = 3
TIME $_{RONE,read}$ = 4
TIME $_{RTWO,write}$ = 4

CYCLE=3

| | TIME READ | TIME WRITE |
|---|---|---|
| Rplan | Null | Null |
| Rtemp | Null | Null |
| Rone | 4 | Null |
| Rzone | 3 | Null |
| Rtwo | Null | 4 |

PIPELINE ACTIVITY FOR SUBSEQUENT CYCLES

| ISSUE_2 EXECUTE | INST#3 |
|---|---|
| | INST#2 |
| COMPLETE | INST#1 |

CYCLE=4

| | TIME READ | TIME WRITE |
|---|---|---|
| Rplan | Null | Null |
| Rtemp | Null | Null |
| Rone | 4 | Null |
| Rzone | Null | Null |
| Rtwo | Null | 4 |

| ISSUE_2 EXECUTE | INST#3 |
|---|---|
| COMPLETE | INST#2 |

CYCLE=5

| | TIME READ | TIME WRITE |
|---|---|---|
| Rplan | Null | Null |
| Rtemp | Null | Null |
| Rone | Null | Null |
| Rzone | Null | Null |
| Rtwo | Null | Null |

| ISSUE_2 EXECUTE | |
|---|---|
| COMPLETE | INST#3 |

Sequential Coherency Exception Handling

Sequential Coherency
Exception Handling
Arithmetic Overflow Trap
Interruption Handling**

Sequential Coherency Exception Handling Virtual Page Fault Interruption Handling

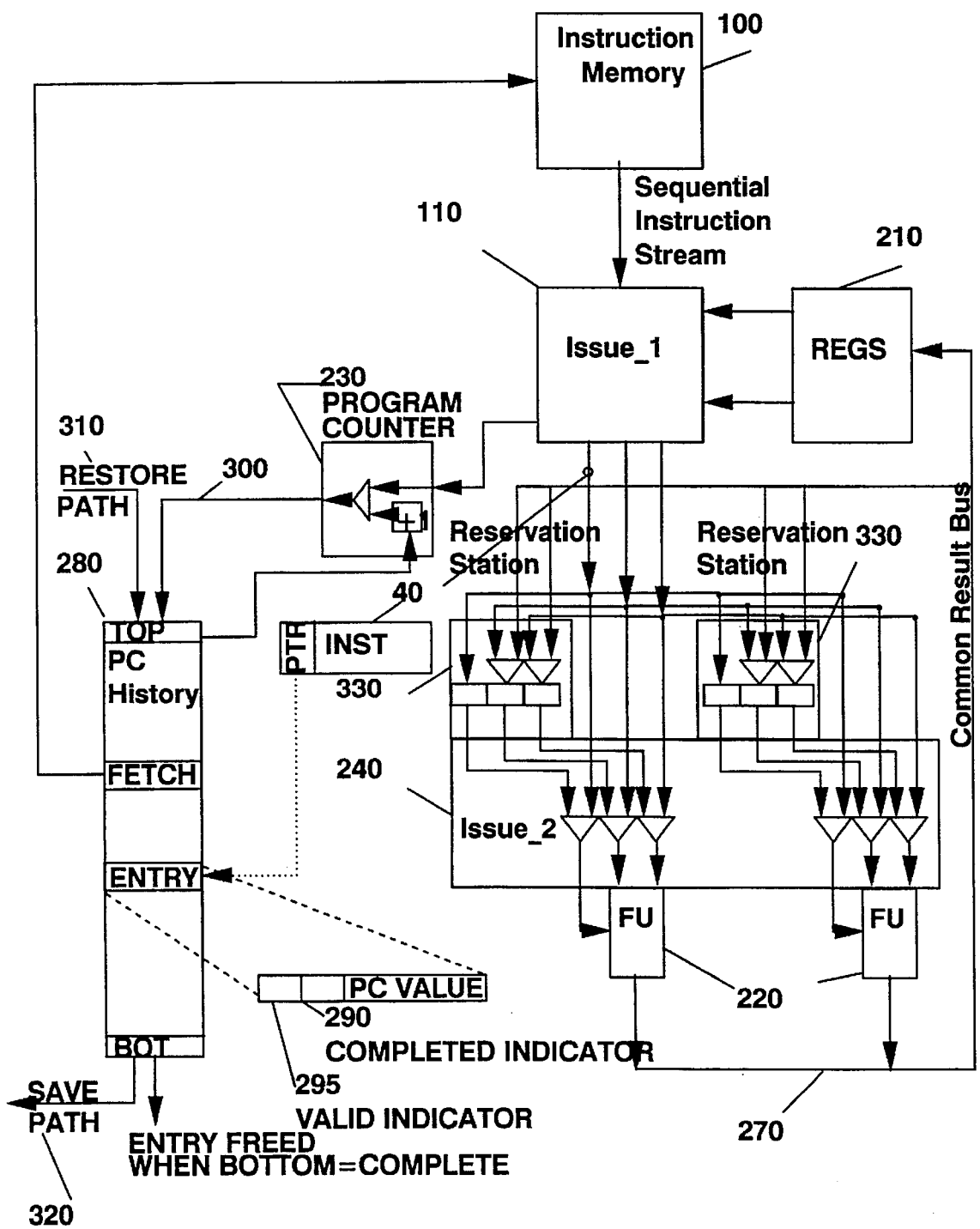
Figure 14A. Thornton's Algorithm Improved Via Sequential Coherency Exception Handling

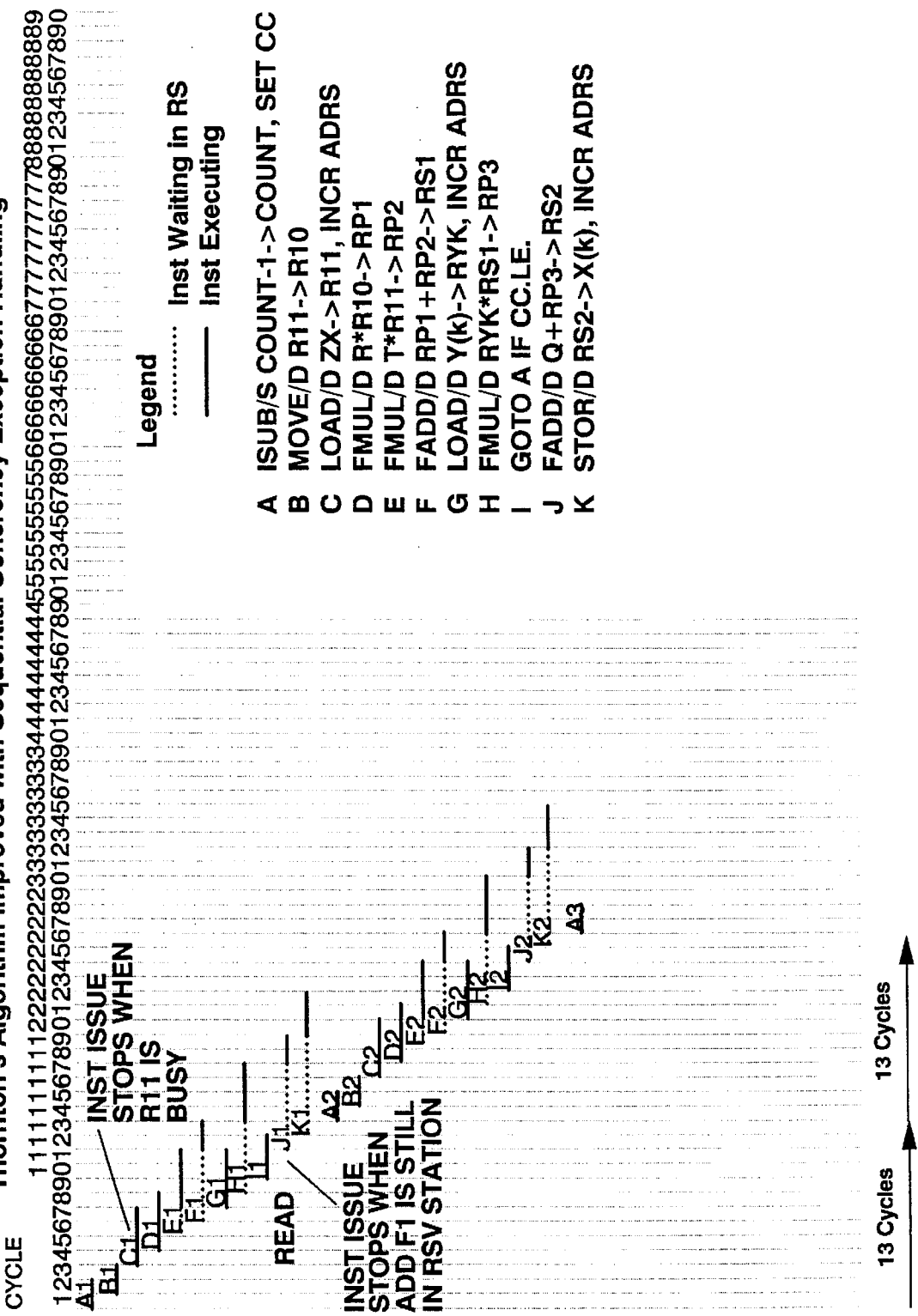

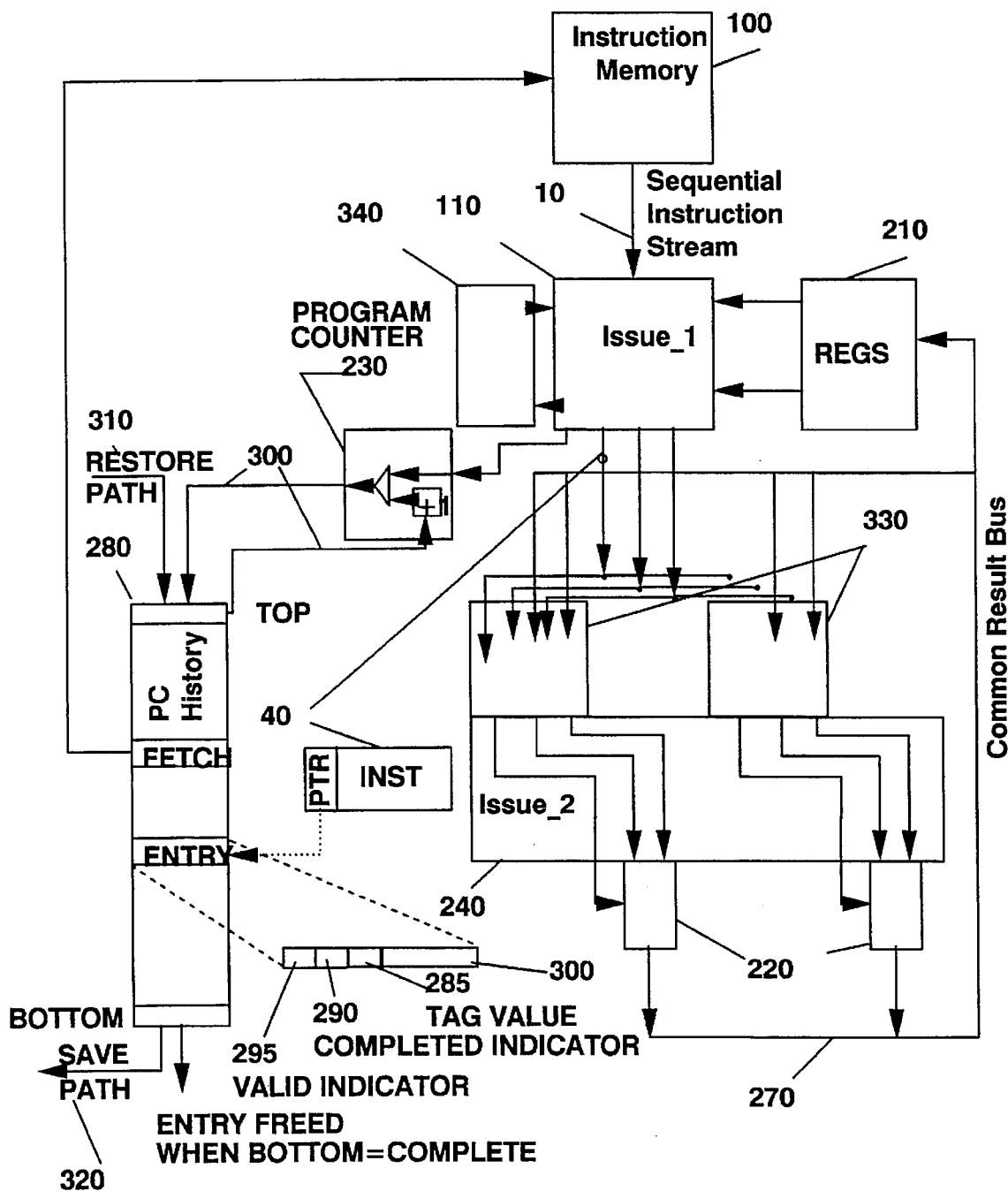
Figure 15A. Tomasulo's Algorithm Improved Via Sequential Coherency Exception Handling

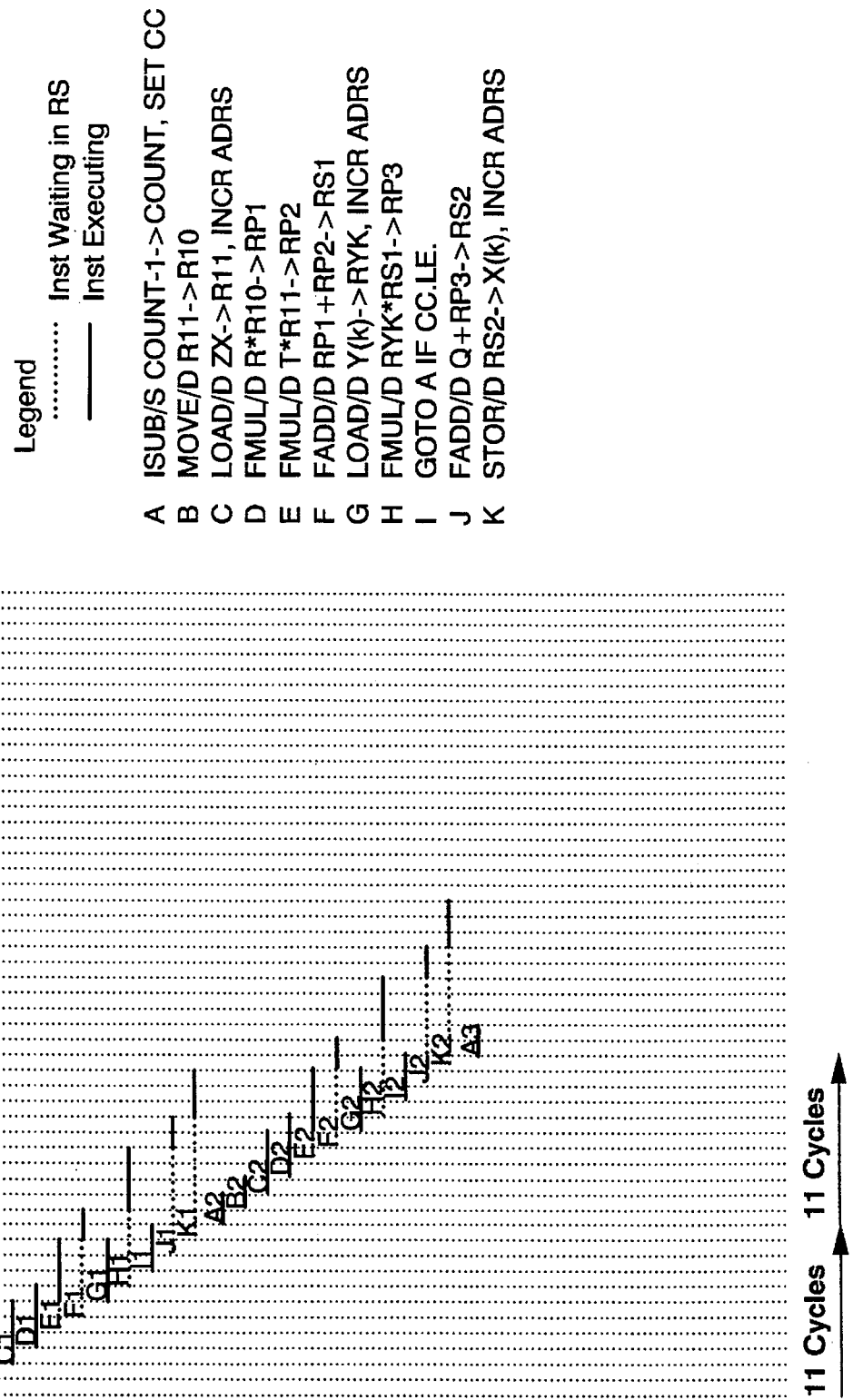
Figure 15B. Performance of the Computer of Figure 15A, Tomasulo's Algorithm Improved with Sequential Coherency Exception Handling

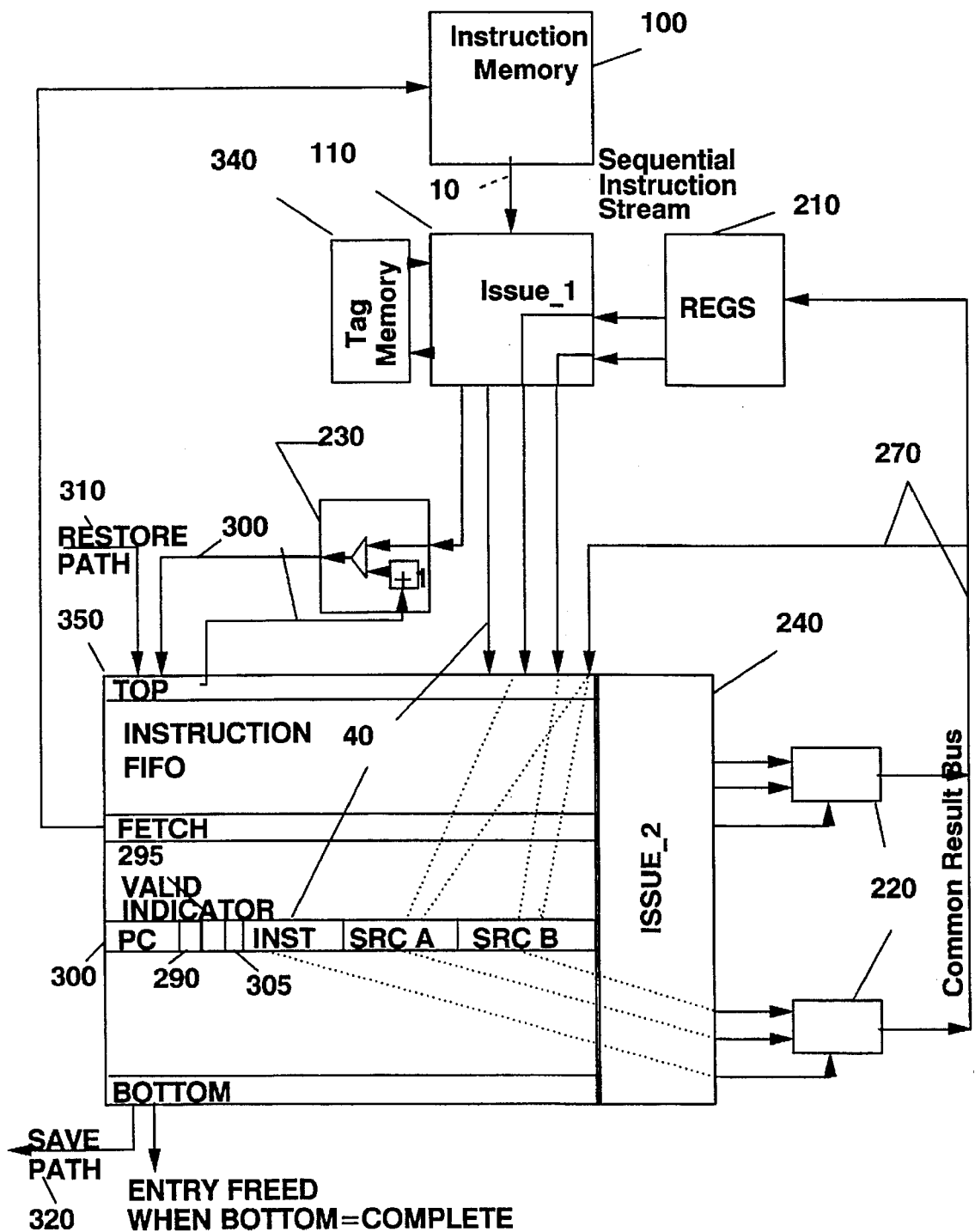
Figure 16A. RUU Improved with Sequential Coherency Exception Handling

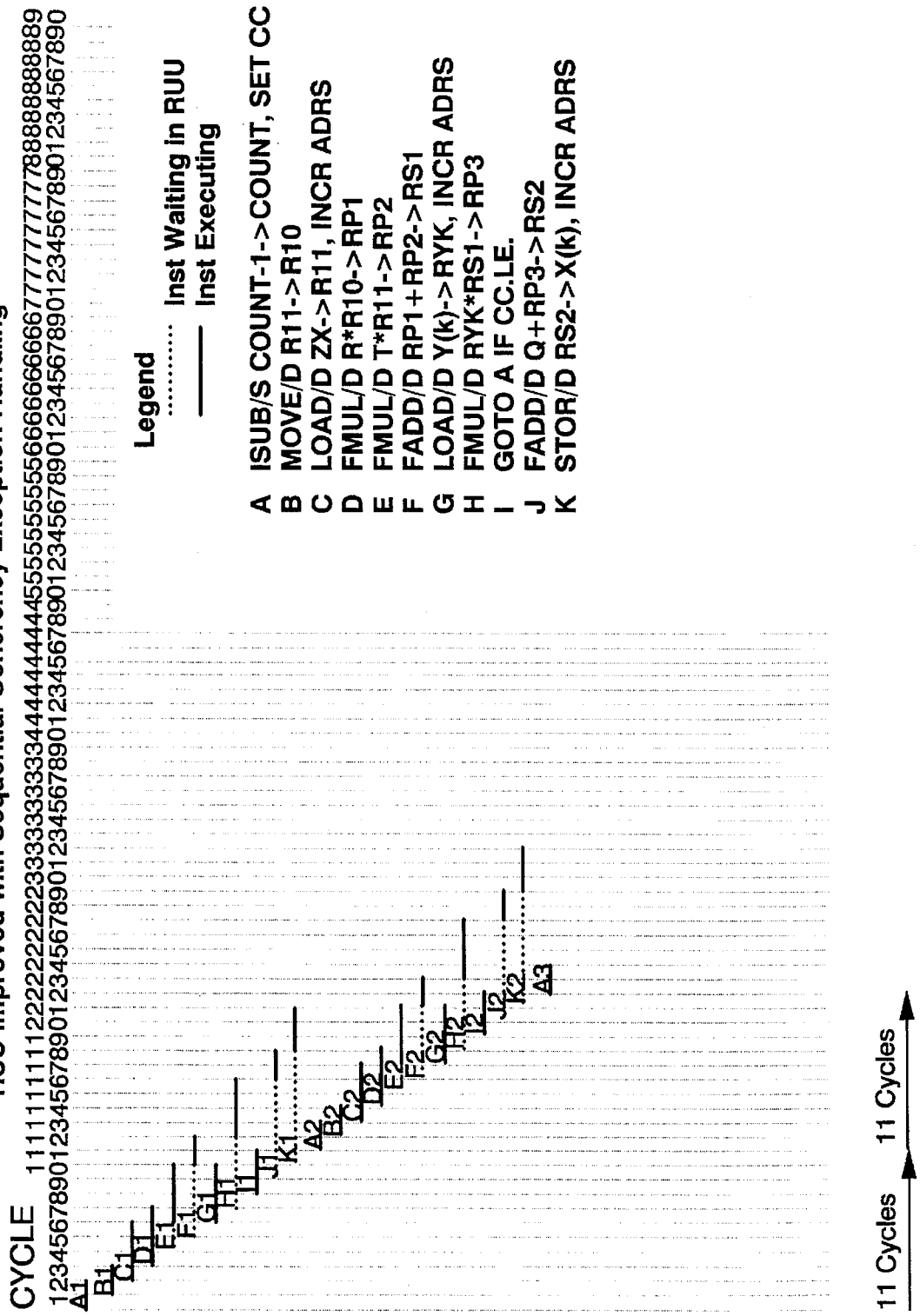

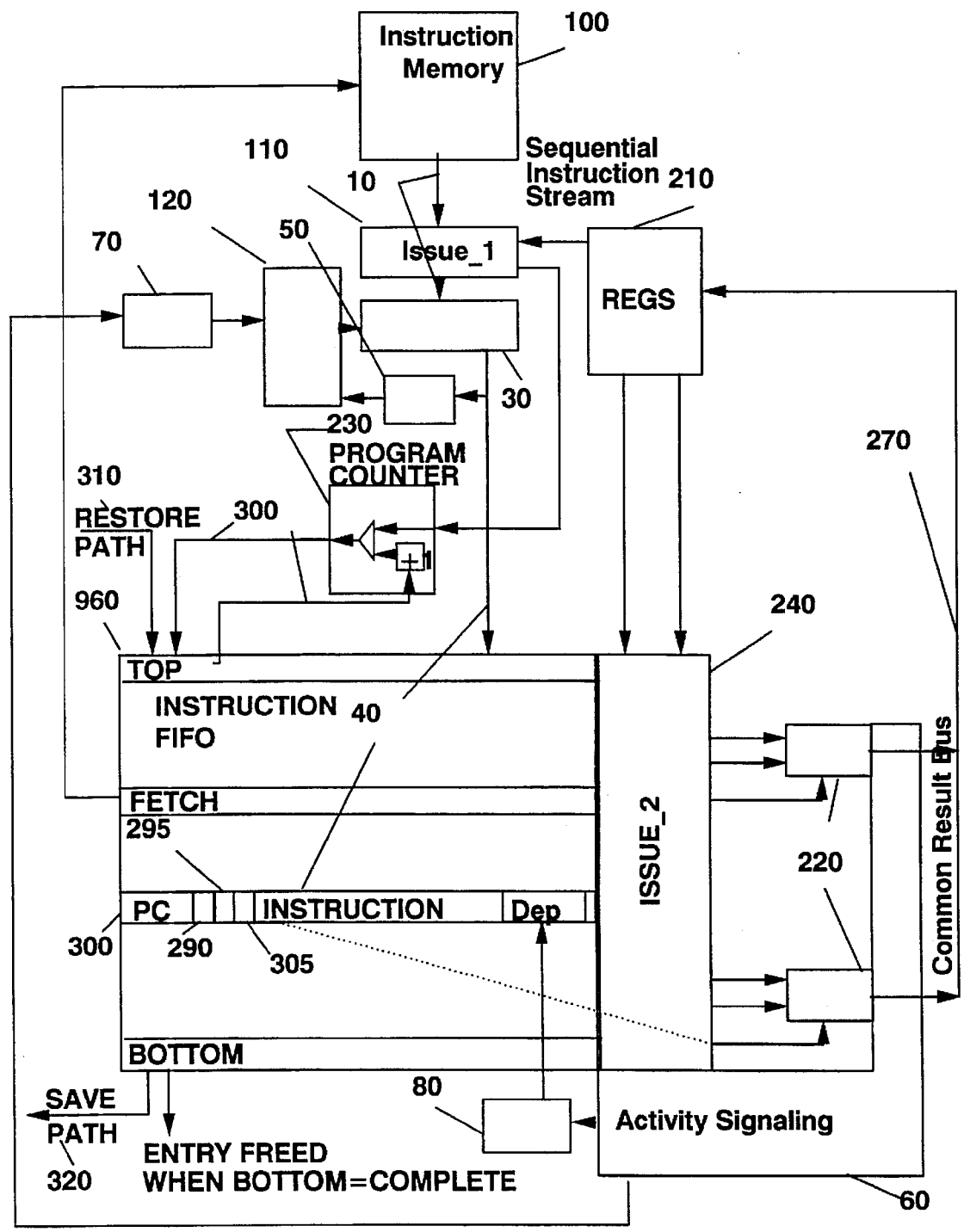
Figure 17A. Sequential Coherency Instruction Scheduling Improved with Sequential Coherency Exception Handling

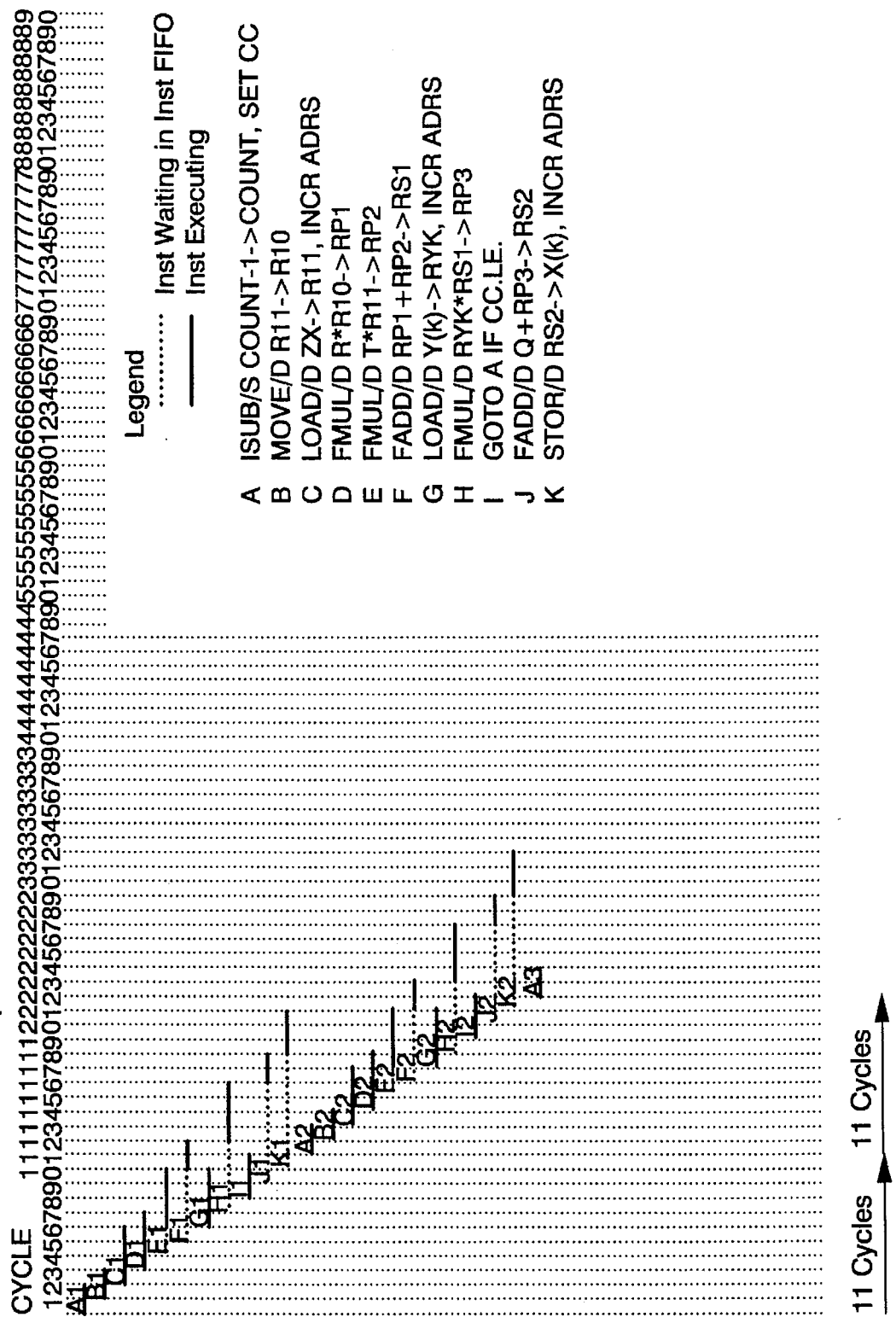

Dynamic Scheduling Embodiment

Data Cache Organization

LOAD/STORE/BRANCH UNITS

Functional Unit Pipeline Signaling

Functional Unit Pipeline Signaling

Figure 24.
One-Packet Vector Loop Example

R48 = 6-3    R49 = 104    R50 = 104

| ADDRS | LSB1 INST | LSB2 INST |
|-------|-----------|-----------|
| 100 | LOOP 104 | STORE RK,RA,1,IRA |
| 101 | ANY | STORE RK,RA,1,IRA |
| 102 | ANY | STORE RK,RA,1,IRA |
| 103 | ANY | STORE RK,RA,1,IRA |
| 104 | DEC/SET | STORE RK,RA,1,IRA |
| 105 | ANY | ANY |
| 106 | ANY | ANY |
| 107 | ANY | ANY |

STORE TO 4 LOCATIONS OUTSIDE LOOP (addrs 100-103)
STORE TO 6 LOCATIONS IN THE LOOP
FOR A TOTAL OF 10 LOCATIONS → Pipeline →    AFTER EXECUTE

| CYC | FETCH INST | ISSUE INST | SELECT INPUTS | EXECUTE STAGE 1 | R48 | CC48 | VECTOR MODE |
|-----|------------|------------|---------------|-----------------|-----|------|-------------|
| 1 | 103 | 102 | 101 | 100 | 3 | ? | ON |
| 2 | 104(1) | 103 | 102 | 101 | 3 | ? | ON |
| 3 | 104(2) | 104(1) | 103 | 102 | 3 | ? | ON |
| 4 | 104(3) | 104(2) | 104(1) | 103 | 3 | ? | ON |
| 5 | 104(4) | 104(3) | 104(2) | 104(1) | 2 | POS | ON |
| 6 | 104(5) | 104(4) | 104(3) | 104(2) | 1 | POS | ON |
| 7 | 104(6) | 104(5) | 104(4) | 104(3) | 0 | ZERO | OFF |
| 8 | 105 | 104(6) | 104(5) | 104(4) | 0 | ZERO | OFF |
| 9 | 106 | 105 | 104(6) | 104(5) | 0 | ZERO | OFF |
| 10 | 107 | 106 | 105 | 104(6) | 0 | ZERO | OFF |
| 11 | 108 | 107 | 106 | 105 | 0 | ZERO | OFF |

Cycle 2: PC = 104 FROM LOOP 104 INST @ ADDRS 100
Cycles 3-7: PC = 104 FROM R50 (PC = R49 & R48>0)
Cycle 8: PC = 104+1 (R48 = 0)
Cycle 9: PC = 105+1
Cycle 10: PC = 106+1
Cycle 11: PC = 107+1

LFK24 Main Loop Mapping, Vector Embodiment

ONLY THE MAIN VECTOR LOOP IS SHOWN ically, to ensuring that the results of executing that
METHOD AND APPARATUS FOR DYNAMIC SCHEDULING OF INSTRUCTIONS TO ENSURE SEQUENTIALLY COHERENT DATA IN A PROCESSOR EMPLOYING OUT-OF-ORDER EXECUTION This is a continuation of application Ser. No. 07/597,580 filed Oct. 12, 1990 now abandoned.

BACKGROUND

1. Field of Invention

The present invention relates generally to the execution of computer-executable instruction streams in an order that differs from their sequential program order and, more particularly, to ensuring that the results of executing that program are the same as those obtained when the instructions are executed sequentially in their original program order and to correctly handling exceptions that occur while executing that program without requiring checkpointing or in-order commit.

REGISTERED TRADEMARKS

Within this document references are made to the following registered trademarks:

AMD 29000 is a registered trademark of Advanced Micro Devices, Inc.
CDC, CDC 6600, and CDC 7600 are registered trademarks of Control Data Corporation.
CRAY, CRAY-1, CRAY-2, CRAY-3, CRAY-XMP AND CRAY-YMP are registered trademarks of Cray Research, Inc.
DEC and VAX are register trademarks of Digital Equipment Corp.
IBM, IBM 360, IBM 370, IBM 370-XA, AND IBM SYSTEM 36 are registered trademarks of International Business Machines Corporation.
INTEL, INTEL 80386/486, AND INTEL 80X86 are registered trademarks of Intel Corp.
INTERGRAPH CLIPPER is a registered trademark of Intergraph, Inc.
MIPS, R2000, AND R3000 are registered trademarks of MIPS Computer Systems.
MOTOROLA, 680XX, AND 88000 are registered trademarks of Motorola, Inc.
NEC AND NEC SX-2 are registered trademarks of Nippon ELectric Corp.
SUN AND SPARC are registered trademarks of Sun Microsystems, Inc.
ZS-1 is a registered trademark of Astronautics Corporation of America.

2. Description of Prior Art

Fundamental Concepts: The performance capacity of a processor is the measure of its ability to do work, measured in OPERATIONS/SECOND. For mainframes the measure is TRANSACTIONS/SECOND and for scientific operations the measure is MFLOPS, Millions of Floating Point Operations Per Second. The achieved OPERATIONS/SECOND is the product of N—the number of OPERATIONS per Instruction,
I—the number of Instructions per Cycle, and
C—the number of Clock cycles per SECOND.

Maximizing the performance capacity, which can be visualized as the volume of the box shown in FIG. 1, is the goal of high performance computers. But maximizing performance can increase physical size and thereby drive cost up. According to best-selling author George Gilder, "A connection of a (VLSI) chip costs a few millionths of a cent; the cost of a lead from a plastic package is about a cent; a wire on a printed circuit board is 10 cents; backplane links between boards are on the order of a dollar apiece; and links between computers, whether on copper cables, through fiber-optic threads or off satellites, can cost between a few thousand and millions of dollars. . . .

. . . Electrons can travel just 9 inches in a nanosecond. The capacity (length) of wires is the basic limit of the technology.

. . . There is one key limit: stay on one chip or a small set of chips. As you leave the microcosm, you will run into dire problems: decreases in speed and reliability; and increases in heat, size, materials complexity and manufacturing expense."[Gild1]

Thus maximizing performance capacity is significantly easier if you can stay on one chip or a small set of chips. Additionally, by doing so, cost decreases dramatically.

A conventional high performance computer processor architecture, shown in FIG. 2, consists of multiple Functional Units connected to a common Result Bus. Any Functional Unit can perform an operation and output the result of that operation onto the Result Bus, but simultaneous results from multiple Functional Units must be placed one at a time onto the Result Bus. Instructions are fetched by the Instruction Fetch Unit and decoded and issued by the Decode and Issue Unit one at a time to the appropriate Functional Unit.

To improve the clock rate (C of the performance capacity box), most high performance architectures segment the functional units into several pieces called "pipeline stages."

A single pipeline stage can be traversed in one clock cycle. With pipelining, each functional unit can be viewed as an assembly line capable of working on several instructions at different stages of completion, i.e. one at the completion stage, several in intermediate stages, and one just being started. Thus, an instruction typically takes several clock cycles, beyond the time of instruction issue, to produce its result (or complete) at the output of the functional unit.

When one instruction can be issued every cycle, these machines run at their peak rate. However, in typical instruction sequences, actual performance falls far short of the peak rate; because, holes instead of instructions are necessarily inserted in the pipeline due to conflicts called "dependencies." A dependency exists when one or more of the following situations occurs:

1. Needs Data—An instruction needs data produced by a logically previous instruction.
2. Cannot Overwrite—A variable (e.g. register) cannot be updated by an instruction to a new value until a logically previous instruction has used the current value.
3. Needs Branch Resolved—An instruction cannot be executed until the result of a logically previous conditional branch is known.

Each processor architecture must decide who has responsibility for detecting and resolving dependencies. The two extremes of the tradeoff are:

Software Dependency Resolution or Static Scheduling—
The compiler or the programmer are totally responsible for statically managing dependencies among the multiple Functional Units; no hardware interlocks are provided.

Hardware Dependency Resolution or Dynamic Scheduling—The hardware dynamically manages dependencies; the programmer or compiler need only place the instructions in their natural logical order.

Virtually every new computer system announced in the last several years has used static scheduling[Smit1], because compiler technology has advanced sufficiently to make their performance adequate and because the cost of dynamic scheduling hardware has been prohibitive.

Out-of-Order Execution: Dynamic scheduling offers performance advantages that simply are not available with static scheduling. The remainder of this disclosure discusses dynamic scheduling in general and out-of-order instruction execution in particular. Out-of-order instruction execution allows, under defined conditions, instruction B to execute before instruction A, even though instruction B comes after instruction A in the program. The performance benefit is that, while instruction A is waiting for a dependency to be resolved, instruction B (and possibly others) can go ahead and execute.

Dynamic scheduling also has several attributes that make it a more general solution, especially for the general purpose microprocessor market:

1. The compiler does not have to place instructions in their worst case relationship and does not have to worry about the variable memory delays present in a multiprocessor system. Multiprocessor systems, with shared memory, are especially attractive for multi-user environments like On Line Transaction Processing.
2. NOOPs to provide time-fill are not necessary. As long as the code is placed in natural program order, the hardware will resolve the timing. The result is much better code fill and much less required code storage.
3. The need, in certain markets, to produce a faster version of an existing architecture that provided hardware interlocks requires a dynamic scheduling mechanism, because, by definition, the code is not recompiled. Examples of these existing architectures that could benefit are IBM 370, Intel 80386/486, and Cray-YMP.

Sequential Coherency: A computer processor is termed sequentially coherent if the results of executing a program are the same as those obtained when the instructions are executed sequentially in their original program order. Sequential coherency applies to accesses to all resources, e.g. register locations, condition codes, and main memory. Sequential coherency is more precisely defined as:

A write to a resource must wait for all previous reads from and writes to that resource to complete.

A read from a resource must wait for all previous writes to that resource to complete.

The Attraction of Out-Of-Order Execution: To better understand the benefits of out-of-order execution let's use LFK 1 (Livermore FORTRAN Kernel 1) as an example.

$$DO\ 1\ k=1,n$$

$$1\ X(k)=Q+Y(k)*(R*ZX(k+10)+T*ZX(k+11))$$

This loop compiles with a straightforward compiler to a loop of natural order assembly code. When the constant values R, T, Q, and n are pre-loaded in the registers designated as R, T, Q, and COUNT, respectively, and the array addresses for X(k), Y(k), and ZX(k+10) are pre-loaded in the address registers designated X(k), Y(k), and ZX, respectively, then the assembly code is

|        | LOAD/D | ZX –>R11, Increment Address |
|--------|--------|------------------------------|
| A LOOP | ISUB/S | COUNT-1 –>COUNT,SET CC       |
| B      | MOVE/D | R11 –>R10                    |
| C      | LOAD/D | ZX –>R11, Increment Address  |
| D      | FMUL/D | R*R10 –>RP1                  |
| E      | FMUL/D | T*R11 –>RP2                  |
| F      | FADD/D | RP1+RP2 –>RS1                |
| G      | LOAD/D | Y(k) –>RYK, Increment Address |
| H      | FMUL/D | RYK*RS1 –>RP3                |
| I      | GOTO   | LOOP IF CC.LE.               |
| J      | FADD/D | Q+RP3 –>RS2                  |
| K      | STOR/D | RS2 –>X(k), Increment Address | where the GOTO is a delayed branch with a branch umbra of two, i.e. the FADD/D and STOR/D following it are executed before the branch action actually occurs.

This loop takes 22 cycles per iteration if these instructions are issued in order and when their needed sources are available, as shown in FIG. 3A, where A1, B1, etc. are the instructions in iteration 1 and A2, B2, etc. are the instructions in iteration 2. The instruction designating letter and iteration number, e.g. A1 indicates the cycle where the instruction begins execution and the line following indicates the cycle where that instruction is completed.

In this example, the maximum number of simultaneously active instructions is 3 (K1, A2, and B2). Increasing this number (simultaneously active instructions) is the primary goal of out-of-order scheduling mechanisms.

If we permit out-of-order execution with an "unlimited" number of active instructions, this loop can be executed as shown in FIG. 3B. This 11 instruction loop takes 11 cycles per iteration and is limited by the instruction issue rate (1 instruction per cycle limit).

Note that the execution efficiency of FIG. 3B assumes that the LOAD instructions in pass n+1 can pass or go ahead of the waiting STORE from pass n, the previous pass.

The Problems of Out-of-Order Execution

Out-of-order execution promises increased computer processor performance, but the prior art suffers from three major difficulties:

1. Scheduling: The prior art used instruction scheduling techniques to ensure sequential coherency that were either slow or expensive.
2. Exception Handling: The prior art required precise interruptions (defined below) to support exceptions like virtual memory page faults.
3. In-Order Commit and Checkpointing: The precise interruptions required by the prior art necessitated even more expensive logic for either checkpointing or in-order commit (both defined below).

Problem 1, Scheduling

The two classic instruction scheduling techniques used by computers that execute instructions out-of-order are called Thornton's Algorithm (or scoreboarding) and Tomasulo's Algorithm.

Thornton's Algorithm (scoreboarding)—FIG. 4A illustrates the commonly used prior art scoreboarding technique:
Instructions are issued (Issue__1) in their dynamic sequential stream order.

A single Reservation Station is located at the input to each Functional Unit.

Each register has a corresponding Busy-bit
Busy is set when a write instruction is issued targeting that register Busy is cleared when that instruction completes and updates that register Instructions that specify non-Busy source registers are issued directly to the target Functional Unit and their state becomes Executing, i.e. they go directly past Issue_2.

Instructions that specify a Busy source register are issued to a Reservation Station (if available) at the input to the target Functional Unit (state=Issued).

An instruction in a Reservation Station is said to have "stepped aside" so that subsequent instructions can be issued directly to the Functional Unit while the instruction in the Reservation Station waits for its needed operands to become available via the Common Data Bus.

When an instruction in a Reservation Station has all its needed operands it passes Issue_2 to begin execution by the Functional Unit Instruction Issue_1 halts if (1) an instruction specifies a Busy destination or (2) the needed Reservation Station is occupied Thornton's Algorithm, as originally defined, deals only with registers. It is extended here to deal with Main Memory so that the resulting performance can be compared with the ideal LFK 1 performance of FIG. 3B.

The extension of Thornton's Algorithm to Main Memory access, where each main memory location is treated as a unique resource, involves a list of the main memory addresses of the outstanding STORE instructions. Those addresses are considered to be Busy and the rules defined above apply. That is, in the above rules, simply replace the word "register" with "memory location".

Performance With Thornton's Algorithm—For a machine with one Branch Unit, one Load/Store Unit, one Multiplier, and one Adder, the performance for LFK 1 is as shown in FIG. 4C. Note that this example takes 12 cycles per iteration because of contention for the Adder's single Reservation Station. For problems that create more Reservation Station contention, performance can suffer dramatically. Scoreboarding, although popular in many commercial processors, has limited performance potential.

Note that Thornton's Algorithm, as shown, does not concern itself with exceptions that occur after the instruction has passed through Issue 1 and, therefore, does not support virtual memory.

Tomasulo's Algorithm—FIG. 5A illustrates the more elaborate mechanism described by Tomasulo:

Instructions are issued (Issue_1) in their dynamic sequential stream order.

Multiple Reservation Stations are located at the input to each Functional Unit. Each Reservation Station has a unique identifying number.

Instruction issue (Issue_1) does not halt if the destination register is Busy.

Instructions are always issued to a Reservation Station, i.e. there is no direct issue to the Functional Unit from Issue_1.

The instruction issued to a Reservation Station requires, in addition to the instruction, either Source Operands or the tag memory contents associated with the Source Operand location (s).

When an instruction is issued by Issue_1 the tag memory location associated with that instruction's destination location is written with the assigned Reservation Station identifier (number).

Instructions in the Reservation Stations associated with a Functional Unit can be executed (issued by Issue_2) in any order when the needed source operands are available.

Every result is tagged with the identifier of the assigned Reservation Station and subsequently issued instructions acquire the tag-values of the results they need as source operands.

Instructions that are waiting for source operands monitor the Common Data Bus for the needed tag.

Instructions that execute after logically later instructions that specify the same destination register supply their result on the Common Data Bus, but do not update the destination register.

Instruction Issue (Issue_1) halts if all Reservation Stations at the target Functional Unit are occupied Reservation Stations are released for reuse when the instruction completes.

Register reuse is handled by not writing the result to the register (only supplying it to waiting instructions via the Common Data Bus) when the tag of the instruction and the current tag memory value for that register are not equal. The handling of register reuse was especially important in the floating-point unit of the IBM 360/91 for which Tomasulo's algorithm was developed, because there are only two addressable registers (extended format). More modern architectures provide many registers and typical compilers limit register reuse.

The 360/91 "was compromised by removing the precedence and inhibit requirements.[1] This specification change led to what is termed the imprecise interrupt."[Ando1] Imprecise interrupts were permissible in the 360/91 because it did not have virtual memory.

[1] The requirement that an interruption on instruction n should logically precede and inhibit any action from being taken on instruction n+1.

Tomasulo's Algorithm, as originally defined, deals only with registers. It is extended here to deal with Main Memory so that the resulting performance can be compared with the ideal LFK 1 performance of FIG. 3B.

The extension of Tomasulo's Algorithm to Main Memory access, where each main memory location is treated as a unique resource, involves a list of the main memory addresses of the outstanding STORE instructions. Those addresses have tag memory locations associated with them and when the STORE completes the STORE data appears on the Common Result Bus, as described above. Thus the rules defined above apply. That is, in the above rules, simply replace the word "register" with "memory location".

Performance With Tomasulo's Algorithm—For a machine with one Branch Unit, one Load/Store Unit, one Multiplier, and one Adder, the performance for LFK 1 is as shown in FIG. 5C. Note that this example achieves the theoretical limit of 11 cycles per iteration. Tomasulo's algorithm is used in no known commercial machine, because of its expense and because it does not concern itself with exceptions that occur after the instruction has passed through Issue 1 and, therefore, does not support virtual memory.

Problem 2, Exception Handling

During out-of-order execution instruction A can fault after instruction B has executed, even though instruction A comes before instruction B in the sequential instruction stream. "Checkpointing" repairs the machine to a previously known state by saving the machine state at appropriate points of execution. If a checkpoint is established at every instruction boundary in the dynamic instruction stream, then the machine can repair to any instruction boundary in response to an exception and the machine is termed "in-order-commit".

Prior art out-of-order executing processors without checkpointing or in-order-commit are unable to handle an exception and resume execution; therefore, they do not support virtual memory. Virtual memory is generally considered to be a fundamental requirement for general purpose multi-user computer systems.

In-order-commit is expensive and the useful work already completed but not committed gets discarded when an exception occurs. Spreading the checkpoints out (not checkpointing at every instruction boundary) decreases the hardware costs but it is still expensive, increases the amount of work that gets thrown out, and usually increases the complexity and path length (time) of the exception handler software. Anderson et al[Ande1] recognized that "interrupts . . . are a major bottleneck to performance in an assembly line organization. Strict adherence to a specification that an interrupt on instruction n should logically precede and inhibit any action from being taken on instruction n+1 leaves two alternatives. The first would force sequentialism between instructions which may lead to an interrupt. In view of the variety of interrupt possibilities defined, this course would totally thwart high performance . . . . The second is to set aside sufficient information to permit recovery from any interrupt which might arise . . . . Taking this approach would entail hardware additions to the extent that it would severely degrade the performance one is seeking to enhance."

Two kinds of execution exceptions are discussed here: traps and faults. The definitions used here for traps and faults are the commonly accepted ones; however, their use may not be consistent across the computer industry. Traps interrupt immediately after the trap-causing instruction completes (i.e. the trap causing instruction is not re-executed after the exception is handled). Faults interrupt immediately before the fault causing instruction completes (i.e. the faulting instruction is re-executed after the exception is handled). Branch exceptions (due to incorrect branch prediction) are not discussed here. The best known solution to branch exception handling is described in patent application Ser. No. 07/448,720.[Bran1]

Examples of exceptions that must typically be handled are arithmetic overflow traps and virtual memory page faults. An arithmetic overflow means that the number resulting from a mathematical operation is larger than the largest number allowed in the computer. The typical action is to put the largest representable number where the result should have gone. A virtual memory page fault indicates that an operand needed by an instruction is not currently really in the physical main memory, i.e. the virtual page that contains the operand is on disk storage. The typical action is to fetch the virtual page from disk into the main memory and then re-execute the faulting instruction.

Problem 3, In-Order Commit and Checkpointing

For the purposes of this discussion four instruction states are defined:

1. Issued—the instruction has been issued, but is not yet executing. If an instruction has passed Issue_1 but not Issue_2 it is in this state. In all the architectures discussed here instructions pass Issue_1 in their dynamic sequential stream order.

2. Executing—the instruction has begun execution, but has not yet been completed. For an instruction to be executing it must have passed Issue_2.

3. Completed—the results of the instruction are available, but have not yet been committed.

4. Committed—the results of the instruction have been used to change the permanent state of the machine.

Precise Interrupts: The prior art has recognized that when instructions can complete execution out of program order an interruption can be imprecise[Smit2] and that an imprecise interruption can leave the machine in an irrecoverable state.[Sohi1] Several schemes to implement precise interruptions are given by Smith and Pleszkun[Smit2].

The most studied of these schemes is the reorder buffer. The reorder buffer allows instructions to finish execution out of order but commits results, i.e. updates the permanent state of the machine (registers, memory, etc.), in the order that the instructions were present in the program. This assures that a precise machine state is maintained at all times for recovery. [Sohi1]

" . . . By forcing an ordering of commitment amongst the instructions, the reorder buffer aggravates data dependencies—the value of a register cannot be read till it has been updated by the reorder buffer, even though the instruction that computed a value for the register may have completed already.

An alternative to a simple reorder buffer is to associate bypass logic with the reorder buffer. In such an organization, an instruction does not wait for the reorder buffer to update a source register, it can fetch the value from the reorder buffer (if it is available) and can [begin execution] With a bypass mechanism, the issue rate of the machine is not degraded considerably if the size of the buffer is large. However, a bypass mechanism is expensive to implement since it requires a search capability and additional data paths for each buffer entry."[Sohi1]

In-Order-Commit Can Impact Performance: A limited size reorder buffer or a limited checkpoint facility directly limits the number of instructions that can be simultaneously active in a processor. The following discusses the relationship between performance and the number of active instructions supported by the in-order-commit mechanism.

For the LFK 1 example, if in-order-commit is added, execution is as shown in FIG. 3C, where the cycles that each instruction waits to be committed following completion are indicated. Instruction K2, which must be issued before A3, is issued before instructions K1, A2, B2, C2, D2, E2, F2, G2, H2, I2 and J2 can be committed; therefore the maximum number of active instructions allowed must be at least 12 (the eleven K2 overlaps plus K2 itself) to achieve the execution rate of FIG. 3B. If the maximum number of active instructions allowed is less than 12, performance would degrade as illustrated in FIGS. 3D, 3E, 3F, and 3G and as tabulated below:

| Maximum Active | Average Cycles per Iteration | Relative Performance | Percent of Best | Figure |
| --- | --- | --- | --- | --- |
| 12 | 11 | 2.00 | 100% | 3C |
| 10 | 12 | 1.83 | 92% | 3D |
| 8 | 13 | 1.69 | 85% | 3E |
| 6 | 15 | 1.47 | 73% | 3F |
| 4 | 17 | 1.29 | 65% | 3G |
| 3 | 22 | 1.00 | 50% | 3A |

These times assume that, where necessary, the LOAD instructions in pass n+1 can pass or go ahead of the waiting STORE from pass n, the previous pass.

As can be seen from this example, performance drops off substantially if the maximum number of active instructions allowed by the design is insufficient for the particular problem. As the problem gets more complex (i.e. more parallelism is available) the number of active instructions allowed must increase. For example Livermore FORTRAN Kernel 9

```
DO 9 i=1,n
  PX(1,i)=DM28*PX(13,i)+DM27*PX(12,i)+DM26*PX(11,i)+
    DM25*PX(10,i)+DM24*PX(9,i)+DM23*PX(8,i)+
    DM22*PX(7,i)+ CO*(PX(5,i)+ PX(6,i)+PX(3,i)
9 CONTINUE
``` requires significantly more active instructions to achieve near optimum performance, because up to 10 threads can be simultaneously active.

The need for a large number of active instructions is substantiated by other work. The RUU studies[Sohi1] have found that 100 active instructions provides performance near the theoretical limit for their target instruction set and target benchmark.

A large mount of hardware (logic) is necessary in the prior art to support many active instructions and in-order-commit (or checkpointing) necessary for correct exception handling. That logic is overhead—it does not contribute to performance, in fact, it impacts performance by making it more difficult to stay within the microcosm.

Thornton's Algorithm with In-Order-Commit—FIG. 4B illustrates the additional logic needed to provide a Reorder buffer for in-order-commit to Thornton's Algorithm:

A PC-History where each entry includes a COMPLETED indicator and a Reorder Buffer pointer that indicates which Reorder Buffer entry should receive the result of that instruction A pointer associated with each instruction that indicates which PC-History entry is associated with that instruction.

A Reorder-Buffer-pointer adjunct to each Busy-bit that indicates where in the Reorder Buffer will receive or has received the result of the logically previous Busy-bit-causing instruction.

A Reorder Buffer for holding Completed results that are not yet ready to commit.

Bypass Logic to supply operands in the Reorder Buffer to instructions in the Reservation Stations.

As each instruction passes through Issue__1 its PC__Value, a Reorder Buffer Pointer, and a zero Completed Indicator is written to PC-History Top and the instruction, with a pointer to the associated PC-History entry, is forwarded to the appropriate Functional Unit or Reservation Station. If needed source operands are not yet available in the registers, the instruction obtains (at Issue__1) the identification of the Reorder Buffer position in which it is to look for the needed operand. Thus instructions waiting in Reservation Stations monitor the Reorder Buffer entry or entries, rather than the Common Result Bus, for needed source operands.

Any method of assigning Reorder Buffer entries is satisfactory as long as no result gets lost or corrupted (e.g. a modulo-n counter would be sufficient).

When the instruction completes it marks the PC-History entry pointed to as Completed and places the result of the instruction in the indicated Reorder Buffer entry. Subsequent instructions that are waiting in Reservation Stations for this result get it from the Reorder Buffer entry via the Bypass Path, which permits each Reservation Station to simultaneously monitor and source any two Reorder Buffer entries. The necessity of bypass logic is more fully explained in the discussion of Tomasulo's algorithm.

When the PC-History entry at Bottom indicates Completed, the Reorder Buffer entry pointed to by that PC-History updates the permanent state of the machine, i.e. it is written to the appropriate register via the Common Data Bus.

The Reorder Buffer is necessary to hold results while they wait their turn to commit in-order. This logic has two negative aspects:

1. Expensive bypass logic is necessary to supply these waiting results to subsequent instructions that need them as sources.
2. The maximum number of active instructions is limited by the size of the Reorder Buffer—as the Reorder Buffer gets larger the bypass logic gets exponentially more complex.

Tomasulo's Algorithm with In-Order-Commit—FIG. 5B illustrates the additional logic needed to add a Reorder Buffer for In-Order-Commit to Tomasulo's algorithm:

A PC-History where each entry includes a COMPLETED indicator and a Reorder Buffer pointer that indicates which Reorder Buffer entry should receive the result of that instruction A pointer associated with each instruction that indicates which PC-History entry is associated with that instruction.

A Reorder Buffer for holding Completed results that are not yet ready to commit.

Bypass Logic to supply operands in the Reorder Buffer to instructions in the Reservation Stations.

As each instruction passes through Issue__1 its PC__Value, a Reorder Buffer Pointer, and a zero Completed Indicator is written to PC-History Top and the instruction, with a pointer to the associated PC-History entry, is forwarded to the appropriate Reservation Station. Any method of assigning Reorder Buffer entries is satisfactory as long as no result gets lost or corrupted (e.g. a modulo-n counter would be sufficient). If needed source operands are not yet available in the registers, the instruction obtains (at Issue__1) the identification of the Reorder Buffer position in which it is to look for the needed operand. That needed operand is known to be the needed operand by a tag match.

When the instruction completes it marks the PC-History entry pointed to as Completed and places the result of the instruction and its tag in the indicated Reorder Buffer entry. A subsequent instruction, that is waiting for this needed operand as a source, sources the contents of the Reorder Buffer entry into the Reservation Station via the bypass logic.

When the PC-History entry at Bottom indicates Completed, the Reorder Buffer entry pointed to by that PC-History updates the permanent state of the machine, i.e. it is written to the appropriate register via the Common Data Bus.

Because results commit in their original program order, Tomasulo's handling of register reuse is no longer necessary.

It is reasonable to ask, "Can the bypass logic in the reorder buffer be eliminated?". FIG. 5C shows that the performance and general characteristics of an in-order-commit machine without bypass logic is unacceptable. Although instructions can pass Issue__1 and enter a Reservation Station, they cannot begin execution until their needed source operands appear on the Common Data Bus. Since these results must appear for commit in the original sequential order, each iteration of the loop is delayed. The resulting performance and ever-increasing demand for more active instructions makes bypass elimination non-feasible.

The point is that when in-order-commit is necessary bypass logic is also necessary. Both are expensive and neither improves performance. With the necessary bypass logic the performance of Tomasulo's Algorithm with In-Order-Commit does reach the theoretical limit of 11 cycles per iteration for LFK 1 (not shown).

Register Update Unit (RUU)—FIG. 6 illustrates the prior art RUU technique, which includes in-order-commit:

There are two levels of issue logic: Issue__1 and Issue__2.

Instructions are issued at Issue_1 in their dynamic sequential stream order into the RUU; they enter the RUU at RUU TOP.

The RUU is a centralized unit containing multiple Reservation Stations, called RUU entries. The RUU entries are managed as a FIFO.

All RUU entries are available for execution (issue by Issue_2) as soon as the needed source operands are available and the needed Functional Unit is available, i.e. they can execute out-of-order.

When an instruction reaches RUU BOTTOM (the bottom of the FIFO) and it is marked COMPLETE its RESULT is written to the specified destination, i.e. the RESULT is "committed" to update the permanent state of the machine, and that RUU entry is freed for use by Issue_1 instruction entry.

RUU entries have fields for the PC-value, the instruction, source operands, the result, an EXECUTED indicator, and a COMPLETED indicator. EXECUTED means issued by Issue_2.

Every result is tagged with the address of the assigned RUU entry and subsequently issued instructions acquire the tag-values of the results they need as source operands.

Instructions that are waiting for source operands monitor the indicated RUU entry(s) for availability of the needed operands.

Instruction completion updates the result field in the associated RUU entry.

Instruction Issue_1 halts if all RUU entries are occupied.

The RUU, as detailed in patent application Ser. No. 07/448,720, filed Dec. 11, 1989,[Bran1] uses only about 25% of its logic for functional logic (functional units, registers, etc.). The remaining 75% is used for scheduling and in-order commit logic. That means that a processor with an RUU will be about 4 times as large (gate count, chip size, number of chips, etc.) as that processor without an RUU.

CONDEL-2—The CONDEL-2 architecture[Uht_1] removes register anti-dependencies (the Cannot Overwrite case, page 5) by recognizing that if multiple copies (instances) of a variable exist then anti-dependencies do not exist. This allows different loop iterations to be concurrently executed—an Iteration Count is incremented for each pass through the loop.

In the Shadow Sink (SSI) Matrix there are as many Register Files (RF) as there are positions in the Instruction Queue. Result Registers are assigned dynamically at run-time—the instruction's position in the Instruction Queue selects the RF and the Iteration Count selects the register within the RF.

One or more instructions can be issued during each cycle from the Instruction Queue when permitted by the state of the binary dependency matrix and the execution matrices. A dependency between two instructions, A and B, is identified by a binary 1 at $ROW_a$ and $COLUMN_b$ in the dependency matrix.

When an instruction execution completes, virtually or really, a binary 1 is set in the Virtual Execution (VE) Matrix or the Real Execution (RE) Matrix, at the position addressed by the instruction and iteration. The logical OR of the bits in the VE and RE matrices permits execution of dependent instructions. The results of virtually executed instructions, i.e. instructions whose results may or may not be used depending on the resolution of the program flow (branching), are available in the Shadow Sink Matrix for subsequent instructions, but are stored into memory only after branch resolution has occurred. This eliminates some flow dependencies.

The combination of the Instruction Queue and the matrices is very similar to the RUU, but the matrices are based on the static instruction stream (their order in memory), while the RUU is a map of the dynamic instruction stream determined by the run time control flow of the code. Additionally, CONDEL-2 assumes that resource limits never exist, i.e. there are as many memory access paths and multipliers as needed at all times. The cost of the scheduling logic (including in-order commit) is estimated by the CONDEL-2 authors at about 1 Million gates or about 95% of the machine's logic, i.e. only about 5% of the logic in the machine is the functional logic. That means that a processor with CONDEL's scheduling mechanism will be about 20 times as large (gate count, chip size, number of chips, etc.) as that processor without that scheduling mechanism.

Reservation Station Scheduling—The Dynamic Scheduling Embodiment of patent application Ser. No. 07/448,720 filed Dec. 11, 1989 now U.S. Pat. No. 5,471,593,[Bran1] introduced Reservation Station Scheduling, an enhancement to Dedicated Result Storage, that reduces the logic required by a Dynamic Scheduling architecture with in-order commit by about 50%. However, that architecture still dedicates about 50% of its logic to the scheduling and in-order-commit functions, i.e. the functional logic content is about 50% of the total (versus about 25% for the RUU and 5% for CONDEL.

Checkpointing: The prior art has few successful examples of checkpointing. Hsu and Pratt[Hsu_1] provide a good analysis of the necessary properties and algorithms needed for checkpointing. They show in Theorem 2 that any checkpointing mechanism needs a minimum of three logical spaces, one current and two backup. Since each logical space is a full set of registers the cost of just minimal checkpointing is prohibitive.

Furthermore, what is really needed for maximum performance is a large number of checkpoints or logical spaces, so that checkpoints can be closely spaced. The further apart the checkpoints the more useful work gets thrown out. "There is a fundamental dilemma regarding checkpointing. On the one hand, since checkpointing is an overhead function, its cost in time and additional hardware should be kept as small as possible. This means no more checkpoints than absolutely necessary. On the other hand, repair to the last checkpoint involves discarding useful work. The further apart the checkpoints, the more useful work gets thrown out."[Hsu_1] Furthermore, if there are too few checkpoints the machine stalls often to fulfill checkpointing rules. The only way to reduce these stalls is to add more checkpoints.

These requirements assume that checkpoints must be precise. "A repair is precise if it excludes the effects on registers and main memory by all instructions to the right of the precise repair point . . . and allows the effects on registers and main memory by all instructions to the left of that precise repair point."[Hsu_1]

Summary of Prior Art Disadvantages: The prior art suffers from five important disadvantages (3 technical problems that result in 2 product problems):

1. Scheduling: The prior art ensured sequential coherency via instruction scheduling techniques that were either slow or expensive.
2. Exception Handling: The prior art required precise interruptions to support exceptions like virtual memory page faults.
3. In-Order Commit and Checkpointing: The precise interruptions required by the prior art necessitated even more expensive logic for either checkpointing or in-order commit.

4. Overhead: The prior art spent 75% to 95% of its hardware budget (logic gates) on scheduling and in-order commit, leaving only 5% to 25% of the logic for functional logic. That means that a processor with that overhead will be 4 to 20 times as large (gate count, chip size, number of chips, etc.) as that processor without the overhead.

5. Performance and Cost: The prior art was forced either to limit performance, because of the need to limit the functional logic in order to fit on one chip or a small set of chips, or to suffer significant decreases in speed and reliability and increases in heat, size, materials complexity and manufacturing expense to include the needed logic.

Patent application Ser. No. 07/448,720[Bran1] provides an efficient scheduling mechanism and in-order commit at significantly lower overhead cost—less than half that of the best prior art.

OBJECTS AND ADVANTAGES

Accordingly, several objects and advantages of the present invention are:
to schedule instructions in a manner that is sequentially coherent, fast, and inexpensive;
to handle exceptions via a technique that is sequentially coherent but not excessively precise;
to eliminate the need for the logic required for in-order-commit and/or checkpointing.
to improve the ratio of functional logic to overhead logic even more significantly than patent application Ser. No. 07/448,720;[Bran1]
and, thereby, to permit increased processing power while staying on one chip or a small set of chips.

BRIEF DESCRIPTION OF DRAWINGS

In the drawings closely related figures have the same number but different alpha character suffixes.

FIGS. 3A, 3B, 3C, 3D, 3E, 3F, and 3G show the instruction execution patterns and resulting performance for the instructions of LFK 1.

FIG. 4A shows a prior art processor using Thornton's Algorithm, FIG. 4B shows the modification necessary to enforce in-order commit, and FIG. 4C shows the performance of such a processor executing LFK 1.

FIG. 5A shows a prior art processor using Tomasulos Algorithm, FIG. 5B shows the modification necessary to enforce in-order commit, and FIG. 5C shows the performance of such a processor (in-order commit and no bypass logic) executing LFK 1.

FIG. 6 shows a prior art processor using the Register Update Unit (RUU) technique.

FIGS. 8A, 8B, 8C, and 8D show the Dependency Resolution Logic of FIG. 7A using Resource Indexed Activity Accounting.

FIGS. 11A and 11B show a more aggressive scheduling form of Sequential Coherency Instruction Scheduling.

FIGS. 12A, 12B, 12C, and 12D show Sequential Coherency Instruction Scheduling using implicit (i.e. without explicit) activity signaling.

FIGS. 14A and 14B show Sequential Coherency Exception Handling used with a computer processor that schedules instructions with Thornton's Algorithm.

FIGS. 15A and 15B show Sequential Coherency Exception Handling used with a computer processor that schedules instructions with Tomasulo's Algorithm.

FIGS. 16A and 16B show Sequential Coherency Exception Handling used with a computer processor that schedules instructions with a RUU.

FIG. 17A and 17B show Sequential Coherency Exception Handling used with a computer processor that schedules instructions with Sequential Coherency Instruction Scheduling.

FIG. 24 shows the operation of a one-packet vector loop with the Vector Embodiment.

Figure 1:
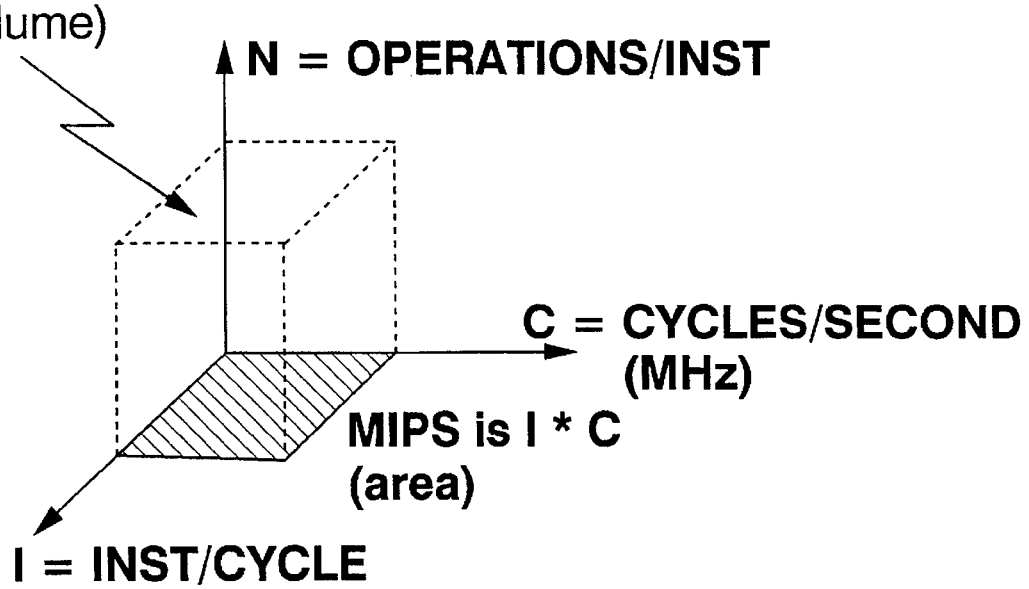
FIG. 1 shows that Performance Capacity can be viewed as the Volume of a cube with sides N (Operations/Instruction), I (Instructions/Cycle) and C (Cycles/Second).
Figure 2:
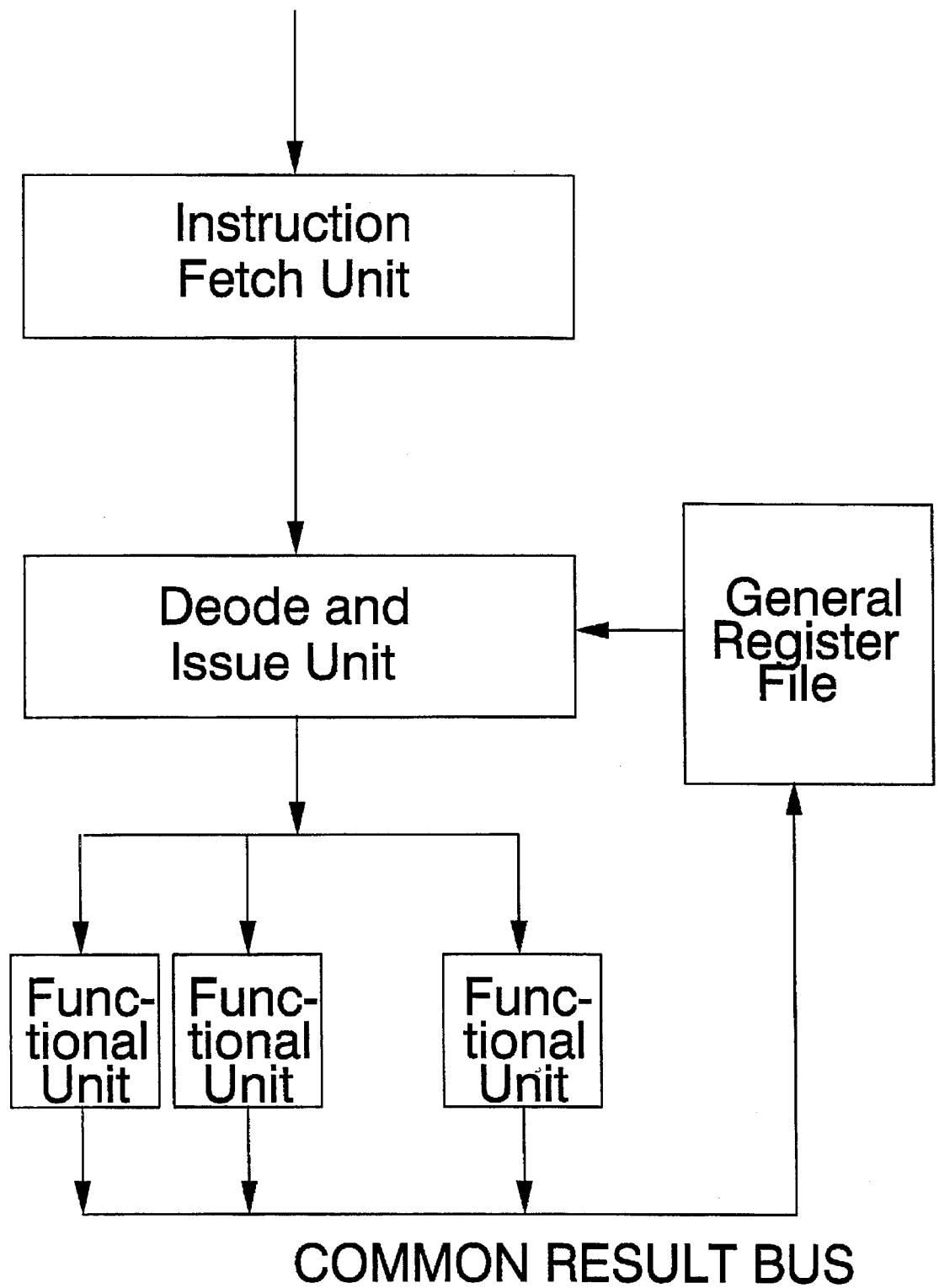
FIG. 2 shows a typical prior art Multi-Functional Unit Processor.

| Reference Numerals In Drawings | | | |
|---|---|---|---|
| No. | NAME | No. | NAME |
| 10 | Instruction | 110 | Issue_1 |
| 20 | Dependency Resolution Logic | 120 | Outstanding Activity Memory |
| 30 | Instruction Expander | 130 | Instruction Queue |
| 40 | Expanded Instruction | 200 | Instruction Pipeline |
| 50 | Issue_1 (I1) Updater | 210 | Registers |

-continued

Reference Numerals In Drawings

| No. | NAME | No. | NAME |
|---|---|---|---|
| 60 | Activity Signaling | 220 | Functional Unit |
| 70 | Outstanding Activity (OA) Updater | 230 | Program Counter |
| 80 | Dependency Information (DI) Updater | 240 | Issue__2 |
| 90 | Cycle Counter | 250 | Instruction Fetch Unit |
| 100 | Instruction Memory (or Cache) | 260 | Instruction Decode and Issue |
|  |  | 270 | Common Result Bus |
|  |  | 280 | PC (Program Counter) HISTORY |
| 285 | Tag Value | 400 | ADD2 Functional Unit |
| 290 | Completed Indicator | 410 | MUL1 Functional Unit |
| 295 | Valid Indicator | 420 | MUL2 Functional Unit |
| 300 | PC (Program Counter) Value | 430 | Registers 0–7 |
| 305 | Executed Indicator | 440 | Registers 8–15 |
| 310 | Restore Path | 450 | Registers 16–23 |
| 320 | Save Path | 460 | Registers 24–31 |
| 330 | Reservation Station | 470 | Registers 32–39 |
| 340 | Tag Memory | 480 | Registers 40–47 |
| 350 | Register Update Unit | 490 | Registers 48–55 |
| 370 | LSB1 Functional Unit | 500 | Registers 56–63 |
| 380 | LSB2 Functional Unit | 510 | Condition Codes 16–23 |
| 390 | ADD1 Functional Unit | 520 | Condition Codes 24–31 |
| 530 | Condition Codes 32–39 | 690 | Line Shifter |
| 540 | Condition Codes 40–47 | 700 | LSB Input A |
| 580 | Register to FU Crossbar | 710 | LSB Input B |
| 590 | Virtual Address Register | 720 | LSB INA Selector |
| 600 | Page Table | 730 | LSB Adder |
| 610 | Real Address Register | 740 | LSB Conditional Execution Decision |
| 620 | Data Cache Memory | 760 | LSB Line Register |
| 630 | LSB Cache Data Register | 770 | LSB Store Data Register |
| 640 | Check and Align | 780 | LSB Store Data Register |
| 650 | Cache Set | 790 | LSB Pipe Register |
| 660 | Cache Line Register | 800 | 3 Port Data Cache |
| 670 | Real Page Compare | 900 | Outstanding Instruction Memory |
| 680 | Line Selector | 910 | Outstanding Read Decode |
| 920 | Outstanding Write Decode |  |  |
| 930 | Write Permitting Summing OR |  |  |
| 940 | Read Permitting Summing OR |  |  |
| 950 | Issue__2 Permit Gating |  |  |
| 960 | Outstanding Instruction FIFO |  |  |
| 970 | Outstanding Instruction List |  |  |
| 975 | Dependency Matrix |  |  |
| 980 | IHPC (Interruption Handler PC) History |  |  |
| 990 | Results Path |  |  |
| 1000 | Term Register |  |  |

SUMMARY OF INVENTION

The invention described here in several embodiments improves on the prior art via two independent elements:

1. Sequential Coherency Instruction Scheduling
2. Sequential Coherency Exception Handling When combined these elements substantially reduce the cost of having many active instructions, by permitting out-of-order execution and correctly handling exceptions without needing in-order-commit or checkpointing.

Sequential Coherency Instruction Scheduling: A computer processor is termed sequentially coherent if the results of executing a program are the same as those obtained when the instructions are executed sequentially in their original program order.

Accesses to all resources, e.g. register locations, condition codes, and main memory, must be sequentially coherent, defined as:

A write to a resource must wait for all previous reads from and writes to that resource to complete.

A read from a resource must wait for all previous writes to that resource to complete.

Figure 7A:
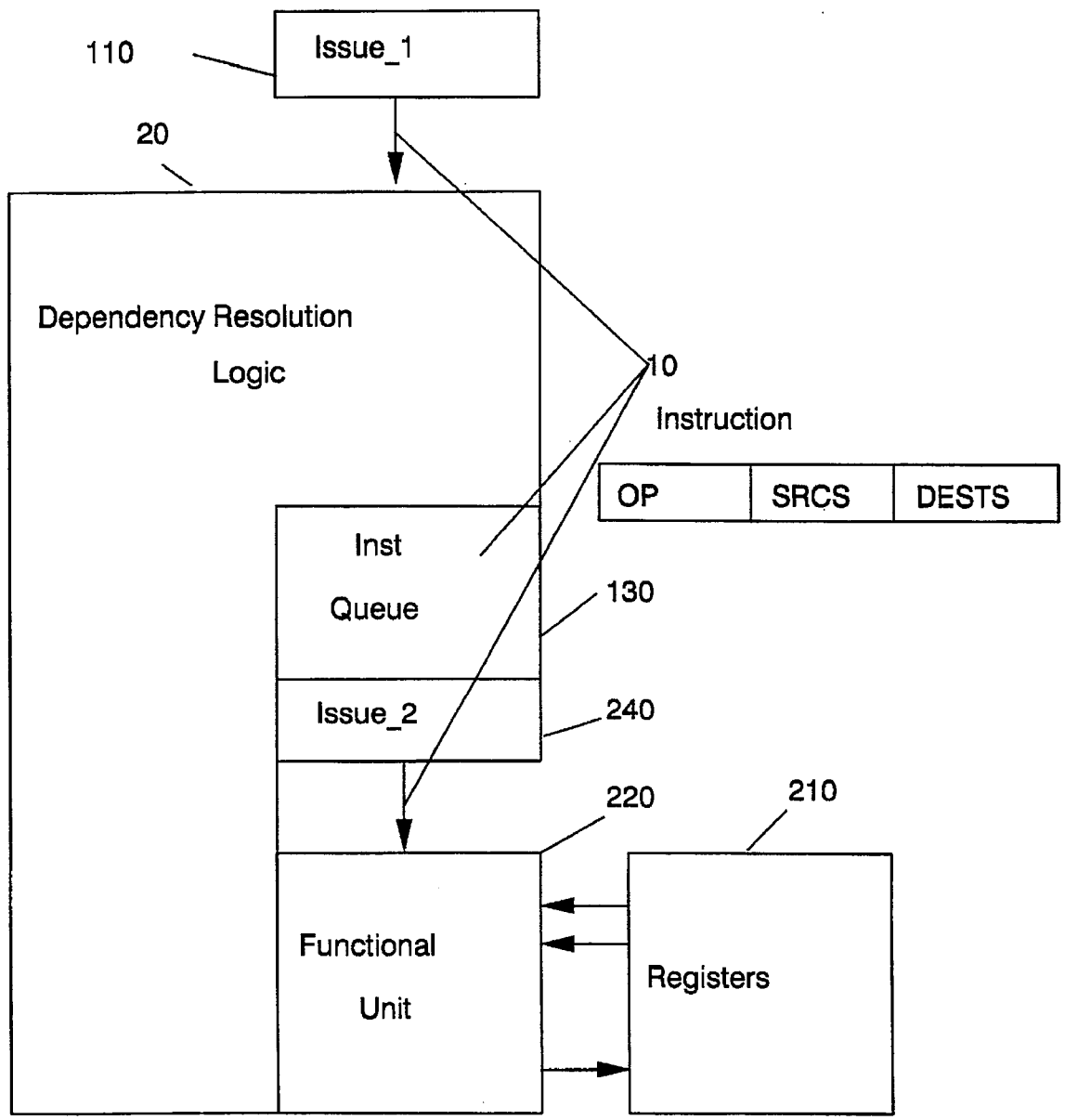
FIGS. 7A and 7B show the block diagram of a computer processor with Sequential Coherency Instruction Scheduling.

FIG. 7A shows the block diagram structure of a computer processor that uses Sequential Coherency Instruction Scheduling. FIG. 7A is composed of the following major elements:

Instructions 10—specify the operations to be performed and the operands to be used Issue__1 110—supplies instructions in the sequential program order. This order is also called the dynamic instruction stream order,$^{[Uhl\_1]}$ as determined by the contents of the program counter in a traditional machine.

Instruction Queue 130—Holds instructions that have passed Issue__1 until they can progress past Issue__2.

Issue__2 240—Schedules instructions 10 for execution, by the Functional Unit 220, from the Instruction Queue 130 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operand(s) obtained from the register(s) 210 and produce a result that is written to the instruction's destination register 210.

Dependency Resolution Logic 20—Resolves dependencies among instructions to ensure that the results are sequentially coherent. This Dependency Resolution Logic and its effect on the scheduling of instructions by Issue__2 240 are the essence of the Sequential Coherency Instruction Scheduling aspect of the present invention.

In FIG. 7A instructions 10 are supplied through Issue__1 110 to the Instruction Queue 130. Entries within the Instruction Queue 130 are allocated from a list of free entries. As instructions 10 enter the Instruction Queue 130 the Dependency Resolution Logic 20 is adjusted to account for dependencies. When all dependencies are resolved, as known by the Dependency Resolution Logic 20, the instruction 10 is moved from the Instruction Queue 130 entry through Issue_2 240 to execution by the Functional Unit 220. During execution the source operand(s) (registers 210) specified by the instruction 10 are accessed, the operation is performed, and the result is written to the destination register (s) 210.

The method of fetching instructions in their program sequence is not shown, because it is not salient to the present invention. Typically a program counter controlled by the program during its execution would be used; however, instructions could, just as well, be provided by an external instruction source (e.g. by the issue unit in a Single Instruction Multiple Data configuration) or as part of the propagating instruction wavefront in a systolic processor.

The Dependency Resolution Logic (20) Algorithm: Sequential Coherency Instruction Scheduling is an invention that issues instructions based on sequential coherency rules that permit an instruction to be executed:

when all needed sources are available or will be available, i.e. when all logically previous writes have been accomplished or will be accomplished, at the time required by the instruction, when all logically previous reads of the destination(s) have been accomplished or will be accomplished before the time that the instruction will overwrite the destination(s), and when all logically previous writes to the destination(s) have been accomplished or will be accomplished before the time that the instruction will overwrite the destination(s).

Figure 7B:
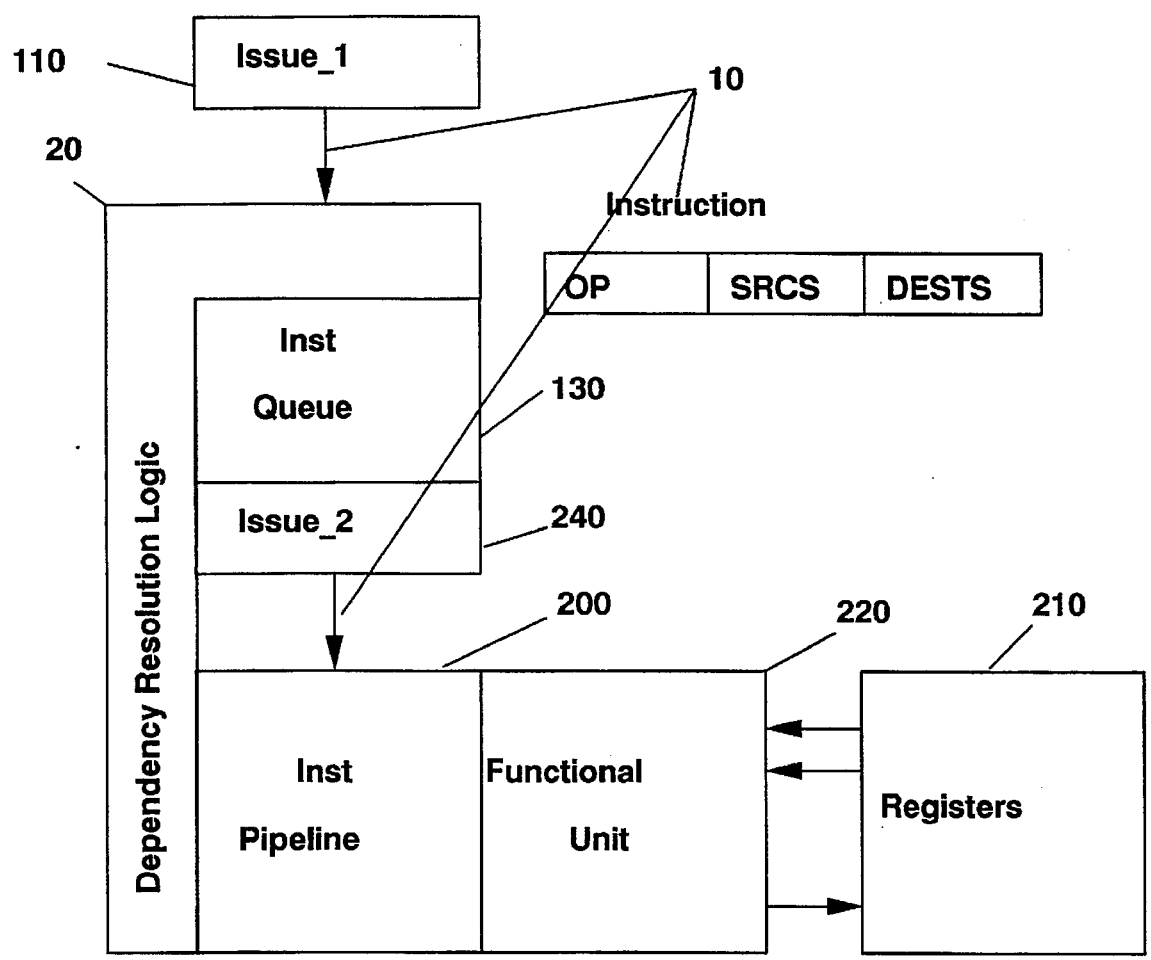

FIG. 7B expands FIG. 7A to show an Instruction Pipeline 200 added to control the execution of instructions 10 within the Functional Unit 220. The above algorithm can be rephrased, to be more specific for a pipelined processor, as:

In a pipeline with n stages, where sources are needed at stage $p_s$ and destinations are written at stage $p_d$, an instruction can be executed (1) when all needed sources will be available by the time the instruction needs them, i.e. reaches stage $p_s$, (2) when all logically previous reads of the destination(s) will be done before the instruction will overwrite the destination, i.e. reaches stage $p_d$, and (3) when all logically previous writes of the destination(s) will be done before the instruction will overwrite the destination, i.e. reaches stage $p_d$.

The general algorithm and, where appropriate, the pipelined rephrasing of that algorithm guide the remaining examples of specific embodiments of Sequential Coherency Instruction Scheduling. Those skilled in the art will recognize that many other techniques than those used here as examples can fall within the scope of Sequential Coherency Instruction Scheduling. For example, logical signaling that an event (e.g. a write of a resource) will occur in m cycles can be used (in combination with any other needed enables) to permit the issuance of an instruction that will write that same resource at any time beyond cycle m. The knowledge that an event has or will occur can be explicit (e.g. a signal that adjusts an indicator) or implicit (e.g. a previous write must occur first because of pipeline positioning). Additionally, indications can represent the accomplishment of an event or predict an event.

EMBODIMENTS OF SEQUENTIAL COHERENCY INSTRUCTION SCHEDULING

Those skilled in the art will recognize that the general architectures of FIGS. 7A and 7B can be modified, enhanced, and expanded within the scope of this invention. For example, the storage resources can be expanded from just registers to include a variety of resources (e.g. main storage and condition-codes). Additionally the number of Functional Units can be expanded. The following embodiments illustrate that, moreover, there are numerous techniques available to construct the Dependency Resolution Logic 20 in a manner that is consistent with the Sequential Coherency Instruction Scheduling algorithm. Three fundamental techniques, discussed below, are:

1. Resource Indexed Activity Accounting—Outstanding activities (e.g. reads and writes), dependency information, and activity signaling are maintained in terms of resource interlocks, where resource interlocks are defined as the combination of resource number and interlock type (read, write), so that a Register 2 read has a different index than a Register 2 write.

2. Instruction And Resource Indexed Activity Accounting—Outstanding activities, dependency information, and activity signaling are maintained as a two dimensional list or matrix, where one dimension is in terms of instructions in their logical order and the other dimension is in terms of resource interlocks.

3. Instruction Indexed Activity Accounting—Outstanding activities, dependency information, and activity signaling are maintained in terms of instructions in their logical order.

Each of these techniques use explicit signaling of activities, e.g. reads, to drive the dependency resolution logic; however, implicit signaling, e.g. knowing by predictive techniques, when an activity will occur is similarly applicable (see the later section, "More Aggressive Scheduling Without Explicit Signaling").

Figure 8A:
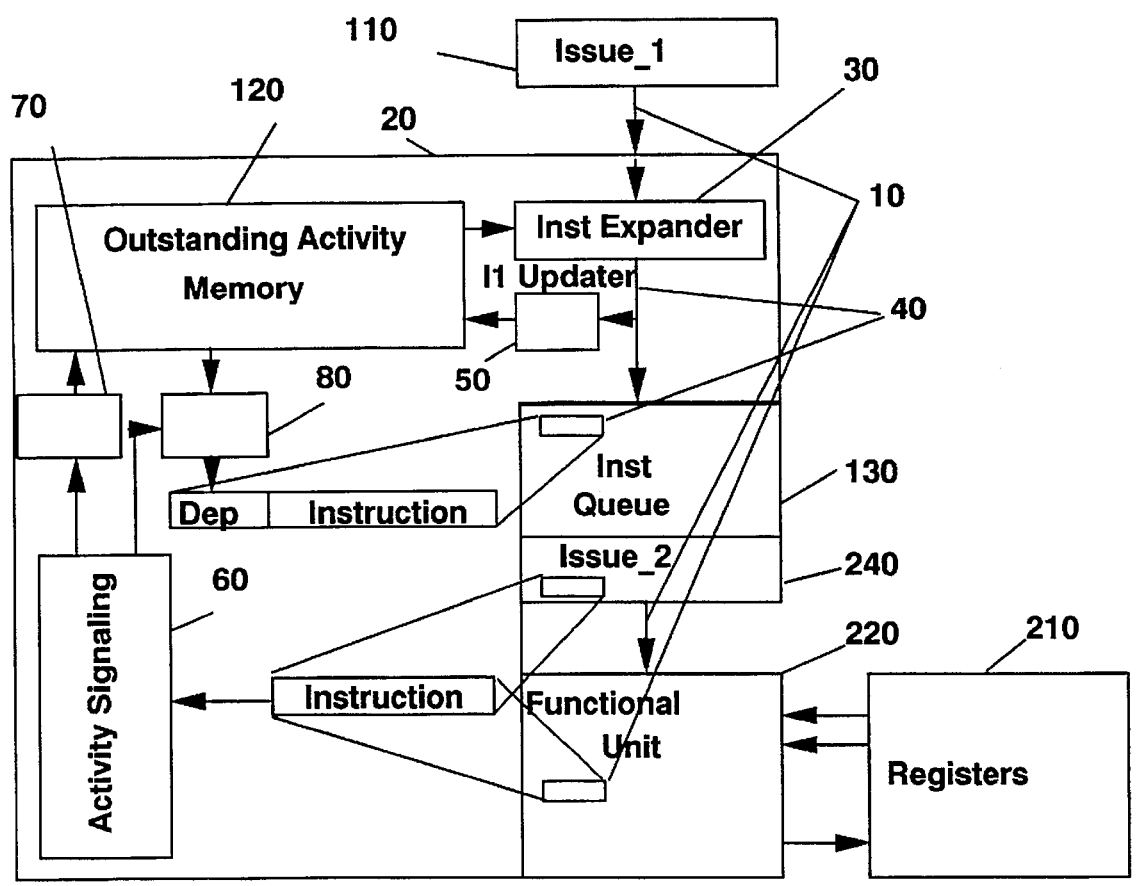

Resource Indexed Activity Accounting: FIG. 8A expands the Dependency Resolution Logic of FIG. 7A. Reference Numbers included in FIG. 8A:

| 10 | Instruction | 110 | Issue_1 |
|----|-------------|-----|---------|
| 20 | Dependency Resolution Logic | 120 | Outstanding Activity Memory |
| 30 | Instruction Expander | 130 | Instruction Queue |
| 40 | Expanded Instruction | 210 | Registers |
| 50 | Issue_1 (I1) Updater | 220 | Functional Unit |
| 60 | Activity Signaling | 240 | Issue_2 |
| 70 | Outstanding Activity (OA) Updater | | |
| 80 | Dependency Information (DI) Updater | | |

FIG. 8A is composed of the following major sections:

Instructions 10—specify the operations to be performed and the operands to be used Issue_1 110—supplies instructions in the sequential program order. This order is also called the dynamic instruction stream order,$^{[U_{ht-1}]}$ as determined by the contents of the program counter in a traditional machine.

Instruction Queue 130—Holds instructions that have passed Issue__1 until they can progress past Issue__2 240.

Issue__2 240—Schedules instructions for execution, by the Functional Unit 220, from the Instruction Queue 130 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent, via Resource Indexed Activity Accounting. This Dependency Resolution Logic 20 and its effect on the scheduling of instructions by Issue__2 240 are the essence of the Sequential Coherency Instruction Scheduling aspect of the present invention.

Where that Dependency Resolution Logic 20 is composed of:

Outstanding Activity Memory 120
Issue__1 (I1) Updater 50
Outstanding Activity (OA) Updater 70
Instruction Expander 30 that produces Expanded Instructions 40
Activity Signaling 60
Dependency Information (DI) Updater 80

In the operation of FIG. 8A instructions 10 that enter the Instruction Queue 130 via Issue__1 110 acquire Dependency Information from the Outstanding Activity Memory 120 for each of the instruction's sources and destinations. That dependency information identifies any outstanding writes that must occur before a source can be read and any outstanding reads and writes that must occur before a destination can be updated.

After dependency information has been acquired from the Outstanding Activity Memory 120, the Outstanding Activity Memory is updated by the Issue__1 Updater 50 to reflect the new activities made outstanding by placing the instruction in the Instruction Queue 130. Specifically, outstanding read activities are recorded for each instruction source and outstanding write activity is recorded for each instruction destination.

When an instruction is executed the activities associated with the source reads and destination writes are signaled via Activity Signaling 60. That signaling causes the Outstanding Activity Updater 70 to update the Outstanding Activity Memory information for the signaled Resource Interlock and causes each Dependency Information Updater 80 to update the Dependency Information for the signaled Resource Interlock.

Instructions in the Instruction Queue 130 are inhibited from execution (Issue__2 240) as long as the Dependency Information carried with the instruction indicates that dependencies exist, but the Activity Signaling 60 and Dependency Information Updater 80 in time remove any inhibiting conditions until the instruction is permitted to execute. As it executes it similarly signals its activities to remove those dependencies for logically subsequent instructions.

Three more detailed embodiments of techniques to implement Resource Indexed Activity Accounting follow:

Dependency Resolution via Resource Deficits
Dependency Resolution via Resource Indicators
Dependency Resolution via Resource Linked Lists Dependency Resolution via Resource Deficits: An embodiment that enforces the rules of Sequential Coherency Instruction Scheduling with deficits or counts is shown in FIG. 8B. The Dependency Resolution Logic of FIG. 8B is based on the following detailed rules:

1. Deficits are the number of reads and writes that are outstanding for a given resource. Deficits are established at Issue__1 based on the original program order and are maintained as two counts for each resource, Read Deficit and Write Deficit.

2. An instruction which will write a resource can be executed only when there are no logically previous outstanding writes to or reads from that resource. That is, it acquires a copy of the Read Deficit, called a Read Debit, and a copy of the Write Deficit, called a Write Debit, for that resource and then counts those debits down when reads from or writes to that resource occur. When both debits reach zero (and rule 3, below, enables) the instruction can safely be executed.

3. An instruction which will read a resource can be executed only when there are no logically previous outstanding writes to that resource. That is, it acquires a copy of the Write Deficit, called a Write Debit, for each such resource and then counts that debit down when writes to that resource occur. When the debits for all such resources reach zero (and rule 2, above, enables) the instruction can safely be executed.

Reference Numbers included in FIG. 8B:

| 10 | Instruction | 110 | Issue__1 |
|----|-------------|-----|----------|
| 20 | Dependency Resolution Logic | 120 | Outstanding Activity Memory |
| 30 | Instruction Expander | 130 | Instruction Queue |
| 40 | Expanded Instruction | 210 | Registers |
| 50 | Issue__1 (I1) Updater | 220 | Functional Unit |
| 60 | Activity Signaling | 240 | Issue__2 |
| 70 | Outstanding Activity (OA) Updater | | |
| 80 | Dependency Information (DI) Updater | | |

FIG. 8B is composed of the following major sections:

Instructions 10 indicating two sources, SRC A and SRC B, an Op Code, and a Destination.

Issue__1 110—supplies instructions in the sequential program order. This order is also called the dynamic instruction stream order,$^{[U_{ht-1}]}$ as determined by the contents of the program counter in a traditional machine.

An Instruction Queue 130 with Expanded Instructions 40 including Dependency Information Issue__2 240 that schedules Instructions 10 from the Instruction Queue 130 for execution when the Dependency Information in the Expanded Instruction 40 indicates that the Instruction can safely execute Registers 210 and Functional Unit 220

Dependency Resolution Logic 20—Resolves dependencies among instructions to ensure that the results are sequentially coherent, via Resource Indexed Activity Accounting. This Dependency Resolution Logic 20 and its effect on the scheduling of instructions by Issue_2 240 are the essence of the Sequential Coherency Instruction Scheduling aspect of the present invention.

Where that Dependency Resolution Logic 20 is composed of:

A Outstanding Activity Memory 120 which has a list, indexed by Resource InterLock (resource and access type), of Deficits or counts of outstanding activity Instruction Expander 30 that adds Dependency Information from the Outstanding Activity Memory 120 to an Expanded Instruction 40

Issue_1 Updater 50 that updates Outstanding Activity Memory 120 to reflect the entry of the Expanded Instruction 40 into the Instruction Queue 130

Activity Signaling 60 that signals the occurrence of reads and writes as the Instruction executes Outstanding Activity Updater 70 that updates Outstanding Activity Memory 120 to reflect Activity Signaling 60

Dependency Information Updater 80 that updates Dependency Information in Expanded Instructions 40 in the Instruction Queue 130 based on the Activity Signaling 60

In FIG. 8B, Outstanding Activity Memory 120 locations are initialized to zero and the contents are incremented when instructions using the associated resources are issued (Issue_1 110) and are decremented by one by the Outstanding Activity (OA) Updater 70 whenever the location is non-zero and an appropriate resource access is performed. A zero deficit indicates that no dependency exists for that resource.

Instructions 10 enter the Instruction Queue 130 in program order via Issue_1 110. As they enter they acquire debits (Destination Read Deficit, Destination Write Deficit, Source A Write Deficit, and Source B Write Deficit) from Outstanding Activity Memory 120 via the Instruction Expander 30 to form the Expanded Instruction 40, and they update the deficits in Outstanding Activity Memory 120 via the Issue_1 Updater 50. Instructions are placed in a free Instruction Queue entry, as determined by a free entry list. When there are no free entries, the Instruction Queue is full and instructions wait to be entered, Issue_1 110 halts.

Instructions are removed from the Instruction Queue when it is the oldest (at Bottom) and the instruction is completed, although the instruction could be removed sooner, e.g. as soon as the instruction completes.

After an Instruction 10 enters the Instruction Queue 130 entry the debit fields in the Expanded Instruction 40 are monitored. When they are all zero, the instruction can be executed. Instructions that enter an Instruction Queue entry with any non-zero debit fields are updated by the Dependent Instruction (DI) Updater 80 when the Activity Signaling 60 signals the accesses to the appropriate resource. Those signals are the addresses of Register 210 reads (SRC A and SRC B), when that read is performed and the addresses of Register writes (DEST), when that write is performed. Thus as soon as an instruction performs the operation needed to satisfy sequential coherency, the waiting instruction decrements its debit.

When all debits in an Expanded Instruction 40 reach zero, the instruction can be executed (Issue_2 240) and that instruction is selected and is moved to the Functional Unit 220 for execution. If more than one instruction is ready to move from the Instruction Queue 130 to the Functional Unit 220, the oldest takes priority.

In FIG. 8B, instruction execution involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue_2 decisions should be provided so that parallel Issue_2 can occur. Additionally, the Dependency Resolution Logic must account for multiple activity signals that can cause deficits and debits to be decreased by more than one in a single cycle. The preferred embodiment of the present invention, and its vector extension, both presented later, include multiple functional units.

Dependency Resolution via Resource Indicators: An embodiment that enforces the rules of Sequential Coherency Instruction Scheduling with indicators instead of counts is shown in FIG. 8C. The Dependency Resolution Logic of FIG. 8C is based on the following detailed rules:

1. Deficits are the number of reads and writes that are outstanding for a given resource. Deficits are established at Issue_1 based on the original program order and are maintained as two indicator fields for each resource, Read Deficit and Write Deficit.

2. An instruction which will write a resource can be executed only when there are no logically previous outstanding writes to or reads from that resource. That is, it acquires a copy of the Read Deficit, called a Read Debit, and a copy of the Write Deficit, called a Write Debit, for that resource and then resets indicators in the debits when reads from or writes to that resource occur. When both debits have no indicators set (and rule 3, below, enables) the instruction can safely be executed.

3. An instruction which will read a resource can be executed only when there are no logically previous outstanding writes to that resource. That is, it acquires a copy of the Write Deficit, called a Write Debit, for each such resource and then resets indicators in that debit when writes to that resource occur. When the debits for all such resources have no indicators set (and rule 2, above, enables) the instruction can safely be executed.

Reference Numbers included in FIG. 8C:

| | | | |
|---|---|---|---|
| 10 | Instruction | 110 | Issue_1 |
| 20 | Dependency Resolution Logic | 120 | Outstanding Activity Memory |
| 30 | Instruction Expander | 130 | Instruction Queue |
| 40 | Expanded Instruction | 210 | Registers |
| 50 | Issue_1 (I1) Updater | 220 | Functional Unit |
| 60 | Activity Signaling | 240 | Issue_2 |

| | |
|---|---|
| 70 | Outstanding Activity (OA) Updater |
| 80 | Dependency Information (DI) Updater |

FIG. 8C is composed of the following major sections:

Instructions 10 indicating two sources, SRC A and SRC B, an Op Code, and a Destination.

Issue__1 110—supplies instructions in the sequential program order. This order is also called the dynamic instruction stream order,$^{[Uht-1]}$ as determined by the contents of the program counter in a traditional machine.

An Instruction Queue 130 with Expanded Instructions 40 including Dependency Information Issue__2 240 that schedules Instructions 10 from the Instruction Queue 130 for execution when the Dependency Information in the Expanded Instruction 40 indicates that the Instruction can safely execute Registers 210 and Functional Unit 220

Dependency Resolution Logic 20—Resolves dependencies among instructions to ensure that the results are sequentially coherent, via Resource Indexed Activity Accounting. This Dependency Resolution Logic 20 and its effect on the scheduling of instructions by Issue__2 240 are the essence of the Sequential Coherency Instruction Scheduling aspect of the present invention.

Where that Dependency Resolution Logic 20 is composed of:

A Outstanding Activity Memory 120 which has a list, indexed by Resource InterLock (resource and access type), of Deficits (Indicator Fields) of outstanding activity—one indicator (bit=1) in a field for each outstanding activity Instruction Expander 30 that adds Dependency Information from the Outstanding Activity Memory 120 to an Expanded Instruction 40

Issue__1 Updater 50 that updates Outstanding Activity Memory 120 to reflect the entry of the Expanded Instruction 40 into the Instruction Queue 130

Activity Signaling 60 that signals the occurrence of reads and writes as the Instruction executes Outstanding Activity Updater 70 that updates Outstanding Activity Memory 120 to reflect Activity Signaling 60

Dependency Information Updater 80 that updates Dependency Information in Expanded Instructions 40 in the Instruction Queue 130 based on the Activity Signaling 60

In FIG. 8C, deficits and debits occupy shift registers. Adding an indicator involves a right shift of one bit position with the shift-in bit equal one. Deleting an indicator involves a left shift of one bit position with the shift-in bit equal zero. Thus, the number of indicators in a deficit or debit field is the number of outstanding activities associated with that field.

Outstanding Activity Memory 120 locations are initialized to zero (all bits false) and a true bit is shifted in by the I1 Updater 50 when instructions using the associated resources are issued (Issue__1 110) and a true bit is shifted out (a false bit is shifted in) by the OA Updater 70 whenever an appropriate resource access is performed. All bits in the deficit being false indicates that no dependency exists for that resource.

Instructions 10 enter the Instruction Queue 130 in program order via Issue__1 110. As they enter they acquire debits (Destination Read Deficit, Destination Write Deficit, Source A Write Deficit, and Source B Write Deficit) from Outstanding Activity Memory 120 via the Instruction Expander 30 to form the Expanded Instruction 40, and they update the deficits in Outstanding Activity Memory 120 via the Issue__1 Updater 50. Instructions are placed in a free Instruction Queue entry, as determined by a free entry list. When there are no free entries, the Instruction Queue is full and instructions wait to be entered, Issue__1 110 halts.

After an Instruction 10 enters the Instruction Queue 130 entry the debit fields in the Expanded Instruction 40 are monitored. When they are all zero, the instruction can be executed. Instructions that enter an Instruction Queue entry with any non-zero debit fields are updated by the DI Updater 80 when the Activity Signaling 60 signals the accesses to the appropriate resource. Those signals are the addresses of Register 210 reads (SRC A and SRC B), when that read is performed and the addresses of Register writes (DEST), when that write is performed. Thus as soon as an instruction performs the operation needed to satisfy sequential coherency, the waiting instruction reduces its debit by a left shift.

When all debits in an Expanded Instruction 40 reach zero, the instruction can be executed (Issue__2 240) and that instruction is selected and is moved to the Functional Unit 220 for execution. If more than one instruction is ready to move from the Instruction Queue 130 to the Functional Unit 220, the oldest takes priority.

In FIG. 8C, instruction execution involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue__2 decisions should be provided so that parallel Issue__2 can occur. Additionally, the Dependency Resolution Logic must account for multiple activity signals that can cause deficits and debits to be decreased by more than one in a single cycle. The preferred embodiment of the present invention, and its vector extension, both presented later, include multiple functional units.

Dependency Resolution via Resource Linked Lists: The two previous embodiments of Resource Indexed Activity Accounting use deficits and debits that are updated in an associative manner based on broadcast activity signaling. The Outstanding Activity Updater adjusts deficits by associating broadcast signals with specific Outstanding Activity Memory locations. Each instruction has a Dependency Information Updater that adjusts debits in that instruction by associating broadcast signals with a particular debit.

There are many other ways to resolve dependencies via Resource Indexed Activity Accounting. The following embodiment replaces activity broadcasting with specific pointers that link dependent activities together. In place of each deficit of the preceding embodiments, a list of outstanding activities for each Resource Interlock is maintained with a list element for every outstanding activity, e.g. read or write. Instructions that perform activities have, for each activity, a pointer to the list element that corresponds to that activity, so that when the activity is accomplished the list element can be directly marked as completed by the instruction without a broadcast/collection mechanism.

Pointers to instructions that are dependent on outstanding activities are linked to the outstanding activities list in such a way that when all logically previous activities are completed the instruction pointed to can be directly informed, by setting a simple flag, that that dependency is resolved. Thus, the Dependency Information Updater is centralized, not distributed with each instruction, and the signaling is specific via pointers, not broadcast.

In the linked lists used in this embodiment, the control point for adding new elements to a list, for removing elements from a list, and for determining all elements in a list is called a listhead. The listhead is not an element of the list, but is simply one or more pointers, as needed to control the particular list, to elements within the list.

Figure 8D:
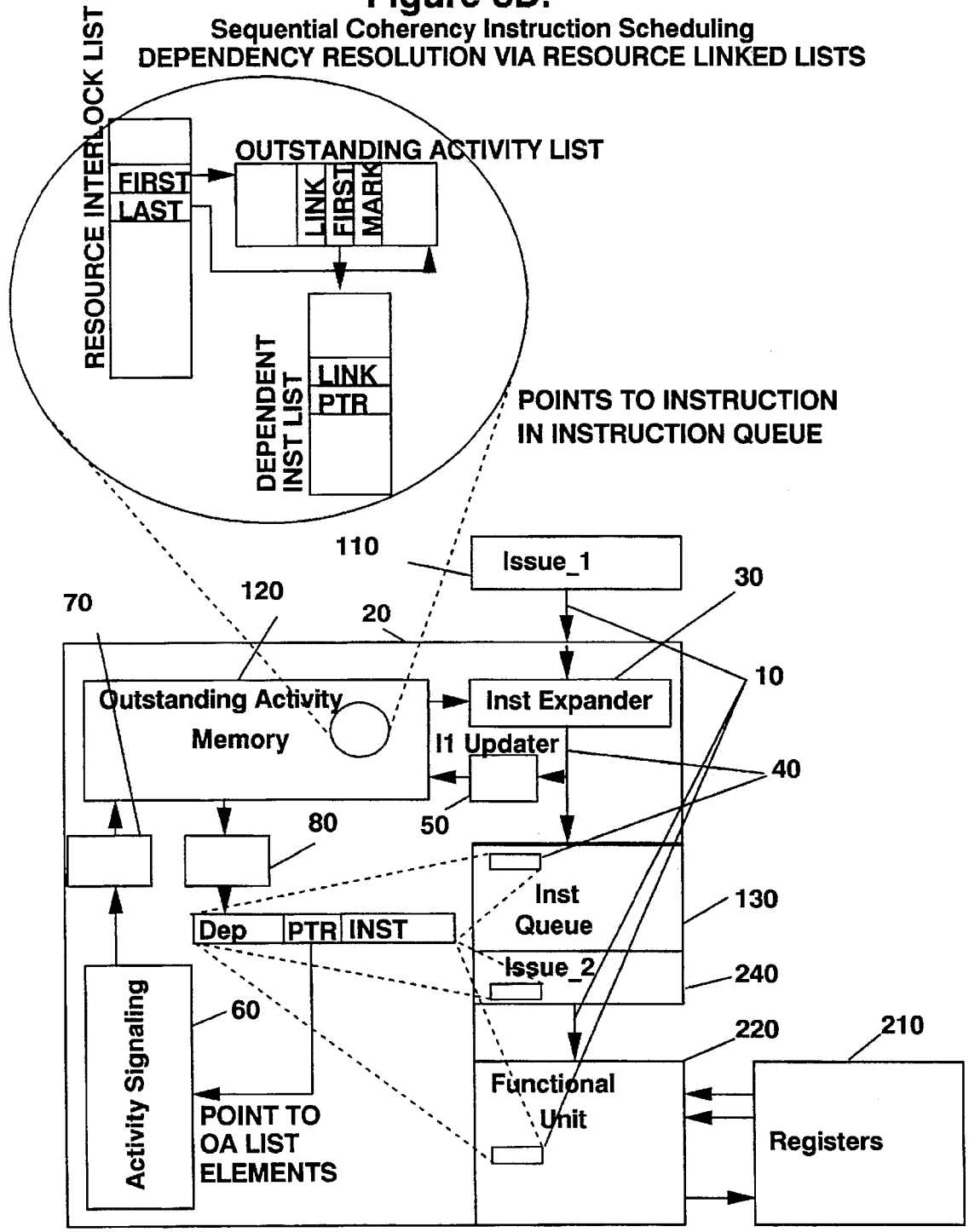

This embodiment, that uses a Linked List structure, is shown in FIG. 8D. The Dependency Resolution Logic of FIG. 8D is based on the following detailed rules:

1. Two Outstanding Activity (OA) lists are maintained for each resource, a Read List and a Write List. Each OA List element contains the Listhead for a second list type, the Dependent Instruction List. Each Dependent Instruction List is a list of pointers to instructions that are dependent on the completion of the activity (read or write) associated with the OA List element containing the Dependent Instruction Listhead. Instructions that will satisfy, by executing, an Outstanding Activity have a pointer to the OA List element for that activity. For both list types new elements are added at Top as part of Issue__1.

2. An instruction which will write a resource can be executed only when there are no logically previous outstanding writes to or reads from that resource. That is, an instruction that will write a resource is dependent on the completion of all the writes that are outstanding (elements on the OA Write List) and reads that are outstanding (elements on the OA Read List) when the instruction reaches Issue__1. Thus, a Dependent Instruction element that points to the instruction is added to the Dependent Instruction List controlled by the Dependent Instruction Listhead contained in the Top OA Write List element for that resource and a Dependent Instruction element that points to the instruction is added to the Dependent Instruction List controlled by the Dependent Instruction Listhead contained in the Top OA Read List element for that resource during phase 1 of Issue__1. When the OA List element is subsequently removed from the OA List, after the associated activity has completed, all instructions pointed to by the Dependent Instruction List for that OA List Element are marked as "dependency resolved". Instructions which will write a resource have two dependency resolved flags associated with the destination, one for reads resolved and one for writes resolved.

3. An instruction which will read a resource can be executed only when there are no logically previous outstanding writes to that resource. That is, an instruction that will read a resource is dependent on the completion of all the writes that are outstanding (elements on the OA Write List) when the instruction reaches Issue__1. Thus, a Dependent Instruction element that points to the instruction is added to the Dependent Instruction List controlled by the Dependent Instruction Listhead contained in the Top OA Write List element for that resource during phase 1 of Issue__1. When the OA List element is subsequently removed from the OA List, after the associated write has completed, all instructions pointed to by the Dependent Instruction List for that OA List Element are marked as "dependency resolved". Instructions which will read a resource have a single dependency resolved flag associated with each source.

4. During phase 2 of Issue__1, entries are added to the OA list corresponding to a particular Resource Interlock. An instruction which is to write a resource causes an entry to be added at the Top of the OA Write List for that resource and the expanded instruction acquires a pointer to that new element. An instruction which is to read a resource causes an entry to be added at the Top of the OA Read List for that resource and the instruction acquires a pointer to that new element. When the required action occurs (e.g. the write by the instruction) the element pointed to by the acquired pointer is marked for removal from the OA list. When an entry (or entries) at the bottom of the OA List are marked for removal, all such marked entries, up to one that is not so marked or until the list is empty, are removed from the bottom of the OA list. Note that part of this removal process involves "signaling" the instructions that are dependent on the activity, using the Dependent Instruction List, as described in 2 and 3, above.

Reference Numbers included in FIG. 8D:

| | | | |
|---|---|---|---|
| 10 | Instruction | 110 | Issue__1 |
| 20 | Dependency Resolution Logic | 120 | Outstanding Activity Memory |
| 30 | Instruction Expander | 130 | Instruction Queue |
| 40 | Expanded Instruction | 210 | Registers |
| 50 | Issue__1 (I1) Updater | 220 | Functional Unit |
| 60 | Activity Signaling | 240 | Issue__2 |
| 70 | Outstanding Activity (OA) Updater | | |
| 80 | Dependency Information (DI) Updater | | |

FIG. 8D is composed of the following major sections:

Instructions 10 indicating two sources, SRC A and SRC B, an Op Code, and a Destination.

Issue__1 110—supplies instructions in the sequential program order. This order is also called the dynamic instruction stream order,[$U^{ht}-1$] as determined by the contents of the program counter in a traditional machine.

An Instruction Queue 130 with Expanded Instructions 40, including Dependency Information.

Issue__2 240 that schedules Instructions 10 from the Instruction Queue 130 for execution when the Dependency Information (Resolved Flags) in the Expanded Instruction 40 indicates that the Instruction can safely execute Registers 210 and Functional Unit 220

Dependency Resolution Logic 20—Resolves dependencies among instructions to ensure that the results are sequentially coherent, via Resource Indexed Activity Accounting. This Dependency Resolution Logic 20 and its effect on the scheduling of instructions by Issue_2 240 are the essence of the Sequential Coherency Instruction Scheduling aspect of the present invention.

Where that Dependency Resolution Logic 20 is composed of:

A Outstanding Activity Memory 120 which has a linear list of Listheads, indexed by Resource InterLock (resource and access type), with each Listhead controlling a linked list of outstanding activities for that Resource Interlock.

Instruction Expander 30 that adds resolved flags and outstanding activity element pointers to an Expanded Instruction 40

Issue_1 Updater 50 that updates Outstanding Activity Memory 120 to reflect the entry of the Expanded Instruction 40 into the Instruction Queue 130

Activity Signaling 60 that signals the occurrence of reads and writes as the Instruction executes Outstanding Activity Updater 70 that updates Outstanding Activity Memory 120 to reflect Activity Signaling 60

Dependency Information Updater 80 that updates Dependency Information in Expanded Instructions 40 in the Instruction Queue 130 based on the Outstanding Activity Memory 120 contents as updated by the Outstanding Activity (OA) Updater 70

Within the Outstanding Activity Memory 120 is a central activity accounting mechanism that is list based, as shown in the exploded view. Outstanding Activity List Heads are organized in a linear Resource Interlock List indexed by the Resource (register) number and the activity type (read or write). Each Outstanding Activity Listhead has a first and last element pointer that point to the first and last elements in the Outstanding Activity List for that Outstanding Activity Listhead, i.e. there is an Outstanding Activity List for each Resource Interlock.

The Outstanding Activity List has elements that are linked in a chain from last to first, i.e. the links point backward. Each Outstanding Activity List element is composed of a Link (backward), a Mark, and Dependent Instruction Listhead that is a single pointer to the first element in the Dependent Instruction List associated with the Outstanding Activity List element. Each Dependent Instruction List is a single linked (forward) list of elements. Each Dependent Instruction List Element has a Link and a Pointer. The Pointer points to the flag within the expanded instruction in the Instruction Queue 130 that is dependent on the completion of all logically previous activities for the Resource Interlock, i.e. completion of all OA List entries from the Bottom of the OA List up to and including the OA List element containing the Dependent Instruction Listhead.

One Outstanding Activity List element is added, becoming the new First, for each source (outstanding read) and for each destination (outstanding write) by the Issue_1 Updater 50 when an Instruction 10 passes Issue_1 110. As an element is added the Dependent Instruction Listhead is set to all zeros, indicating that the Dependent Instruction List is empty and the Mark is set to zero, indicating that the Outstanding Activity has not been completed. The Instruction Expander 30 attaches to an instruction a set of Activity Update Pointers that point to each new OA List Element created by that Instruction and attaches four flags, discussed below, to form the Expanded Instruction 40.

During Issue_1, before new Outstanding Activity List elements are added, the Issue_1 Updater 50 adds, for each instruction source and destination, Dependent Instruction List Elements to the Dependent Instruction Listhead contained in the Top element of the OA List for each resource. If there is no Top element (the OA List is empty) no Dependent Instruction element is added because the instruction is dependent on no outstanding activity. The addition of a Dependent Instruction List element involves the following:

For Source A, a Dependent Instruction List Element is added to the First Outstanding Activity List Element for Writes to that register. This information is used to ensure that all logically previous writes to that register complete before the Dependent Instruction is allowed to execute.

For Source B, a Dependent Instruction List Element is added to the First Outstanding Activity List Element for Writes to that register. This information is used to ensure that all logically previous writes to that register complete before the Dependent Instruction is allowed to execute.

For Destination, a Dependent Instruction List Element is added to the First Outstanding Activity List Element for Writes to that register and a Dependent Instruction List Element is added to the First Outstanding Activity List Element for Reads of that register. This information is used to ensure that all logically previous writes to and reads from that register complete before the Dependent Instruction is allowed to execute.

The Pointer in the added Dependent Instruction List Element points to the appropriate flag in the Dependent Instruction (position in the Instruction Queue), where the Dependent Instruction is expanded to include a flag for Source A Dependencies Resolved, a flag for Source B Dependencies Resolved, and two flags for Destination Dependencies Resolved (one flag for writes and one for reads). If the Outstanding Activity List for any Resource Interlock (e.g. SRC A Read) is empty the associated flag in the Expanded Instruction 40 is set to one, indicating that all dependencies have already been resolved. Otherwise, the flag is set to zero.

After an Instruction 10 enters the Instruction Queue 130 the Dependency Resolved flags in the expanded instruction are monitored. When they have all been marked as resolved by the DI Updater 80, the instruction can be executed. To indicate that an action has occurred during execution, the instruction sets (as part of the OA Updater 70 function due to Activity Signaling 60) to non-zero, the mark in each of the OA List elements pointed to by its acquired Activity Update Pointers, for sources, when the associated read is performed and, for destinations, when the associated write is performed. Thus signaling is not broadcasts as in the previous embodiments, but is directly and specifically to the dependent instructions via the list structure.

When an element at the bottom (Last) of any Outstanding Activity List has been marked for removal, all instructions pointed to by Dependent Instruction List Elements linked to the Dependent Instruction Listhead contained in that Outstanding Activity element have the corresponding Dependency Resolved Flag set to one by the DI Updater 80, indicating that the dependency is resolved. The Dependent Instruction List Elements, and the bottom element of the Outstanding Activity List are then removed and are available for reuse.

When all Dependency Resolved Flags are set, the instruction can be executed (Issue_2) and that instruction is selected and is moved to the Functional Unit for execution. If more than one instruction is ready to move from the Instruction Queue to the Functional Unit, the oldest takes priority.

Instruction execution, in FIG. 8D, involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Registers.

Only one functional unit is shown and used in this embodiment for understandability, but multiple functional units are not precluded. When Multiple Functional Units are included, multiple Issue_2 decisions should be provided so that parallel Issue_2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Instruction and Resource Indexed Activity Accounting: An alternative method for dependency resolution is to maintain a two dimensional list or matrix, where one dimension is in terms of instructions in their logical order and the other dimension is in terms of resource interlocks.

Figure 9A:
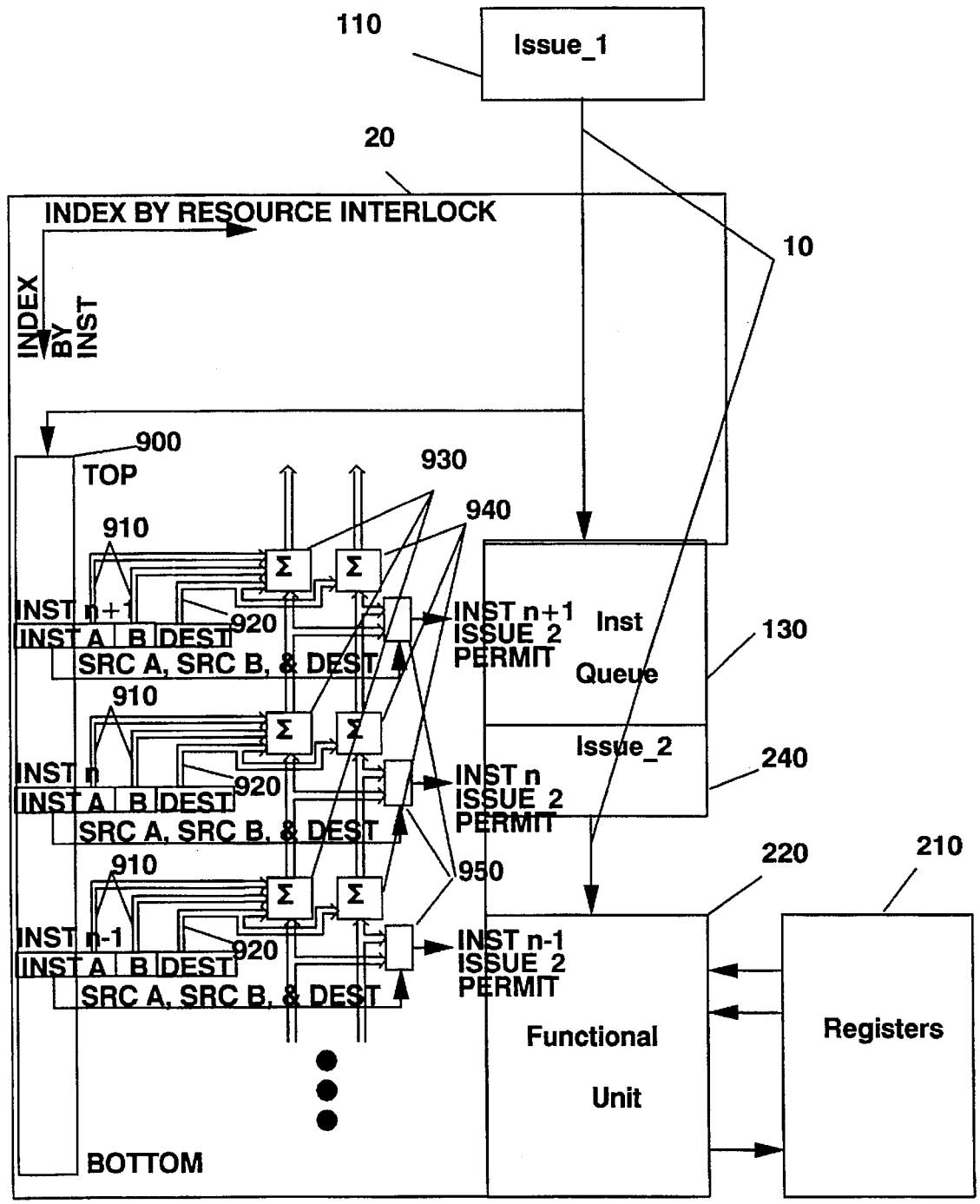
FIGS. 9A, 9B, 9C, and 9D show the Dependency Resolution Logic of FIG. 7A using Instruction and Resource Indexed Activity Accounting.

Reference Numbers included in FIG. 9A:

| | | | |
|---|---|---|---|
| 10 | Instruction | 900 | Outstanding Instruction Memory |
| 20 | Dependency Resolution Logic | 910 | Outstanding Read Decode |
| | | 920 | Outstanding Write Decode |
| 110 | Issue_1 | 930 | Write Permitting Summing OR |
| 130 | Instruction Queue | 940 | Read Permitting Summing OR |
| 210 | Registers | 950 | Issue_2 Permit Gating |
| 220 | Functional Unit | | |
| 240 | Issue_2 | | |

FIG. 9A expands the Dependency Resolution Logic of FIG. 7A and is composed of the following major elements:

Instructions 10—specify the operations to be performed and the operands to be used Issue_1 110—supplies instructions in the sequential program order. This order is also called the dynamic instruction stream order,$^{[Uhr-1]}$ as determined by the contents of the program counter in a traditional machine.

Instruction Queue 130—Holds instructions that have passed Issue_1 until they can progress past Issue_2.

Issue_2 240—Schedules instructions for execution, by the Functional Unit 220, from the Instruction Queue 130 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction and Resource Indexed Activity Accounting.

Where that Dependency Resolution Logic 20 is composed of:

Outstanding Instruction Memory 900
Outstanding Read Decode 910 for each source
Outstanding Write Decode 920 for each destination
Read Permitting Summing OR gate Network 940 to determine when the read of each source is permitted
Write Permitting Summing OR gate Network 930 to determine when the write of each destination is permitted
Issue_2 Permit Gating 950

In the operation of FIG. 9A instructions 10 that enter the Instruction Queue 130 via Issue_1 110 are also placed in the Outstanding Instruction Memory 900 in FIFO order, i.e. the Outstanding Instruction Memory 900 holds copies of the instructions in their sequential program order, oldest in Bottom and newest in Top. The Instruction Queue 130 is shown in FIG. 9A as a separate element for clarity, but those skilled in the art will recognize that the Outstanding Instruction Memory 900 and the Instruction Queue 130 can be combined. In some of the more detailed embodiments that follow, they are combined.

Each instruction in the Outstanding Instruction Memory 900 has a 1-of-n Outstanding Read Decode 910 for each source and a 1-of-n Outstanding Write Decode 920 for each destination field. These decodes have, for a field value of m, an active signal (true or logical one) for the bit m of the n possible decode bit positions.

The detailed embodiments that follow illustrate that the Decodes 910 and 920 can be produced in several ways including decoders associated with each instruction and a single set of decoders at Issue_1 110 plus decode bit storage associated with each instruction.

After an instruction performs the read of a source the instruction's outstanding activity decode for that source is disabled, i.e. the previously active decode bit is inactivated to the false or logical zero state. Similarly after an instruction performs the write of a destination the instruction's outstanding activity decode for that destination is disabled, i.e. the previously active decode bit is inactivated to the false or logical zero state.

All writes to an instruction's source are known to be completed when all instructions that are nearer the Bottom of the Outstanding Instruction Memory 900 have no outstanding write activity decodes for that register in the true or active state. Thus each instruction source selects an input to the Issue_2 Permit Gating 950 to select one Write Outstanding Indicator from the set of indicators supplied from the previous instruction's Read Permitting Summing OR gate Network 940. Each indicator in that set of indicators is the logical OR of the corresponding indicators from all logically previous instructions. That is, there is an indicator for any write outstanding for register n that, when true, indicates that one or more logically previous instructions has an outstanding write for register n. When an indicator is zero no dependencies exist.

Similarly all writes to and reads from an instruction's destination are known to be completed when all instructions nearer the Bottom of the Outstanding Instruction Memory 900 have no outstanding write activity decodes and no outstanding read activity decodes for that register in the true or active state. Thus an instruction destination selects an input to the Issue_2 Permit Gating 950 to select one Access Outstanding Indicator from the set of indicators supplied from the previous instruction's Write Permitting Summing OR—gate Network 930. Each indicator in that set of indicators is the logical OR of the corresponding indicators from all logically previous instructions. That is, there is an indicator for any read or write outstanding for register n that, when true, indicates that one or more logically previous instructions has an outstanding read or write for register n. When an indicator is zero no dependencies exist.

Completed instructions are removed from the Bottom of the Outstanding Instruction Memory 900 FIFO and, when an instruction is removed, the links into the Summing OR networks are destroyed.

In FIG. 9A and the more detailed embodiments of Instruction and Resource Indexed Activity Accounting that follow, the Read Permitting Summing OR 940 and the Write Permitting Summing OR 930 are shown as a serial chain of ORs from Bottom to Top of the Outstanding Instruction Memory 900 listing of instructions. Those skilled in the art will recognize that the serial chain can be replaced by a parallel OR'ing structure within the scope of the present invention. What is important is that the Read Permitting condition for a resource at each instruction summarize the state of completion of all logically previous writes to that resource and that the Write Permitting condition for a resource at each instruction summarize the state of completion of all logically previous reads and writes of that resource.

Three more detailed embodiments of techniques to implement Instruction and Resource Indexed Activity Accounting follow:
1. Dependency Resolution via a FIFO Instruction List and Activity Decodes
2. Dependency Resolution via a Linked Instruction List and Activity Decodes
3. Dependency Resolution via a Matrix (Instructions× Activity Indicators)

Dependency Resolution via a FIFO Instruction List and Activity Decodes: An embodiment that enforces the rules of Sequential Coherency Instruction Scheduling with instructions in a FIFO in their sequential program order with activity decodes and dependency checking based on the source and destination fields of each instruction is shown in FIG. 9B.

Figure 9B:
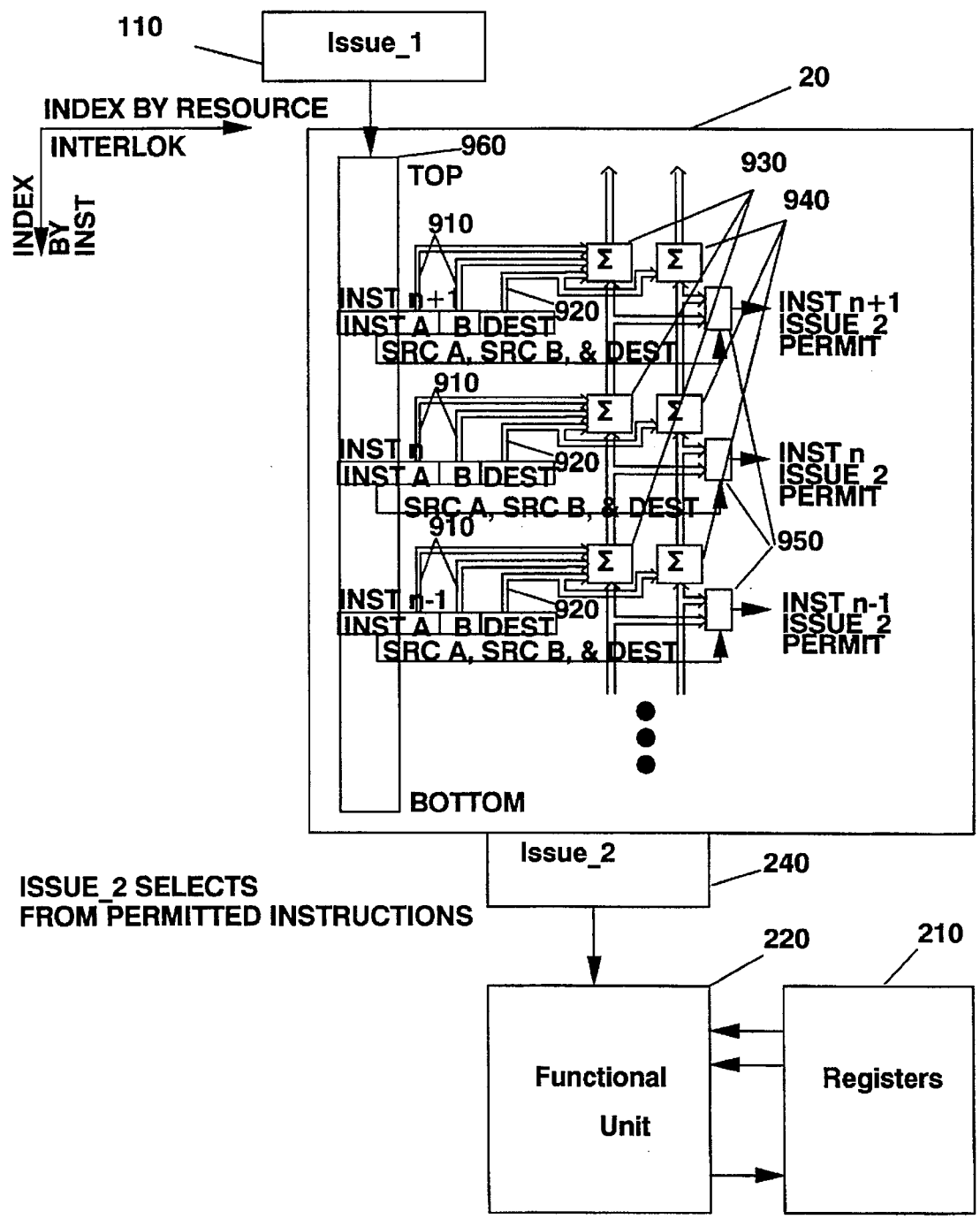

Reference Numbers included in FIG. 9B:

| 10 | Instruction | 910 | Outstanding Read Decode |
|---|---|---|---|
| 20 | Dependency Resolution Logic | 920 | Outstanding Write Decode |
| 110 | Issue__1 | 930 | Write Permitting Summing OR |
| 210 | Registers | 940 | Read Permitting Summing OR |
| 220 | Functional Unit | 950 | Issue__2 Permit Gating |
| 240 | Issue__2 | 960 | Outstanding Instruction FIFO |

FIG. 9B is composed of the following major elements:

Instructions 10—specify the operations to be performed and the operands to be used Issue__1 110—supplies instructions in the sequential program order. This order is also called the dynamic instruction stream order,$^{[U^{ht}-1]}$ as determined by the contents of the program counter in a traditional machine.

Outstanding Instruction FIFO 960—Holds instructions that have passed Issue__1, in a FIFO order. The FIFO combines the functions of the Instruction Queue 130 and the Outstanding Instruction Memory 900 of FIG. 9A.

Issue__2 240—Schedules instructions for execution, by the Functional Unit 220, from the Outstanding Instruction FIFO 960 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction and Resource Indexed Activity Accounting.

Where that Dependency Resolution Logic 20 is composed of:
Outstanding Instruction FIFO 960
Outstanding Read Decode 910 for each source
Outstanding Write Decode 920 for each destination
Read Permitting Summing OR gate Network 940 to determine when the read of each source is permitted
Write Permitting Summing OR gate Network 930 to determine when the write of each destination is permitted
Issue__2 Permit Gating 950

In FIG. 9B, instructions 10 are maintained in the Outstanding Instruction FIFO 960. They are placed onto the FIFO at Top when they pass Issue__1 110 and are removed from the Bottom of the FIFO when the entry at Bottom has completed execution.

Each instruction 10 in the Outstanding Instruction FIFO 960 has a 1-of-n Outstanding Read Decode 910 for each source and a 1-of-n Outstanding Write Decode 920 for each destination field. These decodes have, for a field value of m, an active signal (true or logical one) for the bit-m of the n possible decode bit positions.

After an instruction performs the read of a source the instruction's outstanding activity decode for that source is disabled, i.e. the previously active decode bit is inactivated to the false or logical zero state. Similarly after an instruction performs the write of a destination the instruction's outstanding activity decode for that destination is disabled, i.e. the previously active decode bit is inactivated to the false or logical zero state.

An instruction which will read a resource can be executed only when there are no logically previous outstanding writes to that resource. That is, all writes to an instruction's source are known to be completed when all instructions that are nearer the Bottom of the Outstanding Instruction FIFO 960 have no outstanding write activity decodes for that register in the true or active state. Thus each instruction source selects an input to the Issue__2 Permit Gating 950 to select one Write Outstanding Indicator from the set of indicators supplied from the previous instructions' Read Permitting Summing OR gate Network 940. Each indicator in that set of indicators is the logical OR of the corresponding indicators from all logically previous instructions. That is, there is an indicator for any write outstanding for register n that, when true, indicates that one or more logically previous instructions has an outstanding write for register n. When an indicator is zero no dependencies exist.

An instruction which will write a resource can be executed only when there are no logically previous outstanding writes to or reads from that resource. That is, all writes to and reads from an instruction's destination are known to be completed when all instructions nearer the Bottom of the Outstanding Instruction FIFO 960 have no outstanding write activity decodes and no outstanding read activity decodes for that register in the true or active state. Thus an instruction destination selects an input to the Issue__2 Permit Gating 950 to select one Access Outstanding Indicator from the set of indicators supplied from the previous instruction's Write Permitting Summing OR gate Network 930. Each indicator in that set of indicators is the logical OR of the corresponding indicators from all logically previous instructions. That is, there is an indicator for any read or write outstanding for register n that, when true, indicates that one or more logically previous instructions has an outstanding read or write for register n. When an indicator is zero no dependencies exist.

When all selected indicator inputs to the Issue__2 Permit Gating 950 are zero (false state), the instruction can be executed (Issue__2) and that instruction is selected and is moved to the Functional Unit for execution. If more than one instruction is ready to move from the Outstanding Instruction FIFO 960 to the Functional Unit 220, the oldest takes priority.

In FIG. 9B, instruction execution involves a simple pipeline with instructions executed in the order they were scheduled to the Functional Unit. No blockage can occur because the conditions that can delay execution have already been resolved (in the Outstanding Instruction FIFO). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue_2 decisions should be provided so that parallel Issue_2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Dependency Resolution via a Linked Instruction List and Activity Decodes: An embodiment that enforces the rules of Sequential Coherency Instruction Scheduling with instructions in a Linked List of instructions in their sequential program order with activity decodes and dependency checking based on the source and destination fields of each instruction is shown in FIG. 9C.

Figure 9C:
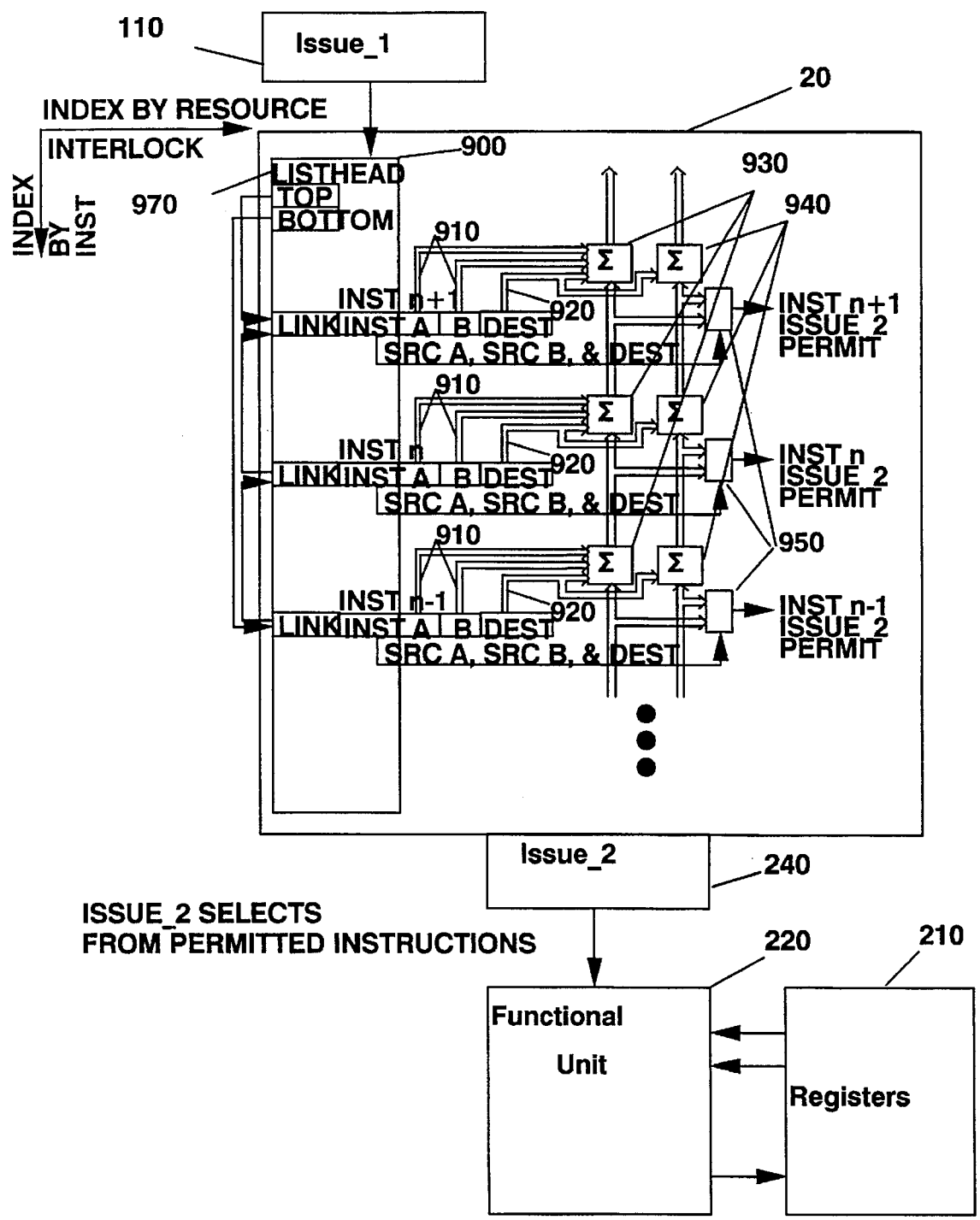

Reference Numbers included in FIG. 9C:

| | | | |
|---|---|---|---|
| 10 | Instruction | 900 | Outstanding Instruction Memory |
| 20 | Dependency Resolution Logic | 910 | Outstanding Read Decode |
| | | 920 | Outstanding Write Decode |
| 110 | Issue_1 | 930 | Write Permitting Summing OR |
| 210 | Registers | 940 | Read Permitting Summing OR |
| 220 | Functional Unit | 950 | Issue_2 Permit Gating |
| 240 | Issue_2 | 970 | Outstanding Instruction List |

FIG. 9C is composed of the following major elements:

Instructions 10—specify the operations to be performed and the operands to be used Issue_1 110—supplies instructions in the sequential program order. This order is also called the dynamic instruction stream order,$^{[U^{hx}-1]}$ as determined by the contents of the program counter in a traditional machine.

Outstanding Instruction Memory 900—Holds instructions that have passed Issue_1, in a Outstanding Instruction List 970 controlled via the Listhead. The Instruction Queue 130 and the Outstanding Instruction Memory 900 of FIG. 9A are combined in the Outstanding Instruction Memory 900 of FIG. 9C.

Issue_2 240—Schedules instructions for execution, by the Functional Unit 220, from the Outstanding Instruction List 970 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction and Resource Indexed Activity Accounting.

Where that Dependency Resolution Logic 20 is composed of:

Outstanding Instruction List 970
Outstanding Read Decode 910 for each source
Outstanding Write Decode 920 for each destination
Read Permitting Summing OR gate Network 940 to determine when the read of each source is permitted
Write Permitting Summing OR gate Network 930 to determine when the write of each destination is permitted
Issue_2 Permit Gating 950

In FIG. 9C, instructions 10 are maintained in the Outstanding Instruction List 970. They are placed onto the List at Top when they pass Issue_1 110 and are removed from the Bottom of the List when the entry at Bottom has completed execution. The Listhead has pointers to Top and Bottom and the elements (instructions) in the List have pointers that link the elements together in a chain from Bottom to Top.

Each instruction 10 in the Outstanding Instruction List 970 has a 1-of-n Outstanding Read Decode 910 for each source field and a 1-of-n Outstanding Write Decode 920 for each destination field. These decodes have, for a field value of m, an active signal (true or logical one) for the bit m of the n possible decode bit positions.

After an instruction performs the read of a source the instruction's outstanding activity decode for that source is disabled, i.e. the previously active decode bit is inactivated to the false or logical zero state. Similarly after an instruction performs the write of a destination the instruction's outstanding activity decode for that destination is disabled, i.e. the previously active decode bit is inactivated to the false or logical zero state.

The List links identify
1. a holder for an instruction with decodes,
2. a Read Permitting Summing OR 940, and
3. a Write Permitting Summing OR 930.

The output of the Read Permitting Summing OR 940 and the Write Permitting Summing OR 930 assigned to an instruction are propagated to the subsequent list elements via the links. Thus each set of summing ORs needs a selector at its input to be able to accept one set of inputs from the entire set of summing ORs outputs. Those skilled in the art will recognize that other organizations that accomplish the same algorithm can replace this mechanism, e.g. assigning summing ORs in a FIFO manner.

An instruction which will read a resource can be executed only when there are no logically previous outstanding writes to that resource. That is, all writes to an instruction's source are known to be completed when all instructions that are nearer the Bottom of the Outstanding Instruction List 970 have no outstanding write activity decodes for that register in the true or active state. Thus each instruction source selects an input to the Issue_2 Permit Gating 950 to select one Write Outstanding Indicator from the set of indicators supplied from the previous instructions' Read Permitting Summing OR gate Network 940. Each indicator in that set of indicators is the logical OR of the corresponding indicators from all logically previous instructions. That is, there is an indicator for any write outstanding for register n that, when true, indicates that one or more logically previous instructions has an outstanding write for register n. When an indicator is zero no dependencies exist.

An instruction which will write a resource can be executed only when there are no logically previous outstanding writes to or reads from that resource. That is, all writes to and reads from an instruction's destination are known to be completed when all instructions nearer the Bottom of the Outstanding Instruction List 970 have no outstanding write activity decodes and no outstanding read activity decodes for that register in the true or active state. Thus an instruction destination selects an input to the Issue__2 Permit Gating 950 to select one Access Outstanding Indicator from the set of indicators supplied from the previous instruction's Write Permitting Summing OR gate Network 930. Each indicator in that set of indicators is the logical OR of the corresponding indicators from all logically previous instructions. That is, there is an indicator for any read or write outstanding for register n that, when true, indicates that one or more logically previous instructions has an outstanding read or write for register n. When an indicator is zero no dependencies exist.

When all selected indicator inputs to the Issue__2 Permit Gating 950 are zero (false state), the instruction can be executed (Issue__2) and that instruction is selected and is moved to the Functional Unit for execution. If more than one instruction is ready to move from the Outstanding Instruction List 970 to the Functional Unit 220, the oldest takes priority.

In FIG. 9C, the Read Permitting Summing OR 940 and the Write Permitting Summing OR 930 are shown as a chain of OR gates from Bottom to Top of the Outstanding Instruction List 970. Those skilled in the art will recognize that the chain of gates can, within the scope of the present invention, be replaced by a software or hardware algorithm that performs the same function. That algorithm would, as a repetitive Dependency Resolution process, perform the summing OR functions starting at the Bottom of the Outstanding Instruction List and moving through the list toward Top, until an Issue__2 Permit Gating 950 condition is found. That instruction is the next instruction to be scheduled via Issue__2. What is important is that the Read Permitting condition for a resource at each instruction summarize the state of completion of all logically previous writes to that resource and that the Write Permitting condition for a resource at each instruction summarize the state of completion of all logically previous reads and writes of that resource.

In FIG. 9C, instruction execution involves a simple pipeline with instructions executed in the order they were scheduled to the Functional Unit. No blockage can occur because the conditions that can delay execution have already been resolved (in the Outstanding Instruction List 970). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue__2 decisions should be provided so that parallel Issue__2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Dependency Resolution via a Matrix (Instructions× Activity Indicators): The previous two embodiments of Instruction and Resource Indexed Activity Accounting maintain complete instructions in the Outstanding Instruction Memory (or its equivalent). An alternative for dependency resolution is to only store the decodes of the SRC A, SRC B, and DEST fields of the instruction in the Outstanding Instruction Memory, while the complete instruction is only held in the Instruction Queue, as shown in FIG. 9D.

Figure 9D:
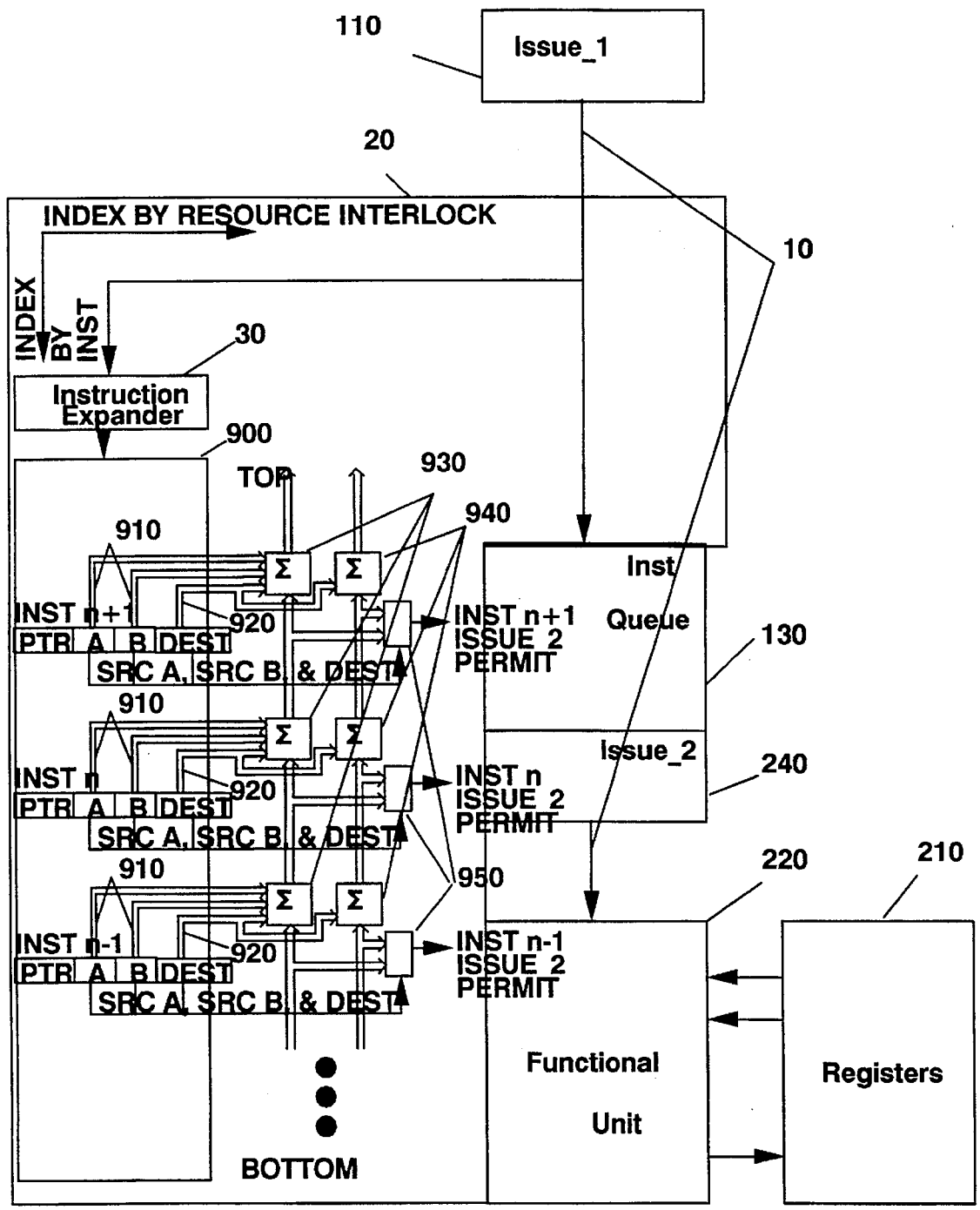

Reference Numbers included in FIG. 9D:

| | |
|---|---|
| 10 Instruction | 900 Outstanding Instruction Memory |
| 20 Dependency Resolution Logic | 910 Outstanding Read Decode |
| 30 Instruction Expander | 920 Outstanding Write Decode |
| 110 Issue__1 | 930 Write Permitting Summing OR |
| 130 Instruction Queue | 940 Read Permitting Summing Or |
| 210 Registers | 950 Issue-2 Permit Gating |
| 220 Functional Unit | |
| 240 Issue__2 | |

FIG. 9D is composed of the following major elements:

Instructions 10—specify the operations to be performed and the operands to be used Issue__1 110—supplies instructions in the sequential program order. This order is also called the dynamic instruction stream order,$[U^{ht}-1]$ as determined by the contents of the program counter in a traditional machine.

Instruction Queue 130—Holds instructions that have passed Issue__1 until they can progress past Issue__2.

Instruction Expander 30—decodes the SRC A, SRC B, and DEST fields of the instruction and supplies the decoded form of these fields, Outstanding Read Decode 910 and Outstanding Write Decode 920, plus a pointer to the instruction 10 in the Instruction Queue 130 to the Outstanding Instruction Memory 900.

Outstanding Instruction Memory 900—Holds the Outstanding Read Decode 910 and Outstanding Write Decode 920 for Instructions 10 that have passed Issue__1. The decodes are inputs to the Read Permitting Summing OR 940 and the Write Permitting Summing OR 930 networks that form a Matrix of indicators with rows corresponding to instructions in their sequential program order and columns corresponding to resource interlocks.

Issue__2 240—Schedules instructions for execution, by the Functional Unit 220, from the Instruction Queue 130 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction and Resource Indexed Activity Accounting.

Where that Dependency Resolution Logic 20 is composed of:

Outstanding Instruction Memory 900 with its matrix composed of indicators with rows corresponding to instructions in their sequential program order and columns corresponding to resource interlocks. Those indicators for each instruction row consist of an Outstanding Read Decode 910 for each source and an Outstanding Write Decode 920 for each destination.

Read Permitting Summing OR gate Network 940 to determine when the read of each source is permitted Write Permitting Summing OR gate Network 930 to determine when the write of each destination is permitted Issue__2 Permit Gating 950

In FIG. 9D, each instruction 10 is expanded by the Instruction Expander 30 via a 1-of-n Outstanding Read Decode 910 for each source and a 1-of-n Outstanding Write Decode 920 for each destination field. These decodes have, for a field value of m, an active signal (true or logical one) for the bit m of the n possible decode bit positions.

The decodes 910 and 920 are maintained in the Outstanding Instruction Memory 900 as a matrix of indicators, with rows corresponding to instructions and the columns corresponding to Reads and Writes Outstanding, for each resource. They are placed onto the Top of the Matrix when they pass Issue__1 110 and are removed from the Bottom of the Matrix when the entry at Bottom has completed execution. When decodes 910 and 920 are added to the Outstanding Instruction Memory 900, that entry includes a pointer to the Instruction Queue 130 position where the Instruction 10 is placed.

After an instruction performs the read of a source the instruction's outstanding activity decode for that source is disabled, i.e. the previously active decode bit is inactivated to the false or logical zero state. Similarly after an instruction performs the write of a destination the instruction's outstanding activity decode for that destination is disabled, i.e. the previously active decode bit is inactivated to the false or logical zero state.

An instruction which will write a resource can be executed only when there are no logically previous outstanding writes to or reads from that resource. That is, when the logical OR of the Read Outstanding bit position for that resource in each row, in the Outstanding Instruction Memory 900, below the instruction's row is zero and the logical OR of the Write Outstanding bit position for that resource in each row below the instruction's row is zero, the dependencies associated with the write have been resolved.

An instruction which will read a resource can be executed only when there are no logically previous outstanding writes to that resource. That is, when the logical OR of the Write Outstanding bit position for that resource in each row below the instruction's row is zero, the dependencies associated with the read have been resolved.

The decoded source and destination fields 910 and 920 held in the matrix directly enable the correct selector in the Issue__2 Permit Gating 950. When all selected indicator inputs to the Issue__2 Permit Gating 950 are zero (false state), the instruction can be executed (Issue__2) and that instruction is selected and is moved from the Instruction Queue 130 to the Functional Unit 220 for execution, using the instruction pointer in the Outstanding Instruction Memory entry. If more than one instruction is ready to move from the Instruction Queue 130 to the Functional Unit 220, the oldest takes priority.

In FIG. 9D, instruction execution involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue__2 decisions should be provided so that parallel Issue__2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Instruction Indexed Activity Accounting: Another alternative method for dependency resolution is to maintain a two dimensional matrix, where both dimensions are in terms of instructions in their logical order. By indexing to a row of the matrix and looking across that row, the activities that must complete before the instruction$_{row}$ can execute is known.

Two variations of this technique are discussed here—the first allocates a single row and a single column for each instruction while the second allocates a single row and three columns for each instruction. In each case, the indices into the matrix originate at the lower right, instruction information is removed from the matrix by removing the bottom row and right column(s), instruction information is added to the matrix as the top row and left column(s). The maximum matrix size is defined by the maximum number of rows. When a new row to be added will exceed that maximum, the matrix is full and instruction entry must pause until space becomes available.

Instruction Indexed Activity Accounting with One Column Per Instruction: The simplest form of Instruction Indexed Activity Accounting involves a dependency matrix with one row and one column per instruction. A flag in the cell at the intersection of row$_y$ and column$_x$ indicates that instruction-y is dependent on the completion of instruction-x. That dependency is due to the logical OR of four conditions:

1. Instruction-y SRC A read must wait for the Destination of Instruction-x to be written.
2. Instruction-y SRC B read must wait for the Destination of Instruction-x to be written.
3. Instruction-y DEST write must wait for the Destination of Instruction-x to be written.
4. Instruction-y DEST write must wait for the read of an Instruction-x source to be completed.

All of these dependencies are satisfied when instruction-x is completed. Thus the technique described here sets flags in the dependency matrix when an instruction passes Issue__1 and clears flags when an instruction completes. To aid in understanding, assume a sequence of instructions 1, 2, 3, and 4 where instructions 2 and 3 are dependent on instruction 1 and instruction 4 is dependent on instructions 2 and 3. Furthermore, assume that all instructions pass Issue__1 before any complete and that no removal of matrix rows and columns takes place.

|   | Matrix after Inst 1 is added | Matrix after Inst 2 is added | Matrix after Inst 3 is added | Matrix after Inst 4 is added |
|---|---|---|---|---|
|   | 4 3 2 1 | 4 3 2 1 | 4 3 2 1 | 4 3 2 1 |
| 4 | 0 0 0 0 | 0 0 0 0 | 0 0 0 0 | 0 1 1 0 |
| 3 | 0 0 0 0 | 0 0 0 0 | 0 0 0 1 | 0 0 0 1 |
| 2 | 0 0 0 0 | 0 0 0 1 | 0 0 0 1 | 0 0 0 1 |
| 1 | 0 0 0 0 | 0 0 0 0 | 0 0 0 0 | 0 0 0 0 |

|   | Matrix after Inst 1 is completed | Matrix after Inst 2 is completed | Matrix after Inst 3 is completed | Matrix after Inst 4 is completed |
|---|---|---|---|---|
|   | 4 3 2 1 | 4 3 2 1 | 4 3 2 1 | 4 3 2 1 |
| 4 | 0 1 1 0 | 0 1 0 0 | 0 0 0 0 | 0 0 0 0 |
| 3 | 0 0 0 0 | 0 0 0 0 | 0 0 0 0 | 0 0 0 0 |
| 2 | 0 0 0 0 | 0 0 0 0 | 0 0 0 0 | 0 0 0 0 |
| 1 | 0 0 0 0 | 0 0 0 0 | 0 0 0 0 | 0 0 0 0 |

Thus, instruction 1 can be immediately scheduled for execution because its row is all zeros, but instructions 2 and 3 must wait until instruction 1 completes, clearing the flags in the column allocated for instruction 1. Instruction 4 must wait until both instructions 2 and 3 complete clearing the flags in the columns allocated to instructions 2 and 3, respectively.

Figure 10:
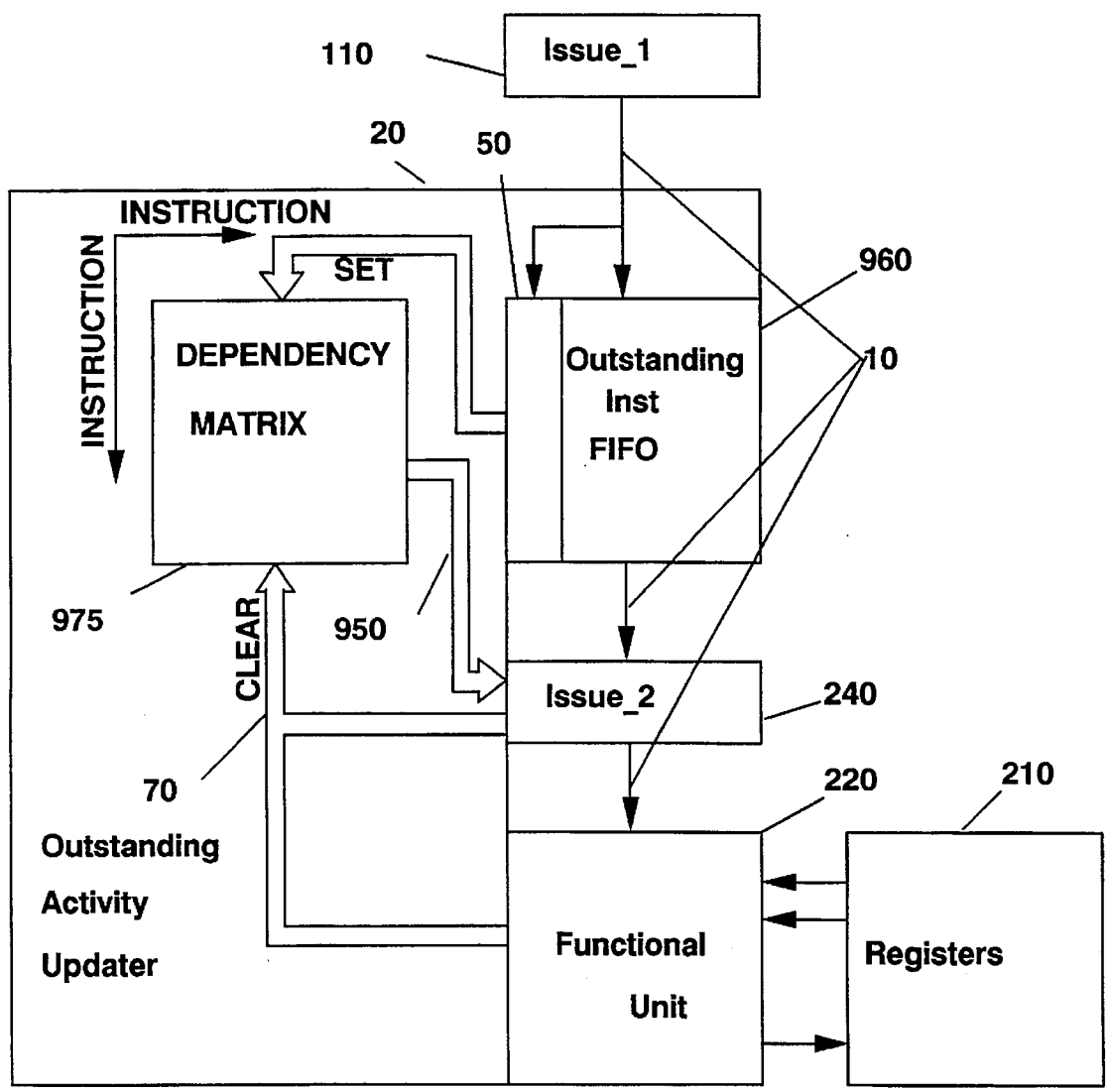
FIG. 10 shows the Dependency Resolution Logic of FIG. 7A using Instruction Indexed Activity Accounting.

Reference Numbers included in FIG. 10:

| | |
|---|---|
| 10 Instruction | 950 Issue_2 Permit Gating |
| 20 Dependency Resolution Logic | 960 Outstanding Instruction FIFO |
| 50 Issue_1 Updater | 975 Dependency Matrix |
| 70 Outstanding Activity (OA) Updater | |
| 110 Issue_1 | |
| 210 Registers | |
| 220 Functional Unit | |
| 240 Issue_2 | |

FIG. 10 expands the Dependency Resolution Logic of FIG. 7A and is composed of the following major elements:

Instructions 10—specify the operations to be performed and the operands to be used Issue_1 110—supplies instructions in the sequential program order. This order is also called the dynamic instruction stream order,$^{[U/t-1]}$ as determined by the contents of the program counter in a traditional machine.

Outstanding Instruction FIFO 960—Holds instructions that have passed Issue_1 in their sequential program order.

Issue_2 240—Schedules instructions for execution, by the Functional Unit 220, from the Outstanding Instruction FIFO 960 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction Indexed Activity Accounting.

Where that Dependency Resolution Logic 20 is composed of:

Dependency Matrix 975—a matrix of flags or indicators with one row and one column for each instruction 10 in the Outstanding Instruction FIFO 960.

Issue_1 Updater 50 that, as part of Issue_1, adds a row to the top of and a column to the left-side of the Dependency Matrix 975 and determines the flags to be set in that row from the contents of the Outstanding Instruction FIFO 960 and the instruction 10 being processed by Issue_1 110.

Outstanding Activity (OA) Updater 70 that clears all flags in the Dependency Matrix column assigned to an instruction when that instruction completes Issue_2 Permit Gating 950 that determines when an instruction can safely execute by detecting all zero flags in the Dependency Matrix row corresponding to an instruction.

During Issue_1 110, each instruction 10 is assigned a row at the Top edge of the Dependency Matrix 975 and a column at the left edge of the Dependency Matrix 975 by the Issue_1 Updater 50 which then determines, by searching the Outstanding Instruction FIFO 960, the outstanding activities of logically previous instructions on which the new instruction is dependent:

An instruction which will write a resource can be executed only when there are no logically previous outstanding writes to or reads from that resource. That is, any instruction in the Outstanding Instruction FIFO 960 that has yet to read its SRC A and that SRC A is the same resource as the Destination of the instruction in the Issue_1 process causes a flag to be set in the new row being added to the Dependency Matrix 975 at the column position corresponding to the dependency causing instruction; any instruction in the Outstanding Instruction FIFO 960 that has yet to read its SRC B and that SRC B is the same resource as the Destination of the instruction in the Issue_1 process causes a flag to be set in the new row being added to the Dependency Matrix 975 at the column position corresponding to the dependency causing instruction; and any instruction in the Outstanding Instruction FIFO 960 that has yet to write its DEST and that DEST is the same resource as the Destination of the instruction in the Issue_1 process causes a flag to be set in the new row being added to the Dependency Matrix 975 at the column position corresponding to the dependency causing instruction.

An instruction which will read a resource can be executed only when there are no logically previous outstanding writes to that resource. That is, any instruction in the Outstanding Instruction FIFO 960 that has yet to write its DEST and that DEST is the same resource as either Source of the instruction in the Issue_1 process causes a flag to be set in the new row being added to the Dependency Matrix 975 at the column position corresponding to the dependency causing instruction.

All flags in the added row that are not set by the Issue_1 Updater 50 are zeroed. This includes the flag at the intersection of the new row and column, which is always zero, because an instruction can never be dependent on itself.

Following the Dependency Matrix update Issue_1 places the new instruction 10 on Top of the Outstanding Instruction FIFO 960.

As an instruction completes execution the Outstanding Activity Updater 70 clears all flags in the Dependency Matrix column assigned to that instruction. When all the flags in a Dependency matrix row are zero, as determined by the Issue_2 Permit Gating 950, the instruction$_{row}$ can safely execute. When more than one instruction is ready for execution the oldest should take priority.

When the instruction 10 at the Bottom of the Outstanding Instruction FIFO 960 has completed, that instruction is removed from the Outstanding Instruction FIFO 960. As part of that removal process, the Dependency Matrix contents are shifted down one row and right one column. Thus the row and columns originally assigned to that instruction as part of Issue_1 are removed from the Dependency Matrix 975 when the instruction is removed from the Outstanding Instruction FIFO 960. Additionally, throughout the instruction's life in the Outstanding Instruction FIFO 960, the index into the Outstanding Instruction FIFO 960, relative to Bottom, and the index into the Dependency Matrix 975 are always the same, albeit changing, index. Within the Dependency Matrix that index is always relative to the Bottom for row and relative to the right-edge for column.

In FIG. 10, instruction execution involves a simple pipeline with instructions executed in the order they were scheduled to the Functional Unit. No blockage can occur because the conditions that can delay execution have already been resolved (in the Outstanding Instruction FIFO). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue_2 decisions should be provided so that parallel Issue_2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Instruction Indexed Activity Accounting with Three Columns Per Instruction: Each instruction is assigned one row and three columns: one for its SRC A Read, one for its SRC B Read, and one for its DEST Write. Issue_1 Updater 50 determines the outstanding activities of logically previous instructions on which the new instruction is dependent and adds flags for those outstanding activities to the row assigned the new instruction. As an instruction executes it clears all flags in the columns assigned to that instruction, i.e. as the SRC A Read is completed that column is cleared, etc. When all the flags in a row are zero, the instruction$_{row}$ can safely execute.

FIG. 10 is used again to explain this extension and is composed of the same major elements, modified as described below:

Instructions 10—specify the operations to be performed and the operands to be used Issue_1 110—supplies instructions in the sequential program order. This order is also called the dynamic instruction stream order,$^{[U^{h+1}]}$ as determined by the contents of the program counter in a traditional machine.

Outstanding Instruction FIFO 960—Holds instructions that have passed Issue_1 in their sequential program order.

Issue_2 240—Schedules instructions for execution, by the Functional Unit 220, from the Outstanding Instruction FIFO 960 when the Dependency Resolution Logic 20 indicates that all of the instruction's dependencies on other instructions have been resolved.

Registers 210—Provides storage for instruction operands.

Functional Unit 220—Contains the operational logic to carry out the operation specified by the instruction 10 on source operands obtained from the registers 210 and produce a result that is written to the instruction's destination register 210.

Dependency Resolution Logic 20—Resolves dependencies among instructions to ensure that the results are sequentially coherent via Instruction Indexed Activity Accounting.

Where that Dependency Resolution Logic 20 is composed of:

Dependency Matrix 975—a matrix of flags with one row for each instruction 10 in the Outstanding Instruction FIFO 960 and three columns for each instruction in the Outstanding Instruction FIFO 960: one for its SRC A read completed, one for SRC B read completed, and one for DEST write completed. That is, the matrix has n rows and 3n columns, where n is the number of active instructions. Those skilled in the art will appreciate that a 3-dimensional matrix, n×n×3, would be a suitable alternate construction.

Issue_1 Updater 50 that, as part of Issue_1, adds a row to the top of and 3 columns to the left side of the Dependency Matrix 975 and determines the flags to be set in that row from the contents of the Outstanding Instruction FIFO 960 and the instruction 10 being processed by Issue_1 110.

Outstanding Activity Updater 70 that clears all flags in the Dependency Matrix column assigned to an instruction's SRC A read when that read is accomplished; that clears all flags in the Dependency Matrix column assigned to an instruction's SRC B read when that read is accomplished; and that clears all flags in the Dependency Matrix column assigned to an instruction's DEST write when that write is accomplished.

Issue_2 Permit Gating 950 that determines when an instruction can safely execute by detecting all zero flags in the Dependency Matrix row corresponding to an instruction.

During Issue_1 110, each instruction 10 is assigned a row, RowNewInst, at the Top edge of the Dependency Matrix 975 and three columns at the left edge of the Dependency Matrix 975: one, ColNewInst,1, for its SRC A Read; one, ColNewInst,2, for its SRC B Read; and one, ColNewInst,3 for its DEST Write by the Issue_1 Updater 50 which then determines, by searching the Outstanding Instruction FIFO 960, the outstanding activities of logically previous instructions on which the new instruction is dependent:

An instruction which will write a resource (its DEST) can be executed only when there are no logically previous outstanding writes to or reads from that resource. That is, any instruction (InstX1) in the Outstanding Instruction FIFO 960 that has yet to read its SRC A and that SRC A is the same resource as the Destination of the instruction in the Issue_1 process causes a flag to be set in RowNewInst and ColX1,1 (i.e. the column previously allocated for Instruction X1's SRC A Read; any instruction (X2) in the Outstanding Instruction FIFO 960 that has yet to read its SRC B and that SRC B is the same resource as the Destination of the instruction in the Issue_1 process causes a flag to be set in RowNewInst and ColX2,2; and any instruction (X3) in the Outstanding Instruction FIFO 960 that has yet to write its DEST and that DEST is the same resource as the Destination of the instruction in the Issue_1 process causes a flag to be set in RowNewInst and ColX3,3.

An instruction which will read a SRC A can be executed only when there are no logically previous outstanding writes to that resource. That is, any instruction (X4) in the Outstanding Instruction FIFO 960 that has yet to write its DEST and that DEST is the same resource as SRC A of the instruction in the Issue_1 process causes a flag to be set in RowNewInst and ColX4,3.

An instruction which will read a SRC B can be executed only when there are no logically previous outstanding writes to that resource. That is, any instruction (X5) in the Outstanding Instruction FIFO 960 that has yet to write its DEST and that DEST is the same resource as SRC B of the instruction in the Issue_1 process causes a flag to be set in RowNewInst and ColX5,3.

Following the Dependency Matrix update Issue_1 places the new instruction 10 on Top of the Outstanding Instruction FIFO 960.

As an instruction reads SRC A the Outstanding Activity Updater 70 clears all flags in the Dependency Matrix column assigned to that Instruction's SRC A Read. As an instruction reads SRC B the Outstanding Activity Updater 70 clears all flags in the Dependency Matrix column assigned to that Instruction's SRC B Read. And as an instruction writes its DEST the Outstanding Activity Updater 70 clears all flags in the Dependency Matrix column assigned to that Instruction's DEST Write. When all the flags in a row are zero, as determined by the Issue_2 Permit Gating 950, the instruction$_{row}$ can safely execute. When more than one instruction is ready to execute, the oldest should take priority.

When the instruction 10 at the Bottom of the Outstanding Instruction FIFO 960 has completed, that instruction is removed from the Outstanding Instruction FIFO 960. As part of that removal process, the Dependency Matrix contents are shifted down one row and fight three columns. Thus the row and columns originally assigned to that instruction as part of Issue_1 are removed from the Dependency Matrix 975 when the instruction is removed from the Outstanding Instruction FIFO 960. Additionally, throughout the instruction's life in the Outstanding Instruction FIFO 960, the index into the Outstanding Instruction FIFO 960, relative to Bottom, and the index into the Dependency Matrix 975 are always the same, albeit changing, index. Within the Dependency Matrix that index is relative to the Bottom for Instruction rows and relative to the right side for Instruction column groups (3 columns per instruction).

In FIG. 10, instruction execution involves a simple pipeline with instructions executed in the order they were scheduled to the Functional Unit. No blockage can occur because the conditions that can delay execution have already been resolved (in the Outstanding Instruction FIFO). Instructions read the needed operands from the Registers, perform the operation specified by the Op Code, and Write the result to the Register.

Only one functional unit is shown and used in this embodiment for understandability, but multiple functional units are not precluded. When Multiple Functional Units are included, multiple Issue_2 decisions should be provided so that parallel Issue_2 can occur. When more than one instruction is ready to move to a single Functional Unit's Instruction Execution Pipeline, the oldest should take priority. The structure of the Dependency Resolution Logic easily accounts for multiple activities that can cause multiple completions in a single cycle. The preferred embodiment of the present invention, and its vector extension, both presented later, include multiple functional units.

Those skilled in the art will understand that many modifications and variations can be made to the above described Instruction Indexed Activity Accounting within the scope of the present invention. For example, rather than a hardware matrix of logic gates and memory devices a program sequence of control information can be used. Additionally, the matrix function can be constructed with linked lists with each linked list element representing a matrix row and column intersection and with each element having two links, one to link elements into a row and a second to link elements into a column.

OTHER EMBODIMENTS OF SEQUENTIAL COHERENCY INSTRUCTION SCHEDULING

The embodiments discussed to this point show multiple methods of providing Sequential Coherency Instruction Scheduling, including:

Resource Indexed Activity Accounting—Outstanding activities (e.g. reads and writes), dependency information, and activity signaling are maintained in terms of resource interlocks, where resource interlocks are defined as the combination of resource number and interlock type (read, write), so that a Register 2 read has a different index than a Register 2 write.

Instruction and Resource Indexed Activity. Accounting—Outstanding activities, dependency information, and activity signaling are maintained as a two dimensional list or matrix, where one dimension is in terms of instructions in their logical order and the other dimension is in terms of resource interlocks.

Instruction Indexed Activity Accounting—Outstanding activities, dependency information, and activity signaling are maintained in terms of instructions in their logical order.

But those skilled in the art will recognize that many other variations are possible within the scope of the present invention. Those variations include more restrictive and more aggressive scheduling algorithms. An example of a more restrictive scheduling algorithm, "Dependency Resolution via Tagging", and a more aggressive scheduling algorithm, "More Aggressive Scheduling," follow.

Dependency Resolution via Tagging: Tagging$^{[Ande1,Bran1,Ples1,Smit1,Sohi1]}$ can be used to ensure Sequential Coherency Instruction Scheduling, if reads are forced to execute in their logical program order as detailed in the following rules (no Figure needed):

1. Two tags are maintained for each resource, a Read Tag and a Write Tag. A unique tag value is assigned to each instruction as it passes Issue_1 and that tag is written to the Read Tag of resources the instruction will read and to the Write Tag of resources that the instruction will write. When a resource is read by an instruction that instruction's tag is signaled as a Reader of that resource and when a resource is written by an instruction that instruction's tag is signaled as a Writer of that resource. When the tag value signaled equals the tag value for that resource, the tag value for the resource is set to indicate that it is Null, i.e. when a Null tag value is obtained at Issue_1, all dependencies for that resource have already been resolved.

2. An instruction which will write a resource can be executed only when there are no logically previous outstanding writes to or reads from that resource. That is, it acquires two tags at Issue_1, a Read Tag and a Write Tag for that resource. When both the Read Tag is Null or the Reader tag signaled for that resource has matched the acquired Read Tag and the Write Tag is Null or the Writer tag signaled for that resource has matched the acquired Write Tag for that resource all dependencies associated with the write have been resolved.

3. An instruction which will read a resource can be executed only when there are no logically previous outstanding writes to or reads from that resource. That is, it acquires two tags at Issue_1, a Read Tag and a Write Tag for that resource. When both the Read Tag is Null or the Reader tag signaled for that resource has matched the acquired Read Tag and the Write Tag is Null or the Writer tag signaled for that resource has matched the acquired Write Tag for that resource all dependencies associated with the read have been resolved.

Note that rule 3 is more limiting than the previous embodiments; because, to ensure that a write has waited for all previous reads, reads must be done in the sequential program order. Thus the other methods described previously for implementing the Dependency Resolution Logic should provide better performance. The "More Aggressive Scheduling" technique that follows can provide much superior performance.

More Aggressive Scheduling

In the embodiments of Sequential Coherency Instruction Scheduling provided to this point, the "or will be available" and the "or will be accomplished" phrases of the previously stated rules, duplicated below for reference, have not been exploited:

when all needed sources are available or will be available, i.e. when all logically previous writes have been accomplished or will be accomplished, at the time required by the instruction, when all logically previous reads of the destination(s) have been accomplished or will be accomplished before the time that the instruction will overwrite the destination(s), and when all logically previous writes to the destination(s) have been accomplished or will be accomplished before the time that the instruction will overwrite the destination(s).

By exploiting that part of the above rules, performance can be increased, by beginning instruction execution earlier than might otherwise be possible, at the expense of some added complexity. The following embodiment illustrates the use of a more aggressive scheduling technique based on deficits. Those skilled in the art will recognize that more aggressive scheduling can be applied to improve the performance of each of the embodiments previously provided. This will become even clearer through an understanding of the selective use of more aggressive scheduling in the preferred embodiment, described later.

More Aggressive Dependency Resolution via Deficits: A specific embodiment of a more aggressive, but still sequentially coherent embodiment, shown in FIG. 11A (with an execution example in FIG. 11B) obeys the following logic:

Deficits are the number of reads and writes that are outstanding for a given resource. Deficits are established at Issue__1 based on the original program order and are maintained as four counts for each resource:

1. Writes Begun—The count of outstanding writes that have not begun
2. Writes Completed—The count of outstanding writes that have not completed
3. Reads Begun—The count of outstanding reads that have not begun
4. Reads Completed—The count of outstanding reads that have not completed An instruction which will write a resource can begin execution (Issue__2) as soon as all logically previous outstanding instructions that write to or read from that resource have began (Issue__2). That is it acquires a copy of the Writes Begun Deficit, etc. When both the Reads Begun and Writes Begun debits are zero and rule 3, below, enables, the instruction can safely be executed.

An instruction which will read a resource can be executed only when there are no logically previous outstanding writes to that resource. That is, it acquires a copy of the Writes Completed Deficit, called a Writes Completed Debit, for each such resource and then counts that debit down when writes to that resource occur. When the debits for all such resources reach zero (and rule 2, above, enables) the instruction can safely be executed.

An instruction which will write a resource can complete (write) only when there are no logically previous outstanding writes to or reads from that resource. That is, when both the Reads Completed and Writes Completed debits reach zero.

Figure 11A:
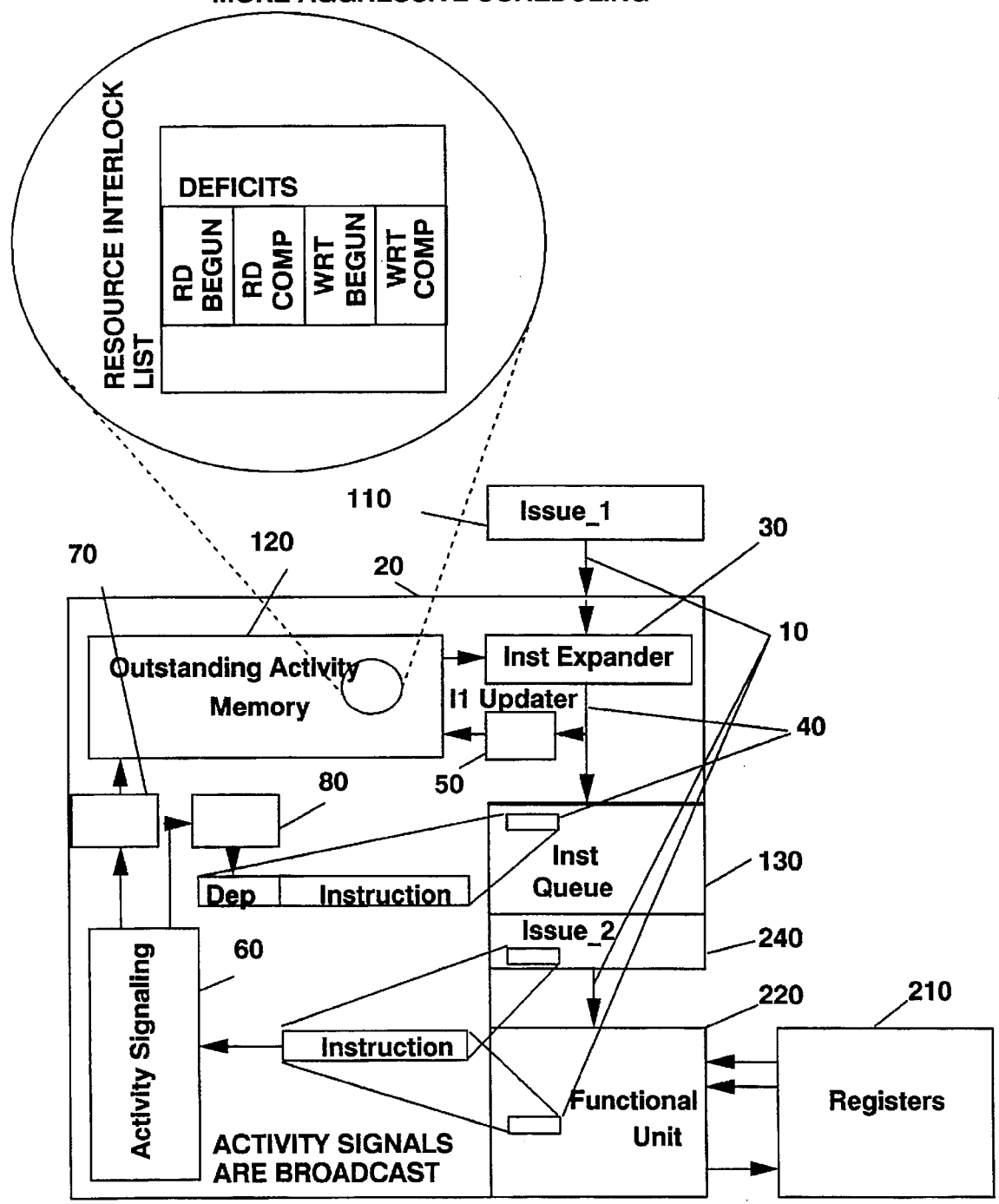

Reference Numbers included in FIG. 11A:

| | |
|---|---|
| 10 Instruction | 110 Issue__1 |
| 20 Dependency Resolution Logic | 120 Outstanding Activity Memory |
| 30 Instruction Expander | 130 Instruction Queue |
| 40 Expanded Instruction | 210 Registers |
| 50 Issue__1 (11) Updater | 220 Functional Unit |
| 60 Activity Signaling | 240 Issue__2 |
| 70 Outstanding Activity (OA) Updater | |
| 80 Dependency Information (DI) Updater | |

FIG. 11A is composed of the following major sections: Instructions 10 as detailed below.

Issue__1 110—supplies instructions in the sequential program order. This order is also called the dynamic instruction stream order,[Uht_1] as determined by the contents of the program counter in a traditional machine.

An Instruction Queue 130 with Expanded Instructions 40 including Dependency Information Issue__2 240 that schedules Instructions 10 from the Instruction Queue 130 for execution when the Dependency Information in the Expanded Instruction 40 indicates that the Instruction can safely execute Registers 210 and Functional Unit 220

Dependency Resolution Logic 20—Resolves dependencies among instructions to ensure that the results are sequentially coherent, via Resource Indexed Activity Accounting. This Dependency Resolution Logic 20 and its effect on the scheduling of instructions by Issue__2 240 are the essence of the Sequential Coherency Instruction Scheduling aspect of the present invention.

Where that Dependency Resolution Logic 20 is composed of:

A Outstanding Activity Memory 120 which has a list, indexed by Resource InterLock (resource and access type), of Deficits or counts of outstanding activity Instruction Expander 30 that adds Dependency Information from the Outstanding Activity Memory 120 to an Expanded Instruction 40

Issue__1 Updater 50 that updates Outstanding Activity Memory 120 to reflect the entry of the Expanded Instruction 40 into the Instruction Queue 130

Activity Signaling 60 that signals the occurrence of reads begun, reads completed, writes begun and writes completed as the Instruction executes Outstanding Activity Updater 70 that updates Outstanding Activity Memory 120 to reflect Activity Signaling 60

Dependency Information Updater 80 that updates Dependency Information in Expanded Instructions 40 in the Instruction Queue 130 based on the Activity Signaling 60

FIG. 11A shows an extension to FIG. 8B where the Outstanding Activity Memory 120 is expanded to have four deficits associated with each resource. Rule 2 requires two additional debit counts associated with the destination field of the instruction (Reads Begun and Writes Begun) and rule 4 requires that a mechanism be provided to defer the writing of a result either by placing the result in a Result Reservation Queue or by pausing the pipeline until the necessary prior accesses have completed. In FIG. 11A the latter alternative is chosen.

For many cases reads are accomplished when the instruction begins execution (Issue__2). For example, when a typical ADD operation begins execution, the source operands are read. In these cases Read Begun and Read Completed are simultaneously signaled when the instruction passes Issue__2.

However, for some performance critical operations like conditional execution (see patent application Ser. No. 07/448,720[Bran1]) it is desirable to defer the reading of the needed condition code operand until just before it is needed for the conditional execution decision. In this case Reads Completed is not signaled until that condition code is actually read. Similarly, the data to be stored is not needed as early in the STORE instruction execution as the memory address operands; therefore, it is desirable to defer reading the needed data operand until it is needed.

The count of Reads Begun is used, as stated in Rule 2, to permit an instruction which will change the contents of a resource to begin execution before that resource has actually been read by instructions that defer the read beyond Issue__2.

In FIG. 11A the general form of the instruction 10 is

| OP CODE | CC MASK | SRC CC | SET | WRT | DEST | SRC A | SRC B | where the OP CODE specifies the operation to be performed, the SRC A and SRC B fields select source registers 210, the SRC C selects a source Condition Code, the CC MASK performs a logical evaluation of that SRC C Condition Code to determine if the Conditional execution of the instruction is successful or unsuccessful[Bran1], and the DEST field specifies a single destination Register and Condition Code pair. The Register specified by the DEST field is written if the instruction is successful and the WRT bit enables the register write. The Condition Code specified by the DEST field is written if the instruction is successful and the SET bit enables the Condition Code write. If neither the SET or the WRT bit is on, no result is stored. If both are on both the register and the condition code are written, if the instruction is successful. There is a single Outstanding Activity Memory location associated with each destination address. Thus, the register and its corresponding condition code share deficit counts, e.g. the deficit for $R_{one}$ applies to both Register 1 and CC1.

When an instruction conditionally executes (e.g. conditionally sets a CC) the deficit/debit actions are identical whether the instruction execution is successful (actually modifies the destination) or unsuccessful (does not change the destination).

In FIG. 11A, there is a single Outstanding Activity Memory location for each Register/Condition Code pair. Outstanding Activity Memory 120 locations are initialized to zero and the contents are incremented when instructions using the associated resources are issued (Issue__1 110) and are decremented by one by the Outstanding Activity (OA) Updater 70 whenever an appropriate resource access is performed. A zero deficit indicates that no dependency exists for that resource.

Instructions 10 enter the Instruction Queue 130 in program order via Issue__1 110. As they enter they acquire debits
SRC A Write Complete
SRC B Write Complete
SRC C Write Begun
DEST Read Began
DEST Write Begun
from Outstanding Activity Memory 120 via the Instruction Expander 30 to form the Expanded Instruction 40, and they update the deficits in Outstanding Activity Memory 120 via the Issue__1 Updater 50 by incrementing by one (for each debit increasing reference) the following debits:
for the Resource addressed by SRC A, Read Begun and Read Complete
for the Resource addressed by SRC B, Read Begun and Read Complete
for the Resource addressed by SRC C, Read Begun and Read Complete
for the Register/CC Pair addressed by DEST, Write Begun and Write Complete Instructions are placed in a free Instruction Queue entry, as determined by a free entry list. When there are no free entries, the Instruction Queue is full and instructions wait to be entered, Issue__1 110 halts. As in FIG. 8B, an entry is removed when it is the oldest (at Bottom) and the instruction is completed.

Instructions that enter the Instruction Queue with any non-zero debit fields are updated by the Dependency Information (DI) Updater 80 when the Activity Signaling 60 signals the accesses to the appropriate resource.

Those signals are the addresses of Registers 210 for the following activities:
SRC A Read Begun—signaled when the instruction passes Issue__2
SRC A Read Complete—signaled when the read of SRC A is actually completed
SRC B Read Begun—signaled when the instruction passes Issue__2
SRC B Read Complete—signaled when the read of SRC B is actually completed
SRC C Read Begun—signaled when the instruction passes Issue__2
SRC C Read Complete—signaled when the read of SRC C is actually completed
DEST Write Begun—signaled when the instruction passes Issue__2
DEST Write Complete—signaled when the write of DEST is actually completed
Thus as soon as an instruction performs the activity needed to satisfy sequential coherency, the waiting instruction decrements its debit.

After an Instruction 10 enters the Instruction Queue 130 the debit fields in the Expanded Instruction 40 are monitored. When the following debits are all zero, the instruction can be executed:
SRC A Write Complete
SRC B Write Complete
SRC C Write Begun
DEST Read Began
DEST Write Begun
When all five debits, listed above, in an Expanded Instruction 40 reach zero, the instruction can be executed (Issue__2 240) and that instruction is selected and is moved to the Functional Unit 220 for execution. If more than one instruction is ready to move from the Instruction Queue 130 to the Functional Unit 220, the oldest takes priority.

In FIG. 11A, the remaining debits are carried forward with the instruction as it executes in the Functional Unit; however, the debits could be maintained in the Instruction Queue and not carried forward. Instruction execution involves a simple pipeline with instructions executed in the order they were scheduled to the Functional Unit. The pipeline must be paused for two cases:
1. An instruction needs SRC C to continue progress in the pipeline and the SRC C Write Complete debit is non-zero
2. An instruction is ready to write its DEST (register and/or CC) and either the DEST Read Complete Debit or the DEST Write Complete debit is non-zero.

The pause condition stops the execution of the instruction detecting the pause condition and subsequent instructions in the pipeline. Previous instructions in the pipeline continue to execute in their normal manner; thus, the non-zero debits in the pausing instruction are, in time, reduced to zero by the activities of the previous instructions. As instructions execute they read the needed operands from the Registers, read the needed Source CC, perform the operation specified by the Op Code, and Write the result to the Register and/or Condition Code as specified by the WRT and SET bits and as determined by the Conditional Execution Decision based on the Source CC and the CC Mask.

Only one functional unit is shown and used in this embodiment for understandability, but multiple functional units are not precluded. When Multiple Functional Units are included, multiple Issue_2 decisions should be provided so that parallel Issue_2 can occur. Additionally, the Dependency Resolution Logic must account for multiple activity signals that can cause deficits and debits to be decreased by more than one in a single cycle. The preferred embodiment of the present invention, and its vector extension, both presented later, include multiple functional units.

Tomasulo's Algorithm and the RUU Algorithm permit writes to the same resource to be executed out-of-order. Sequential Coherency Instruction Scheduling, without extension, does not. The key reason for this is that the RUU and Tomasulo's Algorithm have storage dedicated to each instruction to capture and hold copies of source operands as they become available, but Sequential Coherency Instruction Scheduling does not require such storage. By having the compiler limit register reuse for disjoint results, this disadvantage can be overcome. The reward is a much simpler, much smaller, and therefore much faster processor. Those skilled in the art will appreciate that hardware solutions to limit register reuse, like alternate register substitution, can be used in place of or along with compiler techniques to overcome this inconvenience (see "Implicit Signaling and Alternate Register Assignment").

Aggressive Sequential Coherency Instruction Scheduling Example: FIG. 11B shows the execution sequence, Outstanding Activity Memory states, and debit/deficit updates for a simple three instruction sequence. The sequence used is extracted from optimized code produced to execute LFK 16, Monte Carlo Search Loop, and illustrates the benefits of aggressively scheduling instructions for optimum performance:

Instruction #1 SUBF/D $R_{plan}-R_{temp}\rightarrow$Null Set $CC_{one}$

Instruction #2 SUBF/D $0-R_{zone}\rightarrow$Null Set $CC_{two}$.IF $CC_{one}$.LT.

Instruction #3 SUBF/D $R_{zone}-0\rightarrow$Null Set $CC_{two}$.IF $CC_{one}$.GT.

The instruction set used here is further detailed later in "Dynamic Scheduling Embodiment". As previously explained, the destination field of these instructions can specify a single register/condition-code address and can enable either the register, the condition code, or both to be updated with the result. There is a single Outstanding Activity Memory location associated with each destination address. Thus, the register and its corresponding condition code share deficit counts, e.g. the deficit for $R_{one}$ applies to both Register 1 and CC1.

When an instruction conditionally executes (e.g. conditionally sets a CC) the deficit/debit actions are identical whether the instruction execution is successful (actually modifies the destination) or unsuccessful (does not change the destination).

In FIG. 11B the Outstanding Activity Memory contents for 6 cycles are shown on the left. The pipeline contents, with debits, for the execution of the three instructions involved, are shown in the center. The deficit and debit updates on behalf of each instruction are shown on the right.

In the right column (updates) the "+" signs are caused by an instruction passing Issue_1 and only update the contents of the Outstanding Activity Memory (left). "−" signs are due to instruction activity at pipeline stages other than Issue_1, i.e. in Issue_2 and Execution, and update both the Outstanding Activity Memory and the Expanded Instruction debits. Each update action shown includes the number of the instruction causing the action.

Scheduling without Explicit Signaling

As previously suggested, the explicit signaling of activities can be eliminated if there is an implicit knowledge of when an activity will occur. This elimination of the explicit activity signaling and the associated Outstanding Activity Updater and the Dependency Information Updater can significantly simplify the logic required for Dependency Resolution. Such a simplification of the previous embodiment of "Aggressive Scheduling" will be shown later.

First, let's discuss the basic principles involved. Then a simple embodiment will be described, followed by a description of a "More Aggressive Scheduling Without Explicit Signaling".

Scheduling Without Explicit Signaling Basic Principles: As previously discussed for FIG. 7A, Sequential Coherency Instruction Scheduling is an invention that issues instructions based on sequential coherency rules that permit an instruction to be executed:

when all needed sources are available or will be available, i.e. when all logically previous writes have been accomplished or will be accomplished, at the time required by the instruction, when all logically previous reads of the destination(s) have been accomplished or will be accomplished before the time that the instruction will overwrite the destination(s), and when all logically previous writes to the destination(s) have been accomplished or will be accomplished before the time that the instruction will overwrite the destination(s).

Thus an instruction can be scheduled for execution at the optimum time and meet the rules of Sequential Coherency Instruction Scheduling if:

the time that needed sources will be available and the time, relative to starting execution of the instruction to be scheduled, that the sources will be needed are known;

the time that all logically previous reads of the destination(s) will be accomplished and the time, relative to starting execution of the instruction to be scheduled, that the destination will be written are known;

and the time that all logically previous writes to the destination(s) will be accomplished and the time, relative to starting execution of the instruction to be scheduled, that the destination will be written are known.

The fundamental requirement is that the time allocated for each instruction be predictable. For each class or type of instruction a fixed time or a worst-case time can be used, depending on the particulars of the implementation.

In the two embodiments that follow, a cycle counter is used to point to the Instruction Queue entry containing the instruction to be scheduled (Issue_2) during each cycle. The Instruction Queue position, relative to the current cycle counter value, determines when the instruction will be executed. That cycle counter value plus one is the earliest entry into which Issue_1 can place an instruction in the Instruction Queue. Dependencies can cause Issue_1 to place an instruction further than one from the entry pointed to by the entry pointed to by the cycle counter.

In these embodiments, the Instruction Queue is a circular queue. Time values for outstanding activities are destroyed when the instruction completes, i.e. writes its result. This is only for "garbage collection" purposes to ensure that an old time value will not confuse the algorithm; therefore, other methods of accomplishing the same result, i.e. the same as an idealized infinitely large Instruction Queue where no entry is ever reused, are applicable.

Figure 12A:
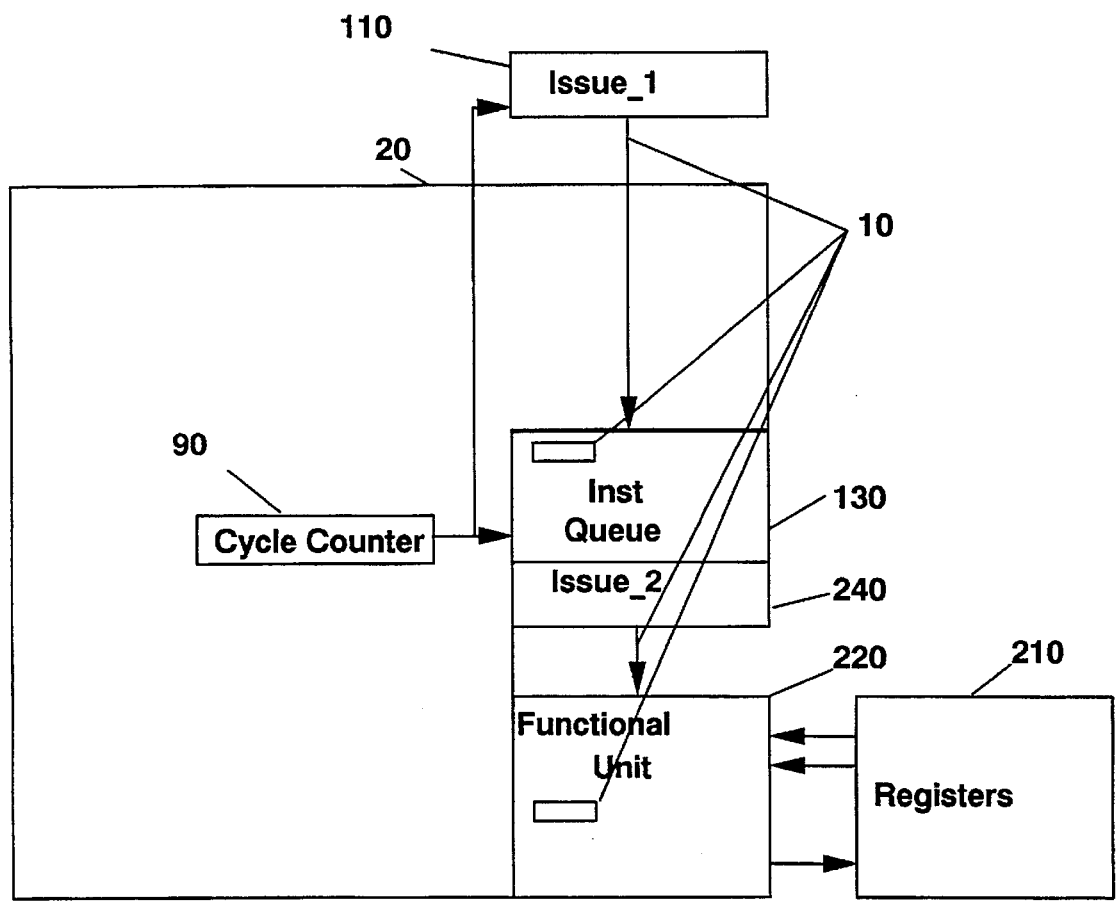

Scheduling without Explicit Signaling, Simple and Basic: A block diagram of a computer that does scheduling with implicit signaling, i.e. without explicit signaling is shown in FIG. 12A. The simplicity of the embodiment refers to two aspects, instructions have two sources and one destination and all activities (reads and writes) of an instruction are considered to have occurred when the instruction completes. FIG. 12A includes the following reference numbers:

| 10 Instruction | 110 Issue_1 |
| 20 Dependency Resolution Logic | 130 Instruction Queue |
| 90 Cycle Counter | 210 Registers |
| | 220 Functional Unit |
| | 240 Issue_2 |

FIG. 12A is composed of the following major sections:

Instructions 10 indicating two sources, SRC A and SRC B, an Op Code, and a Destination.

Cycle Counter 90—a modulo-n counter that increments on each cycle and which points to the Instruction Queue position from which an Instruction 10 is to be scheduled by Issue_2 240 during any cycle. The Cycle Counter has 1 high-order bit that is not used for addressing the Instruction Queue, but is used to prevent wrap around, as described below.

Issue_1 110 determines from the Instruction 10, the Instruction Queue 130 contents, and the Cycle Counter 90 the Instruction Queue 130 position where the Instruction 10 is placed.

An Instruction Queue 130 with Instructions 10 in positions that correspond to the time or cycle when they are to be scheduled.

Issue_2 240 that schedules Instructions 10 from the Instruction Queue 130 for execution when the Cycle Counter 90 points to the Instruction's position.

Registers 210 and Functional Unit 220

Dependency Resolution Logic 20 includes only the Cycle Counter 90.

In FIG. 12A, the Cycle Counter is a modulo-n counter where n is the number of available entries in the Instruction Queue. When the modulo-n Cycle Counter wraps from its maximum value to its minimum value a carry-out condition is detected and that carry out causes an extended counter associated with the Cycle Counter to increment. The full count field, including the extended counter bit, forms the Cycle Counter, but only the modulo-n portion is used to address the Instruction Queue. The number of bits in the extended counter depends on the size of the Instruction Queue and the maximum time needed to complete an instruction, as detailed below.

Instructions 10 enter Issue_1 110 in their sequential program order. Issue_1 determines from the Instruction 10 the execution time, in cycles, required for the Instruction, $DELAY_x$. Instructions are composed of an Op Code, a SRC A field, a SRC B field, and a DEST field. The Instruction Queue is analyzed to find:

$TIME_{SRCA,write}$=the time (cycle count) that the last write of SRC A will occur $TIME_{SRCB,write}$=the time (cycle count) that the last write of SRC B will occur $TIME_{DEST,write}$=the time (cycle count) that the last write of DEST will occur $TIME_{DEST,read}$=the time (cycle count) that the last read of DEST will occur TIME is determined from analysis of the Instruction Queue entries to find the latest time that a queued instruction will reference the resource of interest by summing the current time (modulo-n), the relative start time of the instruction, and the execution time of the instruction to form a result that is extended by 1-bit to indicate wrap-around:

$$\frac{\text{Current Cycle Count (modulo-}n\text{ portion)}}{\text{Positive Distance of the Queue Entry from Current Cycle Count}} \\ \frac{+\text{Instruction Delay}}{\text{TIME (in extended format)}}$$

TIME can either be an absolute number similar to the cycle counter or a relative number, i.e. displacement from the cycle counter. In this embodiment it is an absolute number.

From these calculated times and the current Cycle Counter value, Issue_1 calculates five possible POSITION times (the calculated POSITION values are in extended form to detect wrap-around):

$POSITION_{SRCA}=TIME_{SRCA,write}$ $POSITION_{SRCB}=TIME_{SRCB,write}$ $POSITION_{DESTw}=TIME_{DEST,write}-DELAY_x+1$ $POSITION_{DESTr}=TIME_{DEST,read}-DELAY_x+1$ $POSITION_{DEFAULT}=CURRENT\ CYCLE+1$ where $DELAY_x$ is the time delay needed to execute the instruction at Issue_1. The largest of these POSITION values is chosen and the instruction is placed at that position unless the entry is not available, as indicated by the Valid Bit. If the entry is not available, the POSITION is incremented, using the same rules as detailed in the next two paragraphs, until an available $POSITION_{placed}$ is found and the instruction is placed there and marked as Valid. If all the appropriate Instruction Queue entries are occupied, Issue_1 pauses until an appropriate entry becomes available.

The Cycle Counter is a modulo-n counter where n is the number of available entries in the Instruction Queue. When the modulo-n Cycle Counter wraps from its maximum value to its minimum value a carry-out condition is detected and that carry out causes an extended counter associated with the Cycle Counter to increment. The full count field, including the extended counter bits, form the Cycle Count, but only the modulo-n portion is used to address the Instruction Queue. The number of bits in the extended counter depends on the size of the Instruction Queue and the maximum time needed to complete an instruction, as detailed below.

When the size of the Instruction Queue, SIZE, and the maximum time an instruction needs to complete, $TIME_{MAX}$ are the same, the valid Instruction POSITION range (relative to Cycle Counter) is from 1 to SIZE, assuming that the entry at Cycle Counter is used before the new Cycle Counter+ SIZE entry overwrites it. If the POSITION determined is greater than SIZE, the entry cannot be made and Issue_1 must pause until the entry can be made. One bit is sufficient for the parameters described above. Those skilled in the art will recognize that different parameters can result in a different number of bits in the extended counter.

When the Cycle Counter points to a Valid entry in the Instruction Queue, Issue_2 schedules that instruction for execution.

In FIG. 12A, instruction execution involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Register in a pre-known number of cycles.

When the instruction completes, by writing its result to the destination register, it clears the Valid Bit in the Instruction Queue entry.

Only one functional unit is shown and used in this embodiment for understandability, but multiple functional units are not precluded. When Multiple Functional Units are included, multiple Instruction Queues and Issue_2's should be provided so that parallel Issue_2 can occur.

Figure 12B:
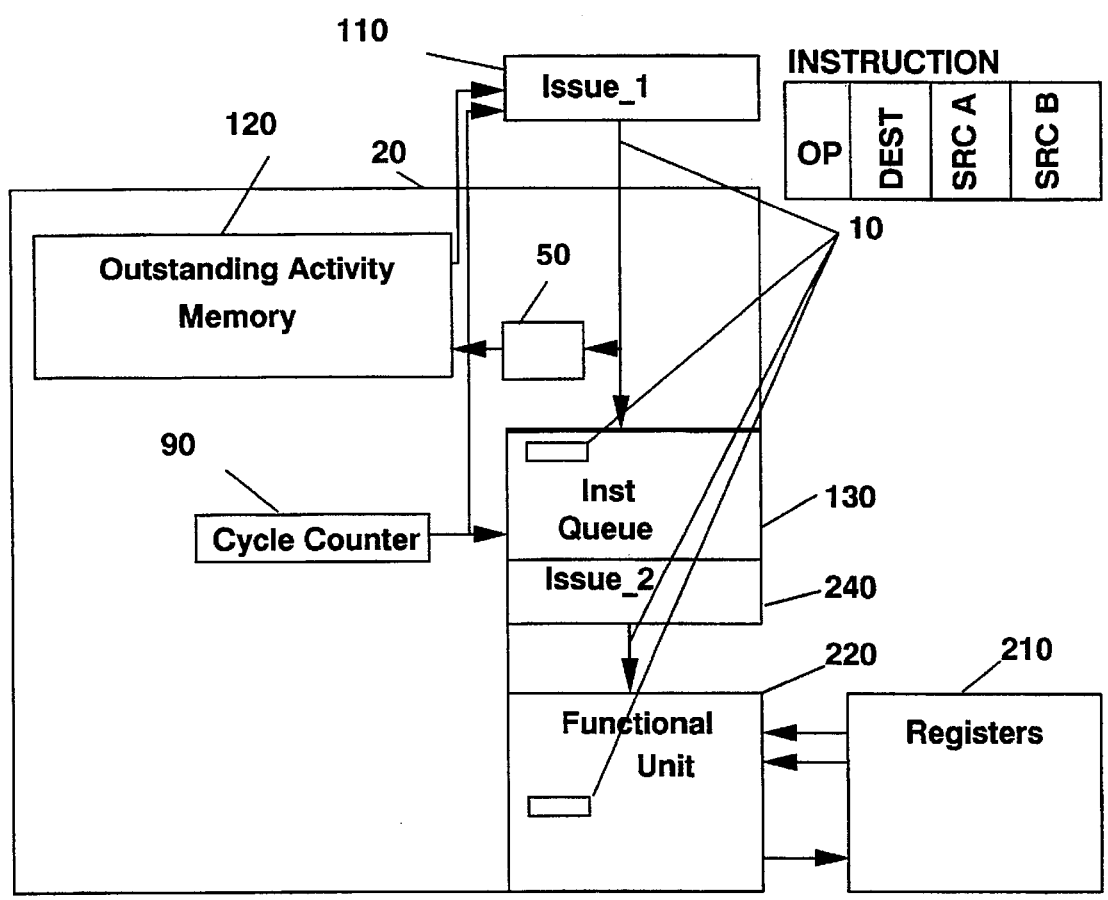

Scheduling without Explicit Signaling, Simple Embodiment: A simple embodiment of scheduling with implicit signaling, i.e. without explicit signaling is shown in FIG. 12B. The simplicity of the embodiment refers to two aspects, instructions have two sources and one destination and all activities (reads and writes) of an instruction are considered to have occurred when the instruction completes. FIG. 12B replaces the calculation of time values based on analysis of the Instruction Queue contents with a memory of the latest activities. This not only accelerates the previous algorithm, but also permits the Valid Bit in the Instruction Queue entry to be cleared earlier and, therefore, offers a more efficient use of the Instruction Queue. FIG. 12B includes the following reference numbers:

---

| | |
|---|---|
| 10 Instruction | 110 Issue_1 |
| 20 Dependency Resolution Logic | 120 Outstanding Activity Memory |
| 50 Issue_1 (11) Updater | 130 Instruction Queue |
| 90 Cycle Counter | 210 Registers |
| | 220 Functional Unit |
| | 240 Issue_2 |

---

FIG. 12B is composed of the following major sections:
Instructions 10 indicating two sources, SRC A and SRC B, an Op Code, and a Destination.
A Outstanding Activity Memory 120 which has a list, indexed by register number, of the times that outstanding activities will be accomplished. There are two values for each register number—$TIME_{Index,read}$, which is the time that the last previous read will be completed, and $TIME_{Index,write}$, which is the time that the last previous write will be completed. The TIME values follow the same rules discussed in the previous section.
Cycle Counter 90—a modulo-n counter that increments on each cycle and which points to the Instruction Queue position from which an Instruction 10 is to be scheduled by Issue_2 240 during any cycle. The Cycle Counter has 1 high-order bit that is not used for addressing the Instruction Queue, but are used to prevent wrap around, as described below.
Issue_1 110 determines from the Instruction 10, the Outstanding Activity Memory 120 contents, and the Cycle Counter 90 the Instruction Queue 130 position where the Instruction 10 is placed.
Issue_1 Updater 50 that updates Outstanding Activity Memory 120 to reflect the entry of the Instruction 10 into the Instruction Queue 130

An Instruction Queue 130 with Instructions 10 in positions that correspond to the time or cycle when they are to be scheduled.
Issue_2 240 that schedules Instructions 10 from the Instruction Queue 130 for execution when the Cycle Counter 90 points to the Instruction's position.
Registers 210 and Functional Unit 220
Dependency Resolution Logic 20 includes the Outstanding Activity Memory 120, the I1_Updater 50, and the Cycle Counter 90.

In FIG. 12B, Outstanding Activity Memory 120 locations are initialized to NULL values, where a NULL value indicates that there is no outstanding activity.

Instructions 10 enter Issue_1 110 in their sequential program order. Issue_1 determines from the Instruction 10 the execution time, in cycles, required for the Instruction, $DELAY_x$. Instructions are composed of an Op Code, a SRC A field, a SRC B field, and a DEST field. The Outstanding Activity Memory entries associated with the source and destination fields are accessed and the following POSITIONs are determined:

$$POSITION_{SRCA}=TIME_{SRCA,write}$$

$$POSITION_{SRCB}=TIME_{SRCB,write}$$

$$POSITION_{DESTw}=TIME_{DEST,write}-DELAY_x+1$$

$$POSITION_{DESTr}=TIME_{DEST,read}-DELAY_x+1$$

$$POSITION_{DEFAULT}=CURRENT\ CYCLE+1$$

where $DELAY_x$ is the execution time of the instruction at Issue_1. The largest of these POSITION values is chosen and the instruction is placed at that position unless the entry is not available, as indicated by the Valid Bit. If the entry is not available, the POSITION is incremented, using the same rules as detailed in the next two paragraphs, until an available $POSITION_{placed}$ is found and the instruction is placed there and marked as Valid. If all the appropriate Instruction Queue entries are occupied, Issue_1 pauses until an appropriate entry becomes available.

The Cycle Counter is a modulo-n counter where n is the number of available entries in the Instruction Queue. When the modulo-n Cycle Counter wraps from its maximum value to its minimum value a carry-out condition is detected and that carry out causes an extended counter associated with the Cycle Counter to increment. The full count field, including the extended counter bits, form the Cycle Count, but only the modulo-n portion is used to address the Instruction Queue. The number of bits in the extended counter depends on the size of the Instruction Queue and the maximum time needed to complete an instruction, as detailed below.

The conventions concerning SIZE, $TIME_{MAX}$, POSITION, and the Cycle Counter extension bits are the same as discussed on page 115.

The Issue_1 Updater 50 replaces the entries in the Outstanding Activity Memory 120 for $TIME_{SRCA,read}$, $TIME_{SRCB,read}$, and $TIME_{DEST,write}$ with $POSITION_{placed}+DELAY_x$ (all use the same value for simplicity), if the previous time value in the entry is less than $POSITION_{placed}+DELAY_x$, otherwise, the previous entry remains.

When the Cycle Counter points to a Valid entry in the Instruction Queue, Issue_2 240 schedules that instruction for execution and clears the Valid Bit in the entry.

In FIG. 12B, instruction execution involves a simple pipeline with instructions executed in the order they were scheduled to the Functional Unit. No blockage can occur because the conditions that can delay execution have already been resolved (in the Instruction Queue). Instructions read the needed operands from the Registers, perform the operation specified by the Op Code, and Write the result to the Register in a pre-known number of cycles.

When the instruction completes, by writing its result to the destination register, the $TIME_{SRCA,read}$, $TIME_{SRCB,read}$ and $TIME_{DEST,write}$ entries in the Outstanding Activity Memory 120 are cleared to NULL if the time entry equals the Current value of the Cycle Counter.

Only one functional unit is shown and used in this embodiment for understandability, but multiple functional units are not precluded. When Multiple Functional Units are included, multiple Instruction Queues and Issue_2's should be provided so that parallel Issue_2 can occur.

Figure 12C:
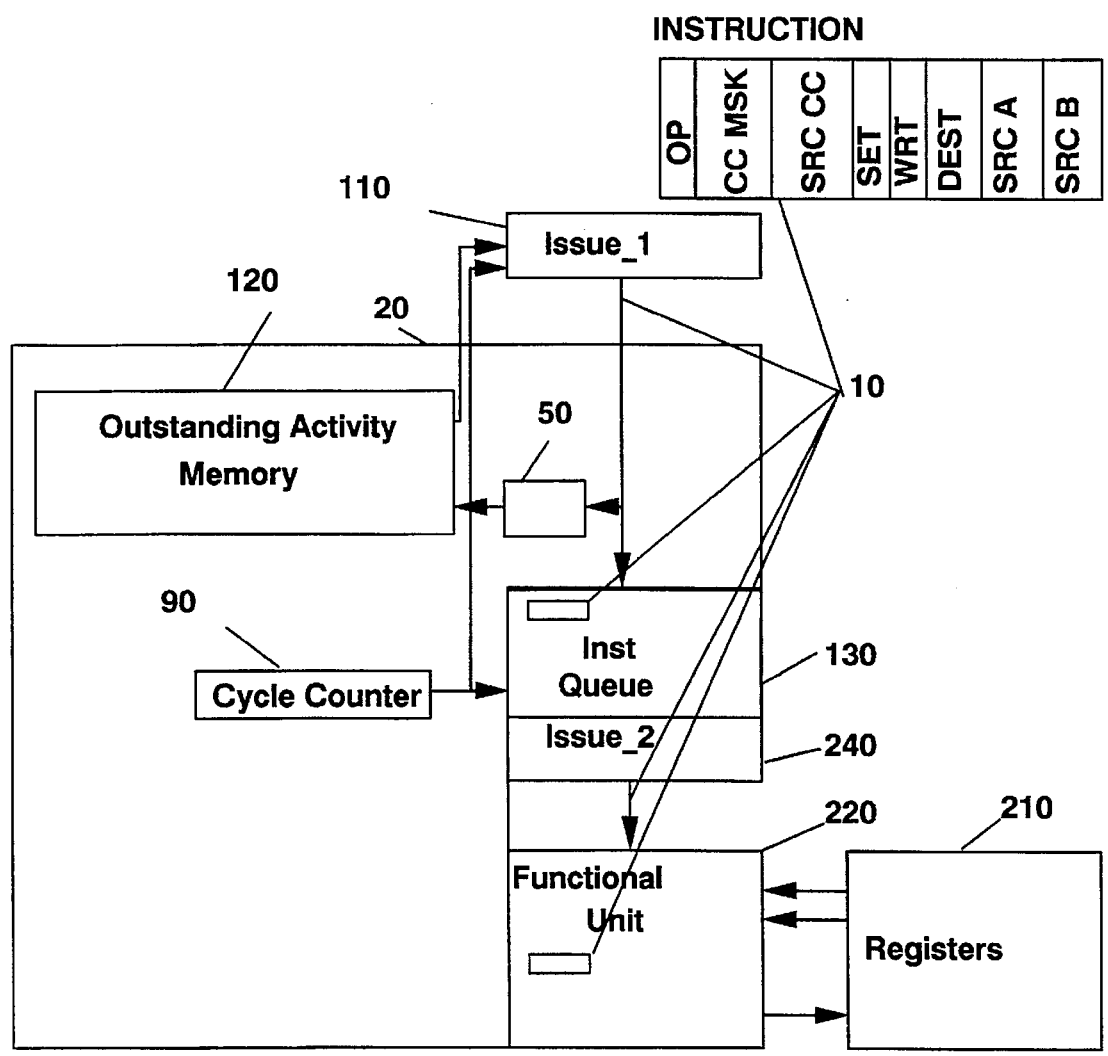

Scheduling without Explicit Signaling, A More Aggressive Embodiment: An example of a more aggressive, but still sequentially coherent embodiment without explicit signaling is shown in FIG. 12C (with an execution example in FIG. 12D). This embodiment uses the more complex instruction format (used previously to illustrate more aggressive scheduling) and the delay calculations include the different delays from the start of execution to reading SRC A and SRC B, reading the source CC, and writing a destination.

The Reference Numbers included in FIG. 12C are:

| | |
|---|---|
| 10 Instruction | 110 Issue_1 |
| 20 Dependency Resolution Logic | 120 Outstanding Activity Memory |
| 50 Issue_1 (11) Updater | 130 Instruction Queue |
| 90 Cycle Counter | 210 Registers |
| | 220 Functional Unit |
| | 240 Issue_2 |

FIG. 12C is composed of the following major sections:
Instructions 10 indicating two sources, SRC A and SRC B, an Op Code, and a Destination plus register writing (WRT), condition code setting (SET), and conditional execution controls (SRC CC and CC MASK).

A Outstanding Activity Memory 120 which has a list, indexed by register number, of the times that outstanding activities will be accomplished. There are two values for each register number—$TIME_{Index,read}$, which is the time that the last previous read will be completed, and $TIME_{Index,write}$, which is the time that the last previous write will be completed.

Cycle Counter 90—a modulo-n counter that increments on each cycle and which points to the Instruction Queue position from which an Instruction 10 is to be scheduled by Issue_2 240 during any cycle. The Cycle Counter has 1 high-order bit that is not used for addressing the Instruction Queue, but are used to prevent wrap around, as described below.

Issue_1 110 determines from the Instruction 10, the Outstanding Activity Memory 120 contents, and the Cycle Counter 90 the Instruction Queue 130 position where the Instruction 10 is placed.

Issue_1 Updater 50 that updates Outstanding Activity Memory 120 to reflect the entry of the Instruction 10 into the Instruction Queue 130

An Instruction Queue 130 with Instructions 10 in positions that correspond to the time or cycle when they are to be scheduled.

Issue_2 240 that schedules Instructions 10 from the Instruction Queue 130 for execution when the Cycle Counter 90 points to the Instruction's position.

Registers 210 and Functional Unit 220

In FIG. 12C the general form of the instruction 10 is

| OP CODE | CC MASK | SRC CC | SET | WRT | DEST | SRC A | SRC B |
|---|---|---|---|---|---|---|---| where the OP CODE specifies the operation to be performed, the SRC A and SRC B fields select source registers 210, the SRC C selects a source Condition Code, the CC MASK performs a logical evaluation of that SRC C Condition Code to determine if the Conditional execution of the instruction is successful or unsuccessful[Bran1], and the DEST field specifies a destination Register and Condition Code pair. The Register specified by the DEST field is written if the instruction is successful and the WRT bit enables the register write. The Condition Code specified by the DEST field is written if the instruction is successful and the SET bit enables the Condition Code write. If neither the SET or the WRT bit is on, no result is stored. If both are on both the register and the condition code are written, if the instruction is successful.

In FIG. 12C, there is a single Outstanding Activity Memory location for each Register/Condition Code pair activity, i.e. Reg/CC read and Reg/CC write. Outstanding Activity Memory 120 locations are initialized to NULL, indicating that no outstanding activity exists for that resource.

Instructions 10 enter Issue_1 110 in their sequential program order. Issue_1 determines from the Instruction 10 the execution time, in cycles, for $DELAY_w$=cycles required for the Instruction to write its result register and condition code, $DELAY_c$=cycles required for the Instruction to read its source condition code The Outstanding Activity Memory 120 entries associated with the source and destination fields are accessed and the following POSITIONs are calculated:

$POSITION_{SRCA}=TIME_{SRCA,write}$ $POSITION_{SRCB}=TIME_{SRCB,write}$ $POSITION_{SRCC}=TIME_{SRCC,write}-DELAY_c+1$ $POSITION_{DESTw}=TIME_{DEST,read}-DELAY_w+1$ $POSITION_{DESTr}=TIME_{DEST,read}-DELAY_w+1$ $POSITION_{DEFAULT}=CURRENT\ CYCLE+1$ where $DELAY_x$ is the execution time of the instruction at ISSUE_1. The largest of these POSITION values is chosen and the instruction is placed at that position unless the entry is not available, as indicated by the Valid Bit. If the entry is not available, the POSITION is incremented, under the same rules detailed in the next two paragraphs, until an available $POSITION_{placed}$ is found and the instruction is placed there and marked as Valid. If all the appropriate Instruction Queue entries are occupied, Issue_1 pauses until an appropriate entry becomes available.

The Cycle Counter is a modulo-n counter where n is the number of available entries in the Instruction Queue. When the modulo-n Cycle Counter wraps from its maximum value to its minimum value a carry-out condition is detected and that carry out causes an extended counter associated with the Cycle Counter to increment. The full count field, including the extended counter bits, form the Cycle Count, but only the modulo-n portion is used to address the Instruction Queue. The number of bits in the extended counter depends on the size of the Instruction Queue and the maximum time needed to complete an instruction, as detailed below.

The conventions concerning SIZE, $TIME_{MAX}$, POSITION, and the Cycle Counter extension bits are the same as discussed on page 115.

The Issue_1 Updater 50 replaces the entries in the Outstanding Activity Memory for $TIME_{SRCA.read}$ and $TIME_{SRCB.read}$ with $POSITION_{placed}$, if the previous time value in the entry is less than $POSITION_{placed}$, otherwise, the previous entry remains. $POSITION_{placed}+DELAY_c$ replaces the entry in $TIME_{SRCC.read}$, if the previous time value in the entry is less than $POSITION_{placed}+DELAY_c$, otherwise, the previous entry remains. And $POSITION_{placed}+DELAY_w$ replaces the entry in $TIME_{DEST.write}$, if the previous time value in the entry is less than $POSITION_{placed}+DELAY_w$, otherwise, the previous entry remains.

When the Cycle Counter 90 points to a Valid entry in the Instruction Queue 130, Issue_2 240 schedules that instruction for execution and clears the Valid Bit in the entry.

In FIG. 12C, instruction execution involves a simple pipeline with instructions executed in the order they were scheduled to the Functional Unit. No blockage can occur because the conditions that can delay execution have already been resolved by their positioning in the Instruction Queue at Issue_1. Instructions read the needed operands from the Registers, perform the operation specified by the Op Code, and Write the result to the Register/CC, under control of the SET/WRT flags and the conditional execution decision, in a pre-known number of cycles. Instructions begin execution at the earliest possible time that their needed sources will be available when needed and that all previous reads and writes of their destination will be accomplished before the instruction writes that destination. However, no explicit activity signaling is necessary.

When the instruction completes, whether successful or unsuccessful as determined by the conditional execution decision, the $TIME_{SRC\ A.read}$, $TIME_{SRC\ B.read}$, $TIME_{SRC\ CC.read}$, and $TIME_{DEST.write}$ entries in the Outstanding Activity Memory are cleared to NULL if the time entry is equal to the Current value of the Cycle Counter.

Only one functional unit is shown and used in this embodiment for understandability, but multiple functional units are not precluded. When Multiple Functional Units are included, multiple Instruction Queues and Issue_2's should be provided so that parallel Issue_2 can occur. Also, a one-instruction-at-a-time Issue_1 is shown, but parallel issue is not precluded.

Those skilled in the art will recognize that Implicit Activity Signaling is more constraining in some ways than Explicit Activity Signaling, e.g. instruction execution timing must be predictable. However, the complexity of signaling and updating is substantially reduced.

Those skilled in the art will also recognize that, although resource indexed activity accounting is used in the examples of Implicit Activity Signaling given here, other indexing methods including those previously described are similarly applicable.

Aggressive Sequential Coherency Instruction Scheduling with Implicit Signaling Example: FIG. 12D shows the Issue_1 placement algorithm for a simple three instruction sequence. The sequence used is the same as used previously in FIG. 11B, extracted from optimized code produced to execute LFK 16, Monte Carlo Search Loop, and illustrates the benefits of aggressively scheduling instructions for optimum performance:

Instruction #1 SUBF/D $R_{plan}-R_{temp}\rightarrow$Null Set $CC_{one}$

Instruction #2 SUBF/D $0-R_{zone}\rightarrow$Null Set $CC_{nwo}$IF $CC_{one}$.LT.

Instruction #3 SUBF/D $R_{zone}-0\rightarrow$Null Set $CC_{nwo}$IF $CC_{one}$.GT.

The instruction set used here is further detailed later in "Dynamic Scheduling Embodiment". As previously explained, the destination field of these instructions can specify a single register/condition-code address and can enable either the register, the condition code, or both to be updated with the result. There is a single Outstanding Activity Memory location associated with the DEST Register/CC pair. Thus, the register and its corresponding condition code share TIME tries, e.g. the TIME entries for $R_{one}$ applies to both Register 1 and CC1.

When an instruction conditionally executes (e.g. conditionally sets a CC) the update of the Outstanding Activity Memory at instruction completion is identical whether the instruction execution is successful (actually modifies the destination) or unsuccessful (does not change the destination).

In FIG. 12D the Outstanding Activity Memory contents for 6 cycles are shown on the left. The Issue_1 placement (Instruction Queue position) calculations and the Issue_1 Update actions (updates of the Outstanding Activity Memory) are shown for the first three cycles, i.e. for the three cycles in which the activity of Issue_1 is applicable to the example. For the other three cycles the pipeline contents for the execution of the three instructions involved are shown. Instruction completion causes Outstanding Activity Memory entries that are the result of scheduling that instruction to be cleared to NULL, as shown.

Implicit Signaling and Alternate Register Assignment

Implicit Signaling, where the decision about when to schedule the instruction is made at Issue_1 time, significantly simplifies hardware allocation of alternate registers, where an alternate register is assigned in place of the destination register if that can improve the scheduling time of an instruction. This occurs when logically previous reads and/or writes of that register, rather than other dependencies like the availability of sources, are the dependencies that actually determine the scheduling time of an instruction.

For example, with the processor of FIG. 12C enhanced to have a pool of alternate registers that can be assigned by the hardware as needed, $POSITION_{DESTw}$ and $POSITION_{DESTr}$ are calculated for both the specified destination and for an alternate destination. If using the alternate instead of the specified destination improves the POSITION value used to schedule the instruction, then the alternate is assigned.

The alternate assignment logic must remember to modify logically subsequent instructions that source the resource for which an alternate was assigned so that those instructions get the correct data copy.

The Advantages of Implicit Signaling Sequential Coherency Instruction Scheduling When Implicit Signaling can be used, those skilled in the art will recognize from the examples provided above, that the logic complexity of the processor can be reduced substantially from the prior art and can also be reduced from Explicit Signaling Sequential Coherency Instruction Scheduling.

A less obvious but equally important advantage of Implicit Signaling is the relative independence of the Issue__1 placement algorithm from the Issue__2 and Functional Unit execution logic. The only connections involve the Cycle Counter and the recycling of Instruction Queue positions. This independence will permit the Issue__1 placement algorithm to be implemented as a "black box" with limited and very well defined interfaces to other portions of the processor's logic.

Additionally, in the particular embodiments described here, the Instruction Queue is simply a memory. There is no active comparison logic, counters, etc. associated with each entry. Only the Cycle Counter's stepping to an entry defines when that instruction will execute. This not only makes the Instruction Queue much simpler, but also permits the Instruction Queue to be implemented with conventional memory devices (e.g. Random Access Memory (RAM) devices) or even in main memory.

Finally, the embodiments shown here describe algorithms that can be implemented in many different ways, including the instruction stream containing information generated by the compiler, that can simplify the hardware required to perform Sequential Coherency Instruction Scheduling.

Thus Sequential Coherency Instruction Scheduling offers a set of design options that were simply not previously available to the computer designer.

SEQUENTIAL COHERENCY EXCEPTION HANDLING

A computer processor's exception handling is termed sequentially coherent if the results of executing a program with one or more exceptions are the same as those obtained when the instructions are executed sequentially in their original program order with no exceptions.

Sequential Coherency Exception Handling, described here, does not use checkpointing or in-order commit. Instead it permits out-of-order instructions to go ahead and change the permanent state of the machine when they are completed. That is, the completed-state and the committed-state are the same. Many different instruction scheduling mechanisms can be used with this invention to execute instructions out-of-order, although some, of course, provide better performance than others. The important characteristics of the scheduling mechanism are:

1. For both traps and faults, all uncompleted instructions can be re-executed, i.e. the source operands must be available.
2. For traps the result of the trap-causing instruction is available to the exception handler and at that point instructions that are dependent on the trap-causing instruction have not completed.
3. For faults the faulting instruction does not complete.

Figure 13A:
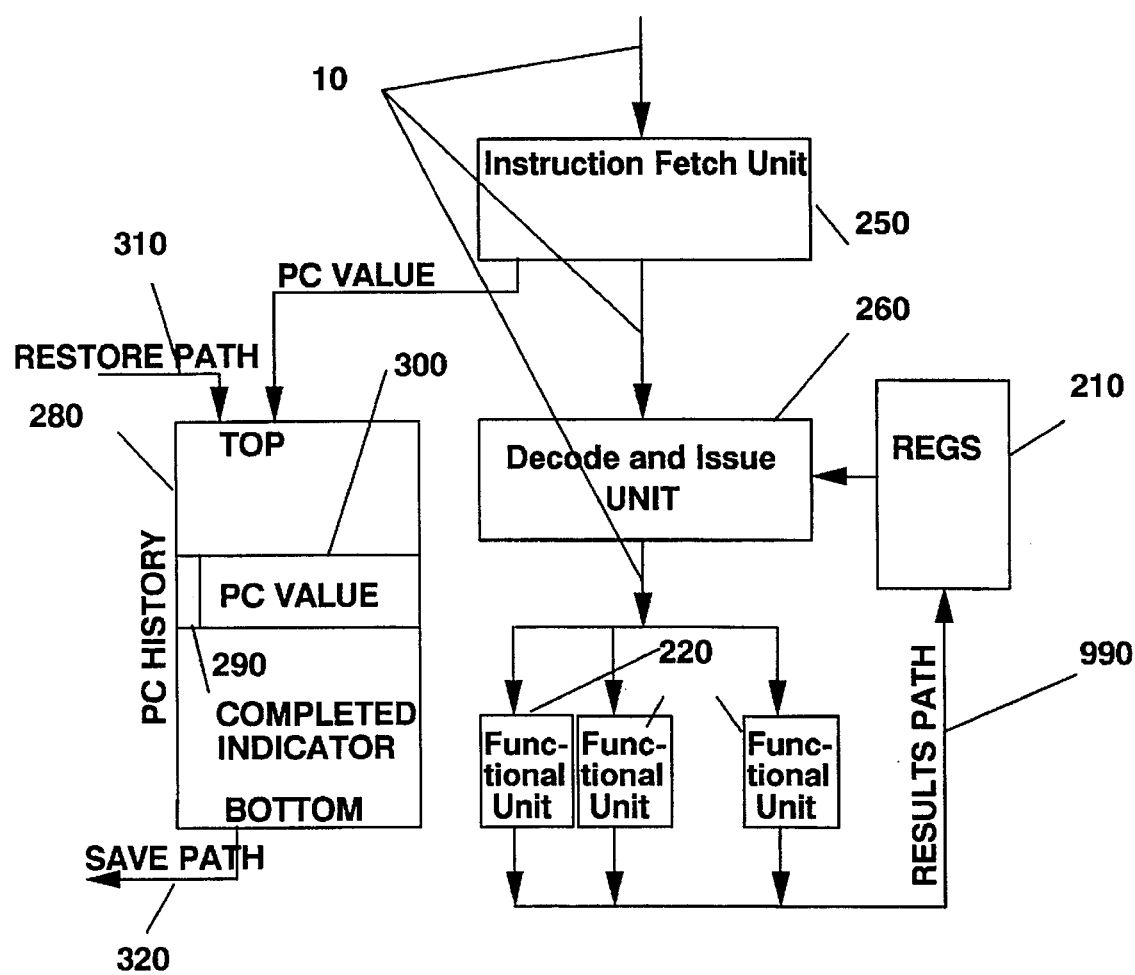
FIGS. 13A, 13B, and 13C show various aspects of Sequential Coherency Exception Handling—the configuration, the handling of a trap, and the handling of a fault.

Reference Numbers included in FIG. 13A:

10 Instruction
210 Registers
220 Functional Unit
250 Instruction Fetch Unit
260 Instruction Decode and Issue
280 PC History -continued 290 Completed Indicator
300 PC Value
310 Restore Path
320 Save Path
990 Results Path FIG. 13A is composed of the following major elements:
Instructions 10 indicating two sources, SRC A and SRC B, an Op Code, and a Destination.
Instruction Fetch Unit 250 that fetches instructions 10 based on a Program Counter (PC) Value 300.
Decode and Issue Unit 260 that decodes instructions and schedules them for execution by the appropriate Functional Unit 220
Registers 210 that hold instruction operands
Functional Units 220 that carry out the operation specified by the instruction on operands specified by the instruction and thereby produce results that are written to the instruction's destination via the Results Path 990
Results Path 990 that conveys the results of instructions from the Functional Units to the Registers. Examples of Results Paths are a Common Results Bus and a Crossbar Interconnect.
PC History 280 that maintains Sequential Flow Information and Completion Information as described below.
Save Path 320 for saving the contents of the PC History 280 when an exception is recognized.
Restore Path 310 for restoring the previously saved contents of the PC History 280 after a recognized exception has been handled.

As shown in FIG. 13A, this invention maintains and saves, when the exception is recognized,
SEQUENTIAL FLOW INFORMATION—a PC History 280, in dynamic sequential program order, of the PC Values 300 just prior to the exception.
COMPLETION INFORMATION—Completion Indicators 290 in the PC History entries, indicating which instructions have completed (and conversely which have not completed).

In operation, as instructions 10 enter the Decode and Issue Unit 260 in their sequential program order from the Instruction Fetch Unit 250, the PC Value 300 associated with that instruction 10 is placed on the Top of the PC History 280 and the Completion Indicator 290 at the Top of the PC History 280 is set to zero. The entries in the PC History 280 are maintained in a FIFO order, with entries added at Top and entries removed from Bottom.

When an instruction 10 is scheduled for execution by the Decode and Issue Unit 260 the instruction and source operands (from the Registers 210) are supplied to the appropriate Functional Unit 220 for execution. The Functional Unit 220 performs the operation specified by the instruction and supplies the result on the Results Path 990 for update of the Register 210 specified as the instruction destination.

When an instruction completes, i.e. when its result is written to the destination register, the Completed Indicator 290 in the PC History entry associated with the instruction 10 is set to one. When the PC History entry at Bottom has its Completed Indicator equal one, that PC History entry is removed from the PC History 280.

During the execution of instructions, when an exception is recognized, the normal operation of the computer processor of FIG. 13A halts and an interruption process is entered. The interruption process saves the contents of registers, as needed, and saves via the Save Path 320 the contents of the PC History 280 at the time the exception was recognized. The exception-causing (or externally interrupted) program is suspended for as long as is necessary to analyze and handle the exception. The exception handling procedure for two common exception-types is detailed later.

When the exception has been handled the interrupted program can resume execution. To resume the interrupted program, after the exception is handled, the saved state is restored, i.e. the saved PC History contents are restored to the PC History 280 via the Restore Path 310 and the saved Register contents are restored to the Registers 210. The PC History 280 establishes the program flow that was determined prior to the exception and the Completed Indicators 290 establish which instructions in that flow should not be issued (bypassed) because they were previously completed and which should be issued because they were not previously completed.

After the PC History is restored instruction fetching is controlled by the contents of the PC History, starting at the Bottom of the PC History and progressing toward the Top of the PC History. PC History entries that do not have the Completed Indicator set cause the instruction pointed to by the entry to be fetched and re-issued (Issue_1), but, until the Fetch pointer has processed all the saved PC History entries, the re-issued PC Value is not placed (again) on the PC History. PC History entries that have the Completed Indicator set are simply skipped over. Note that in the saved PC History, all Branches that established flow recorded in the PC History have necessarily been completed. Thus the program flow, when resuming an interrupted program is guaranteed to duplicate the flow prior to the interruption being recognized. Also, as soon as this process of fetching instructions, based on the PC History contents, is initiated another interruption can be handled.

Figure 13B:
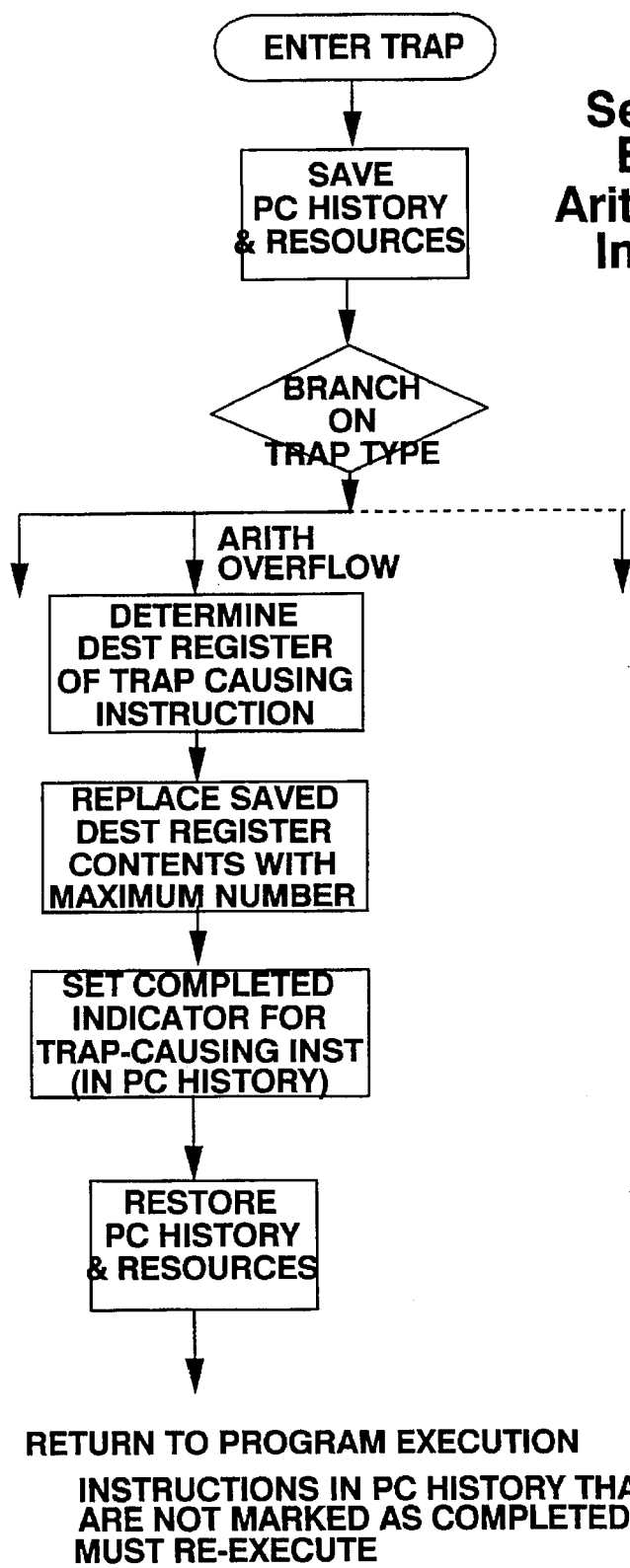

FIG. 13B shows a logical flow of operations to handle a arithmetic overflow trap, which occurs when the result of a mathematical operation (e.g. Floating-point Add) is larger than the maximum machine representable number. In FIG. 13B the interruption occurs just after the trap causing instruction has completed. At that point the result in the register specified as the destination of the instruction is incorrect, i.e. the trap occurred because the actual result value cannot be represented in the machine format. When the interruption handler is entered the PC History contents, the Register contents, and any other resource that might be destroyed by the interruption handler are saved. Then the trap causing instruction is identified and, based on the trap-type (arithmetic overflow), the value in the register that was specified as the destination of that trap causing instruction is replaced with the largest representable number. Then the machine state is restored and the trap causing process continues as if the exception had not occurred, i.e. as if the result of the instruction had been the maximum representable value.

Figure 13C:
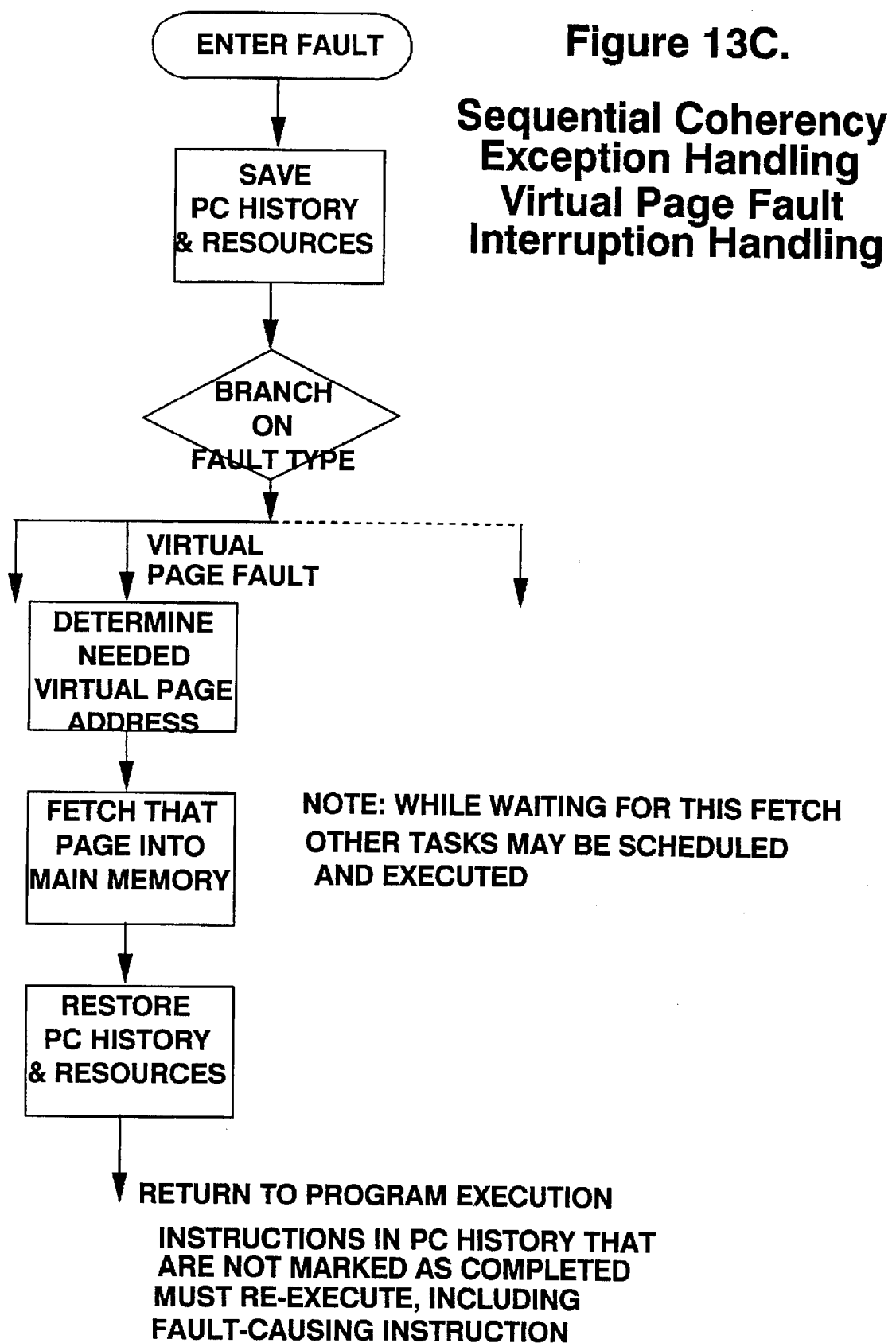

FIG. 13C shows a logical flow of operations to handle a virtual page fault, which occurs when an operand is located in a virtual page that is not currently memory resident. In FIG. 13C the interruption occurs before the faulting instruction has completed and the source operands used to form the memory address are still protected from overwriting. When the interruption handler is entered the PC History contents, the Register contents, and any other resource that might be destroyed by the interruption handler are saved. Then the fault causing instruction is identified and, based on the fault-type (page fault), the virtual address of the needed memory operand is calculated; the location of that virtual page is determined; and that page is moved into the main memory of the machine. While the virtual page is being moved into main memory, other tasks can be executed. When the needed page is properly configured in main storage the machine state is restored and the fault causing process continues as if the exception had not occurred, i.e. the faulting instruction is executed without a page fault.

For specific architectures the interruption handler may, during trap or fault handling, need to save, restore, and manipulate other architecture dependent information to prepare the for correct resumption of the processing within the intent and scope of the present invention.

To better explain the Sequential Coherency Exception Handling aspect of the present invention, its operation is described with four different instruction scheduling mechanisms:

1. Thornton's algorithm (scoreboarding) Modified
2. Tomasulo's algorithm
3. Register Update Unit (RUU)
4. Sequential Coherency Instruction Scheduling (the other aspect of the present invention)

Each of these is shown with serial instruction issue and two Functional Units, but the performance examples assume one Load/Store Unit, one Add Unit, one Multiply Unit, and Branching as described later. Serial versus parallel instruction issue, the actual number of Functional Units (one or more), and the delay characteristics of the functional units are independent of this invention.

Thornton's Algorithm (Modified) with this Invention—FIG. 14A illustrates simplifying FIG. 4B via this invention to correctly handle exceptions by:

Eliminating the Reorder Buffer, associated bypass logic, and the associated pointer in the PC History.

Modifying the Scheduling Algorithm to meet the "important characteristics of the scheduling mechanism", detailed previously.

Reference Numbers included in FIG. 14A:

| | |
|---|---|
| 10 Instructions | 280 PC History |
| 40 Expanded Instruction | 290 Completed Indicator |
| 100 Instruction Memory (or Cache) | 295 Valid Indicator |
| 110 Issue_1 | 300 PC Value |
| 210 Registers | 310 Restore Path |
| 220 Functional Unit | 320 Save Path |
| 230 Program Counter | 330 Reservation Station |
| 240 Issue_2 | |
| 270 Common Result Bus | |

FIG. 14A expands FIG. 4B and is composed of the following major elements:

Instructions 10—specify the operations to be performed and the operands to be used Instruction Memory (or Cache) 100—stores the instructions 10 needed to make up a program Program Counter 230—provides, to PC History Top, the PC Values 300 that control the flow of a program by using the Branch address when a Branch instruction is successful (the path from the Issue_1 110 to the Program Counter 230) or, otherwise, incrementing the previous PC History Top contents to form a new PC Value 300

Issue_1 110—supplies Expanded Instructions 40, as they are fetched from Instruction Memory 100, in the dynamic sequential program order, using the PC History Fetch contents. The conversion of an Instruction 10 to an Expanded Instruction 40 adds a pointer to its associated entry in the PC History 280.

Reservation Stations 330—one associated with each Functional Unit 220, Reservation Stations 330 hold Expanded Instructions 40 that have passed Issue_1 110 but cannot yet be scheduled by Issue_2 240 because one or more needed source operands are not yet available.

Issue_2 240—Schedules instructions for execution, by the Functional Unit 220, from the Reservation Station 330 associated with the Functional Unit 220 or directly from Issue_1 110 when the Expanded Instruction 40 can be executed without passing through a Reservation Station 330.

Registers 210—Provides storage for instruction operands.

Functional Unit 220—Contains the operational logic to carry out the operation specified by the instruction 10 on source operands obtained from the registers 210 and produce a result that is written to the instruction's destination via the Common Result Bus 270.

Common Result Bus 270 that conveys the results of instructions from the Functional Units 220 to the Registers 210.

PC History 280 that maintains Sequential Flow Information and Completion Information as described below. The PC History is managed by the Top, Bottom, and Fetch Pointers. Entries are added at Top from the Program Counter 230 and removed from Bottom. The entry pointed to by the Fetch Pointer is the address used by Issue_1 to fetch the next instruction. When an entry is added its Valid Indicator 295 is set and when an entry is removed its Valid Indicator 295 is cleared.

Save Path 320 for saving the contents of the PC History 280 when an exception is recognized.

Restore Path 310 for restoring the previously saved contents of the PC History 280 after a recognized exception has been handled.

As shown in FIG. 14A, this invention maintains and saves, when the exception is recognized, SEQUENTIAL FLOW INFORMATION—a PC History 280, in dynamic sequential program order, of the PC Values 300 just prior to the exception.

COMPLETION INFORMATION—Completion Indicators 290 in the PC History entries, indicating which instructions have completed (and conversely which have not completed).

Valid Indicators 295 are included in each PC History 280 entry to simplify its management.

The operation of the computer of FIG. 14A is that of FIG. 4B, except the Reorder Buffer, associated bypass logic, and the associated pointer in the PC History of FIG. 4B are eliminated in FIG. 14A and the scheduling algorithm is modified to ensure that for both traps and faults, all instructions can be re-executed, i.e. that the source operands are available.

If a standard Thornton's Algorithm were used in FIG. 14A violations of the above requirement could occur. For example, if instruction I1 had a source operand in Register-m and instruction I2, a logically subsequent instruction executed by a different Functional Unit, had a destination of Register-m, instruction I2 could complete and write Register-m after instruction I1 had sourced Register-m but before instruction I1 completed. Thus, if instruction I1 caused a trap or fault, its source operand would not be available for re-execution.

In FIG. 14A the standard Thornton's Algorithm Busy bit for each register is expanded to two Busy Bits per register: a BusyWrite meaning (like the standard Thornton Busy Bit) that an instruction which will write the register has passed Issue_1 110, but has not completed and a BusyRead meaning that an instruction which will read the register has passed Issue_1 110, but has not completed. Additionally, the Condition Code has two Busy Bits associated with it, BusyWrite and BusyRead.

As previously described, Thornton's Algorithm is extended to Main Memory access, where each main memory location is treated as a unique resource. A list of the main memory addresses of the outstanding STORE instructions are considered BusyWrite and a list of the main memory addresses of the outstanding LOAD instructions are considered BusyRead.

Instructions 10 enter via Issue_1 110 in their dynamic sequential program order. The Instruction 10 is converted to an Expanded Instruction 40 by including a pointer to the associated PC History entry. Issue_1 stalls if the instruction's destination register or memory location already has BusyWrite or BusyRead set or if one or more of the instruction's sources already has BusyRead set. Issue_1 remains stalled until all the inhibiting Busy bits are cleared.

Issue_1 also stalls if it needs a Reservation Station 330 for the instruction, but the needed Reservation Station is not available. Issue_1 needs a Reservation Station if none of the above inhibiting Busy conditions are present and one or more of the instruction's sources already has BusyWrite set. When this condition is encountered and the needed Reservation Station is available, Issue_1 places the Expanded Instruction 40 and any available source operands in the Reservations Station.

Additionally, Issue_1 stalls if the instruction is a Branch and its source register (Branch address) or condition code is "Busy".

Issue_1 issues the instruction directly (through Issue_2) to the target Functional Unit, bypassing the available or non-available Reservation Station, if none of the above inhibiting conditions are present. If the target Functional Unit has a ready-to-schedule instruction in its Reservation Station, that instruction takes priority and Issue_1 is delayed one cycle.

When Issue_1 issues the instruction to either a Reservation Station or directly (through Issue_2) to the target Functional Unit the BusyRead bit is set for SRC A, SRC B, (or the Condition Code for a Branch), and the Memory address of a LOAD and the BusyWrite bit is set for DEST, for the Condition Code if specified as a destination, and for the Memory address of a STORE.

While an instruction is in the Reservation Station 330 it monitors the Common Result Bus 270 for the needed source operand(s), as recognized by their destination address. When a needed source operand becomes available on the Common Result Bus 270, it is captured in the Reservation Station 330. When all needed source operands are present in the Reservation Station 330, the instruction can be scheduled by Issue_2 240 for execution by the Functional Unit 220. The Reservation Station 330 remains "in use" until the instruction is scheduled by Issue_2.

When the result of an instruction is written to the destination register, to the Condition Code, or to STORE Memory address via the Common Result Bus 270, the BusyRead bits associated with the completed instruction's source registers/cc/memory are cleared and the BusyWrite bit associated with its destination register/cc/memory is cleared.

FIG. 14A has a PC History 280 that receives PC Values 300 from the PC Counter 230. The order that PC Values 300 enter the PC History 280 is their dynamic sequential program order. The PC History 280 is managed as a FIFO with entries added at the Top (using the Top pointer) and entries removed from the Bottom (using the Bottom pointer). A third pointer, Fetch, is used by Issue_1 and points to the PC History entry that is used to access the next instruction from the instruction Memory 100. A Valid Indicator 295 is set in the entry as it is added to Top and is cleared in the entry as it is removed from Bottom. When trying to add an entry, if the entry at Top already has a Valid Indicator 295 set the addition of all new entries pauses until the entry becomes available.

When an entry is added to the PC History 280 from the PC Counter 230, the Completed Indicator 290 in the entry is set to zero and the Valid indicator is set to one. During instruction execution, when the result of the instruction is written to the destination register, the Completed Indicator is set to one in the PC History entry for that instruction, using the pointer appended by Issue_1 to the Instruction 10 to form the Expanded Instruction 40. The PC History entry at Bottom can be removed when its Completed Indicator is one. When that entry is removed, the Valid Indicator 295 is set to zero, indicating that the entry is available for reuse.

Branch instruction execution in FIG. 14A takes 3 cycles, i.e. the Branch umbra is 2 instructions. The Branch is executed by Issue_1 which accesses the source register (the Branch Address) and condition code, under control of Busy, during the Issue_1 cycle, called "cycle 1" here. That Branch address or the value at PC Top plus one is selected by the Program Counter 230, based on the success of the Branch, and written to a new PC_Top location during the cycle 2. The address resulting from the Branch is then used to access the correct instruction from Instruction Memory during cycle 3. That accessed instruction is the Issue_1 subject during cycle 4. Thus the Branch that results from the Issue_1 instruction in cycle 1 does not effect the instructions that pass Issue_1 during cycles 2 and 3, but does take affect in cycle 4. The two instructions in cycles 2 and 3 are the two instructions of the Branch umbra.

Those skilled in the art will recognize that this Branch strategy is not key to the present invention, but is included here for completeness of the embodiment. Many other Branch strategies are possible within the scope of this invention. The preferred embodiment described later uses a more sophisticated Branch strategy.

When an exception occurs the state save mechanism (hardware, software, or a combination) must save the entries in the PC History 280, i.e. from Bottom to Top, (via the Save Path 320), as well as the Register contents. The Busy bits, which are cleared during an interruption, and the Reservation Station contents need not be saved; in fact, the clearing of the Busy bits simplifies the sourcing of operand values established by the interruption handler, e.g., in response to a trap. Also the PC History pointers in the Expanded Instruction 40 need not be saved, because they are reestablished during the restore process.

To resume the interrupted process, the Registers are restored. Bottom, Top, and Fetch are set to zero; and the saved PC History contents are restored (by pushing the saved state onto the PC History, Bottom to Top) via the Restore Path 310. As each PC History entry is restored, Top is incremented. The instructions indicated in the saved PC History are re-issued, beginning at the entry pointed to by Fetch, by Issue_1 110, under control of the associated Completed indicator 290. If Fetch points to an entry containing a zero Completed Indicator 290, the instruction is fetched and issued by Issue_1 in the normal manner described above, including storing its PC History pointer in the Expanded Instruction. However, when the PC History entry pointed to by Fetch contains a non-zero Completed Indicator, the instruction is fetched but Issue_1 does not re-issue the instruction to the Functional Unit.

This resume process, where instructions are issued but no new PC History entry is generated from the Program Counter, continues until the Fetch pointer is 1 entry from the Top pointer. At that point normal instruction fetching and issuing, including adding new PC History entries (at Top), resumes.

The resume process ensures that already completed instructions are not re-executed and ensures that the PC History exactly represents the state at the point of interruption. Thus, another exception that occurs immediately after the restore process, i.e. immediately after the PC History is restored, will be correctly handled.

Those skilled in the art will understand that the restore/resume process described above can be modified and varied within the scope of the present invention. For example, when an instruction queue is available, the PC History contents can be restored as the instructions are refetched (based on the saved PC History), so long as those instructions are prevented from beginning execution until the full saved PC History is restored. Otherwise, an interruption could be generated by instruction execution before the restore/resume process was ready to correctly handle an interruption.

Although this modification to Thornton's Algorithm is simple, its effect on the Sequential Coherency of the resulting processor is significant. The scheduling mechanism after modification is, in fact, not Thornton's Algorithm, but is a simple implementation of the Sequential Coherency Instruction Scheduling aspect of the present invention.

Performance With a Modified Thornton's Algorithm—For a machine with the Branch strategy of FIG. 14A, one Load/Store Unit, one Multiplier, and one Adder, the performance for LFK 1 is as shown in FIG. 14B. Note that this example takes 13 cycles per iteration because of contention for the Adder's single Reservation Station and the BusyRead conflict. A standard Thornton's algorithm would allow instruction C to begin one cycle sooner, because it would not wait for instruction B (reading R11) to complete. Thus, the modification chosen here impacts performance, for this example, by one cycle per iteration.

Scoreboarding, although popular in many commercial processors, has limited performance potential. The scheduling mechanisms that follow have significantly improved performance potential.

Tomasulo's Algorithm with This Invention—FIG. 15A illustrates simplifying FIG. 5B via this invention to correctly handle exception with less logic complexity by eliminating the Reorder Buffer, associated bypass logic, and the associated pointer in the PC History.

Reference Numbers included in FIG. 15A:

| | |
|---|---|
| 10 Instructions | 285 Tag Value |
| 40 Expanded Instruction | 290 Completed Indicator |
| 100 Instruction Memory (or Cache) | 295 Valid Indicator |
| 110 Issue_1 | 300 PC Value |
| 210 Registers | 310 Restore Path |
| 220 Functional Unit | 320 Save Path |
| 230 Program Counter | 330 Reservation Station |
| 240 Issue_2 | 340 Tag Memory |
| 270 Common Result Bus | |
| 280 PC History | |

FIG. 15A expands FIG. 5B and is composed of the following major elements:

Instructions 10—specify the operations to be performed and the operands to be used Instruction Memory (or Cache) 100—stores the instructions 10 needed to make up a program Program Counter 230—provides the PC Values 300 to PC History Top that control the flow of a program by using the Branch address when a Branch instruction is successful (the path from the Issue_1 110 to the Program Counter 230) or, otherwise, incrementing the previous PC History Top contents to form a new PC Value 300

Issue_1 110—supplies Instructions 10 as they are fetched from Instruction Memory 100 in the dynamic sequential program order using the PC History Fetch contents, to a Reservation Station 330 associated with the instruction's target Functional Unit 220. The Instruction 10 is expanded to an Expanded Instruction 40 to include a pointer to the PC History entry assigned to the instruction, source operands, and the tag memory contents for needed source operands. The assigned Reservation Station number is stored in the associated PC History entry as a Tag Value 285.

Tag Memory 340 records the number of the Reservation Station assigned to an instruction in the Tag Memory location corresponding to that instruction's destination, when the instruction passes Issue_1. Supplies, during Issue_1, the previously recorded tags for the instruction's sources.

Reservation Stations 330—a set of multiple Reservation Stations 330 are associated with each Functional Unit 220. Each Reservation Station 330 can hold an Expanded Instruction 40 that has passed Issue_1 110 but cannot yet be scheduled by Issue_2 240 because one or more needed source operands are not yet available.

Issue_2 240—Schedules instructions for execution, by the Functional Unit 220, from a Reservation Station 330 associated with the Functional Unit 220.

Registers 210—Provides storage for instruction operands.

Functional Unit 220—Contains the operational logic to carry out the operation specified by the instruction 10 on source operands obtained from the registers 210 and produce a result that is written to the instruction's destination via the Common Result Bus 270.

Common Result Bus 270 that conveys the results of instructions from the Functional Units 220 to the Registers 210.

PC History 280 that maintains Sequential Flow Information and Completion Information as described below. The PC History is managed by the Top, Bottom, and Fetch Pointers. Entries are added at Top from the Program Counter and removed from Bottom. When an entry is added its Valid Indicator 295 is set and when an entry is removed its Valid Indicator 295 is cleared, it Completed Indicator 290 is cleared, and its Tag Value 285 is cleared. Each PC History entry also contains the Tag Value 285 (Reservation Station number) assigned to the instruction, as the instruction passes Issue_1. The entry pointed to by the Fetch pointer is the address used by Issue_1 to fetch the next instruction.

Save Path 320 for saving the contents of the PC History 280 when an exception is recognized.

Restore Path 310 for restoring the previously saved contents of the PC History 280 after a recognized exception has been handled.

As shown in FIG. 15A, this invention maintains and saves, when the exception is recognized, SEQUENTIAL FLOW INFORMATION—a PC History 280, in dynamic sequential program order, of the PC Values 300 just prior to the exception.

COMPLETION INFORMATION—Completion Indicators 290 in the PC History entries, indicating which instructions have completed (and conversely which have not completed) and the Tag Value 285 (Reservation Station Number) assigned to each instruction.

DEPENDENCY INFORMATION—The contents of the Tag Memory 340 and the Tags that are carried with the instructions in the Reservation Stations 330.

INTERMEDIATE RESULTS—The contents of the Reservation Stations 330.

Valid Indicators 295 are included in each PC History 280 entry to simplify its management.

The operation of the computer of FIG. 15A is that of FIG. 5B, except the Reorder Buffer, associated bypass logic, and the associated pointer in the PC History of FIG. 5B are eliminated in FIG. 15A.

In FIG. 15A:

Instructions 10 are issued (Issue_1 110) in their dynamic sequential instruction order.

Multiple Reservation Stations 330 are located at the input to each Functional Unit 220.

Instruction issue (Issue_1 110) does not halt if the destination register is Busy.

Instructions are issued (Issue_1) to a Reservation Station 330, if available.

The instruction 10 is expanded to an Expanded Instruction 40 and issued (Issue_1) to a Reservation Station 330 and requires, in addition to the instruction, either Source Operands or the tag memory contents associated with the Source Operand locations (registers, CC, and/or memory location), plus a pointer to its associated PC History entry.

When an instruction is issued by Issue_1 110 the Tag Memory 340 location associated with that instruction's destination location (register, CC, and/or memory location) is written with the assigned Reservation Station identifier (number). Additionally, that Tag is written to the associated PC History entry as a Tag Value 285.

Expanded Instructions 40 in the Reservation Stations 330 associated with a Functional Unit 220 can be executed (issued by Issue_2 240) in any order when the needed source operands are available. Reservation Station entries are maintained until the instruction completes.

Every result is tagged with the address of the assigned Reservation Station 330 and subsequently issued (Issue_1) instructions acquire the tag-values of the results they need as source operands from Tag Memory 340.

Expanded Instructions 40 that are waiting for source operands monitor the Common Result Bus 270 for the needed data, as identified by its tag value.

Instructions that execute after logically later instructions that specify the same destination register supply their result and tag value on the Common Result Bus 270, but do not update the destination register 210.

Instruction Issue (Issue_1 110) halts if all Reservation Stations 330 at the target Functional Unit 220 are occupied or if a Branch instruction has to wait for needed source register (Branch address) or condition code operands.

Register reuse is handled by not writing the result to the register 210 (only supplying it to waiting instructions via the Common Result Bus 270) when the tag of the instruction and the current tag memory 340 value for that register are not equal. When those tags are equal the register is written and the Tag Memory location for that register is set to zero, indicating that the register contains the latest result.

As previously described, Tomasulo's Algorithm is extended to Main Memory access, where each main memory location is treated as a unique resource. Each outstanding STORE instruction has a tag assigned to its result data, i.e. there is a Reservation Station for each outstanding STORE, and an extension of the tag memory contains a list of the memory addresses of the outstanding STORE instructions.

Tomasulo's Algorithm is also extended to the condition code.

FIG. 15A includes a PC History 280 that receives PC Values 300 from the PC Counter 230. The order that PC Values 300 enter the PC History 300 is their sequential program order. The PC History 280 is managed as a FIFO with entries added at the Top (using the Top pointer) and entries removed from the Bottom (using the Bottom pointer). A third pointer, Fetch, points to the PC History entry that is used by Issue_1 to access the next instruction from the instruction Memory 100.

When an entry is added to the PC History 280 from the PC Counter 230, the Completed Indicator 290, and the Tag Value 285 in the entry are set to zero and the Valid Indicator 295 is set to one. Issue_1 assigns the instruction to a Reservation Station and records that Reservation Station number as the Tag Value. During instruction execution, when the result of the instruction is written to the Common Result Bus 270, the Completed Indicator is set to one in the PC History entry for that instruction, using the pointer acquired at Issue_1. The PC History entry at Bottom can be removed when its Completed Indicator is one. When that entry is removed, the Valid Indicator 295 is set to zero, indicating that the entry is available for reuse.

Branch instruction execution in FIG. 15A takes 3 cycles, i.e. the Branch umbra is 2 instructions. The Branch is executed by Issue_1 which accesses the source register and condition code during the Issue_1 cycle, called "cycle 1" here under control of the associated tags. That Branch address or the value at PC Top plus one is selected by the Program Counter 230, based on the success of the Branch, and written to a new PC_Top location during the cycle 2. The address resulting from the Branch is then used to access the correct instruction from Instruction Memory during cycle 3. That accessed instruction is the Issue_1 subject during cycle 4. Thus the Branch that results from the Issue_1 instruction in cycle 1 does not affect the instructions that pass Issue_1 during cycles 2 and 3, but does take effect in cycle 4. The two instructions in cycles 2 and 3 are the two instructions of the Branch umbra.

Those skilled in the art will recognize that this Branch strategy is not key to the present invention, but is included here for completeness of the embodiment. Many other Branch strategies are possible within the scope of this invention. The preferred embodiment described later uses a more sophisticated Branch strategy.

Because of the handling of register reuse (not always writing the result to the register) traps need special handling:

1. The trap-causing instruction identifies its result on the Common Result Bus as Trap_causing, inhibiting instructions waiting for that result from gating it into their reservation stations, inhibiting the result from being written to the destination register, and causing the reservation station of the trap-causing instruction to gate the Common Result Bus data into its SRC A operand position.

2. The interruption handler replaces the instruction in the identified Reservation Station with a MOVE SRC A→DEST instruction and modifies the Reservation Station's SRC A as desired; thus, when the state is restored and execution is re-established the desired result is correctly propagated.

When an exception occurs the state save mechanism (hardware, software, or a combination) must save the Reservation Station contents, the Tag Memory contents, and the entries in PC History including the Top and Bottom pointers (via the Save Path 320), as well as the Register contents. Note that the Top and Bottom pointers must be saved, because the Expanded Instructions in the Reservation Stations have pointers to particular PC History entries, which must be maintained.

To resume the interrupted process, the Registers, the Tag Memory, and the Reservation Stations are restored. The saved PC History contents and Top and Bottom pointers are restored via the Restore Path 310. The Bottom pointer is copied into the Fetch pointer, so they point to the same PC History entry. The instructions indicated in the saved PC History are issued, by Issue_1 110, under control of the associated Completed Indicator 290 and Tag value 285. If Fetch points to an entry containing a zero Completed Indicator 290 and a NULL Tag Value 285 (indicating that the instruction was not previously issued to a Reservation Station), the instruction is fetched and issued by Issue_1 in the normal manner described above. When the PC History entry pointed to by Fetch contains a zero Completed Indicator and a non-NULL Tag Value, the instruction is skipped over by Issue_1. When the PC History entry pointed to by Fetch contains a non-zero Completed Indicator, the instruction is skipped over by Issue_1.

At that point normal instruction fetching and issuing, including adding new PC History entries, resumes.

The resume process ensures that already completed instructions are not re-executed and ensures that the PC History exactly represents the state at the point of interruption. Thus, another exception that occurs immediately after the restore process, i.e. immediately after the PC History is restored, will be correctly handled.

Performance With Tomasulo's Algorithm—For a machine with the Branch strategy of FIG. 15A, one Load/Store Unit, one Multiplier, and one Adder, the performance for LFK 1 is as shown in FIG. 15B. The resulting performance of 11 cycles per iteration equals the theoretical limit.

Figure 6:
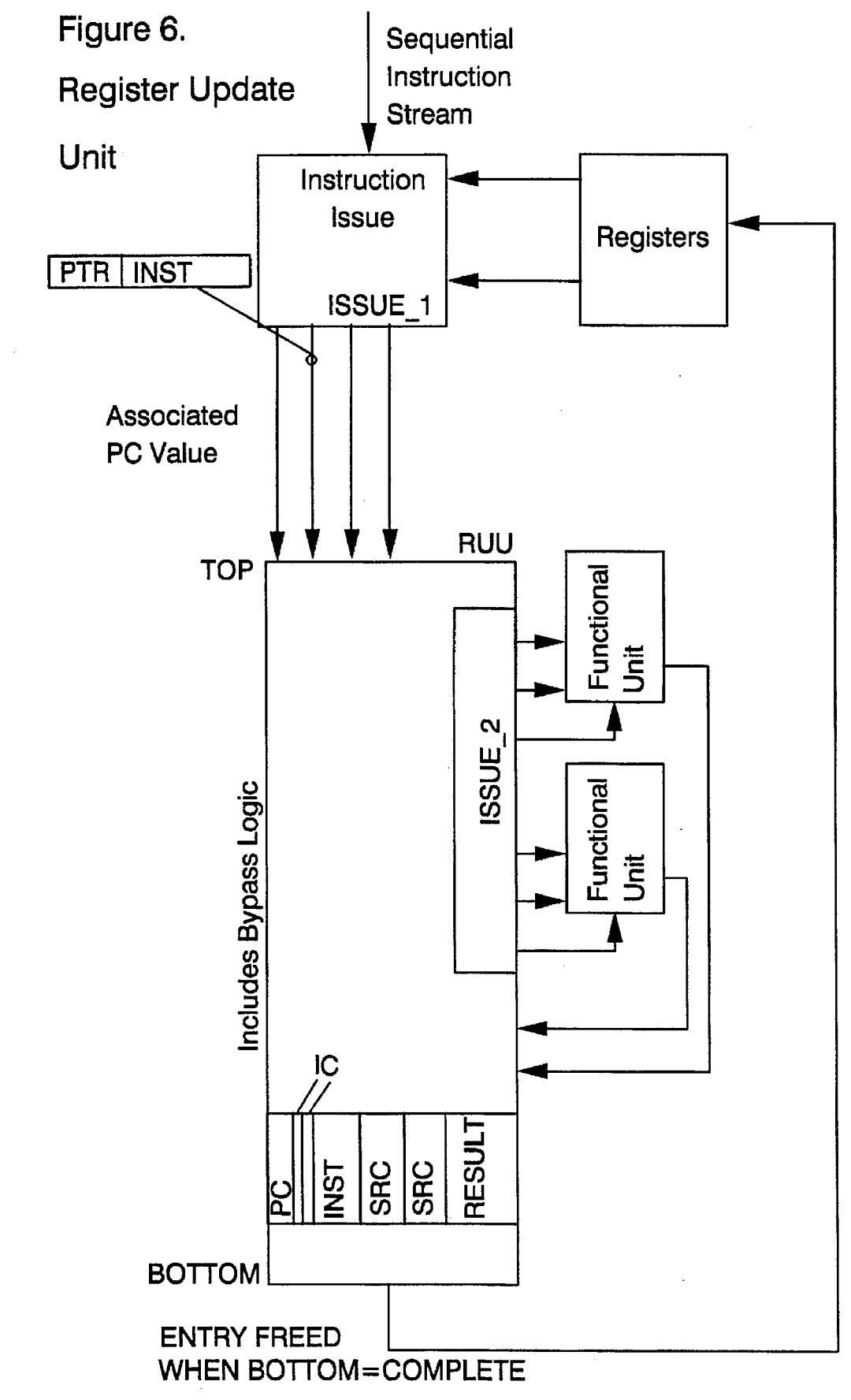

RUU with This Invention—FIG. 16A illustrates simplifying the RUU of FIG. 6A via this invention:

Removing the RESULT field from each RUU entry, removing the associated bypass logic, and adding Tag Memory and the use of tags to identify results on the Common Result bus.

Writing the RESULT directly to the destination when the instruction completes, eliminating the bypass logic. Waiting instructions match the needed tag (RUU entry number) against the RUU entry number that accompanies the result on the Common Result Bus.

When the RUU entry at BOTTOM indicates COMPLETED that entry can be freed.

Including Tomasulo's original register reuse logic. That is, register reuse is handled by not writing the result to the register (only supplying it to waiting instructions via the Common Result Bus) when the tag of the instruction and the current tag memory value for that register are not equal.

Reference Numbers included in FIG. 16A:

| | |
|---|---|
| 10 Instructions | 290 Completed Indicator |
| 40 Expanded Instruction | 295 Valid Indicator |
| 100 Instruction Memory (or Cache) | 300 PC Value |
| 110 Issue_1 | 305 Executed Indicator |
| 210 Registers | 310 Restore Path |
| 220 Functional Unit | 320 Save Path |
| 230 Program Counter | 340 Tag Memory |
| 240 Issue_2 | 350 Register Update Unit |
| 270 Common Result Bus | |

FIG. 16A expands FIG. 6A and is composed of the following major elements:

Instructions 10—specify the operations to be performed and the operands to be used Instruction Memory (or Cache) 100—stores the instructions 10 needed to make up a program Program Counter 230—provides the PC Values 300 to RUU Top that control the flow of a program by using the Branch address when a Branch instruction is successful (the path from the Issue_1 110 to the Program Counter 230) or, otherwise, incrementing the previous RUU Top PC Value 300 contents to form a new PC Value 300

Issue_1 110 expands Instructions 10 into Expanded Instructions 40 as they are fetched from Instruction Memory 100 in the dynamic sequential program order, using the Fetch Pointer of the RUU.

Expanded Instructions 40—the instructions 10 expanded by the addition of tags for needed source operands and a tag value for the instruction's result. Null tags for sources indicate that the source operand is present with the Expanded Instruction. The SRC A and SRC B fields in the RUU entry can hold either the needed source tag or the needed source operands, along with tag-present and source-operand-present indicators.

Register Update Unit (RUU) 350—combines the functions of the PC History with a centralized set of Reservation Stations. Each RUU entry contains a PC Value 300, a Completed Indicator 290, a Valid Indicator 295, the Executed Indicator 305, the Expanded Instruction 40, and operand storage for the two source operands.

Issue_2 240—Schedules instructions for execution, by the Functional Unit 220, from the RUU 350.

Registers 210—Provides storage for instruction operands.

Functional Unit 220—Contains the operational logic to carry out the operation specified by the instruction 10 on source operands obtained from the registers 210 and produce a result that is written to the instruction's destination via the Common Result Bus 270.

Common Result Bus 270 that conveys the results of instructions from the Functional Units 220 to the Registers 210.

Save Path 320 for saving the contents of the RUU 350 when an exception is recognized.

Restore Path 310 for restoring the previously saved contents of the RUU 350 after a recognized exception has been handled.

Tag Memory 340 records the RUU entry assigned to an instruction in the Tag Memory location corresponding to that instruction's destination, when the instruction passes Issue_1. Supplies, during Issue_1, the previously recorded tags for the instruction's sources.

As shown in FIG. 16A, this invention maintains and saves, when the exception is recognized, 1. Sequential Flow Information—The dynamic sequential program order of the PC Values 300 just prior to the exception as contained in the RUU 350.
2. Completion and State Information—Completion Indicators 290 and Executed Indicators 305 in the RUU entries, indicating which instructions have completed (and conversely which have not completed).
3. Dependency Information—The contents of the Tag Memory 340 and the Tags that are carried with the instructions in the RUU 350.
4. Intermediate Results—the captured source operands in the RUU entries.

The operation of the computer of FIG. 16A is similar to that of FIG. 6A, except the Result field is eliminated from each RUU entry, results are written directly to the destination register, the bypass logic within the RUU is eliminated, and the interruption process is that of Sequential Coherency Exception Handling.

In FIG. 16A:

There are two levels of issue logic: Issue_1 110 and Issue_2 240.

Instructions 10 are expanded to Expanded Instructions 40 and issued at Issue_1 110 in their dynamic sequential stream order into the RUU 350.

The RUU 350 is a centralized unit containing multiple Reservation Stations called RUU entries.

All RUU entries are available for execution (issue by Issue_2 240) as soon as the needed source operands are available and the needed Functional Unit 220 is available, i.e. they can execute out-of-order. When the instruction passes Issue_2, the Executed Indicator 305 is set.

When an instruction completes the Result and Tag are broadcast via the Common Result Bus and the Result is written to the specified destination, i.e. the Result is "committed" to update the permanent state of the machine, if the tag of the instruction matches the value in the Tag Memory 340 location corresponding to the instruction's destination. Otherwise, the result and Tag are broadcast via the Common Result Bus 270, but the Register 210 is not modified. The Completed Indicator 290 is set.

RUU entries have fields for the PC Value 300, the Expanded Instruction 40, the two source operands (or tags for needed sources), a Valid Indicator 295, an Executed Indicator 305, and a Completed Indicator 290.

Every destination is tagged in the Tag Memory with the address of the assigned RUU entry and subsequently issued instructions acquire the tag-values of the results they need as source operands. If the Tag Memory contains a Null tag value for that resource, the instruction acquires the needed source operand(s) from the Registers 210 as it moves to the RUU entry.

Instructions that are waiting for source operands monitor the Common Result Bus 270 for availability of the needed operands, as identified by the tag value associated with the operand on the Common Result Bus.

Instruction Issue_1 (and Fetch) halts if all RUU entries are occupied., i.e. if the entry stepped to by Top has a Valid indicator set.

Register reuse is handled by not writing the result to the register 210 (only supplying it to waiting instructions via the Common Result Bus 270) when the tag of the completing instruction and the current Tag Memory 340 value for that register are not equal. When those tags are equal the result is written to the register and the Tag Memory location for that register is set to zero, indicating that the register contains the latest result.

The RUU Algorithm is extended to Main Memory access, where each main memory location is treated as a unique resource. Each outstanding STORE instruction supplies its tagged result data via the Common Result Bus to be captured and held by LOAD instructions in other Reservation Stations as needed.

The RUU 350 is managed as a FIFO with entries added at the Top (using the Top pointer) and entries removed from the Bottom (using the Bottom pointer). A third pointer, Fetch, is used by Issue_1 points to the RUU entry that is used to access the next instruction from the instruction Memory 100. Fetch is maintained to point to TOP−1 (except during startup). An RUU entry is created when a PC Value is ready to be placed at Top. When an entry is added to the RUU 350 from the PC Counter 230, the Executed Indicator 305 and the Completed Indicator 290 in the entry are set to zero and the Valid Indicator 295 is set to one. When that entry has been used to fetch and Issue_1 an instruction, that Expanded Instruction 40 is placed in the entry along with any needed source operands that are available and the tag-present and source-operand-present indicators are appropriately set. While the instruction waits for Issue_2, needed source operands are captured, as they appear on the Common Result Bus 270 and held in the source operand fields of the entry. When all the entries source-operand-present indicators are set, the instruction can be issued by Issue_2. When Issue_2 occurs, the Executed Indicator 305 is set.

During instruction execution, when the result of the instruction is written via the Common Result Bus 270 (the result is written to the destination register only when the result tag and the value in the Tag Memory location corresponding to the destination are equal), the Completed Indicator is set to one in the RUU entry for that instruction. The RUU entry at Bottom can be removed when its Completed Indicator is one. When that entry is removed, the Valid Indicator 295 is set to zero, permitting the entry to be reused.

Branch instruction execution in FIG. 16A takes 3 cycles, i.e. the Branch umbra is 2 instructions. The Branch is executed by Issue_1 which accesses the source register and condition code during the Issue_1 cycle, called "cycle 1" here, under control of the associated Tag Memory entries. That Branch address or the value at RUU Top plus one is selected by the Program Counter 230, based on the success of the Branch, and written to a new RUU Top location during the cycle 2. The address resulting from the Branch is then used to access the correct instruction from Instruction Memory during cycle 3. That accessed instruction is the Issue_1 subject during cycle 4. Thus the Branch that results from the Issue_1 instruction in cycle 1 does not affect the instructions that pass Issue_1 during cycles 2 and 3, but does take effect in cycle 4. The two instructions in cycles 2 and 3 are the two instructions of the Branch umbra.

Those skilled in the art will recognize that this Branch strategy is not key to the present invention, but is included here for completeness of the embodiment. Many other Branch strategies are possible within the scope of this invention. The preferred embodiment described later uses a more sophisticated Branch strategy.

Because of the handling of register reuse (not always writing the result to the register) traps need special handling:

1. The trap-causing instruction identifies its result on the Common Result Bus as Trap_causing, inhibiting instructions waiting for that result from gating it into their RUU entries, inhibiting the result from being written to the destination register, and causing the RUU entry of the trap-causing instruction to gate the Common Result Bus data into its SRC A operand position.

2. The interruption handler replaces the instruction in the identified RUU entry with a MOVE SRC A→DEST instruction and modifies the RUU entry's SRC A as desired; thus, when the state is restored and execution is re-established the desired result is correctly propagated.

When an exception occurs the state save mechanism (hardware, software, or a combination) must save, from Bottom to Top, the Valid entries (via the Save Path 320) and the Top and Bottom Pointers, as well as the Tag Memory and Register contents.

To resume the interrupted process, the Registers and Tag Memory are restored. The saved RUU contents and Top and Bottom pointers are restored via the Restore Path 310. The Fetch pointer is set to a value that is 2 entries from Top. The Executed Indicator 305 is cleared in those entries that have the Completed Indicator 295 not set. The instructions in the restored RUU 350 are scheduled by Issue_2 240, under control of the associated tags and Executed Indicator 305. Instruction fetching resumes from the point of interruption.

Note that instructions which have the Completed Indicator 290 on will also have the Executed Indicator 305 on and will, therefore, not be reissued.

This resume process ensures that already completed instructions are not re-executed and ensures that the RUU History exactly represents the state at the point of interruption. Thus, another exception that occurs immediately after the restore process, i.e. immediately after the RUU is restored, will be correctly handled.

Performance With RUU—FIG. 16B shows the instruction execution pattern for the LFK 1 example executed by the configuration of FIG. 16A. The resulting performance of 11 cycles per iteration equals the theoretical limit. Note that the RUU, with the present invention, is much simpler, because the results are not saved in the RUU entry. This means that bypass logic to move results in one entry to the source operand field of another entry is not needed.

Additionally, prior art RUU implementations with in-order commit flushed the RUU entries when an interruption was recognized thus discarding any useful work that already produced the results in RUU entries. The technique described here does not discard useful results that have already been produced.

Sequential Coherency Exception Handling & Sequential Coherency Instruction Scheduling Reference Numbers included in FIG. 17A:

| 10  | Instruction                   | 210 | Registers          |
|-----|-------------------------------|-----|--------------------|
| 30  | Instruction Expander          | 220 | Functional Unit    |
| 40  | Expanded Instruction          | 230 | Program Counter    |
| 50  | Issue_1 (I1) Updater          | 240 | Issue_2            |
| 60  | Activity Signaling            | 270 | Common Result Bus  |
| 70  | Outstanding Activity (OA) Updater | 290 | Completed Indicator |
|     |                               | 295 | Valid Indicator    |
| 80  | Dependency Information (DI) Updater | 300 | PC Value     |
|     |                               | 305 | Executed Indicator |
| 100 | Instruction Memory (or Cache) | 310 | Restore Path       |
| 110 | Issue_1                       | 320 | Save Path          |
| 120 | Outstanding Activity Memory   | 960 | Instruction FIFO   |

FIG. 17A is composed of the following major elements:

Instructions 10—specify the operations to be performed and the operands to be used Instruction Memory (or Cache) 100—stores the instructions 10 needed to make up a program Program Counter 230—provides the PC Values 300 the Instruction FIFO 960 Top that control the flow of a program by using the Branch address when a Branch instruction is successful (the path from the Issue_1 110 to the Program Counter 230) or, otherwise, incrementing the previous Instruction FIFO Top contents to form a new PC Value 300

Issue_1 110—supplies instructions as they are fetched from Instruction Memory 100 in the dynamic sequential program order using the Instruction FIFO 960 Fetch Pointer contents.

A Outstanding Activity Memory 120 which has a list, indexed by Resource InterLock (resource and access type), of Deficits or counts of outstanding activity Instruction Expander 30 that adds Dependency Information from the Outstanding Activity Memory 120 to an Expanded Instruction 40

Issue_1 Updater 50 that updates Outstanding Activity Memory 120 to reflect the entry of the Expanded Instruction 40 into the Instruction FIFO 960

Instruction FIFO 960—combines the functions of the PC History and an Instruction Queue. PC History 280 that maintains Sequential Flow Information and Completion Information as described below. The Instruction FIFO is managed by the Top, Bottom, and Fetch Pointers. Entries are added at Top from the Program Counter and removed from Bottom. The entry pointed to by the Fetch pointer is the address used by Issue__1 to fetch the next instruction.

Each Instruction FIFO entry contains a PC Value 300, a Valid Indicator 295, an Executed Indicator 305, a Completed Indicator 290, and the Expanded Instruction 40.

Issue__2 240 that schedules Instructions 10 from the Instruction FIFO 960 for execution when the Dependency Information in the Expanded Instruction 40 indicates that the Instruction can safely execute Registers 210—Provides storage for instruction operands.

Functional Unit 220—Contains the operational logic to carry out the operation specified by the instruction 10 on source operands obtained from the registers 210 and produce a result that is written to the instruction's destination via the Common Result Bus 270.

Common Result Bus 270 that conveys the results of instructions from the Functional Units 220 to the Registers 210.

Activity Signaling 60 that signals the occurrence of reads and writes as the Instruction executes Outstanding Activity Updater 70 that updates Outstanding Activity Memory 120 to reflect Activity Signaling 60

Dependency Information Updater 80 that updates Dependency Information in Expanded Instructions 40 in the Instruction FIFO 960 based on the Activity Signaling 60

Save Path 320 for saving the contents of the Instruction FIFO 960 when an exception is recognized.

Restore Path 310 for restoring the previously saved contents of the Instruction FIFO 960 after a recognized exception has been handled.

As shown in FIG. 17A, this invention maintains and saves, when the exception is recognized, 1. Sequential Flow Information—The dynamic sequential program order of the PC Values 300 just prior to the exception as contained in the Instruction FIFO 960.

2. Completion and State Information—Completed Indicators 290 and Executed Indicators 305 in the Instruction FIFO entries, indicating which instructions have passeed Issue__2 and completed (and conversely which have not completed).

3. Dependency Information—The contents of the Outstanding Activity Memory 120 and the Debits that are carried with the instructions in the Instruction FIFO 960.

FIG. 17A shows enhancing the machine of FIG. 8B (Dependency Resolution via Resource Deficits) with Sequential Coherency Exception Handling by changing the Instruction Queue to an Instruction FIFO 960 with entries that include a PC Value and a Completed Indicator in addition to the Expanded Instruction.

The rules of Sequential Coherency Instruction Scheduling of FIGS. 17A (and 8B) are used (repeated here for ease of readability):

1. Deficits are the number of reads and writes outstanding for a given resource. Deficits are established at Issue__1 based on the original program order and are maintained as two counts for each resource, Read Deficit and Write Deficit.

2. An instruction which will write a resource can be executed only when there are no logically previous outstanding writes to or reads from that resource. That is, it acquires a copy of the Read Deficit, called a Read Debit, and a copy of the Write Deficit, called a Write Debit, for that resource and then counts those debits down when reads from or writes to that resource occur. When both debits reach zero (and rule 3, below, enables) the instruction can safely be executed.

3. An instruction which will read a resource can be executed only when there are no logically previous outstanding writes to that resource. That is, it acquires a copy of the Write Deficit, called a Write Debit, for each such resource and then counts that debit down when writes to that resource occur. When the debits for all such resources reach zero (and rule 2, above, enables) the instruction can safely be executed.

The difference from the implementation of FIG. 8B is that the signaling that a read has been accomplished (to decrement the count of outstanding reads) is not done until the instruction reaches the point where it is guaranteed that the sources will not be required to re-execute the instruction. Thus the source resources needed to execute an instruction cannot be overwritten until the instruction is guaranteed to complete, without causing an interruption. For the configuration of FIG. 17A, two kinds of exception are discussed here:

1. Arithmetic traps do not require the source operands to be maintained beyond the normal point where the read of the sources is accomplished, because the exception handling action is to provide a particular result value in the result register based on the trap type.

2. Virtual Memory Page Faults require that the source operands for memory accesses be maintained until the Memory Reference instruction (LOAD or STORE) progresses beyond the last point where a page fault can be detected.

In FIG. 17A:

There are two levels of issue logic: Issue__1 110 and Issue__2 240.

Instructions 10 are issued at Issue__1 110 in their dynamic sequential stream order using the Instruction FIFO 960 Fetch Pointer.

All Instruction FIFO entries are available for execution (issue by Issue__2 240) as soon as the needed source operands are available and the needed Functional Unit 220 is available, i.e. they can execute out-of-order. The Executed Indicator 305 is set when Issue__2 occurs.

When an instruction completes the Result is written to the specified destination, i.e. the RESULT is "committed" to update the permanent state of the machine and the Completed Indicator 290 is set, via a pointer back to the instruction entry in the FIFO that follows the instruction during execution.

Instruction FIFO entries have fields for the PC-value 300, the Expanded Instruction 40, a Valid Indicator 295, an Executed Indicator 305, and a Completed Indicator 290.

Instruction Issue__1 (and Fetch) halts if all Instruction FIFO entries are occupied, i.e. all entries have the Valid Indicator set.

Register reuse is handled by the compiler's limiting disjoint reuse.

The Sequential Coherency Instruction Scheduling algorithm includes Main Memory access, where each main memory location is treated as a unique resource. Each memory address that is associated with an outstanding STORE instruction or an outstanding LOAD instruction has assigned Outstanding Activity Memory locations, which are dynamically assigned and use associative search logic to find equal memory addresses for management of the associated deficits.

The Instruction FIFO 960 is managed as a FIFO with entries added at the Top from the Program Counter 230

(using the Top pointer) and entries removed from the Bottom (using the Bottom pointer). A third pointer, Fetch, is used by Issue_1 and points to the Instruction FIFO entry which contains the PC Value that is used to access the next instruction from the instruction Memory 100. An Instruction FIFO entry is created when a PC Value is ready to be placed at Top. At that time the Valid Indicator 295 is set and the remainder of the entry (Executed Indicator 305, Completed Indicator 290, and Expanded Instruction 40) are set to zero, because they are not yet available. When that entry has been used to Issue_1 an instruction, that Expanded Instruction 40 is placed in the entry.

When the instruction passes Issue_2, the Executed Indicator 305 is set.

During instruction execution, when the result of the instruction is written via the Common Result Bus 270 to the destination register, the Completed Indicator 290 is set to one in the Instruction FIFO entry for that instruction, via a pointer back to the instruction entry in the FIFO that follows the instruction during execution. The Instruction FIFO entry at Bottom can be removed when its Completed Indicator is one. When that entry is removed, the Valid indicator 295 is set to zero, permitting reuse of that entry.

Branch instruction execution in FIG. 17A takes 3 cycles, i.e. the Branch umbra is 2 instructions. The Branch is executed by Issue_1 which accesses the source register and condition code during the Issue_1 cycle, called "cycle 1" here, under control of the deficit logic. That Branch address or the value at Instruction FIFO Top plus one is selected by the Program Counter 230, based on the success of the Branch, and written to a new Instruction FIFO_Top location during the cycle 2. The address resulting from the Branch is then used to access the correct instruction from Instruction Memory during cycle 3. That accessed instruction is the Issue_1 subject during cycle 4. Thus the Branch that results from the Issue_1 instruction in cycle 1 does not affect the instructions that pass Issue_1 during cycles 2 and 3, but does take effect in cycle 4. The two instructions in cycles 2 and 3 are the two instructions of the Branch umbra.

Those skilled in the art will recognize that this Branch strategy is not key to the present invention, but is included here for completeness of the embodiment. Many other Branch strategies are possible within the scope of this invention. The preferred embodiment described later uses a more sophisticated Branch strategy.

Arithmetic traps write the result and signal completion as normal, thus causing the associated debits and deficits to be decremented; however, the trap-event causes Issue_2 to cease issuing instructions and the interruption occurs at that point. Thus, upon restoring the environment and correcting the contents provide by the trap-causing instruction, instruction execution can proceed as if it were not interrupted.

Virtual Memory Page Faults interrupt prior to signaling reads or writes, thus the entire instruction is re-executed following the interruption handling process.

When an exception occurs the state save mechanism (hardware, software, or a combination) must save the Instruction FIFO contents (via the Save Path 320) and the FIFO Top and Bottom pointers, as well as the Outstanding Activity Memory 120 and Register 210 contents.

To resume the interrupted process, the Registers and Outstanding Activity Memory are restored. The saved Instruction FIFO contents and Top and Bottom pointers are restored via the Restore Path 310. The Fetch pointer is set to a value that is 1 entry behind Top. The Executed Indicator 305 is cleared in those entries that have the Completed Indicator 295 not set. The instructions in the restored Instruction FIFO 960 are scheduled by Issue_2 240, under control of the associated debits and indicators. Instruction fetching resumes from the point of interruption. Note that instructions which have the Completed Indicator 290 on will also have the Executed Indicator 305 on and will, therefore, not be reissued.

This resume process ensures that already completed instructions are not re-executed and ensures that the Instruction FIFO exactly represents the state at the point of interruption. Thus, another exception that occurs immediately after the restore process, i.e. immediately after the Instruction FIFO is restored, will be correctly handled.

Performance With Sequential Coherency Instruction Scheduling—FIG. 17B shows that LFK 1 execution for the machine of FIG. 17A equals the theoretical limit of 11 cycles per iteration.

Other combinations: Those skilled in the art will appreciate that the described combinations of instruction scheduling mechanisms using Sequential Coherency Exception Handling are only examples of the many instruction scheduling mechanisms that can benefit from Sequential Coherency Exception Handling.

For example, the RUU instruction scheduling described above can be even further improved (logic reduced) by augmenting the instruction scheduling with Sequential Coherency Instruction Scheduling to reduce each RUU entry to a single operand holding register. That storage register would capture the first of the two source operands to become available. Then when the second operand became available the instruction would begin execution. When there are more ready-to-issue instructions within the RUU than Issue_2 can accommodate, Sequential Coherency Instruction Scheduling augmenting the RUU mechanism is needed to protect operands from being overwritten.

Thus, the examples given here are to demonstrate the usefulness of the present invention, not to limit the present invention's scope.

EMBODIMENTS OF THE INVENTION, PREFERRED

The application of the present invention is described in more detail for two embodiments:

1. The Preferred Embodiment, A Dynamic Scheduling Embodiment
2. Vector Instruction Extension to the Preferred Embodiment These embodiments are similar to embodiments of patent application Ser. No. 07/448,720.[Bran1] The embodiments described here are primarily simplified by Sequential Coherency Instruction Scheduling and Sequential Coherency Exception Handling. With the simplifications these embodiments use the following aspects of patent application Ser. No. 07/448,720[Bran1] and of the present invention:

| | |
|---|---|
| Dedicated Result Storage | (07/448,720) |
| Folded Connections | (07/448,720) |
| Conditional Execution | (07/448,720) |
| Condition Code Mask Field | (07/448,720) |
| Set CC Field | (07/448,720) |
| Stale CC | (07/448,720) |
| Multiple CC's | (07/448,720) |
| Sequential Coherency Memory Tagging | (07/448,720) |
| Sequential Coherency Instruction Scheduling | (present invention) |
| Sequential Coherency Exception Handling | (present invention) |

Figure 18:
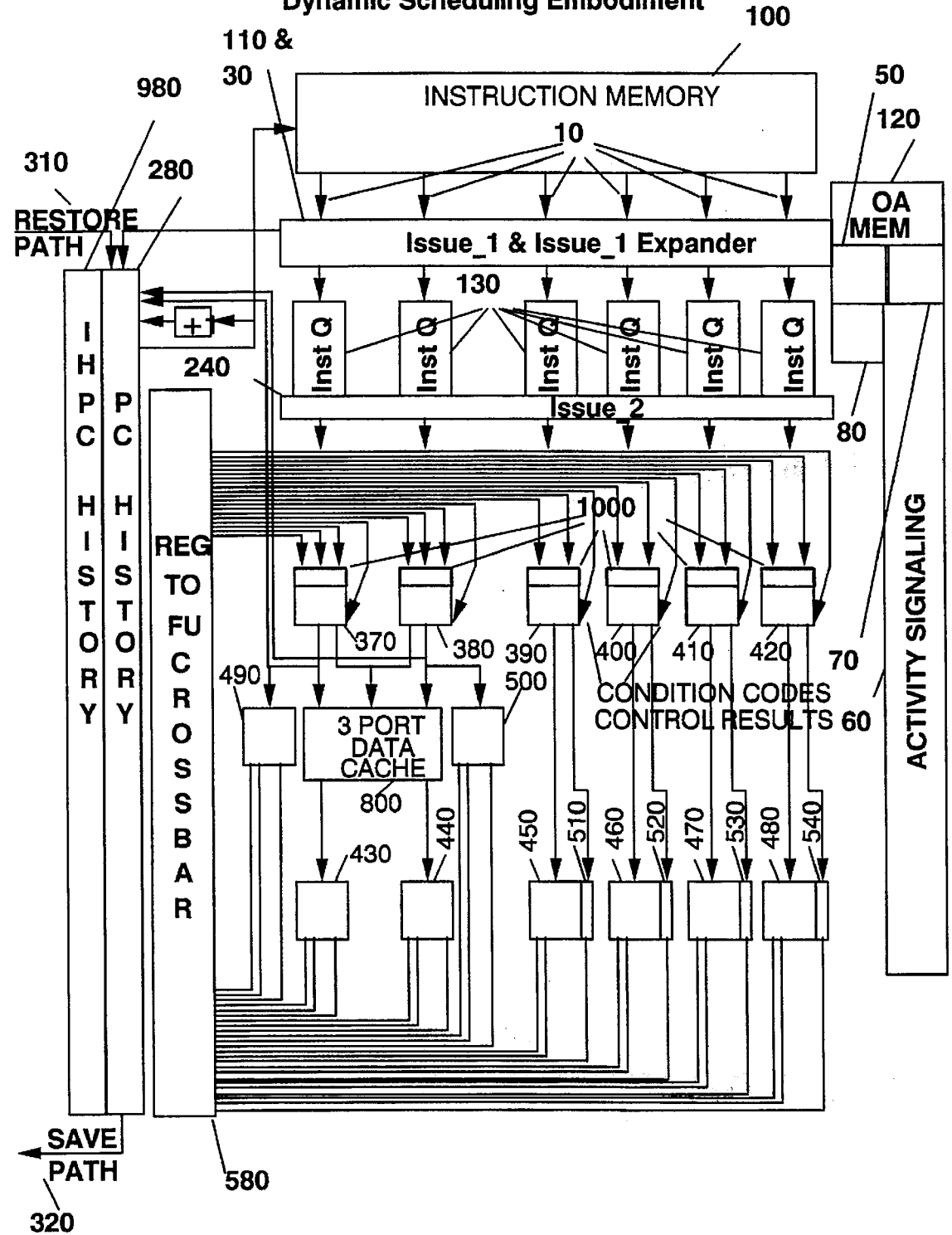
FIG. 18 shows the block diagram of the Dynamic Scheduling Embodiment.

The embodiments described here are based on the configuration of 6 Functional Units, shown in FIG. 18, and a common instruction set.

Scheduling Algorithm Overview: The combination of Sequential Coherency Instruction Scheduling, Sequential Coherency Exception Handling, and the use of Conditional Execution, which sources the controlling condition code at the last possible moment to decrease latency and a similar sourcing of the data operand of the STORE instruction at the last possible moment, i.e. well after the other instruction operands were sourced, results in a dilemma concerning when to release the source operands for overwriting. If instruction execution begins before the delayed operand (controlling condition code or storage operand) is available and the other sources are released for overwriting and the instruction that was to supply the delayed operand causes an exception, the instruction that needs that delayed condition code or operand cannot complete and cannot be safely re-executed after the exception is handled.

The most straight-forward solutions are to either require the controlling condition code or storage operand to be available when the other operands are sourced, i.e. when the instruction begins execution (possibly delaying the start of that execution), or delay release of all sources until the delayed condition code or operand has been read. Although both of these solutions produce logically correct results, the first adds latency in typical decision intensive code and the second monopolizes the sources for longer than necessary.

The solution, chosen for these embodiments, is to release the non-delayed source operands as soon as they are read, but to save in "Term Registers", strictly for restart from exception, those source operands (terms) until the instruction is guaranteed to complete. Details of the Term Registers operation follow and are further expanded in "LSB Unit Operation". The resulting Sequential Coherency Instruction Scheduling rules used, which are a selective mixture of the basic and the more aggressive mechanisms described previously, are:

1. Deficits are the number of reads and writes outstanding for a given resource. Deficits are established at Issue_1 based on the original program order and are maintained as three counts for each non-memory resource, Reads Completed, Writes Begun, and Writes Completed. For the main memory resource the number of deficit counts is expanded to four by adding a Memory Reads Begun.

2. An instruction which will write a non-memory resource can be executed only when there are no logically previous outstanding reads from that resource and when there will be no logically previous writes of that resource when the instruction writes that resource. That is, it acquires a copy of Reads Completed, called a Reads Completed Debit, a copy of Writes Begun, called a Writes Begun Debit, and a copy of the Writes Completed, called a Writes Completed Debit, for that resource and then counts the appropriate debits down when an instruction which will write a resource begins execution and when reads from or writes to that resource occur. When the Reads Completed Debit and the Writes Begun Debit both reach zero (and rule 3, below, enables) the instruction can be safely executed. When the instruction is ready to write the result, i.e. complete, the Writes Completed Debit must also be zero, or the pipeline pauses until it becomes zero.

3. An instruction which will read a non-memory or non-delayed-operand resource can be executed only when there are no logically previous outstanding writes to that resource. That is, it acquires a copy of Writes Completed, called a Writes Completed Debit, for each such resource and then counts that debit down when writes to that resource occur. When all debits for such resources reach zero (and rule 2, above, enables) the instruction can be safely executed.

4. Instruction execution that involves the use (read) of a delayed operand (e.g. controlling condition code) can begin when the other operands meet rules 2 and 3 and the instruction that will produce the needed delayed operand has begun execution. Such instructions can source the needed delayed operand when the instruction that produces the needed delayed operand has actually written that needed data. The instructions that use delayed operands acquire at Issue_1, in addition to the Writes Completed Debits detailed in rule 3, a copy of Writes Begun for the delayed source(s), called the Writes Begun Debit. When the requirements of rule 3 are met and the Writes Begun Debit for the delayed operand(s) is zero, the instruction can begin execution (Issue_2). When the Writes Completed Debit for the delayed operand(s) is zero the instruction can source the delayed source(s) to complete the instruction execution; the pipeline pauses if necessary until the Write Completed Debit becomes zero.

5. Instructions that will read memory (LOADS) can begin execution as soon as all logically previous memory write instructions (STORES) have begun and rules 2, 3, and 4 have been satisfied, but can actually access (read) memory only after all logically previous memory writes have occurred. Thus, in addition to the other deficits acquired as debits by the LOAD instruction, it acquires a copy of Memory Writes Begun and Memory Write Completed as debits. When the Memory Writes Begun Debit is zero the LOAD instruction can begin execution and when the Memory Writes Completed Debit is zero the actual memory access is permitted.

6. Instructions that will write memory (STORES) can begin execution as soon as all logically previous LOADS and STORES have begun execution and rules 2, 3, and 4 have been satisfied, but can actually access memory only after all logically previous memory reads and writes have occurred. The STORE instruction's debit acquisition and use operates like the LOAD except it acquires Begun and Completed debits for both memory writes and memory reads.

7. LOADS and STORES that specify $IR_a$ (save the calculated memory address in $R_a$, described later) signal Write Complete to the same LSB Unit for $R_a$ as part of Issue_1, so that there is no delay for a subsequent instruction in the same functional unit that uses the updated $R_a$. The signaling of Write Complete for $R_a$ to other Functional Units is at the time of the actual write. The early signaling to the same LSB Unit is an example of knowing that the needed data will be available by any subsequent instruction when needed.

8. All conditionally executing instructions signal their activities (as if they were successful) regardless of whether they are successful or unsuccessful.

For rules 5 and 6, the occurrence of a memory operation is defined here as the interlocking of the memory item by setting the Cache-line Lock Bit as described later in "Main Memory Accesses" and rule 7 is detailed in "LSB Unit Operation".

Those skilled in the art will appreciate that the embodiments described here are simply examples of using the aspects of this invention and that many modifications and extensions are possible within the scope of this invention. For example, the more aggressive Sequential Coherency Scheduling mechanism, which was described previously and which allows instructions to begin execution before the destination resource is free, can be applied to more instructions than the memory access instructions by the addition of the appropriate debits and signals.

Term Registers: In each functional unit a small set of term registers are included for the storage of the source terms (operands) of actively executing instructions. In each Load/Store/Branch Unit and each Multiply Unit, 6 term registers are provided to save two 64-bit operands for each of three active instructions. In each Add Unit only two term registers for one set of two 64-bit operands are required. The term registers of each functional unit are managed (by hardware) as a pool of resources.

There are four positive effects of saving the source operands of actively executing instructions:

1. The number of instructions that can be active in any functional unit pipeline is deterministic and relatively small (e.g. 1 to 3 for this embodiment).
2. The Instruction Queue and PC History, which need to be relatively large, are not impacted, i.e. they do not get larger because of the active operand queue (Term Registers).
3. All functional units are capable of supporting both traps and faults, i.e. all instructions that have not completed can be safely re-executed in a Sequentially Coherent manner.
4. All non-delayed source operands are released for subsequent use as soon as they have been read; therefore performance is maximized.

THE PREFERRED EMBODIMENT

Reference Numbers included in FIG. 18:

| 10 | Instruction | 400 | ADD2 Functional Unit |
|---|---|---|---|
| 30 | Instruction Expander | 410 | MUL1 Functional Unit |
| 50 | Issue_1 (I1) Updater | 420 | MUL2 Functional Unit |
| 60 | Activity Signaling | 430 | Registers 0–7 |
| 70 | Outstanding Activity (OA) Updater | 440 | Registers 8–15 |
|  |  | 450 | Registers 16–23 |
| 80 | Dependency Information (DI) Updater | 460 | Registers 24–31 |
|  |  | 470 | Registers 32–39 |
| 100 | Instruction Memory (or Cache) | 480 | Registers 40–47 |
|  |  | 490 | Registers 48–55 |
| 110 | Issue_1 | 500 | Registers 56–63 |
| 120 | Outstanding Activity Memory | 510 | Condition Codes 16–23 |
| 130 | Instruction Queue | 520 | Condition Codes 24–31 |
| 240 | Issue_2 | 530 | Condition Codes 32–39 |
| 280 | PC History | 540 | Condition Codes 40–47 |
| 310 | Restore Path | 580 | Register to FU Crossbar |
| 320 | Save Path | 800 | 3 Port Data Cache |
| 370 | LSB1 Functional Unit | 980 | IHPC (Interruption Handler PC) History |
| 380 | LSB2 Functional Unit |  |  |
| 390 | ADD1 Functional Unit | 1000 | Term Registers |

FIG. 18, Dynamic Scheduling Embodiment, has a set of 6 Functional Units:

Two LOAD, STORE, BRANCH units (LSB1 370 and LSB2 380)

Two Integer and Floating-Point ALU's (ADD1 390 and ADD2 400)

Two Integer and Floating-Point Multipliers (MUL1 410 and MUL2 420)

Instruction packets, fetched from Instruction Memory 100 and containing six Instructions 10 each, are issued to control the six Functional Units. The entire packet of 6 instructions occupies a single address in Instruction Memory 100. The addresses of sequential packets differ by one. The position of each instruction within the packet corresponds directly to its target functional unit.

The compiler should ensure that there are no dependencies among instructions within a single packet or unpredictable operation may occur. For example, pairing an instruction that is to modify a register with an instruction that is to source that register may result in the source being either the previous value or the modified value.

Sixty-four registers are divided into eight groups of eight registers and allocated as follows:

1. Reg 0–7, LSB1 General Registers 430
2. Reg 8–15, LSB2 General Registers 440
3. Reg 16–23, ADD1 General Registers 450
4. Reg 24–31, ADD2 General Registers 460
5. Reg 32–39, MUL1 General Registers 470
6. Reg 40–47, MUL2 General Registers 480
7. Reg 48–55, LSB1 Address Registers 490
8. Reg 56–63, LSB2 Address Registers 500

Each register contains 64 bits of information. Any register may be a source to any Functional Unit, selected through the Register to Functional Unit Crossbar 580, but only those registers associated with a Functional Unit can be a destination. The special use of Address Registers 490 and 500 is described in the instruction descriptions.

Each Register in the 16–47 address range 450, 460, 470, and 480, i.e. those associated with the ADD 390 and 400 and MULTIPLY 410 and 420 Functional Units, additionally has a 5-bit condition code associated with it. Like the registers, any of these 32 condition codes can be a source to any Functional Unit, but only those condition codes associated with a Functional Unit can be set by that Functional Unit. The groups of eight condition codes have the following addresses:

CC 16–23, ADD1 Condition Codes 510
CC 24–31, ADD2 Condition Codes 520
CC 32–39, MUL1 Condition Codes 530
CC 40–47, MUL2 Condition Codes 540

In each functional unit a small set of term registers are included for the storage of the source terms of actively executing instructions. In each Load/Store/Branch Unit and each Multiply Unit 6 term registers are provided to save two 64-bit operands for each of three active instructions. In each Add Unit only two term registers for one set of two 64-bit operands are required.

The Data Cache 800 can be accessed for loading or storing data by the LSB Units 370 and 380. Instruction packets are fetched from Instruction Memory 100, based on the contents of the PC History 280. When Branch instructions are not present, the PC value at the top of the PC History 280 is incremented by one and placed on PC History as the new top entry. Branch instructions can modify the contents of the entry to the PC History 280 as described later.

In all the embodiments described here instruction execution order within each Functional Unit pipeline is maintained in the order in which those instructions pass Issue_2, which may differ from the Issue_1 order.

Bit Numbering: Lower bit numbers are less significant than higher bit numbers, i.e. bit numbering is right to left starting at bit 0 (least significant).

The Basic Instruction Set

The instruction set is composed of instructions targeted at the various Functional Units in four basic formats with variations for the STORE, STORE INDEXED, and BRANCH & LINK instructions. An all zeros value in a source Register field specifies an all zeros source, while an all zeros value in a Destination Register field specifies a Null destination.

Instruction Formats

RRR, REGISTER-REGISTER-REGISTER INSTRUCTIONS operate on two registers, $R_a$ and $R_b$, to produce a result which is stored in register $R_d$ if the WRT bit is true and the conditional execution decision enables (see below). These instructions modify the condition code specified by $R_d$ when the SET bit is true and the conditional execution decision enables. Data length of 32 or 64 bits is specified by the Op Code.

RRR

| OP CODE | CC MASK | CC SEL | SET | WRT | $R_d$ | $R_a$ | $R_b$ |

RKR, REGISTER-CONSTANT-REGISTER instructions are like the RRR's in all respects, except the $R_b$ source operand is replaced by the 6-bit K-field from the instruction, sign extended to 32 or 64-bits, as specified by the OP CODE.

RKR

| OP CODE | CC MASK | CC SEL | SET | WRT | $R_d$ | $R_a$ | K |

RKA, REGISTER-CONSTANT-A instructions calculate a value by adding the contents of $R_a$ to the 12-bit K-field, sign extended to 32 bits. The GOTO instruction, the special GOTO's (e.g. GOTO HISTORY), and the Vector Embodiment LOOP instruction, the only RKA format instructions, modify the PC-value with the calculated value when the conditional execution decision enables. RKA instructions cannot set condition codes.

RKA

| OP CODE | CC MASK | CC SEL | 0 | 0 | $R_a$ | K |

RKD, REGISTER-CONSTANT-D instructions calculate a value by adding zero or the contents of $R_d$ (as specified by the Op Code) to a 16-bit constant (not sign extended) positioned in the 16-bit half-word as specified in the POS field. The 64-bit result produced is stored in register $R_d$, when enabled by the conditional execution decision. The 16-bit constant is composed of 12-bits from the K-field plus 4 bits from the OP CODE field. RKD instructions cannot set condition codes.

RKD

| OP CODE | CC MASK | CC SEL | POS | $R_d$ | K |

Instruction Fields

The OP CODE specifies the operation (e.g. Double Precision Floating-Point Add, Integer Subtract, Single Precision Floating-Point Multiply) to be performed by the instruction and includes data length specifications in the RRR and RKR formats.

The CC MASK, in combination with the Condition Code selected by the CC SEL field, decides if the data and/or Condition Code result of an instruction is to be written to the specified destination register and/or Condition Code. The details of the logical evaluation leading to this decision, termed "conditional execution," are provided later.

For the RRR and RKR formats, the SET bit, when true, specifies that the Condition Code specified by $R_d$ is to be updated with the Condition Code resulting from the instruction, if enabled by the conditional execution decision.

For the RRR and RKR formats, the WRT bit, when true, specifies that the Register specified by $R_d$ is to be updated with the datum resulting from the instruction execution, if enabled by the conditional execution decision.

The SET bit is replaced by the $IR_a$ bit in the LOAD, LOAD INDEXED, STORE, and STORE INDEXED forms of the RRR and RKR format instructions. The $IR_a$ bit specifies that the address register specified by $R_a$ is to be updated with the address calculated by adding the two source operands together.

In the RKD format instructions, the 2-bit POS field specifies one of four 16-bit half-word positions for the 16-bit constant source to be placed within the 64-bits.

INSTRUCTION OPERATION

NOOP INSTRUCTION—The NOOP instruction is used to fill instruction slots in the Instruction Packet when no suitable instruction is available for that slot. The NOOP is a RRR format instruction with all fields other than the OP CODE zeroed. The NOOP instruction can be used in any of the 6 instruction slots within a packet.

LOAD CONSTANT INSTRUCTION—The RKD format LOAD CONSTANT instruction, LCON/h, adds an implied source of 64 zero bits to the 16-bits from the instruction, positioned as specified by the /h-modifier which is encoded into the POS field as follows:

0—specifies bits 0–15
1—specifies bits 16–31
2—specifies bits 32–47
3—specifies bits 48–63

The result of the add is conditionally written to register $R_d$. The LCON/h instruction cannot modify condition codes. This instruction can be executed by any functional unit.

LOAD ADDRESS INSTRUCTION—The RKD format LOAD ADDRESS instruction, LADS/h, adds the 64-bit value obtained from $R_d$ to the 16-bits from the instruction, positioned as specified by the /h-modifier which is encoded into the POS field as follows:

0—specifies bits 0–15
1—specifies bits 16–31
2—specifies bits 32–47
3—specifies bits 48–63

The result of the add is conditionally written to register $R_d$. The LADS/h instruction cannot modify condition codes.

This instruction can be executed by any functional unit. Since this instruction uses $R_d$ as both source and destination, it is limited to registers dedicated to the functional unit executing the instruction.

LOAD ADDRESS REGISTER—The RRR and RKR format LOAD ADDRESS REGISTER instruction, LDAR/g, is a special form of the ADD INTEGER instruction executed only by LSB Units and typically used to load an address register. The LDAR/g adds the contents of $R_a$ and $R_b$, or the contents of $R_a$ and the 6-bit K-field, sign extended to 32 or 64 bits. The data length is specified by the /g-modifier (encoded into the Op Code):

S—specifies 32 bits
D—specifies 64 bits

The result is written to the Register specified by $R_d$, when enabled by the WRT bit and the conditional execution decision. The LOAD ADDRESS REGISTER instruction cannot modify condition codes (the SET bit is ignored). The LOAD ADDRESS REGISTER instruction can only be executed by a LOAD/STORE/BRANCH unit.

LOAD INSTRUCTION—The RRR and RKR format LOAD instruction, LOAD/f, calculates a memory address by adding the 64-bit contents of registers $R_a$ and $R_b$, or the contents of $R_a$ and the sign extended K-field. If the $IR_a$-bit is set and the conditional execution decision enables, the resulting memory address is saved in $R_a$, which must be an Address Register. The calculated memory address is used to access data memory and, if the WRT bit is set, the accessed datum is conditionally written to $R_d$, which must be a General Register, not an Address Register. Memory addressing is on the basis of 8-bit bytes.

The /f-modifier, encoded into the OP CODE, selects the number of bits moved from the selected memory location to register $R_d$ as follows:

S—specifies 32 bits, loaded into bits 0–31 of $R_d$
D—specifies 64 bits, loaded into $R_d$
T—specifies 64 bits, 32-bits to $R_d$ and 32-bits to $R_d+1$, bits 32–63 are zeroed.
Q—specifies 128 bits, 64-bits to $R_d$ and 64-bits to $R_d+1$ The Q and T options require that $R_a$ be a even numbered register. The /f-modifier also specifies the number of low-order address bits to be ignored; 2 for S, 3 for D, 3 for T, and 4 for Q. That is, the calculated address is forced to the proper byte boundary.

The LOAD instruction can only be executed by a LOAD/STORE/BRANCH unit and cannot modify Condition Codes.

LOAD INDEXED INSTRUCTION—The RRR and RKR format LOAD INDEXED instruction, LDIn/f, calculates a memory address by adding the 64-bit contents of $R_a$ to the left shifted contents of $R_b$, or the contents of $R_a$ to the left shifted sign extended K-field. If the $IR_a$-bit is set and the conditional execution decision enables, the resulting memory address is saved in $R_a$, which must be an Address Register. Either the original $R_a$ contents or the calculated memory address is used to access data memory, as determined by the n-modifier, and, if the WRT bit is set, the accessed datum is conditionally written to $R_d$, which must be a General Register, not an Address Register. Memory addressing is on the basis of 8-bit bytes.

The n-modifier, encoded into the OP CODE, specifies whether the indexing operation takes place before or after the address is used as the memory address:

A—Apply Index after using $R_a$ as address
B—Apply Index before using $R_a$ as address The default for LDIn/f is to apply the index before using $R_a$ as the address. Note that the software produced for this machine would normally create a Last-in-First-Out (LIFO) Stack in main memory by assigning (by convention) an Address Register to always be the Stack Pointer. Information can be "Pushed" onto the Stack and "Popped" off the Stack. A PUSH is accomplished via a STORE INDEXED instruction (with $R_a$=Stack Pointer, a positive index, the n-modifier=before, $IR_a$=1, and WRT=1: STIB/D Rx,RStack, 1,$IR_a$) and a POP is a LOAD INDEXED instruction (with $R_a$=Stack Pointer, a negative index, the n-modifier=after, $IR_a$=1, and WRT=1: LDIA/D $R_x$,RStack,–1,$IR_a$).

The /f-modifier, encoded into the OP CODE, selects the number of bit positions that $R_b$ or the K-field is shifted and selects the number of bits moved from the selected memory location to register $R_d$ as follows:

S—specifies 32 bits, loaded into bits 0–31 of $R_d$, bits 32–63 are zeroed ($R_b$ or K-field shift count=2).
D—specifies 64 bits, loaded into $R_d$ ($R_b$ or K-field shift count=3)
T—specifies 64 bits, 32-bits to $R_d$ and 32-bits to $R_d+1$, bits 32–63 are zeroed ($R_b$ or K-field shift count=3).
Q—specifies 128 bits, 64-bits to $R_d$ and 64-bits to $R_d+1$ ($R_b$ or K-field shift count=4)

The T and Q options require that $R_d$ be a even numbered register. The /f-modifier also specifies the number of low-order address bits to be ignored; 2 for S, 3 for D and T, and 4 for Q. That is, the calculated address is forced to the proper byte boundary.

The LOAD INDEXED instruction can only be executed by a LOAD/STORE/BRANCH unit and cannot modify condition codes.

LOAD HISTORY—A special form of the LOAD INDEXED instruction (different Op code) ignores the $R_d$ field and loads the memory operand into the PC History entry at TOP (see PC History description later). The entry loaded is a 64-bit datum; therefore, the "D" /f-modifier should be used. Normally, the source of the LOAD HISTORY is the stack; thus, $IR_a$ is normally specified (and the WRT bit is set).

As the entry at TOP is loaded, the source memory operand (64-bit datum) includes the Valid-bit, state information etc., as detailed in "PC GENERATION AND THE PC HISTORY".

Use of the LOAD HISTORY instruction except as described in the "Interruption" section may produce unpredictable results.

STORE INSTRUCTION—The RRR and RKR format STORE instruction, STOR/f, calculates a memory address by adding the 64-bit contents of registers $R_a$ and $R_b$, or the contents of $R_a$ and the sign extended K-field. If the $IR_a$-bit is set and the conditional execution decision enables, the resulting memory address is saved in $R_a$, which must be an Address Register. The calculated memory address is used to access data memory and, if the WRT bit is set, register $R_d$ is conditionally written to the accessed memory location. Memory addressing is on the basis of 8-bit bytes.

The /f-modifier, encoded into the OP CODE, selects the number of bits moved to the selected memory location as follows:

S—specifies 32 bits from bits 0–31 of $R_d$ are stored
D—specifies 64 bits from $R_d$ are stored
T—specifies 64 bits, bits 0–31 of both $R_d$ and $R_d+1$ are stored
U—specifies 64 bits, bits 0–31 of both $R_d$ and $R_d+8$ are stored
Q—specifies 128 bits, bits 0–63 from registers $R_d$ and $R_d+1$ are stored W—specifies 128 bits, bits 0–63 of both $R_d$ and $R_d$+8 are stored The Q and T options require that $R_d$ be a even numbered register. The U and W options require that $R_d$ be a LSB1, ADD1 or MUL1 register. Register $R_d$+8 is the corresponding register in LSB2, ADD2, or MUL2, respectively; thus allowing simultaneous storage of results from two functional units. The /f-modifier also specifies the number of low-order address bits to be ignored; 2 for S; 3 for D, T, and U; and 4 for Q and W. That is, the calculated address is forced to the proper byte boundary.

The STORE instruction can only be executed by a LOAD/STORE/BRANCH unit and cannot modify condition codes. Each packet can contain a maximum of one STORE or STORE INDEXED instruction.

STORE INDEXED INSTRUCTION—The RRR and RKR format STORE INDEXED instruction, STIn/f, calculates a memory address by adding the 64-bit contents of register $R_a$ to the left shifted contents of register $R_b$, or the contents of $R_a$ to the left shifted sign extended K-field. If the $IR_a$-bit is set and the conditional execution decision enables, the resulting memory address is saved in $R_a$, which must be an Address Register. Either the original contents of $R_a$ or the calculated memory address is used to access data memory, as determined by the n-modifier, and the contents of register $R_d$ is conditionally written, based on the conditional execution decision and the WRT bit, to that memory location. Memory addressing is on the basis of 8-bit bytes.

The n-modifier, encoded into the OP CODE, specifies whether the indexing operation should take place before the address is used as the memory address or after:

A—Apply Index after using $R_a$ as address

B—Apply Index before using $R_a$ as address

The default for STIn/f is to apply the index before using $R_a$ as the address. See the PUSH and POP discussion under the LOAD INDEXED instruction.

The /f-modifier, encoded into the OP CODE, selects the number of bit positions that $R_b$ or the K-field is shifted and selects the number of bits moved to the selected memory location:

S—specifies 32 bits from bits 0–31 of $R_d$ are stored ($R_b$ or K-field shift count=2)

D—specifies 64 bits from $R_d$ are stored ($R_b$ or K-field shift count=3)

T—specifies 64 bits, bits 0–31 of both $R_d$ and $R_d$+1 are stored ($R_b$ or K-field shift count=3)

U—specifies 64 bits, bits 0–31 of both $R_d$ and $R_d$+8 are stored ($R_b$ or K-field shift count=3)

Q—specifies 128 bits, bits 0–63 from registers $R_d$ and $R_d$+1 are stored ($R_b$ or K-field shift count=4)

W—specifies 128 bits, bits 0–63 of both $R_d$ and $R_d$+8 are stored ($R_b$ or K-field shift count=4)

The T and Q options require that $R_d$ be a even numbered register. The U and W options require that $R_d$ be a LSB1, ADD1 or MUL1 register. Register $R_d$+8 is the corresponding register in LSB2, ADD2, or MUL2, respectively. The /f-modifier also specifies the number of low-order address bits to be ignored; 2 for S; 3 for D, T, and U; and 4 for Q and W. That is, the calculated address is forced to the proper byte boundary.

The STORE INDEXED instruction can only be executed by a LOAD/STORE/BRANCH unit and cannot modify condition codes. Each packet can contain a maximum of one STORE or STORE INDEXED instruction.

STORE HISTORY—A special form of the STORE INDEXED instruction (different op code) ignores the $R_d$ field and sources the PC History entry at BOTTOM (see PC History description later). The entry stored is a 64-bit datum; therefore, the "D" /f-modifier should be used. Normally, the destination of the STORE HISTORY is the stack; thus, $IR_a$ is normally specified.

As the entry at BOTTOM is stored, the Valid-bit in that entry in the PC History is cleared to zero.

Use of the STORE HISTORY instruction except as described in the "Interruption" section may produce unpredictable results.

GOTO INSTRUCTION—The RKA format GOTO instruction calculates a branch address by adding the contents of $R_a$ to the 12-bit K-field (sign extended). That calculated branch address is placed in the PC History entry target of the GOTO (i.e. the entry that is 4 entries away from the GOTO) and the PC STATE (see "PC GENERATION AND THE PC History) is changed from 3 to 2, if enabled by the conditional execution decision. If the conditional execution does not enable the branch, the PC STATE in the PC History entry target of the GOTO is changed from 3 to 1. As described later in the Program Counter description, the branch action is delayed for three cycles, i.e. the Branch umbra is 3 packets long.

The GOTO instruction can only be executed by a LOAD/STORE/BRANCH unit.

BRANCH AND LINK—The RRR and RKR format BRANCH AND LINK instruction, BAND, (in which the SET and WRT bits must be 0 and 1, respectively) calculates a branch address by adding the contents of registers $R_a$ and $R_b$, or the contents of $R_a$ and the sign extended K-field. The PC Value from the BAND instruction's PC History entry is conditionally saved in the link register $R_d$, which must be a General Register (not an Address Register). The calculated branch address is conditionally placed in the PC History entry target of the BAND (i.e. the entry that is 4 entries away from the BAND) and the PC STATE (see "PC GENERATION AND THE PC History) is changed from 3 to 2, if enabled by the conditional execution decision. If the conditional execution does not enable the branch, the PC STATE in the PC History entry target of the BAND is changed from 3 to 1.

As described later in the Program Counter description, the branch action is delayed for three cycles, i.e. the Branch umbra is 3 packets long. Code returning from a call entered via a BRANCH AND LINK should use a GOTO $R_a$,4 instruction, where $R_a$ is the link register contents. Adding 4 to the link register is necessary to skip the instruction packets executed in the BRANCH AND LINK umbra, i.e. instructions already executed. Note that this mechanism does not support branching within the BAND umbra.

The BRANCH AND LINK instruction can only be executed by a LOAD/STORE/BRANCH unit.

CONDITION CODE MANAGEMENT INSTRUCTIONS

| Instruction | Mnemonic | Functional Units |
|---|---|---|
| SAVE CC | SAVE | ADD, MUL |
| RESTORE CC | RESTOR | ADD, MUL |

The RRR format SAVE CC instruction moves the Condition Code selected by $R_a$ to the least significant 5-bits of $R_d$, if enabled by the conditional execution decision. The $R_b$ field should be set to zero.

The RRR format RESTORE CC instruction moves the 5 least significant bits of $R_a$ to the Condition Code specified by $R_d$, if enabled by the conditional execution decision. The $R_b$ field should be set to zero.

The Condition Codes: The condition codes used in the embodiments described here are encoded into 5 C-bits and the CC MASK field of the instructions is 6 bits (5 mask bits to test each of the 5 C-bits plus a bit that inverts the test as detailed later). The C-bits are $C_4$=Latest, indicates that the latest instruction targeting setting the particular CC successfully updated the CC.

$C_3$=Zero, indicates that the result is zero $C_2$=Negative, indicates that the result is negative $C_1$=Carry, indicates that the operation generated a carry $C_0$=Valid, indicates that the result is a valid number Instructions that specify SET, but which are not completed because of the conditional execution decision, zero the Latest bit, but do not change the other C-bits. Instructions that specify SET and do complete set the Latest bit and modify the other C-bits to indicate the status of the operation.

The conditional execution decision is successful when CC MASK (6 m-bits) and the CC (5 C-bits) produce a true condition from the logical evaluation

| TEST = | ((NOT m4) OR | (m4 AND $C_4$)) |
|---|---|---|
| | AND (m5 XOR | ((m3 AND $C_3$) OR |
| | | (m2 AND $C_2$) OR |
| | | (m1 AND $C_1$) OR |
| | | (m0 AND $C_0$) ) |

Note that m5 inverts the test of $C_0$ through $C_3$, not $C_4$, Latest. Some examples of use of the CC MASK are Unconditional execution requires that only m5 be set The test for equal sets m3

The test for not equal sets m5 and m3.

The test for not equal and latest sets m5, m4, and m3

Interruption Handling Instructions

In addition to the previously described STORE HISTORY and LOAD HISTORY instructions, interruption handling, as detailed later in "Interruptions", utilizes the RKA format GOTO HISTORY and RTNTO HISTORY instructions, the RRR format ENABLE/DISABLE INTERRUPTION instructions, and the RRR format MOVE TO TERM and MOVE FROM TERM instructions.

GOTO HISTORY: The RKA-format GOTO HISTORY instruction, is a special form of the GOTO instruction, which switches between use of the PC History 280 and the IHPC (Interruption Handler PC) HISTORY 980 (see Interruptions). The GOTO HISTORY instruction is a serialization instruction, i.e. all instructions in the current HISTORY must be completed (the HISTORY must be empty) before the switch occurs. The GOTO HISTORY causes the new HISTORY to be initialized as follows:

The pointers PC_TOP, PC_FETCH, and PC_BOT are initialized to 4, 0, and 0, respectively, and the IHPC (Interruption Handler PC) HISTORY entry 0 is initialized to the PC-value of the calculated GOTO address. Entries 0, 1, 2, and 3 have the Valid-bit set and the PC STATE equal 2, 1, 1, and 1, respectively. Location 4, pointed to by PC_TOP is the next entry to be used. All other fields and entries are zeroed.

The GOTO HISTORY instruction is used when the contents of the HISTORY being switched to are not already setup, e.g. to switch to the IHPC (Interruption Handler PC) HISTORY in order to restore the PC History.

RTNTO HISTORY: The RKA-format RTNTO HISTORY instruction, is a special form of the GOTO instruction, which switches between use of the PC History 280 and the IHPC (Interruption Handler PC) HISTORY 980 (see Interruptions). The RTNTO HISTORY instruction is a serialization instruction, i.e. all instructions in the current HISTORY must be completed (the HISTORY must be empty) before the switch occurs. The RTNTO HISTORY causes the following actions:

No initialization of pointers or entry contents occurs. Processing continues under control of the Top, Fetch, and Bottom pointers and entry contents that are present when the switch occurs.

The RTNTO HISTORY instruction is used when the contents of the HISTORY being switched to are already setup, e.g. to switch to the PC History after its restoration to resume the interrupted program controlled by the PC History.

ENABLE/DISABLE INTERRUPTION: The RRR-format ENABLE/DISABLE INTERRUPTION instructions (two Op Codes), in which the $R_a$, $R_b$, and $R_d$ fields should be set to zero, control the enabling and disabling of interruptions during interruption handling (see Interruptions).

Term Registers: As previously discussed, each functional unit contains a set of Term Registers that are used as described in "LSB Unit". These registers are allocated by the hardware as pairs to save instruction source operands, that can be destroyed by subsequent instructions, until the corresponding instruction is completed. When an interruption occurs these Term registers should be saved/restored by the interruption handler. Within each functional unit the Term Registers are allocated as the even/odd pairs 0/1, 2/3, and 4/5. LSB and MUL units have three pairs, while the ADD units have only one pair (0/1). During operation the source A operand is saved in the even register of the pair and the source B operand is saved in the odd register of the pair. The MOVE FROM TERM and MOVE TO TERM instructions are used to save and restore the term register contents. These instructions specify individual term registers for accesses.

MOVE FROM TERM: The RRR-format MOVE FROM TERM instruction, in which the $R_b$ field should be zero, moves the target functional unit's Term Register specified by the $R_a$ field to the register specified by the $R_d$ field.

MOVE TO TERM: The RRR-format MOVE TO TERM instruction, in which the $R_b$ field should be zero, moves the contents of source register $R_a$ to the target functional unit's Term Register specified by the $R_d$ field.

OTHER INSTRUCTIONS

The remainder of the instruction set are of the RRR or RKR format. These instructions operate on the source operands and produce a result and/or condition code. All are conditionally executable and all can write a result and/or set a condition code under control of the WRT and SET bits.

In these instructions the /g-modifier, encoded in the Op Code field, specifies the size of the operands:

S—specifies 32 bits

D—specifies 64 bits

In most instructions the operands must be the same length; however, the FIX, FLOAT, and FORMAT instructions, which convert among the available numeric formats, have two g-modifiers encoded in the Op Code field. The first /g-modifier applies to the source and the second /g-modifier applies to the destination. Instructions that use only one source (e.g. MOVE) use the $R_b$ or K field as the source and ignore the $R_a$ field.

GENERAL INSTRUCTIONS

| Instruction | Mnemonic | Functional Units |
|---|---|---|
| MOVE | MOVE/g | ADD, MUL |
| MOVE BYTE | MBYT/b | ADD |

The MOVE instruction moves data from any register (or a constant) to a register dedicated to a ADD or MUL functional unit. The /g-modifier, encoded in the Op Code field, specifies the size of the operands:

S—32 bits

D—64 bits

When a 32-bit operand is moved bits 32–63 are zeroed in the destination.

The MOVE BYTE instruction selects the byte (one of eight) from $R_a$ specified by the low-order 3 bits of the second operand ($R_b$ or K) and moves that byte to the byte of $R_d$ specified by the /b-modifier, encoded in the Op Code field. No other bytes in $R_d$ are changed by the MOVE BYTE instruction.

ARITHMETIC INSTRUCTIONS

| Instruction | Mnemonic | Functional Units |
|---|---|---|
| ADD INTEGER | ADDI/g | ADD, MUL |
| ADD FLOATING-POINT | ADDF/g | ADD, MUL |
| COMPARE INTEGER | CMPI/g | ADD, MUL |
| COMPARE FLOATING-POINT | CMPF/g | ADD, MUL |
| SUBTRACT INTEGER | SUBI/g | ADD, MUL |
| SUBTRACT FLOATING-POINT | SUBF/g | ADD, MUL |
| MULTIPLY INTEGER | MULI/g | MUL |
| MULTIPLY FLOATING-POINT | MULF/g | MUL |
| FIX (FP TO INTEGER) | FIXg/g | ADD |
| FLOAT (INTEGER TO FP) | FLTg/g | ADD |
| FORMAT (FP TO FP) | FMTg/g | ADD |
| NORMALIZE | NORM/g | ADD |

The COMPARE and the SUBTRACT are actually the same instruction.

LOGICAL INSTRUCTIONS

| Instruction | Mnemonic | Functional Units |
|---|---|---|
| AND (LOGICAL) | AND_/g | ADD |
| OR | OR_/g | ADD |
| XOR | XOR_/g | ADD |
| NAND | NAND/g | ADD |
| NOR | NOR_/g | ADD |
| SHIFT LOGICAL | SHFL/g | ADD |
| ROTATE LOGICAL | ROTL/g | ADD |

The count of the SHIFT LOGICAL and ROTATE LOGICAL is a 6 bit sign-extended value from the low-order 6-bits of $R_b$ or from the K field. Thus the range of shifting or rotating is −32 bit to +31 bits, where negative shift counts indicate left shifts or rotates and positive shift counts indicate right shifts or rotates.

Left shifts shift in zeros from the right and right shifts shift in zeros from the left, while rotates wrap the bits shifted out back around as shift in bits.

MEMORY

Data Memory Addressing—Since a minimal general purpose processor illustrating the embodiments of the present invention is described, the address is limited here to 32-bits. Memory is byte addressed where a byte is 8-bits. Words are 4 bytes long and double-words are 8 bytes long.

Virtual Memory Addressing—Virtual memory pages are 64K bytes in size. The low order 16 bits of the virtual address map directly to the low order 16-bits of the real address. The high order 16-bits of the virtual address are used to index into the page table, which contains the virtual to real mapping by providing a 16-bit value to replace the high order 16-bits of the virtual address.

Figure 19:
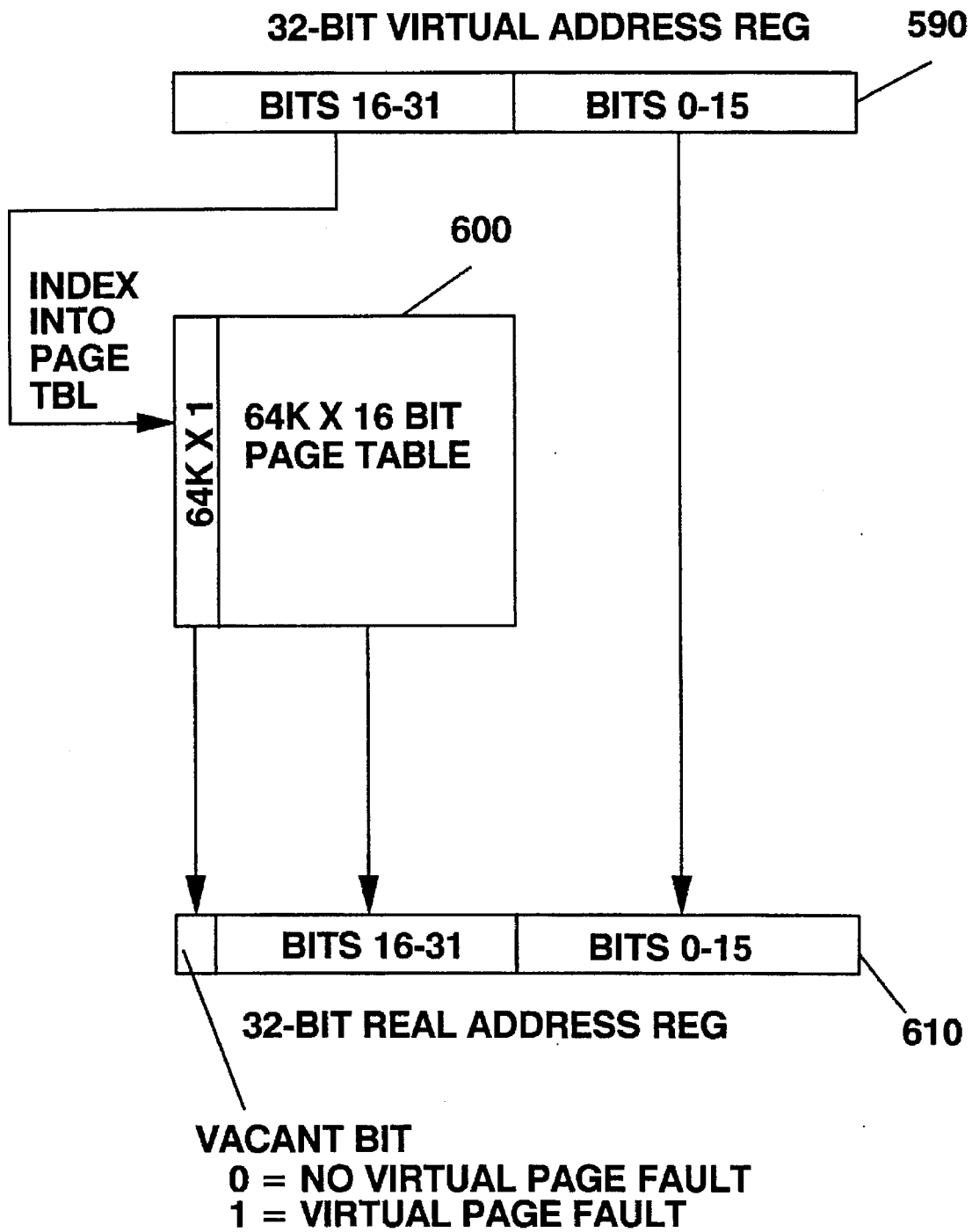
FIG. 19 shows the details of the virtual memory address translation of the Dynamic Scheduling Embodiment.

A high-speed 64K entry page table provides this direct mapping as shown in FIG. 19. The access of the physical-page portion of the address occurs in parallel with the fetch of cache data, as described below. Associated with each entry in the high-speed page table is a Vacant bit, that when set indicates that the corresponding page is not present in memory.

Reference Numbers included in FIG. 19:

| | |
|---|---|
| 590 | Virtual Address Register |
| 600 | Page Table |
| 610 | Real Address Register |

In FIG. 19 bits 16–31 of the Virtual Address 590 are used to select a Real Page Address from the Page Table 600. That selected Real Page Address is used as bits 16–31 of the Real Address 610, while bits 0–16 of the Virtual Address 590 are directly used as bits 0–16 of the Real Address 610. If the Vacant bit is set in the Page Table entry, a Page Fault is recognized.

Data Cache—The data cache is pipelined and has three ports to permit two reads (LOADs) and one write (STORE) during each cycle. The 256K byte cache contains 4 sets of 4K×16 bytes organized as a direct mapped 4-way set associative cache. When accessed each of the 4 sets supplies the addressed 16 bytes of data along with identifying information and controls. Each 16 bytes of data is called a line.

Figure 20:
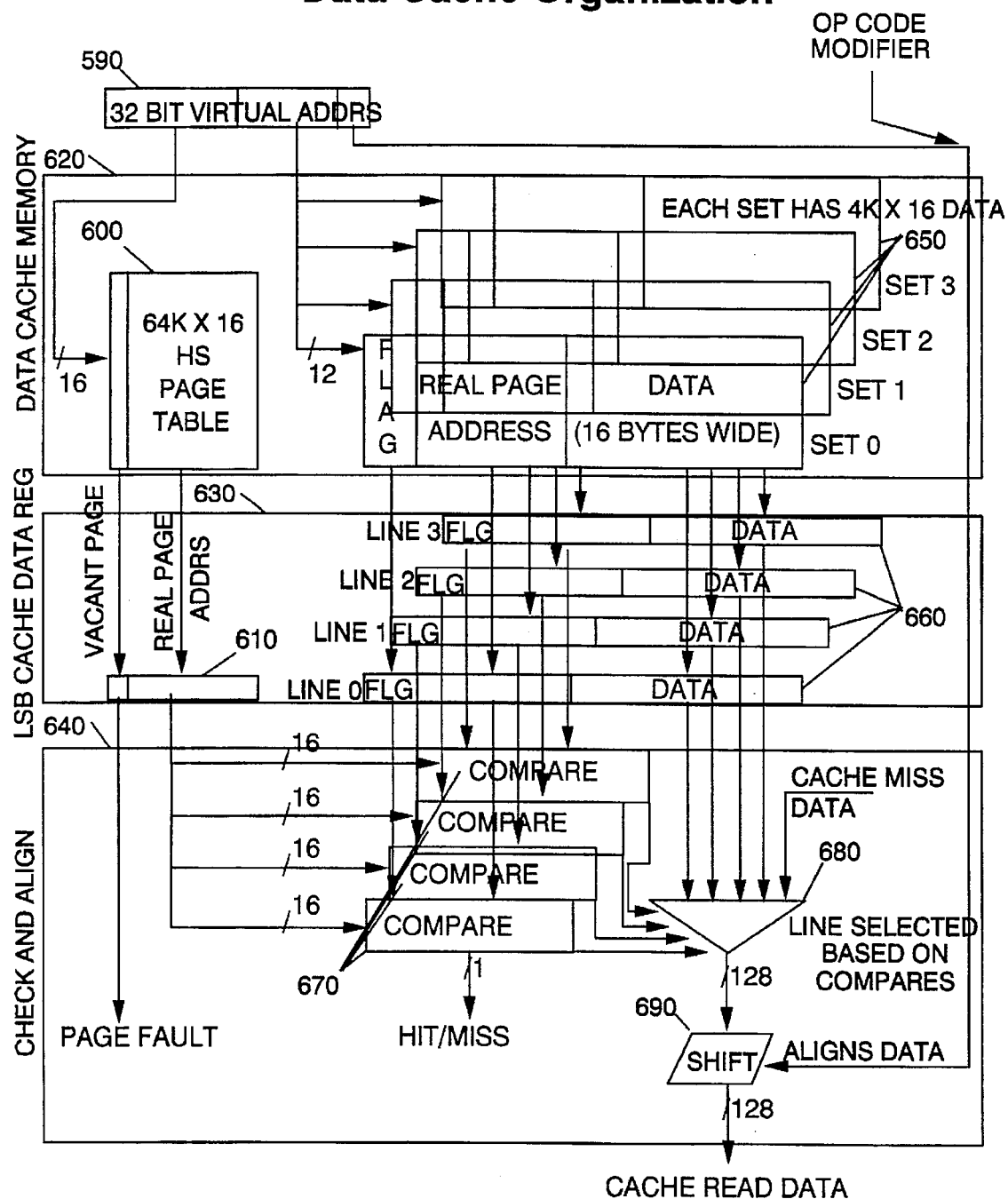
FIG. 20 shows the Data Cache organization used in the Dynamic Scheduling Embodiment.

Reference Numbers included in FIG. 20:

| | |
|---|---|
| 590 | Virtual Address Register |
| 600 | Page Table |
| 610 | Real Address Register |
| 620 | Data Cache Memory |
| 630 | LSB Cache Data Register |
| 640 | Check and Align |
| 650 | Cache Set |
| 660 | Cache Line Register |
| 670 | Real Page Comparator |
| 680 | Line Selector |
| 690 | Line Shifter |

In FIG. 20, one read port of the 3 Port Data Cache 800 of FIG. 18 is extended to show more detail with 4 major elements:

1. 32 bit Virtual Address Register 590
2. Data Cache Memory 620 including the 64K×16 bit High Speed Page Table 600 and 4 Cache Sets 650. Each set 650 includes 4K entries with each entry having 16 bytes (128 bits) of data, the associated Real Page Address, and Control Flags.
3. LSB Cache Data Register 630 including the Real Address Register 610 and the Cache Line Registers 660 (one for each set).
4. Check and Align 640 including 4 Real Page Comparators 670, the Line Selector 680, and the Line Shifter 690.

In operation cache access uses the 32 bit Virtual Address Register 590, which is separated into 3 fields. Direct mapping uses bits 4–15 of the address to access a Line (16 bytes of data, the 16-bit real page address, and controls) from each of four 4K Cache Sets 650. Bits 16–31 of the Virtual Address Register 590 access a real page address from the Page Table 600 as described for FIG. 19. Bits 0–3 of the Virtual Address Register 590, as controlled by the Op Code modifier, are forwarded to the Check and Align 640 for selection of the starting byte within the line at the Line Shifter 690. The Op Code /f-modifier (discussed previously) is also used to determine data length:

| Page Address | Cache Line Address | Bytes in Line |
|---|---|---|
| 31       16 | 15            04 | 03      00 |

In the Cache Data Register section 630, the accessed Real Page Address is clocked into the Real Address Register 610 and the 4 lines accessed are clocked into the Cache Line Registers 660.

In the Check and Align section the Real Page Addresses from the Line Registers 660 are compared via the four Real Page Comparators 670 with the contents of the Real Page Address Register 610 to determine which, if any, of the Cache Line Registers 660 has the matching Real Page Address. If there is no match a Cache Miss is recognized and the data is fetched into the cache from main memory; otherwise, the data from the correct Cache Line Register 660 is selected by the Line Selector 680 and passed to the Line Shifter 690 for alignment based on Virtual Address Register 590 bits 0–3 and the Op Code modifier (see the LOAD and LOAD INDEXED instruction definition for alignment details).

During Store operations the cache is first accessed, in the same manner as described above, to ensure that the needed line is present, then in a later cycle the data is actually written. During the first STORE access of the Cache Line the Cache Line Lock Bit is set to prevent any subsequent LOAD or STORE from accessing that line until the STORE completes. The Cache Line Lock Bit is cleared when the STORE completes by writing an operand (successful or unsuccessful) to the Cache Line. If a Virtual Page fault occurs on the first STORE access, the Cache Line Lock Bit is still set to prevent subsequent instructions from obtaining a bad data copy. During the interruption process, after subsequent instruction execution is halted, all Cache Line Lock Bits are cleared.

The three ports allow the two LSB pipes to simultaneously access data from the cache while the results of a previous store are being written.

When data is read or written the f-modifier (see the LOAD, LOAD INDEXED, STORE, and STORE INDEXED instructions) specifies the alignment of data and specifies the number of low-order address bits that are ignored, as previously described.

PC GENERATION AND THE PC HISTORY

The PC History entries address the Instruction Memory on packet granularity. That is, PC_Value=1 addresses the first packet of 6 instructions, PC_Value=2 addresses the second packet, etc.

Each PC History entry includes a PC_STATE which is established either at Issue_1 or during the execution of a Branch and a PC VALUE which is established either by the execution of a Branch or during the instruction Fetch process. The PC VALUE can originate from one of four sources:

| | |
|---|---|
| 1. Interruption vector address | (see "Handling an Interruption") |
| 2. Calculated Branch address from LSB 1 | (see "Branching") |
| 3. Calculated Branch address from LSB 2 | (see "Branching") |
| 4. PC_Value+1 | |

The PC_History is controlled by the following pointers (modulo-n counters):

PC_TOP, the location where the next valid PC Entry is to be placed by the Issue_1 logic; incremented after the PC Entry is written by that logic.

PC_FETCH, the location containing the PC STATE and PC VALUE associated with the next packet to be fetched; incremented after use.

PC_BOT, the location containing the next PC Entry to be removed, by clearing the Valid-bit, from the PC_History; incremented after use. PC_BOT is used to control the removal of PC History information as described later in "PC History Entry Removal".

Each PC History entry has a Valid-bit, a PC value (32 bits), a PC_STATE (2 bits), and 6 Instruction States (4 bits each).

| V BIT (1) | PC VALUE (32) | PC ST (2) | I1 ST (4) | I2 ST (4) | I3 ST (4) | I4 ST (4) | I5 ST (4) | I6 ST (4) |
|---|---|---|---|---|---|---|---|---|

The Valid-bit indicates, when one, that the PC STATE and INSTRUCTION STATE portions of the entry contains valid information. Depending on the particular PC STATE the PC VALUE may or may not be valid.

The PC-value is the 32-bit packet address associated with the entry.

The PC_STATE, which is initially established by the Issue_1 logic, when the entry is introduced at PC_TOP, has the following encoding:

0—PC VALUE and action to be performed at Fetch are both unknown

1—PC VALUE is to be derived at Fetch by adding +1 to the previous entry's value. This plus one addition is performed, when specified, just prior to the fetch of a packet, i.e. the PC VALUE from the entry previously pointed to by PC_FETCH is incremented and placed in the entry pointed to by PC_FETCH.

2—PC VALUE is the value provided by a successful BRANCH instruction.

3—PC STATE and possibly the PC VALUE await resolution of a BRANCH instruction. When resolved the new PC STATE will be 1 if the BRANCH is unsuccessful and will be 2 if the BRANCH is successful.

The Instruction State fields are discussed later (see Processor Operation, Instruction State).

The PC History is managed as a FIFO with entries (new PC STATE) placed at TOP and entries moved from BOTTOM. The TOP and BOTTOM pointers are modulo-n counters where n is 32. An attempt to place a new entry at TOP that encounters a Valid-bit equal 1 means that the PC History is full and stalls PC generation until there is space on the PC History. Similarly an attempt to remove an entry from BOTTOM that encounters a Valid-bit equal 0 means that the PC History is empty.

The size of the Branch umbra is defined as three, so up to 4 PC History entries are allowed for packets that have not yet been fetched. These are the packets pointed to by TOP-1, TOP-2, TOP-3, and PC_FETCH. Only after a packet has been fetched and is analyzed during the Issue_1 process is it known whether or not it contains a Branch instruction; therefore, until the packet pointed to by PC_FETCH is analyzed to determine if it contains a Branch, no entry at or beyond PC_TOP can be made. After Issue_1 analyzes the just fetched Instruction Packet for the presence of a Branch, the entry pointed to by PC_TOP is initialized with a
PC STATE of 3 if a Branch was fetched
or a PC STATE of 1 if no Branch was fetched
and the Valid-bit is set.

In the embodiment described here a maxima of one Branch instruction is permitted in each packet, but those skilled in the art will understand that expansion to two Branches per packet, where their generation of a branch address is mutually exclusive, requires two PC STATEs, one for each possible Branch in a packet, with the initial state for a 2-Branch-Packet being 33. Thus when the fetch logic encountered a 11 state it would be safe to increment the previous PC value and when it encountered a 21 or 12 state the PC value supplied by the indicated Branch should be used. Thus if there were two Branches in a packet those Branches could execute in any order and, when neither PC STATE remained a 3, both Branches have been resolved.

Initialization: The pointers PC_TOP, PC_FETCH, and PC_BOT are initialized to 4, 0, and 0, respectively, and the PC History entry 0 is initialized to the PC-value of 0. Entries 0, 1, 2, and 3 have the Valid-bit set and the PC STATE equal 2, 1, 1, and 1, respectively. Location 4, pointed to by PC_TOP is the next entry to be used. All other fields and entries are zeroed.

Thus, the PC History during the first few cycles of operation after initialization (no BRANCH instructions in packets 0–2), where a (p)s/v in a column position indicates the entry location "p" on the PC History, the entry's PC STATE "s" and the PC value "v"):

| Position | t = 0 | t = 1 | t = 2 | t = 3 |
|---|---|---|---|---|
| PC_TOP | (4)0/X | (5)0/X | (6)0/X | (7)0/X |
| TOP-1 | (3)1/X | (4)1/X | (5)1/X | (6)1/X |
| TOP-2 | (2)1/X | (3)1/X | (4)1/X | (5)1/X |
| TOP-3 | (1)1/X | (2)1/X | (3)1/X | (4)1/X |
| PC_FETCH | (0)2/0 | (1)1/0 + 1 = 1 | (2)1/1 + 1 = 2 | (3)1/2 + 1 = 3 |
| Issue_1 | — | (0)2/0 | (1)1/1 | (2)1/2 |
| Issue_2 | — | — | (0)2/0 | (1)1/1 |
| Execute | — | — | — | (0)2/0 |

In this sequence PC_BOT would be 0 in every cycle shown, pointing to the entry with a PC-value of 0. PC_TOP would step in the sequence 4, 5, 6, etc. and PC_FETCH would step in the sequence 0, 1, 2, 3, etc.

Branching: Branch instructions can be successful or unsuccessful based on the conditional execution decision. When a Branch is successful the generated Branch Address is used in place of the incremented PC-value. The resulting PC-value is placed on the PC_HISTORY which records the sequence of PC-values generated for fetching instructions. The Branch action is delayed for 3 cycles, thus the Branch is said to have a Branch umbra of 3.

When a packet passes Issue_1 the entry at PC_TOP is checked to ensure that the Valid-bit is not set (if it is instruction issue waits for the PC History to become not full); if there is no BRANCH instruction in the packet the PC_HISTORY entry at PC_TOP is set to PC_STATE=1; and if there is a BRANCH instruction in the packet the entry at PC_TOP is set to PC_STATE=3 and the BRANCH instruction obtains a pointer to that PC History entry. Additionally, the Valid-bit is set.

Branches follow the normal rules of Sequential Coherency Instruction Scheduling described previously, but each PC History entry that is pointed to by a Branch is the sole property of that Branch; therefore, the Branch instruction can update it at any time and has no deficits associated with it. When the Branch instruction is successful it writes the generated PC-value to the PC History location and sets the PC STATE=2. When the Branch instruction is unsuccessful it simply sets the PC_STATE=1.

The sequencing for a GOTO 200 instruction in the packet associated with PC_VALUE=3 would generate the following sequence of PC History contents after the first few cycles shown above.

| Position | t = 4 | t = 5 | t = 6 | t = 7 | t = 8 |
|---|---|---|---|---|---|
| PC_TOP | (8)0/X | (9)0/X | (10)0/X | (11)0/X | (12)0/X |
| TOP-1 | (7)3/X | (8)1/X | (9)1/X | (10)1/X | (11)1/X |
| TOP-2 | (6)1/X | (7)3/X | (8)1/X | (9)1/X | (10)1/X |
| TOP-3 | (5)1/X | (6)1/X | (7)3/X | (8)1/X | (9)1/X |
| PC_FETCH | (4)1/3 + 1 = 4 | (5)1/4 + 1 = 5 | (6)1/5 + 1 = 6 | (7)2/200 | (8)1/200 + 1 = 201 |
| Issue_1 | (3)1/3 | (4)1/4 | (5)1/5 | (6)1/6 | (7)2/200 |
| Issue_2 | (2)1/2 | (3)1/3 | (4)1/4 | (5)1/5 | (6)1/6 |
| Execute | (1)1/1 | (2)1/2 | (3)1/3 | (4)1/4 | (5)1/5 |

As shown the Branch umbra is 3, i.e. before the Branch action resulting from the GOTO 200 in the packet at location 3 takes effect (i.e. before the GOTO is executed during the t=6 to t=7 cycle to produce the 200 address) instructions at locations 4, 5, and 6 are fetched for execution. The issuing of instructions other than the Branch at location 3 are shown as typical (e.g., instructions in their sequential program order at Issue_2); however, unless dependencies exist between the GOTO and the preceding instructions, the Issue_2 and Execution status of the other instructions does not affect the operation of the GOTO.

Thus Branch instructions, once past Issue_1, can execute and results in the PC HISTORY, completely out-of-order with the PC History processing the entries so that Issue_1 occurs in the dynamic sequential program order. Branches are given priority over other instructions, when there is contention for the LSB functional unit, to maximize the available instructions in the Instruction Queue.

PC History Entry Removal: PC_History entries pointed to by PC_BOT that have the Valid-bit set and that have all 6 INSTRUCTION STATEs in the Completed (C) state are "removed" from the PC_History by clearing the Valid-bit and incrementing PC_BOT.

Handling an Interruption: In addition to the normal PC History 280 there is a small Interruption Handler PC History (IHPC HISTORY 980) that is used during the interruption process to ensure that the PC History can be saved. The later sections "Recognition of Interruptions" and "Interruption" contain additional details about the interruption process.

LSB FUNCTIONAL UNITS

Figure 21:
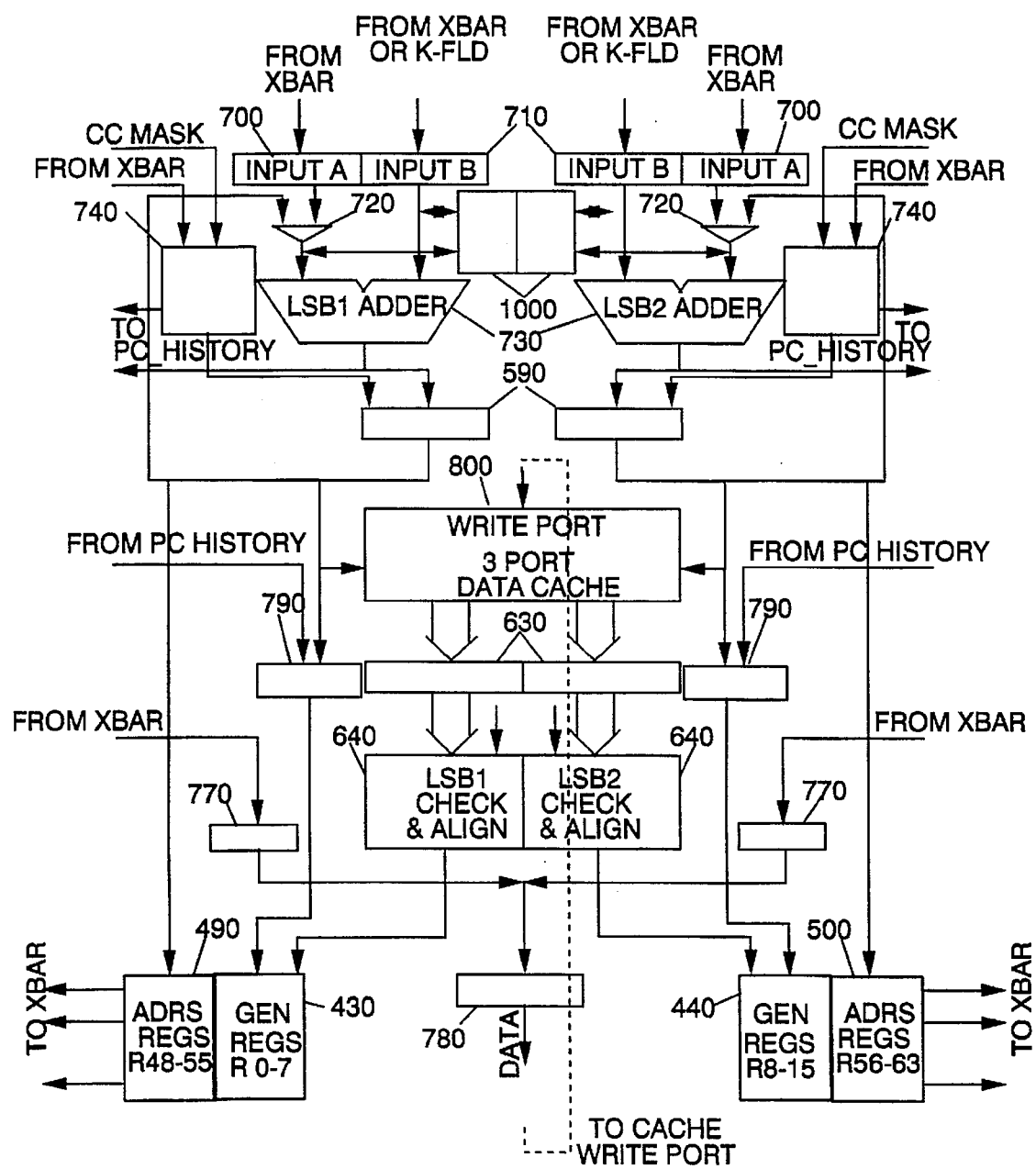
FIG. 21 shows the Load/Store/Branch Unit organization used in the Dynamic Scheduling Embodiment.

Reference Numbers included in FIG. 21:

| 430 | Register 0–7 | 740 | LSB Conditional Execution Decision |
| 440 | Register 8–15 | 760 | LSB Line Register |
| 490 | Register 48–55 | 770 | LSB Store Data Register |
| 500 | Register 56–63 | 780 | Store Data Register |

-continued

| | | | |
|---|---|---|---|
| 590 | Virtual Address Register | 790 | LSB Pipe Register |
| 630 | LSB Cache Data Register | 800 | 3 Port Data Cache |
| 640 | LSB Check and Align | 1000 | Term Registers |
| 700 | LSB Input A | | |
| 710 | LSB Input B | | |
| 720 | LSB INA Select | | |
| 730 | LSB Adder | | |

The LOAD/STORE/BRANCH units are pipelined as shown in FIG. 21. As shown, the two LSB units share the 3 Port Data cache 800 and each LSB includes the Virtual Address Register 590, the Cache Data Register 630 and the Check and Align 640 of FIG. 20. In this discussion, which applies to both LSB Units, the general registers will be referred to as General Registers 430 or 440 and the Address Registers will be referred to as Address Registers 490 or 500, where 430 and 490 apply to LSB1 and 440 and 500 apply to LSB2.

In FIG. 21, LSB Input A 700 provides the operand selected by the $R_a$ field of the RRR, RKR, and RKA format instructions or by the $R_d$ field of the RKD-format LOAD ADDRESS instruction. LSB Input B 710 provides the operand selected by the $R_b$ field of the RRR format instructions or by the K-field of other format instructions.

The LSB In-A Selector 720 chooses either LSB Input A 700 or the local feedback path specified by the $R_a$ field of the instruction for one operand to the LSB Adder 730. LSB Input B 710 is the other input to the LSB Adder 730, which is used to calculate operands for the BRANCH, BRANCH AND LINK, LOAD, LOAD INDEXED, STORE, STORE INDEXED, and LOAD ADDRESS, LOAD CONSTANT, and LOAD ADDRESS REGISTER instructions.

When an instruction begins execution in an LSB unit, a pair of term registers are allocated from the unit's Term Register 1000 pool for saving the A-operand and the B-operand and the pointer to the pair allocated is recorded in the INSTRUCTION STATE of the PC History entry (see PC Generation and the PC History) associated with the instruction. Those operands are saved in the term registers until the instruction completes. At that time the pair of term registers is returned to the unit's pool. The free pool list is initialized to 0, 1, and 2, indicating that the first instruction is to be allocated pair 0, the second pair 1, and the third pair 2. Subsequent operations return term register pairs to the pool and acquire the next available pair dynamically.

Operating in parallel with the LSB Adder 730, the LSB Conditional Execution Decision 740 evaluates the Condition Code specified by the CC Select field in the instruction against the CC Mask field of the instruction as previously described (see The Condition Code).

The result from a LSB Adder 730, available one cycle after the instruction begins execution, can be passed to a LSB Virtual Address Register 590 for movement to a local Address Register 490 or 500 (when enabled by the Conditional Execution Decision 740), for Data Cache 800 access, for General Register 430 or 440 load, or for movement to the PC History during execution of a Branch (when enabled by the Conditional Execution Decision 740).

An LSB unit can update one of its (local) Address Registers 490 or 500 on cycle n and use that updated data on the very next cycle n+1, because of the LSB In-A Selector 720 which can select the output of the Virtual Address Register 590 when the needed source register number equals the destination of the data in the Virtual Address Register and the controlling conditional execution decision was successful. Other functional units are not signaled that the Address Register has been written until the transfer from the Virtual Address Register to the Address Register has been completed. Note that updating of these Address Registers 490 or 500 is only via the LOAD CONSTANT, LOAD ADDRESS, or LOAD ADDRESS REGISTER instructions or via a Load or Store instruction specifying $IR_a$.

The LSB Virtual Address Register 590 provides a virtual address to the 3 Port Data Cache Memory 800, as previously described (see FIG. 20), to the LSB Pipe Register 790, or to the Address Registers 490 or 500. The LSB Virtual Address Register 590 is provided to the 3 Port Data Cache Memory 800, as a virtual address, when a Load or Store instruction is being executed. It is provided to the Address Registers 490 or 500 when the instruction is to update an Address Register. And, it is provided to the LSB Pipe Register 790 when the operand calculated via the LSB Adder is destined for a General Register 430 or 440 during the execution of a LOAD CONSTANT, LOAD ADDRESS, or LOAD ADDRESS REGISTER instruction. The LSB Pipe Registers 790 can also, during the execution of a BRANCH AND LINK instruction, receive input from the PC History.

The LSB Conditional Execution Decision 740 controls the writing of the Address Registers 490 or 500, the writing of the General Registers 430 or 440, the bypass loading of Input A via the LSB In-A Selector (as described above), and the Storing of Data to the Data Cache as previously described (see The Condition Code). During Store operations the LSB Store Data Register 770 receives the data to be stored as selected via the crossbar by the $R_d$ field of the instruction.

The LSB Pipe Register 790 and the LSB Check and Align 640 supply data inputs to the General Registers 430 or 440. The input to be used, if any, is determined by the Op Code and by the LSB Conditional Execution Decision 740. Similarly the contents of the LSB Store Data Register 770 are moved to the Store Data Register 780 when the Op Code is a Store. The Enable bit in the Store Data Register 780 reflects the state of the Conditional Execution Decision 740. Thus, the STORE and the STORE INDEXED instructions pick up the data to be stored as late as possible; therefore, minimizing latency. For example a LOAD can be followed by a STORE of the loaded data on the very next cycle.

Instruction execution in the LSB units requires the following minimum execution times including a cycle to obtain sources:

| Instruction | Operand | Minimum Req'd Cycles |
|---|---|---|
| LOAD | $R_d$ | 4 |
| LOAD non-$IR_a$ | CC source | needed 1 cycle after start |
| LOAD $IR_a$ | $R_a$ | 1 |
| LOAD $IR_a$ | CC source | needed 1 cycle after start |
| STORE | $R_d$ source | needed 3 cycles after start |
| STORE non-$IR_a$ | CC source | needed 1 cycle after start |
| STORE $IR_a$ | $R_a$ | 1 |
| STORE $IR_a$ | CC source | needed 1 cycle after start |

The ADD Functional Units

The ADD Functional Units (ADD1 390 and ADD2 400 in FIG. 18) are straightforward integer and floating-point ALU's capable of performing the operations specified by the instructions that target the ADD units, as previously described. All ADD unit instructions require one clock time to source the needed operands and one clock time for execution, including the writing of the destination register/CC. A single pair of term registers is associated with each ADD Unit.

Instruction state and sequencing is as described later in "Processor Operation".

The MUL Functional Units

The MUL Functional Units (MUL1 410 and MUL2 420 in FIG. 18) are straightforward integer and floating-point multipliers capable of performing the operations specified by the instructions that target the MUL units, as previously described. All MUL unit instructions require one clock time to source the needed operands and three clock times for execution, including the writing of the destination register/ CC. Three pairs of term registers are associated with each MUL Unit.

Instruction state and sequencing is as described in the following section, "Processor Operation".

Processor Operation

Instruction State: Each instructions has, associated with it, INSTRUCTION STATE information (in the PC History entry) that describes the state of execution progress. The 4-bit Instruction State field indicates one of the following states:

| STATE | MEANING |
|---|---|
| N | Null (instruction not yet fetched) |
| W | Waiting in the Instruction Queue |
| X2 | Executing - Source Operands in Term Position 2 |
| X1 | Executing - Source Operands in Term Position 1 |
| X0 | Executing - Source Operands in Term Position 0 |
| X | Executing - Source Operands not saved (during interruption handling) |
| C | Completed - Result in Register |
| I2 | Interruption - Source Operands in Term Position 2 |
| I1 | Interruption - Source Operands in Term Position 1 |
| I0 | Interruption - Source Operands in Term Position 0 |
| S2 | Suspended - Source Operands in Term Position 2 |
| S1 | Suspended - Source Operands in Term Position 1 |
| S0 | Suspended - Source Operands in Term Position 0 |

The Interruption states result when the instruction has detected an exception condition. The Suspended states result when an instruction that is in the process of executing is not completed because another instruction caused an interruption. The permitted state transitions are as follows:

| STATE | NEW STATE | Stimulus |
|---|---|---|
| x --> | N | Initial Reset |
| N --> | W | Issue_1 |
| W --> | Xn | Issue_2 |
| Xn --> | C | Completion (all destinations have been updated) |
| Xn --> | In | Exception due to this instruction |
| Xn --> | Sn | Interruption by another instruction |
| Sn --> | Xn | After restarting an interrupted task |
| In --> | Sn | By the interruption handler (see "Interruption") |

Xn States: As previously described, term register pairs are allocated for each active instruction to save the A and B source operands in case of an exception that requires the instruction to be re-executed after the exception is handled. For each LSB, MUL, and ADD functional unit the number of available term register pairs is 3, 3, and 1, respectively. Pairs are allocated from a local unit pool when the instruction passes Issue_2 and are returned to that pool when the instruction completes.

During initial interruption handling no term registers are allocated for saving source operands; therefore, subsequent interruptions must be inhibited until the interruption handler has saved the critical state information as described later in "Interruptions".

Outstanding Activity Memory: The Outstanding Activity Memory contains an addressable entry for each Register/ Condition Code and for Main Memory. Each of those addressable entries has three fields—the count of outstanding writes not begun, and the count of outstanding writes not completed, and the count of outstanding reads. The main memory entry, additionally has a count of outstanding reads not begun. The addresses of the entries are as follows:

| | |
|---|---|
| 0– 7 | Reg 0– 7, LSB1 General Registers 430 |
| 8–15 | Reg 8–15, LSB2 General Registers 440 |
| 16–23 | Reg 16–23, ADD1 General Registers 450 and associated CCs 510 |
| 24–31 | Reg 24–31, ADD2 General Registers 460 and associated CCs 520 |
| 32–39 | Reg 32–39, MUL1 General Registers 470 and associated CCs 530 |
| 40–47 | Reg 40–47, MUL2 General Registers 480 and associated CCs 540 |
| 48–55 | Reg 48–55, LSB1 Address Registers 490 |
| 56–63 | Reg 56–63, LSB2 Address Registers 500 |
| 64 | Main Memory |

Each deficit count is 4-bits so that deficit counts of up to 15 can be accommodated. Any possible overflow of the 4-bit value is enforced by the Issue__1 logic as described later.

Issue 1, Obtaining Deficit Counts as Debits: During Issue__1 the appropriate Outstanding Activity Memory locations are accessed to obtain debits needed to control the execution of the instructions in the packet. The debits obtained by each instruction are:

$Debit_{SAWC}$—SRC A Writes Complete $Debit_{SBWC}$—SRC B Writes Complete $Debit_{SCWB}$—SRC CC Writes Begun $Debit_{SCWC}$—SRC CC Writes Complete $Debit_{DDRC}$—Dest D Reads Complete $Debit_{DDWB}$—Dest D Writes Begun $Debit_{DDWC}$—Dest D Writes Complete If a particular instruction source/destination selection field is NULL, then the associated debit obtained is zero, e.g. if an instruction is not conditional (no CC source) then $Debit_{SCWB}$ and $Debit_{SCWC}$ are set to zero.

LOAD and STORE instructions that specify $IR_a$ obtain deficit counts to control the updating of $R_a$ (sourcing of $R_a$ is controlled by $Debit_{SAWC}$):

$Debit_{DARC}$—Dest A Reads Complete

LOAD and STORE instructions also obtain deficit counts to control the memory updates:

$Debit_{MWB}$—Memory Writes Began $Debit_{MWC}$—Memory Writes Complete

Additionally, STORE instructions obtain the following deficit counts:

$Debit_{MRB}$—Memory Reads Begun $Debit_{MRC}$—Memory Reads Complete $Debit_{SDWB}$—SRC D Writes Begun $Debit_{SDWC}$—SRC D Writes Complete Issue 1, Increasing Deficit Counts: After the needed debits are obtained for all instructions in the packet, then the appropriate Outstanding Activity Memory locations are updated to reflect the new deficit counts associated with the instructions that are being issued. For example, an ADD R1+R2→R3 IF CC1 .EQ. instruction would access the deficits for R1, R2, R3 and CC1 before updating them.

Since a resource can be referenced more than once within a packet of 6 instructions, the deficit updating mechanism must properly sum the references before the update of the deficit is accomplished. Note that if any update value overflows the 4-bit count, Issue__1 must stop, and continually retry the Issue__1 operation, until all the result values being updated are small enough to fit within their 4-bit counts.

Hardware Associated with Deficits and Debits: Associated with each Outstanding Activity Memory count location is a 4-bit wide 3-input adder that sums (1) the previous deficit count value, (2) the increases derived from the packet being issued, and (3) the decreases signaled as instruction execution progresses (by subtracting or adding the 2's complement form as described later). The construction of the 3-input adder is four 3-input Carry-Save-Adders each supplying a sum and a carry output to a 3-bit full adder (the least significant bit is resolved by the carry-save-adder stage).

Instructions in the process of Issue__1, i.e. on the way to an Instruction Queue entry, require a simple 4-bit wide (2 input) full adder for each debit count field to subtract (add the 2's complement form) the decreases signaled as instruction execution progresses (described later) from the previous debit count value. Similarly, instructions that have passed Issue__1 require a simple 4-bit wide 2 input full adder for each debit count field to subtract (add the 2's complement form) the decreases signaled as instruction execution progresses (described later) from the previous debit count value carried forward with the instruction.

As instructions progress through their execution they signal events such as "write begun" for a particular register, as detailed below. The individual signals that correspond to a particular resource are summed during each machine cycle and that sum is used as the value by which the associated debit counts and Outstanding Activity Memory counts are decreased.

Issue 2, Instruction Scheduling

After instructions enter the appropriate Instruction Queue with debits, those non-zero debits are decremented by the value indicated by the summing network when the summing network output, selected by the instruction source or destination field associated with the debit, indicates a debit reducing event. For the ADD and MUL Functional Units and for all LSB instructions, except the LOAD and STORE instructions, the debits that must reach zero before the instruction can begin execution are:

$Debit_{SAWC}$—SRC A Writes Complete
$Debit_{SBWC}$—SRC B Writes Complete
$Debit_{SCWB}$—SRC CC Writes Begun
$Debit_{DDRC}$—Dest D Reads Complete
$Debit_{DDWB}$—Dest D Writes Begun The Dest D Debits ($Debit_{DDRC}$ and $Debit_{DDWB}$) apply to both the Destination Register and Destination Condition Code.

LOAD and STORE instructions that specify $IR_a$ obtain the correct copy of $R_a$ because of the $Debit_{SAWC}$. This operation ensures that all logically previous writes to $R_a$ have occurred. To overwrite $R_a$ these instructions must additionally only have the following debit reach zero before the instruction can begin execution:

$Debit_{DARC}$—Dest A Reads Complete

LOAD and STORE instructions must also have the following debit reach zero before the instruction can begin execution:

$Debit_{MWB}$—Memory Writes Begun

STORE instructions do not consider $Debit_{DDRC}$ or $Debit_{DDWB}$, instead they must have the following debits reach zero:

$Debit_{MRB}$—Memory Reads Begun
$Debit_{SDWB}$—SRC D Writes Begun

Decreasing Deficits and Debits: When an instruction begins execution (Issue__2) all reads associated with its SRC A and SRC B are signaled as completed; writes associated with its destinations are signaled as begun, so that the appropriate counts of outstanding accesses are decremented. When delayed operands are read (e.g. CC) those reads are signaled as complete. When an instruction completes (writes the result to the destination) that action is signaled so that the count of outstanding writes not completed can be decremented.

More specifically, when an instruction is issued by Issue__2 its state changes from W to Xn and the source operands are read and Read Completed is signaled for sources SRC A and SRC B, thus releasing those registers for overwriting by subsequent instructions; and Write Begun is signaled for the DESTINATION.

The SRC A and SRC B operands are saved in the Term Register pair designated by n (of state=Xn) so that the instruction can be re-executed, after handling an interruption, if necessary.

ADD and MUL Unit Signaling

Figure 22:
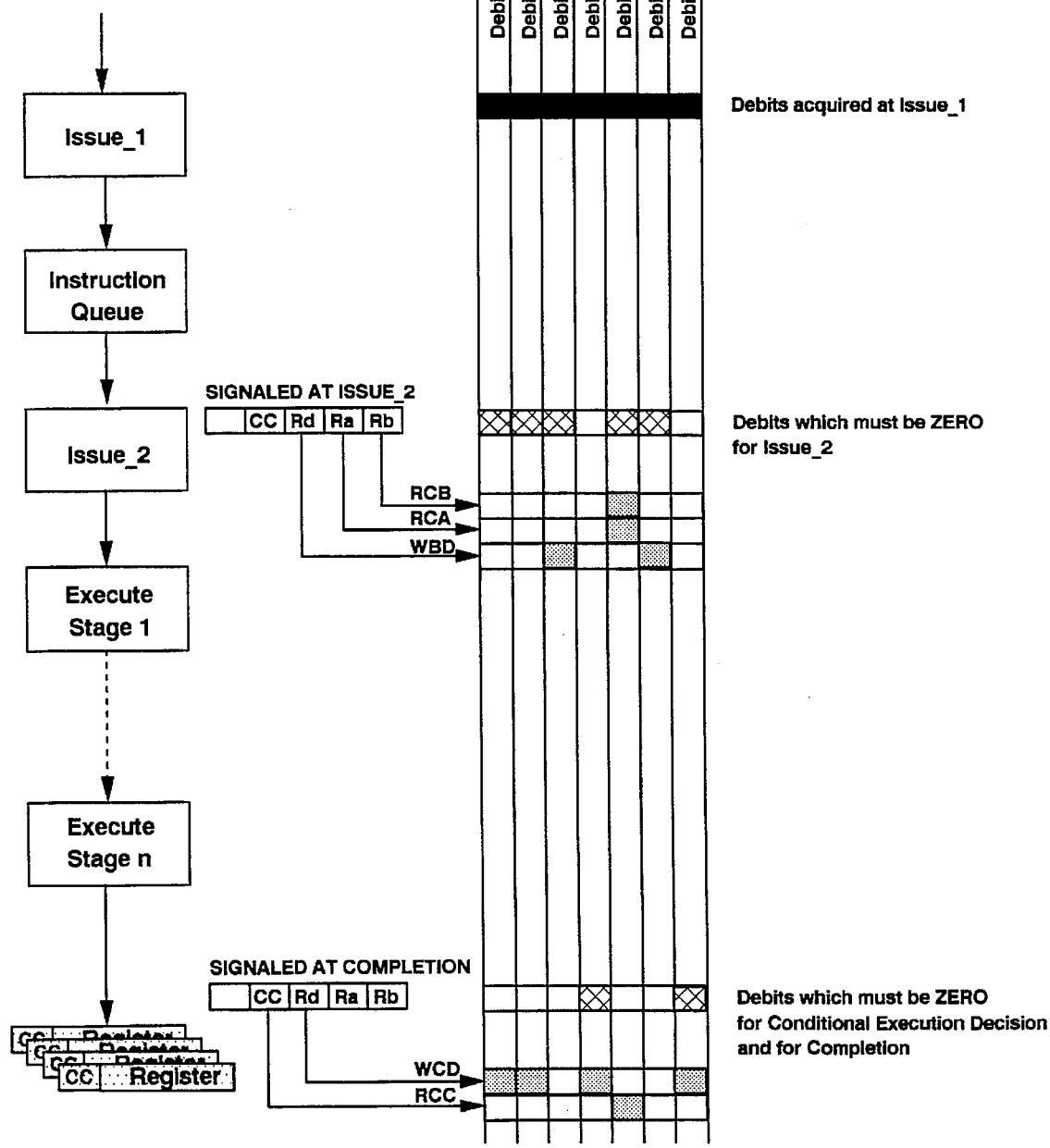
FIG. 22 shows the Multiplier and Add Functional Units' use of deficits to control instruction scheduling and execution.

FIG. 22 shows the signals originating from each of these Functional Units and which deficits they are used to decrease:

Signaled at W→Xn State Transition (Issue 2)
WBD, Write Begun Destination—a 3-bit field, with enable, from the destination field (Register and CC) that is activated at Issue__2 time (when the INSTRUCTION STATE transitions W to Xn), indicating that an instruction has began execution which will write the corresponding Register/CC.
RCA, Read Completed Source A—a 6-bit field, with enable, from the source A field and activated at Issue__2 time (when the INSTRUCTION STATE transitions W to Xn), indicating that the instruction has completed its read of source A.
RCB, Read Completed Source B—a 6-bit field, with enable, from the source B field that is activated at Issue__2 time (when the INSTRUCTION STATE transitions W to Xn), indicating that the instruction has completed its read of source B.

Signaled During X→C State Transition
RCC, Read Completed Source CC—a 6-bit field, with enable, from the source CC field that is activated when the specified Condition code is actually read (when the INSTRUCTION STATE transitions X to C), indicating that the instruction has completed its read of the source Condition Code.
WCD, Write Completed Destination—a 3-bit field, with enable, from the destination field (Register/CC) that is activated at Completion time (during the X→C state transition), indicating that the instruction has completed its write of the destination.

The row of black boxes at the top of the debit columns in FIG. 22 indicates those debits that are acquired during Issue__1. The crosshatched boxes further down the columns show those debits which must be zero for particular state transitions, as indicated.

Figure 23:
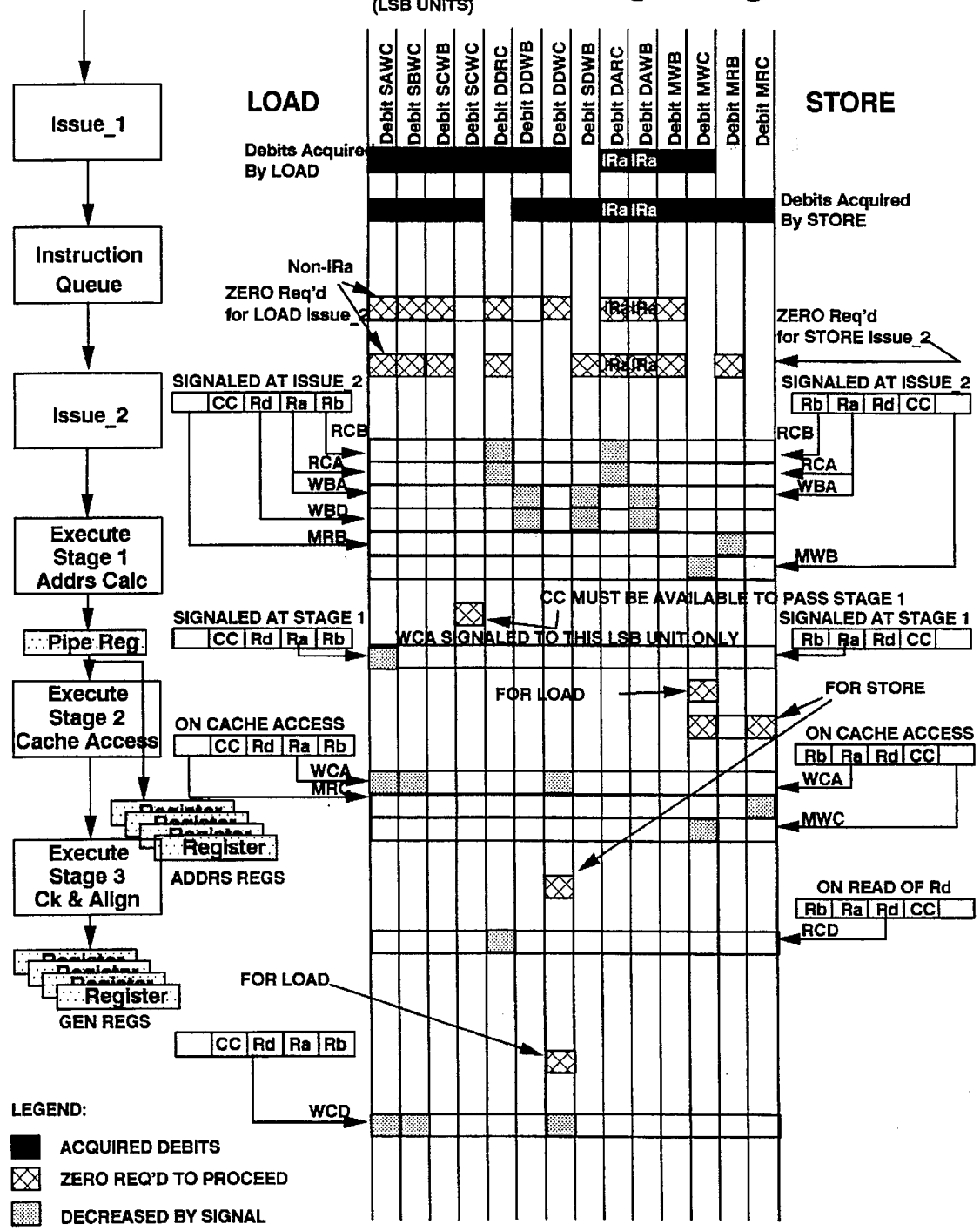
FIG. 23 shows the Load/Store/Branch Units' use of deficits to control instruction scheduling and execution.

LSB Unit Signaling: The LSB Functional Units, as shown in FIG. 23, have similar signaling needs plus signaling for IR$_a$ and for main memory. Additionally, since STORE instructions can specify 3 source operands a Read Completed Source D (RCD) signal group is added. The added signals are:

WBA, Write Begun Source A (IR$_a$=1)—a 6-bit field, with enable, from the source A field that is activated at Issue_2 time (when the INSTRUCTION STATE transitions from W to X) and that indicates that an instruction which will write R$_a$ has begun execution.

WCA, Write Completed Source A (IR$_a$=1)—a 6-bit field, with enable, from the source A field that is activated at Issue_2 time (when the INSTRUCTION STATE transitions from W to X), indicating that an instruction has completed its write to R$_a$.

RCD, Read Completed Source D (STORE)—a 6-bit field, with enable, from the source D field that is activated when the R$_d$ operand is read as part of the STORE operation, indicating that an instruction has completed its read of R$_d$.

MRB, Memory Read Begun—1 signal activated when a LOAD instruction passes Issue_2, indicating that a Memory Read Instruction has begun.

MRC, Memory Read Completed—1 signal activated when a LOAD instruction successfully obtains ownership of the addressed Cache line indicating that a Memory Read has completed.

MWB, Memory Write Begun—1 signal activated when a STORE instruction passes Issue_2, indicating that a Memory Write instruction has begun.

MWC, Memory Write Completed—1 signal activated when a STORE instruction successfully obtains ownership of the addressed Cache line, indicating that a Memory Write has completed.

During Execution—The LSB Unit Conditional Execution Decision

An LSB instruction can begin execution before the condition code controlling its conditional execution decision is available; however, before the instruction can complete its first stage of pipeline execution, it must have a valid copy of the controlling SRC CC, as known by a zero debit Debit$_{SCWC}$—SRC CC Writes Complete The other Functional Units (ADD and MUL) delay the need for the controlling condition code until instruction completion (see "Instruction Completion").

During Execution—The LOAD/STORE Memory Access

When a LOAD instruction has progressed to the point of accessing the cache, that access can only be allowed if Debit$_{MWC}$ (Memory Writes Complete) is zero. Similarly when a STORE instruction has progressed to the point of accessing the cache, that access can only be allowed if both Debit$_{MRC}$—Memory Reads Complete Debit$_{MWC}$—Memory Writes Complete are zero. This is discussed in the detailed descriptions "Main Memory Access", "LOAD Instruction, and "STORE Instruction".

Instruction Completion

Typical instruction execution involves the state transition chain

N→W→X→C

When the instruction reaches the C state it is completed. All instructions, except STORE instructions, must have Debit-$_{DRWC}$ (Destination D Write Complete) equal zero before the instruction is allowed to complete. This zero debit is required whether the conditional execution is successful or unsuccessful.

To complete non-LSB instructions must also have Debit$_{SCWC}$ (SRC CC Writes Complete) equal zero.

LSB Unit instructions require this debit to be zero early in the pipeline (see "The LSB Unit Conditional Execution Decision").

STORE instructions additionally need the Store data to be available for instruction completion, as known by a zero Debit$_{SDWC}$ (SRC D Writes Complete).

Instruction Exceptions

When an instruction detects an exception condition during execution that condition is indicated by replacing the X→C state transition with an X→I state transition.

Recognition of Interruptions: When any instruction in the packet at PC History PC_BOT (the bottom of the PC History) has a state of I and the other instructions in that packet have a state of C or I, an interruption is recognized.

Recognition of an interruption produces 4 actions:

1. Instruction fetching is suspended.
2. PC BOTTOM removal of entries is suspended so no other interruptions can occur.
3. Instruction States in the PC_History that are the X state are set to the S state (Suspended) and all other states are unaffected.
4. All Cache Line Lock bits are cleared.

Interruption: When the interruption is recognized, as described above, the interruption process is invoked through 3 automatic actions:

1. The Outstanding Activity Memory is cleared to all zeros.
2. The IHPC (Interruption Handler PC) History 980 is initialized as described below.
3. The PC History 280 is disabled and the IHPC (Interruption Handler PC) HISTORY 980 is enabled.

IHPC (Interruption Handler PC) History Initialization involves the following actions:

The pointers PC_TOP, PC_FETCH, and PC_BOT are initialized to 4, 0, and 0, respectively, and the IHPC (Interruption Handler PC) HISTORY entry 0 is initialized to the PC-value of the Interruption Vector. Entries 0, 1, 2, and 3 have the Valid-bit set and the PC STATE equal 2, 1, 1, and 1, respectively. Location 4, pointed to by PC_TOP is the next entry to be used. All other fields and entries are zeroed.

The interruption handler should save the PC History with the STORE HISTORY instruction, save the appropriate registers and condition codes, save the term registers with the MOVE FROM TERM and STORE instructions, execute the GOTO HISTORY instruction to use the standard PC History, and analyze the interruption. In this process interruptions can be re-enabled any time after the GOTO HISTORY instruction, as is appropriate for the interruption handler, thus supporting the nesting of interruption handlers where appropriate.

The interruption handler should handle all interruptions indicated in the interruption causing instruction packet, i.e. there can be more than one interruption indicated in a single packet. The next task to be scheduled can be the interrupted task or another task as determined by the scheduling algorithm.

Any operands that need to be modified (in their saved locations) as part of the interruption handler should be accomplished prior to the restore process. Additionally, the instructions in the interruption causing packet in the In state should have that state changed to the Sn state (see "Instruction State").

To restore an interrupted task, following the handling of the interruption, interruptions should be disabled and the GOTO HISTORY instruction should be executed to switch control to the IHPC (Interruption Handler PC) HISTORY. The saved term registers, registers and condition codes, and PC History should be restored as described later. Once the environment is restored the ENABLE INTERRUPTION instruction followed by the RTNTO HISTORY instruction should be executed.

Restarting the PC History After Handling an Interruption: Part of the interruption process involves restoring the PC History to its state at the time of interruption and fetching instructions based on that saved/restored state. As each PC History entry is restored via the LOAD HISTORY instruction the data is written to the location pointed to by PC_TOP and PC_TOP is incremented. Thus, after all the entries have been restored, PC_BOT and PC_FETCH both point to the first entry restored and PC_TOP points to the last. When control of execution is switched to the restored PC History by execution of the RTNTO HISTORY instruction, instruction packets addressed by the PC values in the entries are fetched and issued (Issue_1) until the absolute difference between PC_TOP and PC_FETCH is 4, then normal PC History processing continues with new PC Values being generated and added at PC_TOP. Instructions that are already marked as completed are not scheduled for re-execution by Issue_2, while those that are not marked as completed are scheduled for execution by Issue_2.

Note that the portion of the interruption handler that saves and restores state, especially that portion that operates with interruptions disabled and that portion that uses the IHPC (Interruption Handler PC) History, must be free from fault/trap-causing instructions or unpredictable operation may result.

Main Memory Accesses: The Sequential Coherency Instruction Scheduling (similar to the Sequential Coherency Memory Tagging aspect of previous patent application [Bran1]) is also used to coordinate accesses to main memory via the Data Cache. Main memory is considered to be a single resource. Memory reference instructions adhere to the following rules to ensure sequential coherency, i.e. to ensure that the results of parallel and out-of-order execution are the same as they would have been if the program were executed sequentially:

Loads must wait for previous Stores, but Loads can be executed out-of-order relative to other Loads in the other functional unit.

Stores must wait for previous Loads and previous Stores.

Sequential Coherency Memory Tagging is a special case of the Sequential Coherency Instruction Scheduling aspect of the present invention. Thus, this embodiment uses the four deficits and corresponding debits, previously described, to control memory accesses:

| Deficits | Debits |
|---|---|
| Memory Reads Begun | $Debit_{MRB}$ |
| Memory Reads Complete | $Debit_{MRC}$ |
| Memory Writes Begun | $Debit_{MWB}$ |
| Memory Writes Complete | $Debit_{MWC}$ |

LOAD Instruction: During Issue_1 a LOAD instruction acquires the deficit values from the Outstanding Activity Memory for Memory Writes Begun and Memory Writes Completed as two debits, $Debit_{MWB}$ and $Debit_{MWC}$, respectively. These two debits, if non-zero, must be decremented to zero before the LOAD can perform the specified memory access. As with the other debits the $Debit_{MWB}$ must be zero before the LOAD can begin execution (Issue_2) and $Debit_{MWC}$ must be zero before the Cache access can occur. $Debit_{MWB}$ is decreased by activated MWB signals (see "Decreasing Deficits and Debits") and $Debit_{MWC}$ is decreased by activated MWC signals.

Additionally, during Issue_1 a LOAD instruction increases the Memory Reads Begun and Memory Reads Completed deficits in Outstanding Activity Memory.

During the LOAD execution the MRB signal (see "Decreasing Deficits and Debits") is activated for the particular LSB Unit when the LOAD passes Issue_2 and begins execution. Similarly the MRC signal is activated when the LOAD instruction successfully accesses the addressed Cache Line. The LOAD instruction does not set the associated lock-bit to establish ownership of that Cache line.

Note that when two LOADS are in the same packet they are controlled by the previous debits, they may be executed in any order in relation to each other, and their activity controls subsequent STOREs. As with other instructions in the same packet, no dependencies should exist between two LOADs in the same packet.

STORE Instruction: During Issue_1 a STORE instruction acquires the deficit values from the Outstanding Activity Memory for Memory Writes Begun, Memory Writes Completed, Memory Reads Begun, and Memory Reads Completed as four debits, $Debit_{MWB}$, $Debit_{MWC}$, $Debit_{MRB}$, and $Debit_{MRC}$, respectively. These debits, if non-zero, must be decremented to zero before the STORE can perform the specified memory access. As with the other debits the $Debit_{MWB}$ and $Debit_{MRB}$ must be zero before the STORE can begin execution (Issue_2) and the $Debit_{MWC}$ and $Debit_{MRC}$ must be zero before the Cache access can occur.

Additionally, during Issue_1 a STORE instruction increases the Memory Writes Begun and Memory Writes Completed deficits in Outstanding Activity Memory.

During the STORE execution the MWB signal (see "Decreasing Deficits and Debits") is activated for the particular LSB Unit when the STORE passes Issue_2 and begins execution. Similarly the MWC signal is activated when the STORE instruction successfully accesses the addressed Cache Line and sets the associated lock-bit to establish ownership of that Cache line.

The Cache Line Lock bit is cleared when the STORE instruction completes. Additionally, all Cache Line Lock bits are cleared during an interruption.

During STORE instructions the individual Cache Line Lock bit assures that addressed set of Cache lines are interlocked from any subsequent reads or writes beginning with the STORE's initial access to determine that the virtual page is in memory and that the needed line is in the cache and extending until the STORE completes by writing the operand to the Storage location.

When a LOAD and a STORE instruction are paired in the same packet, no particular order is enforced; therefore, it is the compiler's responsibility to ensure that they cannot reference the same memory location and that their order of execution is not important.

In this description of Main Memory Accesses, the entire memory is treated as a single resource for purposes of Sequential Coherency. However, those skilled in the art will recognize that there are hardware and software techniques that can divide the memory into multiple logical pieces. If those pieces do not overlap, the Loads and Stores to different pieces need not be interlocked. Only when accesses occur to the same piece (resource) must ordering be enforced. For example, in the earlier descriptions of combining various scheduling methods with Sequential Coherency Exception Handling, an associative memory was used to record the outstanding Load and Store addresses, so that non-conflicting memory accesses could be accomplished out of their sequential program order and, thus, occur in a performance-optimized manner.

Additionally, the compiler can often determine that there is no danger of address conflicts and can provide, in the instruction stream, information that permits similar out-of-order accesses to non-conflicting addresses.

VECTOR INSTRUCTION EXTENSION TO THE PREFERRED EMBODIMENT

An embodiment of the present invention with Vector instructions that support a powerful set of vector chaining operations is described here. In this type of architecture the present invention provides significant benefits, as will become apparent in the example illustrating the benefits relative to the prior art.

Vector mode can improve the efficiency of a processor for repetitive code sequences by performing the loop count decrementation and looping branch without needing specific instructions, thus permitting operation at maximum speed with less compiler optimization, and decreasing the needed code space.

In this discussion vector mode applies to the special mode described here and scalar mode applies to the execution of instructions without use of vector mode, i.e. as previously described.

In addition to the functionality of the dynamic scheduling embodiment, the vector embodiment uses three address registers in the first LOAD/STORE/BRANCH unit (LSB1) to control the vector loops:

R48 Register 48 contains an integer count, LOOP_CNT, that is used to determine the number of times the loop is executed. R48 is decremented under program control, as described below. R48 has an associated condition code (CC48), added to assist vector mode operations as discussed below.

R49 Register 49 contains an address, LOOP_END, that is used to determine when to effect a branch back to the top or beginning of the loop. The value in LOOP_END is compared to the current PC-value as part of the PC update process.

R50 Register 50 contains an address, LOOP_BGN, that replaces the PC to effect a Branch back to the top of the loop.

These registers, after being initialized by the program as part of setup for the vector loop, are managed without specific instructions to perform the looping branch. Additionally, the decrementing of the count is controlled via a normally unused bit in the LSB instructions; thus, allowing all six instructions in every packet to be directed at the operations inside the loop, rather than needing subtract instructions to decrement the count and branch instructions to perform the loop branching. The decrement of R48 and setting the associated CC48 is controlled by the program within the loop via the DEC/SET bit in the first LOAD/STORE/BRANCH unit. This bit can appear in any normal LSB1 instruction within the limitations cited below.

The LOAD/STORE/BRANCH unit instructions do not use the WRT-bit in the RRR and RKR formats; therefore, that bit is redefined in this embodiment for LSB1 to be the DEC/SET bit. LOOP_CNT (R48) is decremented and condition code CC48 is updated when DEC/SET is specified for LSB1. The following rules apply:

1. Normally, one and only one packet within the loop should specify DEC/SET.
2. The instruction specifying DEC/SET must be a valid LSB1 RRR or RKR format instruction with the DEC/SET bit equal one. The instruction can be made the equivalent of a NOOP by zeroing the MASK field thus limiting its action to the DEC/SET function. Otherwise it may be any LSB RRR or RKR format instruction, except as listed below.
3. An instruction with the DEC/SET bit equal one indicates to the issue hardware that the instruction should become OWNER of R48 and CC48. It also indicates that the instruction should decrement R48 and set CC48 based on the result. This mechanism allows any subsequent instruction to properly use R48 or CC48 as a source.
4. The instruction that specifies DEC/SET cannot be a LOAD ADDRESS or a LOAD CONSTANT instruction because of conflicts with the POS field in the RKD format. Additionally, DEC/SET cannot be specified in a LOAD ADDRESS REGISTER instruction and the LOAD, LOAD INDEXED, STORE, and STORE INDEXED instructions cannot specify IR$_a$, because updating the Address Registers from two sources in one instruction would require additional paths.

When in vector mode the normally incremented PC-value is replaced with the value in LOOP_BGN when the current PC-value equals LOOP_END and the LOOP_CNT is greater than zero. This action occurs under hardware control in LSB1 at the point of placing the PC onto the PC History; therefore, there is no "branch umbra," i.e. instruction addresses greater than the LOOP_END address are not placed on the PC History when vector looping occurs. When the current-PC-value becomes greater than LOOP_END (because LOOP_CNT is zero or less or because a Branch within the loop changes the PC value), vector mode is exited. Loops as short as one packet can be constructed. For a one packet loop both LOOP_END and LOOP_BGN are initialized to the same address, causing every PC-value placed on the PC History to be the same, until vector mode is exited when LOOP_CNT becomes less than or equal to zero.

Vector mode is entered via two special forms of the branch instruction, the LOOP instruction and the LOOP AND LINK instruction, executed in the LSB 1 unit:

The RKA format LOOP instruction, LOOP, calculates a branch address by adding the contents of $R_a$ to the 12-bit K-field (sign extended). The vector mode flag is set (indicating that the compare and replace operations described in the previous paragraph are enabled) and the calculated branch address is placed on the PC History, if enabled by the conditional execution decision. The LOOP instruction's action is delayed by three cycles, i.e. the Branch umbra is 3 packets long. The LOOP instruction can only be executed by the LSB 1 unit.

The RRR or RKR format LOOP AND LINK instruction, LAND, calculates a branch address by adding the contents of $R_a$ and $R_b$, or the contents of $R_a$ and the 6-bit K-field (sign extended). The vector mode flag is set, the current program counter address is saved in register $R_d$, and the calculated branch address is placed on the PC History, if enabled by the conditional execution decision.

The LAND instruction's action is delayed for three cycles, i.e. the Branch umbra is 3 packets long. Code returning from a call entered via a LAND should use a GOTO $R_a$,4 instruction, where $R_a$ is the link register. Adding 4 to the link register is necessary to skip the instructions executed in the LOOP AND LINK umbra, i.e. instructions already executed. The LAND instruction can only be executed by the LSB 1 unit.

The LOOP or LAND instruction will normally, but not necessarily, point to the first packet of the vector mode loop. The target of the LOOP or LAND instruction determines only the first pass starting point; subsequent iterations use LOOP_BGN which can point elsewhere. The iterated loop consists of those packets beginning at LOOP_BGN through LOOP_END. Previous instructions, e.g. those in the LOOP or LAND branch umbra, and those from the branch target to LOOP_BGN, can be used for setup or other non-iterative operations.

If the vector loop is not a subroutine and there are no non-iterative operations to be performed, the vector mode loop can be placed immediately following the LOOP instruction (part of the loop is in the umbra). In this case, LOOP_BGN would point to the packet immediately following the packet containing the LOOP instruction, and the LOOP would target LOOP_BGN+3 to account for execution within the umbra on the first pass. Other similar variations are possible.

The PC History, as previously described, is made one bit wider by the addition of the vector mode flag, which is associated with each PC Value. Interruptions during vector mode can occur at any packet boundary. The interruption handler can use the flexibility of the LOOP instruction to properly restart the vector operation at the necessary packet.

The vector mode flag, which is associated with the PC, is cleared when the PC-value is greater than LOOP_END. This permits exits from the loop when LOOP_CNT reaches zero (falling through) or when an explicit branch instruction within the loop causes an exit. Note that backward branching (even outside the loop) or branching inside the loop does not clear vector mode. This facilitates nested and complex loops.

All loops must recognize that LOOP_CNT and the associated CC are updated when the instruction specifying DEC/SET is executed, while PC replacement occurs at the input to the PC History. These events are 3 packets apart in time. When the loop consists of four or more packets, the effect of this difference is as follows:

1. When DEC/SET is in a packet before the last three packets in the loop, a LOOP_CNT of n results in n iterations.
2. When DEC/SET is in one of the last three packets in the loop, a LOOP_CNT of n results in n+1 iterations.

Thus, based on the placement of the DEC/SET in LSB 1, the starting LOOP_CNT value may have to be adjusted by −1 to achieve the desired loop iterations.

Loops consisting of less than 4 packets are affected as follows:

Three-packet loops must always pre-adjust LOOP_CNT by −1 to achieve the desired loop iterations. The DEC/SET may appear in any of the three packets.

Two-packet loops must pre-adjust LOOP_CNT by either −1 or −2, based on the placement of the DEC/SET within the packets:

| DEC/SET PLACEMENT | LOOP CNT | ITERATIONS |
|---|---|---|
| Either packet | 0 | 1 |
| First packet | 1 | 2 |
| Second packet | 1 | 3 |
| First packet | 2 | 3 |
| Second packet | 2 | 4 |
| First packet | N | N + 1 |
| Second packet | N | N + 2 |

One-packet loops must pre-adjust LOOP_CNT by −3 to account for the fact that the packet's address will be in 3 sequential PC History locations when the packet executes the first time. FIG. 24 shows the pipeline timing for a one-packet loop that stores a constant to 6 sequential memory locations. Because a loop count of zero always yields a single pass of the loop, one-packet loops with loop counts less than 4 should be unrolled and executed in scalar mode.

Since all instructions and facilities operate identically in scalar and vector modes, with the simple extension and restrictions described above, very tight and fast programs that mix vector mode with scalar mode are easily constructed. Additionally, because vector mode uses the dynamic scheduling and conditional execution and can take advantage of the low latency feedback inherent in the present invention, code that the prior art could not vectorize is now easily vectorized. This will become even more evident from the example of intensely data dependent code, that follows.

Vector Advantages and Benefits—Intense Data Dependency Example

The advantages, benefits, and operation of the present invention are shown here through LFK24, an example of intense data dependency code from the Livermore FORTRAN Kernels (LFK's.)

LFK 24, Find Location of First Minimum In Array, is not vectorized by the compiler for any known vector processor, because recursive data and control dependencies cannot be handled by the hardware of those machines. Of all the 24 LFK's this kernel produces the lowest MegaFLOPS rating for vector machines, including all Cray models, CDC 7600, and the NEC SX-2. Thus this loop along with a few others determines the harmonic mean of the 24 loops, i.e. the overall performance across all 24 Kernels is the harmonic mean of the 24 Kernels and that harmonic mean is dominated by a few Kernels, one of which is LFK 24.

The FORTRAN source code for LFK 24 is shown below. The kernel begins by setting the X-array location halfway through the array to a very large negative value. On entry to the inner loop, where the kernel spends the majority of its time, m is set to 1, so that the initial X(m) fetched will be X(1). With k starting at 2 the initial X(k) reference is X(2). As long as X(k) is not less than X(m), k is incremented and each X(k) is compared to the X(m) value. When an X(k) is found that is less than X(m), the X(m) comparison value is replaced by that X(k) value (the data) and the k-value (the index) is copied into the variable m. The only important variables when the loop completes are L, k, and m, where L=Loop (50), k=n which is the last array index (1001), and m is the first minimum index (500). The benchmark data is organized so that every other array element is a new minimum until it reaches the −10,000,000,000 value at element 500. On entry to LFK 24, Loop and n are 50 and 1001, respectively.

LFK 24—FIND LOCATION OF FIRST MINIMUM IN ARRAY

```
FORTRAN SOURCE
   X(n/2) = -1.0E+10
   DO 24 L = 1,Loop
      m = 1
      DO 24 k = 2,n
         IF( X(k) .LT. X(m)) m=k
   CONTINUE
```

The sequential code needed for the embodiment of this invention is shown below. The associative nature of the problem is used to divide the problem into four problems that find the first minimum in the X(1) through X(250) range, the X(251) through X(500) range, the X(501) through X(750) range, and the X(751) through X(1000) range. The final code finds the first minimum among the four minimums found and X(1001). LOOP_CNT (R48) starts with a value of 250 (1000/4), because that decremented count is needed to calculate m when X(k).LT.X(m). Since each pass of the loop in each of the four ranges evaluates two X(k)'s, two DEC/SETs are used for each pass.

Each of the four problems compares two X-array elements to the latest first minimum, using the LDIN/Q instruction to load two double-precision floating-point numbers on each reference. When a new minimum is found the m value is calculated by subtracting the current value in LOOP_CNT from a constant.

Setup for the loop

|  |  |  |  |
|---|---|---|---|
|  | LCON/0 RLOOP,50 |  |  |
|  | LCON/0 RL,1 |  |  |
|  | LCON/0 RMIN,(0F,-1.0e10) |  | build DP FP number (4 inst sequence) |
|  | LADS/1 RMIN,(1F,-1.0e10) |  | * 0F, 1F, etc. are compiler directives |
|  | LADS/2 RMIN,(2F,-1.0e10) |  | * to define which 16-bits of the -1.0e10 |
|  | LADS/3 RMIN,(3F,-1.0e10) |  | * FP constant to put in the instruction |
|  | LCON/0 RXMID,X_ADRS+(499*8) | addrs of storing -1.0e10 |  |
|  | STIN/D RMIN,RXMID,0 | store it at X(n/2) |  |
|  | LCON/0 RV249,249 |  |  |
|  | LCON/0 RV250,250 | Use to adjust m from R48 |  |
|  | LCON/0 R49,V24END | Load LOOP_END addrs |  |
|  | LCON/0 R50,V24STRT | Load LOOP_BGN addrs |  |
| L24LOOP | LCON/0 R48,250 | Load LOOP_CNT, R48 = 250 |  |
|  | LCON/0 RS1X,X_ADRS-( 2*8) | addrs of 1st block minus 2 (entry @ 0*8) |  |
|  | LCON/0 RS2X,X_ADRS+(248*8) | addrs of 2nd block minus 2 (entry @ 250*8) |  |
|  | LCON/0 RS3X,X_ADRS+(498*8) | addrs of 3rd block minus 2 (entry @ 500*8) |  |
|  | LCON/0 RS4X,X_ADRS+(748*8) | addrs of 4th block minus 2 (entry @ 750*8) |  |
|  | LDIB/D RS1KM,RS1X,2 | preload min for seg 1 (for 1st is min) |  |
|  | MOVE/S RS1M,1 | m = 1 |  |
|  | LDIB/D RS2KM,RS2X,2 | preload min for seg 2 (for 1st is min) |  |
|  | MOVE/S RS2M,1 |  |  |
|  | LDIB/D RS3KM,RS3X,2 | preload min for seg 3 (for 1st is min) |  |
|  | MOVE/S RS3M,1 |  |  |
|  | LDIB/D RS4KM,RS4X,2 | preload min for seg 4 (for 1st is min) |  |
|  | MOVE/S RS4M,1 |  |  |
|  | LAND RRTN,V24STRT | Do The Vector LOOP |  |

Find the min from the 4 segments and X(1001)

|  |  |  |  |
|---|---|---|---|
| RRTN | CMPF/D RS2KM,RS1KM | SET CC6 | post processing on rtn from vector loop |
|  | MOVE/D RS1KM,RS2KM | IF CC6 .LT. |  |
|  | LCON/0 R250,250 |  |  |
|  | ADDI/S RS1M,RS2M,R250 | IF CC6 .LT. |  |
|  | CMPF/D RS3KM,RS1KM | SET CC6 |  |
|  | MOVE/D RS1KM,RS3KM | IF CC6 .LT. |  |
|  | LCON/0 R500,500 |  |  |
|  | ADDI/S RS1M,RS3M,R500 | IF CC6 .LT. |  |
|  | CMPF/D RS4KM,RS1KM | SET CC6 |  |
|  | MOVE/D RS1KM,RS4KM | IF CC6 .LT. |  |
|  | LCON/0 R750,750 |  |  |
|  | ADDI/S RS1M,RS4M,R750 | IF CC6 .LT. |  |
|  | LDIB/D RS5XK,RS4X,0 |  | RSX4 has addrs of X(1001) |
|  | CMPF/D RS5XK,RS1KM | SET CC6 |  |
|  | LCON/0 R1001,1001 |  |  |
|  | MOVE/S RS1M,R1001 | IF CC6 .LT. |  |

Min INDEX is in register RS1M (potential values of RSIM=1 to 1001)
Now do outer loop

```
           ADDI/S  RL,RL,1
           CMPI/S  RL,RLOOP     SET CC5
           GOTO    L24LOOP      IF CC5 .LE.
           GOTO    "Exit"       IF CC5 .GT.
```

The vector portion of the inner loop

```
V24STRT    DEC/SET                              do 2 DEC/SETs at
           DEC/SET                              op top R48(250->248)
           LDIB/Q  RS1XK1 [& RS1XK2],RS1X,2,IRₐ 2nd dest [] is implicit
           CMPF/D  RS1XK1,RS1KM    SET CC1
           MOVE/D  RS1KM,RS1XK1    IF CC1 .LT.
           SUBI/S  RS1M,RV249,R48  IF CC1 .LT. RS1M = 249 - R48
           CMPF/D  RS1XK2,RS1KM    SET CC1
           MOVE/D  RS1KM,RS1XK2    IF CC1 .LT.
           SUBI/S  RS1M,RV250,R48  IF CC1 .LT. RS1M = 250 - R48
           LDIB/Q  RS2XK1 [& RS2XK2],RS2X,2,IRₐ 2nd dest [] is implicit
           CMPF/D  RS2XK1,RS2KM    SET CC2
           MOVE/D  RS2KM,RS2XK1    IF CC2 .LT.
           SUBI/S  RS2M,RV249,R48  IF CC2 .LT.
           CMPF/D  RS2XK2,RS2KM    SET CC2
           MOVE/D  RS2KM,RS2XK2    IF CC2 .LT.
           SUBI/S  RS2M,RV250,R48  IF CC2 .LT.
           LDIB/Q  RS3XK1 [& RS3XK2],RS3X,2,IRₐ 2nd dest [] is implicit
           CMPF/D  RS3XK1,RS3KM    SET CC3
           MOVE/D  RS3KM,RS3XK1    IF CC3 .LT.
           SUBI/S  RS3M,RV249,R48  IF CC3 .LT.
           CMPF/D  RS3XK2,RS3KM    SET CC3
           MOVE/D  RS3KM,RS3XK2    IF CC3 .LT.
           SUBI/S  RS3M,RV250,R48  IF CC3 .LT.
           LDIB/Q  RS4XK1 [& RS4XK2],RS4X,2,IRₐ 2nd dest [] is implicit
           CMPF/D  RS4XK1,RS4KM    SET CC4
           MOVE/D  RS4KM,RS4XK1    IF CC4 .LT.
           SUBI/S  RS4M,RV249,R48  IF CC4 .LT.
           CMPF/D  RS4XK2,RS4KM    SET CC4
           MOVE/D  RS4KM,RS4XK2    IF CC4 .LT.
           SUBI/S  RS4M,RV250,R48  IF CC4 .LT.
V24END     CONTINUE (FLAG FOR OPTIMIZER, NOT A REAL INSTRUCTION)
(V24END)   GOTO RRTN    Instruction addressed by V24END label
```

Figure 25:
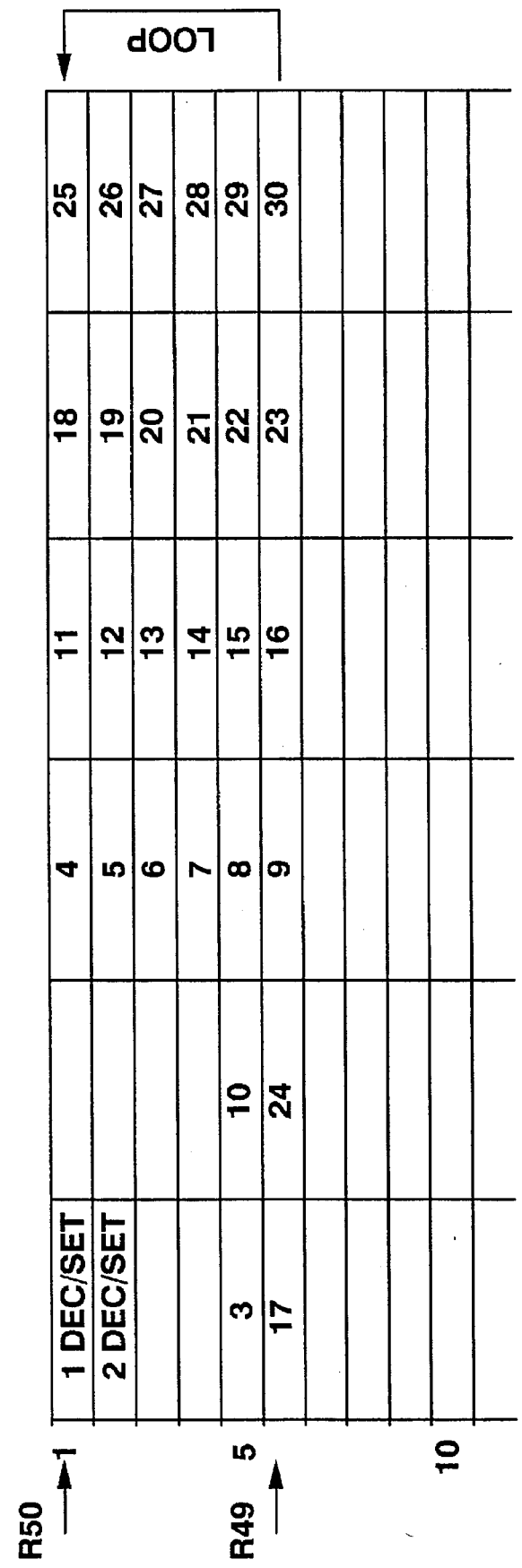
FIG. 25 shows the code mapping of the main loop of Livermore FORTRAN Kernel 24 for the Vector Embodiment.

The mapping of the vector loop (V24STRT through V24END) is shown in FIG. 25. The instruction numbers in FIG. 25 correspond to the instruction numbers, above. The LDIB instructions are aggressively scheduled so that the data needed in pass n+1 is loaded during pass n. These LDIB instructions are executed conditionally based on CC48, so that they do not complete on the final pass. Because of this aggressive scheduling, the initial LDIB instructions are done outside the loop.

As shown in FIG. 25, for this benchmark the vector embodiment of the present invention produces 8 "results" every 6 cycles. The 50 MHz CMOS VLSI implementation will thus achieve 67 MFLOPS for LFK24. The Cray-3, a faster version of the Cray-2, is expected, when available, to operate at 500 MHz, but to achieve only 5.1 MFLOPS for LFK24. The present invention will produce 10 times the performance at 1/10th the clock rate or, if implemented in the Cray-3's 500 MHz GaAs technology, will produce over 100 times the performance of the Cray-3.

Size/Cost Benefits of the Present Invention

When compared to static scheduling architectures, dynamic scheduling architectures have previously required a significant portion of their logic to be dedicated to the overhead of scheduling. As detailed in the previous patent application Ser. No. 07/448,720[Bran1] for a design that has about 60K gates of functional logic the prior art needed the following approximate logic content, while the present invention significantly improves this, as shown below. Thus the present invention with implicit signaling adds only about 20% to the basic 60K gates, while the CONDEL increases the 60K gates to 60K×16.7=1000K gates.

| Architecture | GATE COUNT | | PERCENTAGE | | Fctn + OverHd |
|---|---|---|---|---|---|
| | Fctn | OverHd | Fctn | OverHd | /Fctn |
| CONDEL | 60K | 1000K | 6% | 94% | 16.7X |
| RUU | 60K | 200K | 23% | 77% | 4.3X |
| Dyn. Sch. (apl 07/448,720) | 60K | 60K | 50% | 50% | 2.0X |
| Present Inv. w/Expl. Signal | 60K | 25K | 70% | 30% | 1.4X |
| Present Inv. w/Impl. Signal | 60K | 10K | 85% | 15% | 1.2X |

Additionally, the use of Implicit Signaling, described previously, with the Instruction Queue residing in main memory would reduce the overhead of instruction scheduling even further.

Applications of Sequential Coherency Instruction Scheduling and Sequential Coherency Exception Handling The aspects of the present invention can benefit many existing architectures including, but not limited to, the DEC VAX, the Intel 80X86, the Motorola 680xx, the Motorola 88000, the Sun Sparc, the MIPS R2000/3000, the AMD 29000, the IBM System 36, the IBM System 370, the IBM System 390, the Cray-1, Cray-XMP/YMP, and Cray-2, and the Intergraph Clipper.

The aspects of the present invention used in an existing or new computer processor architecture can benefit the application of those processors, where such applications include, but are not limited to, personal computers, workstations, servers, on line transaction processors, mainframes, supercomputers, embedded processors, signal processors, simulators, accelerators, motion control, and graphics engines.

SUMMARY AND SCOPE

Consequently, the reader will see that Sequential Coherency Instruction Scheduling and Sequential Coherency Exception Handling can be used to improve existing and new computer architectures in the following ways:

- ☑ it schedules instructions in a manner that is sequentially coherent, faster, and significantly less expensive than the prior art;
- ☑ it handles exceptions via a technique that is sequentially coherent but not excessively precise;
- ☑ it eliminates the need for the logic required for in-order-commit and/or checkpointing.
- ☑ it improves the ratio of functional logic to overhead logic even more significantly than patent application Ser. No. 07/448,720[Bran1];
- ☑ and, thereby, it permits increased processing power while staying on one chip or a small set of chips.

Although the description in this patent application contains many specifications, these should not be construed as limiting the scope of the invention, but merely providing illustrations of some embodiments of this invention.

Accordingly, the scope of the present invention should be determined by the appended claims and their legal equivalents, rather than by the examples given.

REFERENCES

| INDEX | AUTHOR, TITLE, & DATE |
|---|---|
| [Ande1] | Anderson, D. et al, "The IBM System/360 Model 91: Floating-Point Execution Unit", IBM Journal, January, 1967, pp. 34–53. |
| [Bran1] | Patent Application 07/448,720, Branigin, M. H., filed December 11, 1989. |
| [Gild1] | Gilder, George.. Microcosm: The Quantum Revolution in Economics and Technology, "Excerpts from", Electronics Business, September 4, 1989, pp, 44–48. |
| [Hsu_1] | Hsu, W.. Patt, Y.. "Checkpoint Repair for Out-of- order Execution Machines, Proceedings of the 14th Annual International Symposium on Computer Architecture, June, 1987, pp. 18–26. |
| [Ples1] | Pleszkun, A.. Sohi, G.. "The Performance Potential of Multiple Functional Unit Processors", Proceedings of the 15th Annual International Symposium on Computer Architecture, May, 1988, pp. 37–44. |
| [Smit1] | Smith, J. E., "Dynamic Instruction Scheduling and the Astronautics ZS-1", Computer, July, 1989, pp. 21–35. |
| [Smit2] | Smith, J. E.. Pleszkun, A. R., "Implementation of Precise Interrupts in Pipelined Processors", The 12th International Symposium on Computer Architecture Conference Proceedings, June, |
| [Sohi1] | Sohi, G.. Valjapeyam, S., "Instruction Issue Logic for High Performance Interruptable Pipelined Processors", Proceedings of the 14th International Conference on Computer Architecture, June, 1987, pp. 27–34. |
| [Uht_1] | Uht, A.. Wedig, R., "Hardware Extraction of Low-Level Concurrency From Serial Instruction Streams", Proceedings of the 1986 Conference on Parallel Processing, August, 1986, pp. 729–736. |

I claim:

1. A method of executing a program in a processor;

said program comprising instructions in sequential program order with each of said instructions logically previous to all subsequent instructions;

the instructions comprising source operand specifiers and destination operand specifiers;
    said source operand specifiers specifying source locations for reading source operands; and
    said destination operand specifiers specifying destination locations for writing results of the instruction;

said processor including at least one execution unit for instruction execution;

said method comprising the steps of:
    obtaining the instructions in said sequential program order;
    for each of the instructions dynamically, at run-time, determining an execution-point defining when said instruction execution is to begin, such that:
        all logically previous writes to said source locations will be accomplished before the instruction execution reads said source locations;
        all logically previous reads of said destination locations will be accomplished before the instruction execution causes said destination locations to be overwritten; and
        all logically previous writes to the destination locations will be accomplished before the instruction execution causes the destination locations to be overwritten;
    and beginning use of said execution unit by the instruction only when said execution-point has been reached;

whereby
    the processor, when appropriate, executes the instructions in an order that differs from the sequential program order;
    program execution results are identical to said program execution results obtained by executing the instructions, one at a time, in the sequential program order;
    each of the instructions is executed as early as possible with foreknowledge of when all logically previous writes of the source locations and all logically previous reads and writes of the destination locations will be completed, instead of waiting until after said logically previous reads and writes have been completed before beginning execution; and
    the execution unit is utilized by the instruction only during the instruction's active execution, thus maximizing the execution unit availabilty for other instructions, rather than monopolizing the execution unit while waiting for execution to begin.

2. A processor for executing a program;

said program comprising instructions in sequential program order with each of said instructions logically previous to all subsequent instructions;

the instructions comprising source operand specifiers and destination operand specifiers;
    said source operand specifiers specifying source locations for reading source operands; and
    said destination operand specifiers specifying destination locations for writing results of the instruction;

said processor including at least one execution unit for instruction execution;

the processor further:
obtaining the instructions in said sequential program order;
for each of the instructions dynamically, at run-time, determining an execution-point defining when said instruction execution is to begin, such that:
all logically previous writes to said source locations will be accomplished before the instruction execution reads said source locations;
all logically previous reads of said destination locations will be accomplished before the instruction execution causes said destination locations to be overwritten; and
all logically previous writes to the destination locations will be accomplished before the instruction execution causes the destination locations to be overwritten;
and beginning use of said execution unit by the instruction only when said execution-point has been reached;

whereby
the processor, when appropriate, executes the instructions in an order that differs from the sequential program order;
program execution results are identical to said program execution results obtained by executing the instructions, one at a time, in the sequential program order;
each of the instructions is executed as early as possible with foreknowledge of when all logically previous writes of the source locations and all logically previous reads and writes of the destination locations will be completed, instead of waiting until after said logically previous reads and writes have been completed before beginning execution; and
the execution unit is utilized by the instruction only during the instruction's active execution, thus maximizing the execution unit availabilty for other instructions, rather than monopolizing the execution unit while waiting for execution to begin.

* * * * *